(12) United States Patent
Sasada

(10) Patent No.: US 8,956,552 B2
(45) Date of Patent: *Feb. 17, 2015

(54) CYCLOHEXENE-3,6-DIYL COMPOUND, LIQUID CRYSTAL COMPOSITION AND LIQUID CRYSTAL DISPLAY DEVICE

(71) Applicant: Yasuyuki Sasada, Ichihara (JP)

(72) Inventor: Yasuyuki Sasada, Ichihara (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,628

(22) Filed: Jun. 17, 2013

(65) Prior Publication Data

US 2013/0277612 A1    Oct. 24, 2013

Related U.S. Application Data

(62) Division of application No. 13/880,527, filed as application No. PCT/JP2011/073552 on Oct. 13, 2011.

(30) Foreign Application Priority Data

Oct. 21, 2010 (JP) ................ 2010-236192

(51) Int. Cl.
| | |
|---|---|
| C09K 19/30 | (2006.01) |
| C09K 9/02 | (2006.01) |
| C09K 19/06 | (2006.01) |
| C07D 319/06 | (2006.01) |
| C07D 315/00 | (2006.01) |
| C07F 15/00 | (2006.01) |
| C07C 13/615 | (2006.01) |
| C07C 13/465 | (2006.01) |
| C09K 19/54 | (2006.01) |

(52) U.S. Cl.
CPC ............ C09K 19/54 (2013.01); C09K 19/3098 (2013.01); *C09K 2019/3027* (2013.01)
USPC ...... 252/299.63; 549/369; 549/428; 556/487; 568/647; 568/642; 568/645; 568/661; 568/664; 570/129; 585/22; 585/27

(58) Field of Classification Search
USPC ............. 252/299.01, 299.6, 299.63; 428/1.1; 349/182; 549/369, 428; 556/487; 568/58, 642, 645, 647; 570/129; 585/22, 27

See application file for complete search history.

(56) References Cited

U.S. PATENT DOCUMENTS

| 4,683,079 A * | 7/1987 | Bezborodov et al. ..... 252/299.67 |
| 2013/0270480 A1* | 10/2013 | Sasada ...................... 252/299.63 |

FOREIGN PATENT DOCUMENTS

| EP | 0 834 490 A1 | 4/1998 |
| JP | 04-327544 A | 11/1992 |
| WO | 97/00233 A1 | 1/1997 |

OTHER PUBLICATIONS

Bezobodov, V.S., et al., Synthesis, mesomorphic properties and potential applications of aryl esters of 4-n-alkylcyclohexane-1-carboxylic acids in electrooptic displays, Liq. Cryst., 1989, 4(2), 209-215.
International Search Report, PCT/JP2011/073552, Dec. 20, 2011, Japanese and English-translation.

* cited by examiner

*Primary Examiner* — Geraldina Visconti
(74) *Attorney, Agent, or Firm* — Hogan Lovells US LLP

(57) ABSTRACT

To provide a compound, when the compound has both a high clearing point and a low crystallization temperature, having a wide temperature range of a liquid crystal phase and also an excellent solubility in other liquid crystal compounds, and further having general physical properties necessary for the compound, namely, stability to heat, light and so forth, a suitable optical anisotropy and a suitable dielectric anisotropy. A compound is represented by formula (1):

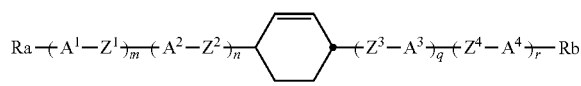

wherein, for example, Ra and Rb are alkyl having 1 to 10 carbons; $A^1$, $A^2$, $A^3$ and $A^4$ are 1,4-phenylene; $Z^1$, $Z^2$, $Z^3$ and $Z^4$ are a single bond or alkylene having 1 to 4 carbons; and m, n, q and r are independently 0, 1, or 2, and a sum of m, n, q and r is 1, 2, 3 or 4.

21 Claims, No Drawings

CYCLOHEXENE-3,6-DIYL COMPOUND, LIQUID CRYSTAL COMPOSITION AND LIQUID CRYSTAL DISPLAY DEVICE

This application is a Divisional of U.S. application Ser. No. 13/880,527, filed on Apr. 19, 2013, which is the U.S. National Phase under 35 U.S.C. §371 of International Application PCT Patent Application No. PCT/JP2011/073552, filed on Oct. 13, 2011, which claims priority to Japanese Patent Application No. 2010-236192, filed on Oct. 21, 2010; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The invention relates to a liquid crystal composition, a liquid crystal compound and a liquid crystal display device. More specifically, the invention relates to a cyclohexene-3,6-diyl compound, a liquid crystal composition that contains the same and has a nematic phase and a liquid crystal display device including the composition.

BACKGROUND ART

A liquid crystal display device typified by a liquid crystal display panel, a liquid crystal display module and so forth utilizes optical anisotropy, dielectric anisotropy and so forth of a liquid crystal compound. As an operating mode of the liquid crystal display device, various kinds of modes are known, such as a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode and a polymer sustained alignment (PSA) mode.

The liquid crystal display device is required to have capability of being driven in a temperature range from a high temperature to a low temperature. However, many cyclohexane rings are used in a compound in a composition that has been used so far, and compatibility of a compound having such a cyclohexane ring has been poor at a low temperature. Thus, a smectic phase or crystals easily precipitate, and therefore driving at a low temperature has not been easy, in particular. From such a background, development has been required for a liquid crystal compound having a high clearing point, a low crystallization temperature, an excellent compatibility and an excellent chemical stability.

For example, compound (A) as described below is reported (Patent literature No. 1, for example). However, the compound (A) has a significantly poor liquid crystallinity, and has not been sufficient as a liquid crystal compound constituting a liquid crystal composition having desired physical properties.

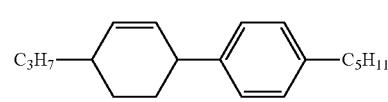

(A)

Moreover, compound (B) as described below is reported (Non-patent literature No. 1, for example). However, the compound (B) has a moiety having a problem in chemical stability, such as an ester group and a cyano group, and has not been sufficient as a liquid crystal compound constituting a liquid crystal composition used for a liquid crystal display device in which high reliability is required.

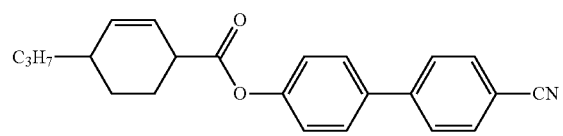

(B)

The prior arts are as described below. A further preferred liquid crystal compound, liquid crystal composition and liquid crystal display device are desired.

CITATION LIST

Patent Literature

Patent literature No. 1: JP H4-327544 A.

Non-Patent Literature

Non-patent literature No. 1: Liq. Cryst., 1989, 4(2), 209-215.

SUMMARY OF INVENTION

Technical Problem

A display device that operates according to each mode described above is constituted of a liquid crystal composition containing a liquid crystal compound. In order to further improve characteristics of the display device, the liquid crystal compound is required to have characteristics shown in (1) to (8) below. More specifically, the characteristics include:
(1) being chemically stable and physically stable;
(2) having a high clearing point (clearing point: transition temperature between a liquid crystal phase and an isotropic phase);
(3) having a low minimum temperature of a liquid crystal phase (a nematic phase, a smectic phase or the like), in particular, having a low minimum temperature of the nematic phase;
(4) having a small viscosity;
(5) having a suitable optical anisotropy;
(6) having a suitable dielectric anisotropy suited for each mode;
(7) having a suitable elastic constant suited for each mode; and
(8) having an excellent solubility in other liquid crystal compounds.

If a composition containing a liquid crystal compound being chemically and physically stable as described in (1) is used for the display device, a voltage holding ratio can be increased. A composition containing a liquid crystal compound having a high clearing point or a low minimum temperature of the liquid crystal phase as described in (2) and (3) allows extension of a temperature range of the nematic phase, and can be used in the form of the display device in a wide temperature range.

If a composition containing a compound having a small viscosity as described in (4) and a compound having a suitable elastic constant as described in (7) are used in the form of the display device, response time can be improved, and in a case of a display device in which a composition containing a compound having a suitable optical anisotropy as described in (5) is used, contrast of the display device can be improved.

In a case where a compound has a suitable dielectric anisotropy suited for each mode, a threshold voltage of a liquid crystal composition containing the compound can be decreased, and therefore a driving voltage of the display device can be decreased, and electric power consumption can also be decreased. Furthermore, when a composition containing a compound having a suitable elastic constant as described in (7) is used in the form of the display device, a driving voltage of the display device can be decreased, and electric power consumption can also be decreased.

The liquid crystal compound is generally used in the form of the liquid crystal composition prepared by mixing the compound with many other liquid crystal compounds in order to develop characteristics that are difficult to achieve by a single compound. Accordingly, the liquid crystal compound to be used for the display device preferably has a good solubility in other liquid crystal compounds and so forth as described in (8). Moreover, because the display device may be occasionally used in a wide temperature range including a freezing point or lower, a compound having a good compatibility at a low temperature is preferred.

A first aim of the invention is to provide a liquid crystal compound having stability to heat, light and so forth, a small viscosity and an excellent solubility in other liquid crystal compounds, exhibiting a nematic phase in a wide temperature range, and having a suitable optical anisotropy and a suitable elastic constant.

A second aim of the invention is to provide a liquid crystal composition that contains the compound, and has a high stability to heat, light and so forth, a low viscosity, a suitable optical anisotropy, a suitable dielectric anisotropy, a suitable elastic constant, a low threshold voltage, a high maximum temperature of the nematic phase and a low minimum temperature of the nematic phase.

A third aim of the invention is to provide a liquid crystal display device that includes the composition, and has a short response time, a small electric power consumption, a small driving voltage and a large contrast, and can be used in a wide temperature range.

Solution to Problem

In view of the problems described above, the present inventors have diligently conducted research, as a result, have found that a compound having a double bond on 2-position of a 1,4-cyclohexylene group has both a high clearing point and a low crystallization temperature, and thus the compound has, while having a wide temperature range of a liquid crystal phase, an excellent solubility in other liquid crystal compounds, stability to heat, light and so forth, a small viscosity, a suitable optical anisotropy and a suitable elastic constant, and a liquid crystal composition containing the compound has stability to heat, light and so forth, a small viscosity, a suitable optical anisotropy, a suitable elastic constant, a suitable dielectric anisotropy, a low threshold voltage, a high maximum temperature of a nematic phase and a low minimum temperature of the nematic phase, and further a liquid crystal display device including the composition has a short response time, a small electric power consumption, a small driving voltage and a large contrast ratio, and can be used in a wide temperature range, and thus have completed the invention.

The invention includes subject matters described in items 1 to 32 below. Simultaneously, a preferred example of a bonding group in compound (1) will be described.

Item 1. A compound represented by formula (1):

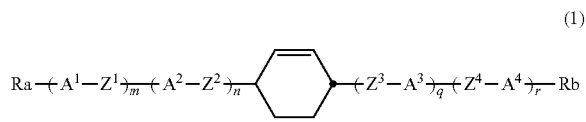

(1)

wherein, in formula (1), Ra and Rb are independently hydrogen, halogen or alkyl having 1 to 10 carbons, and in the alkyl, arbitrary —$CH_2$— may be replaced by —O—, —S—, —CO— or —$SiH_2$—, and arbitrary —$(CH_2)_2$— may be replaced by —CH=CH— or —C≡C—; $A^1$, $A^2$, $A^3$ and $A^4$ are independently 1,4-cyclohexylene, 1,4-phenylene, cyclohexene-1,4-diyl, cyclohexene-3,6-diyl, decahydronaphthalene-2,6-diyl, 1,2,3,4-tetrahydronaphthalene-2,6-diyl or naphthalene-2,6-diyl, and in the rings, one of —$CH_2$— may be replaced by —O—, —S—, —CO— or —$SiH_2$—, and arbitrary —$(CH_2)_2$— may be replaced by —CH=CH—, and in the rings, arbitrary hydrogen may be replaced by halogen, —$CF_3$, —$CHF_2$, —$CH_2F$, —$OCF_3$, —$OCHF_2$ or —$OCH_2F$; $Z^1$, $Z^2$, $Z^3$ and $Z^4$ are independently a single bond or alkylene having 1 to 4 carbons, and in the alkylene, arbitrary —$CH_2$— may be replaced by —O—, —S— or —$SiH_2$—, and arbitrary —$(CH_2)_2$— may be replaced by —CH=CH— or —C≡C—; m, n, q and r are independently 0, 1 or 2, and a sum of m, n, q and r is 1, 2, 3 or 4; and when a sum of m, n, q and r is 1, Ra and Rb are independently hydrogen, halogen or alkyl having 1 to 10 carbons, and in the alkyl, arbitrary —$CH_2$— may be replaced by —O—, —S—, —CO— or —$SiH_2$—, and arbitrary —$(CH_2)_2$— may be replaced by —CH=CH— or —C≡C—; $A^1$, $A^2$, $A^3$ and $A^4$ are independently 1,4-cyclohexylene, 1,4-phenylene in which one or more of hydrogen is replaced by halogen, cyclohexene-1,4-diyl, cyclohexene-3,6-diyl, decahydronaphthalene-2,6-diyl, 1,2,3,4-tetrahydronaphthalene-2,6-diyl or naphthalene-2,6-diyl, and in the rings, one of —$CH_2$— may be replaced by —O—, —S—, —CO—, or —$SiH_2$—, and arbitrary —$(CH_2)_2$— may be replaced by —CH=CH—, and in the rings, arbitrary hydrogen may be replaced by halogen, —$CF_3$, —$CHF_2$, —$CH_2F$, —$OCF_3$, —$OCHF_2$ or —$OCH_2F$; and $Z^1$, $Z^2$, $Z^3$ and $Z^4$ are independently a single bond or alkylene having 1 to 4 carbons, and in the alkylene, arbitrary —$CH_2$— may be replaced by —O—, —S— or —$SiH_2$—, and arbitrary —$(CH_2)_2$— may be replaced by —CH=CH— or —C≡C—.

A meaning of a phrase "in alkyl, arbitrary —$CH_2$— may be replaced by —O—, —S—, —CO— or —$SiH_2$—, and arbitrary —$(CH_2)_2$— may be replaced by —CH=CH— or —C≡C—" is shown in one example. Specific examples of groups in which arbitrary —$CH_2$— in $C_4H_9$— is replaced by —O— or arbitrary —$(CH_2)_2$— in $C_4H_9$ is replaced by —CH=CH— include $C_3H_7O$—, $CH_3$—O—$(CH_2)_2$—, $CH_3$—O—$CH_2$—O—, $H_2C$=CH—$(CH_2)_2$—, $CH_3$—CH=CH—$CH_2$— and $CH_2$=CH—$CH_2$—O—. Thus, a term "arbitrary" means "at least one selected without distinction." In consideration of stability of the compound, $CH_3$—O—$CH_2$—O— in which oxygen and oxygen are not adjacent is preferred to $CH_3$—O—O—$CH_2$— in which oxygen and oxygen are adjacent.

Preferred $R^1$ or $R^2$ is chlorine, fluorine, alkyl, alkenyl, alkoxy, alkoxyalkyl, alkenyloxy, polyfluoroalkyl, polyfluoroalkoxy and polyfluoroalkenyl each having 2 to 10 carbons. In the groups, a non-branched chain group is preferred to a branched group. Even if $R^1$ and $R^2$ are a branched group, when $R^1$ and $R^2$ are optically active, such $R^1$ and $R^2$ are preferred. Further preferred $R^1$ or $R^2$ is alkyl, alkenyl, alkoxy, alkoxyalkyl or alkenyloxy each having 2 to 10 carbons. Most preferred $R^1$ and $R^2$ are alkyl, alkoxy or alkenyl each having 2 to 10 carbons.

A preferred configuration of —CH=CH— in alkenyl depends on a position of a double bond. A trans configuration is preferred in alkenyl such as 1-propenyl, 1-butenyl, 1-pentenyl, 1-hexenyl, 3-pentenyl and 3-hexenyl. A cis configuration is preferred in alkenyl such as 2-butenyl, 2-pentenyl and 2-hexenyl.

Specific examples of $R^1$ or $R^2$ include methyl, ethyl, propyl, butyl, pentyl, hexyl, heptyl, octyl, methoxy, ethoxy, propoxy, butoxy, pentyloxy, hexyloxy, heptyloxy, methoxymethyl, methoxyethyl, methoxypropyl, ethoxymethyl, ethoxyethyl, ethoxypropyl, propoxymethyl, butoxymethyl, pentoxymethyl, vinyl, 1-propenyl, 2-propenyl, 1-butenyl, 2-butenyl, 3-butenyl, 1-pentenyl, 2-pentenyl, 3-pentenyl, 4-pentenyl, 2-propenyloxy, 2-butenyloxy, 2-pentenyloxy, —$CH_2F$, —$CHF_2$, —$CF_3$, —$(CH_2)_2F$, —$CF_2CH_2F$, —$CF_2CHF_2$, —$CH_2CF_3$, —$CF_2CF_3$, —$(CH_2)_3F$, —$(CF_2)_2CF_3$, —$CF_2CHFCF_3$, —$CHFCF_2CF_3$, —$OCF_3$, —$OCHF_2$, —$OCH_2F$, —$OCF_2CF_3$, —$OCF_2CHF_2$, —$OCF_2CH_2F$, —$OCF_2CF_2CF_3$, —$OCF_2CHFCF_3$, —$OCHFCF_2CF_3$, —CH=CHF, —CH=$CF_2$, —CF=CHF, —CH=$CHCH_2F$, —CH=$CHCF_3$ and —$(CH_2)_2CH$=$CF_2$—.

Further preferred $R^1$ or $R^2$ include fluorine, ethyl, propyl, butyl, pentyl, hexyl, heptyl, octyl, methoxy, ethoxy, propoxy, butoxy, pentyloxy, hexyloxy, heptyloxy, methoxymethyl, methoxyethyl, methoxypropyl, ethoxymethyl, ethoxyethyl, ethoxypropyl, propoxymethyl, butoxymethyl, pentoxymethyl, vinyl, 1-propenyl, 2-propenyl, 1-butenyl, 2-butenyl, 3-butenyl, 1-pentenyl, 2-pentenyl, 3-pentenyl, 4-pentenyl, 2-propenyloxy, 2-butenyloxy and 2-pentenyloxy. Most preferred $R^1$ or $R^2$ include ethyl, propyl, butyl, pentyl, hexyl, heptyl, octyl, methoxy, ethoxy, propoxy, butoxy, pentyloxy, hexyloxy, heptyloxy, vinyl, 1-propenyl, 2-propenyl, 1-butenyl, 2-butenyl, 3-butenyl, 1-pentenyl, 2-pentenyl, 3-pentenyl and 4-pentenyl.

$A^1$, $A^2$, $A^3$ and $A^4$ are independently 1,4-cyclohexylene, 1,4-phenylene, cyclohexene-1,4-diyl, cyclohexene-3,6-diyl, decahydronaphthalene-2,6-diyl, 1,2,3,4-tetrahydronaphthalene-2,6-diyl or naphthalene-2,6-diyl, but when sum of m, n, q, and r is 1, in one or more of 1,4-phenylene, one or more of hydrogen is replaced by halogen without fail, and in the rings, one of —$CH_2$— may be replaced by —O—, —S—, —CO— or —$SiH_2$—, and arbitrary —$(CH_2)_2$— may be replaced by —CH=CH—, and in the rings, one of hydrogen may be replaced by halogen, —$CF_3$, —$CHF_2$, —$CH_2F$, —$OCF_3$, —$OCHF_2$ or —$OCH_2F$.

Preferred $A^1$, $A^2$, $A^3$ and $A^4$ are 1,4-cyclohexylene, 1,4-phenylene, cyclohexene-1,4-diyl, cyclohexene-3,6-diyl, 2-fluoro-1,4-phenylene, 2,3-difluoro-1,4-phenylene, decahydronaphthalene-2,6-diyl, 1,2,3,4-tetrahydronaphthalene-2,6-diyl or naphthalene-2,6-diyl. Further preferred $A^1$, $A^2$, $A^3$ and $A^4$ are 1,4-cyclohexylene, 1,4-phenylene, cyclohexene-1,4-diyl, cyclohexene-3,6-diyl, 2-fluoro-1,4-phenylene, 3-fluoro-1,4-phenylene and 2,3-difluoro-1,4-phenylene. Most preferred $A^1$, $A^2$, $A^3$ or $A^4$ is 1,4-cyclohexylene, 1,4-phenylene and 2,3-difluoro-1,4-phenylene.

$Z^1$, $Z^2$, $Z^3$ and $Z^4$ are independently a single bond or alkylene having 1 to 4 carbons, and in the alkylene, arbitrary —$CH_2$— may be replaced by —O—, —S— or —$SiH_2$—, and arbitrary —$(CH_2)_2$— may be replaced by —CH=CH— or —C≡C—.

Preferred $Z^1$, $Z^2$, $Z^3$ and $Z^4$ are a single bond, —$(CH_2)_2$—, —CH=CH—, —$CH_2O$—, —$OCH_2$—, —$(CH_2)_4$—, —C≡C—, —$CH_2SiH_2$—, —$SiH_2CH_2$—, —$O(CH_2)_2O$—, —CH=CH—$CH_2O$— and —$OCH_2$—CH=CH—. With regard to a configuration of a double bond as in —CH=CH—, —CH=CH—$CH_2O$— and —$OCH_2$—CH=CH—, trans is preferred to cis.

Further preferred $Z^1$, $Z^2$, $Z^3$ and $Z^4$ are a single bond, —$(CH_2)_2$—, —CH=CH—, —$CH_2O$—, —$OCH_2$—, —$(CH_2)_4$— and —C≡C—. Most preferred $Z^1$, $Z^2$, $Z^3$ and $Z^4$ are a single bond, —$(CH_2)_2$—, —$CH_2O$—, —$OCH_2$— and —CH=CH—.

Item 2. The compound according to item 1, represented by formula (1-1) to formula (1-8):

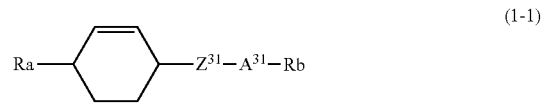

(1-1)

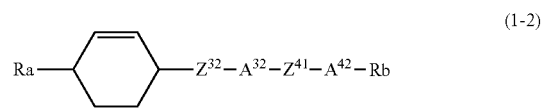

(1-2)

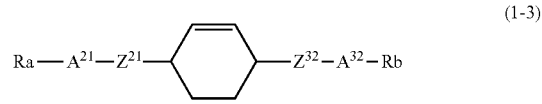

(1-3)

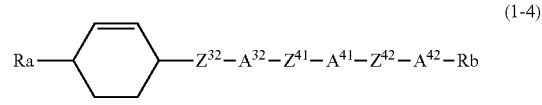

(1-4)

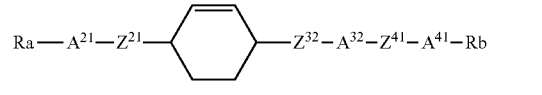

(1-5)

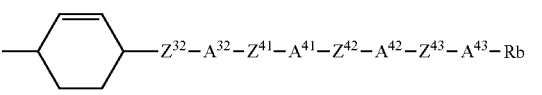

(1-6)

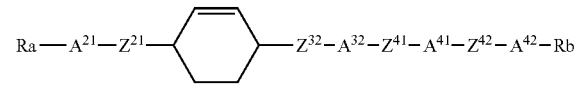

(1-7)

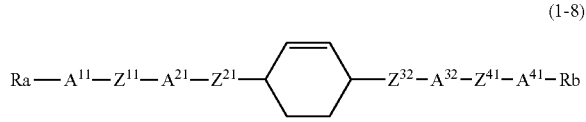

(1-8)

wherein, in formula (1-1) to formula (1-8), Ra and Rb are independently hydrogen, halogen or alkyl having 1 to 10 carbons, and in the alkyl, arbitrary —CH₂— may be replaced by —O—, —S—, —CO— or —SiH₂-r, and arbitrary —(CH₂)₂— may be replaced by —CH=CH— or —C≡C—; $A^{11}, A^{21}, A^{32}, A^{41}, A^{42}$ and $A^{43}$ are independently 1,4-cyclohexylene, cyclohexenylene-1,4-diyl, 1,4-phenylene, cyclohexene-3,6-diyl, decahydronaphthalene-2,6-diyl, 1,2,3,4-tetrahydronaphthalene-2,5-diyl or naphthalene-2,6-diyl, $A^{31}$ is 1,4-cyclohexylene, cyclohexene-1,4-diyl, 1,4-phenylene in which one or more of hydrogen is replaced by halogen, cyclohexene-3,6-diyl, decahydronaphthalene-2,6-diyl, 1,2,3,4-tetrahydronaphthalene-2,6-diyl or naphthalene-2,6-diyl, and in the rings, one of —CH₂— may be replaced by —O—, —S—, —CO—, or —SiH₂—, and arbitrary —(CH₂)₂— may be replaced by —CH=CH—, and in the rings, one of hydrogen may be replaced by halogen, —CF₃, —CHF₂, —CH₂F, —OCF₃, —OCHF₂ or —OCH₂F; and $Z^{21}, Z^{31}, Z^{32}, Z^{41}, Z^{42}$ and $Z^{43}$ are independently a single bond or alkylene having 1 to 4 carbons, and in the alkylene, arbitrary —CH₂— may be replaced by —O—, —S— or —SiH₂—, and arbitrary —(CH₂)₂— may be replaced by —CH=CH— or —C≡C—.

Item 3. The compound according to item 2, wherein, in formula (1-1) to formula (1-8) according to item 2, Ra and Rb are independently fluorine, alkyl having 1 to 10 carbons, alkenyl having 2 to 10 carbons, alkoxy having 1 to 9 carbons, alkoxyalkyl having 2 to 9 carbons, alkenyloxy having 3 to 9 carbons, polyfluoroalkyl having 2 to 10 carbons, polyfluoroalkoxy having 1 to 9 carbons or polyfluoroalkenyl having 2 to 10 carbons; $A^{11}, A^{21}, A^{32}, A^{41}, A^{42}$ and $A^{43}$ are independently 1,4-cyclohexylene, 1,4-phenylene, cyclohexene-1,4-diyl, cyclohexene-3,6-diyl, 2-fluoro-1,4-phenylene, 3-fluoro-1,4-phenylene, decahydronaphthalene-2,6-diyl, 1,2,3,4-tetrahydronaphthalene-2,6-diyl or naphthalene-2,6-diyl, and $A^{31}$ is 1,4-cyclohexylene, cyclohexene-1,4-diyl, cyclohexene-3,6-diyl, 2-fluoro-1,4-phenylene, 3-fluoro-1,4-phenylene, decahydronaphthalene-2,6-diyl, 1,2,3,4-tetrahydronaphthalene-2,6-diyl or naphthalene-2,6-diyl; and $Z^{11}, Z^{21}, Z^{31}, Z^{32}, Z^{41}, Z^{42}$ and $Z^{43}$ are independently a single bond, —(CH₂)₂—, —CH=CH—, —CH₂O—, —OCH₂—, —(CH₂)₄—, —C≡C—, —CH₂SiH₂—, —SiH₂CH₂—, —O(CH₂)₂O—, —CH=CH—CH₂O— or —OCH₂—CH=CH—.

Item 4. The compound according to item 2, wherein, in formula (1-1) to formula (1-5) according to item 2, Ra and Rb are independently fluorine, alkyl having 1 to 8 carbons, alkenyl having 2 to 8 carbons, alkoxy having 1 to 7 carbons, alkoxyalkyl having 2 to 7 carbons or alkenyloxy having 3 to 7 carbons; $A^{21}, A^{32}, A^{41}$ and $A^{42}$ are independently 1,4-cyclohexylene, 1,4-phenylene, cyclohexene-1,4-diyl, cyclohexene-3,6-diyl, 2-fluoro-1,4-phenylene or 3-fluoro-1,4-phenylene, and $A^{31}$ is 1,4-cyclohexylene, cyclohexene-1,4-diyl, cyclohexene-3,6-diyl, 2-fluoro-1,4-phenylene or 3-fluoro-1,4-phenylene; and $Z^{21}, Z^{31}, Z^{32}, Z^{41}$ and $Z^{42}$ are independently a single bond, —(CH₂)₂—, —CH=CH—, —CH₂O—, —OCH₂—, —(CH₂)₄— or —C≡C—.

Item 5. The compound according to item 2, wherein, in formula (1-1) to formula (1-3), Ra and Rb are independently alkyl having 1 to 5 carbons, alkenyl having 2 to 5 carbons or alkoxy having 1 to 4 carbons; $A^{21}, A^{31}, A^{32}$ and $A^{42}$ are independently 1,4-cyclohexylene; and $Z^{21}, Z^{31}, Z^{32}$ and $Z^{42}$ are independently a single bond, —(CH₂)₂— or —CH=CH—.

Item 6. The compound according to item 2, wherein, in formula (1-1) to formula (1-3), $A^{21}, A^{31}, A^{32}$ and $A^{42}$ are independently 1,4-cyclohexylene, and $Z^2, Z^{31}, Z^{32}$ and $Z^{42}$ are a single bond.

Item 7. The compound according to item 1, represented by formula (1-1) to formula (1-8):

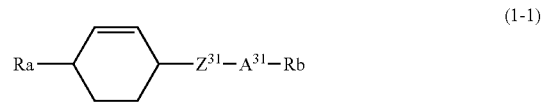

(1-1)

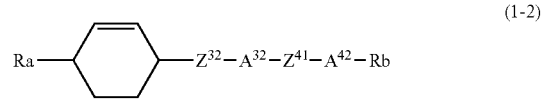

(1-2)

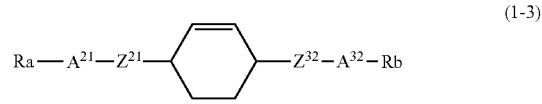

(1-3)

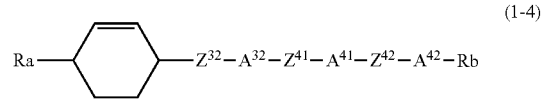

(1-4)

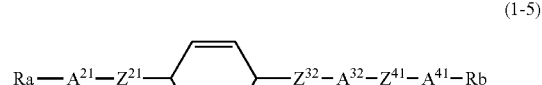

(1-5)

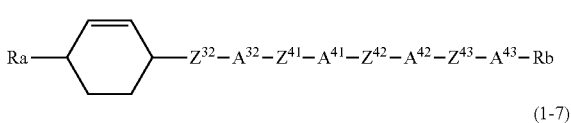

(1-6)

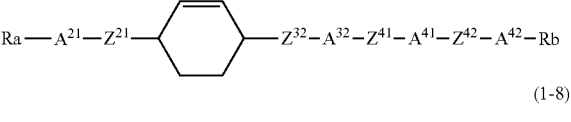

(1-7)

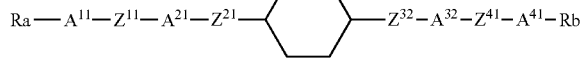

(1-8)

wherein, in formula (1-1) to formula (1-8), Ra and Rb are independently alkyl having 1 to 10 carbons, alkenyl having 2 to 10 carbons, alkoxy having 1 to 9 carbons, alkoxyalkyl having 2 to 9 carbons, alkenyloxy having 3 to 9 carbons, polyfluoroalkyl having 2 to 10 carbons, polyfluoroalkoxy having 1 to 9 carbons or polyfluoroalkenyl having 2 to 10 carbons; $A^{11}, A^{21}, A^{31}, A^{32}, A^{41}, A^{42}$ and $A^{43}$ are independently 1,4-cyclohexylene, 1,4-phenylene, cyclohexene-1,4-diyl, cyclohexene-3,6-diyl, tetrahydropyran-2,5-diyl, 1,3-dioxane-2,5-diyl, 2-fluoro-1,4-phenylene, 3-fluoro-1,4-phenylene, 2,3-difluoro-1,4-phenylene, 2-(trifluoromethyl)-3-fluoro-1,4-phenylene, 2-fluoro-3-(trifluoromethyl)-1,4-phenylene, 2-(difluoromethyl)-3-fluoro-1,4-phenylene, 2-fluoro-3-(difluoromethyl)-1,4-phenylene, 2-trifluoromethyl-1,4-phenylene, 3-trifluoromethyl-1,4-phenylene, 2-difluoromethyl-1,4-phenylene, 3-difluoromethyl-1,4-phenylene, decahydronaphthalene-2,6-diyl or naphthalene-2,6-diyl, but at least one of $A^{11}, A^{21}, A^{31}, A^{32}, A^{41}, A^{42}$ and $A^{43}$ is 2,3-difluoro-1,4-phenylene, 2-(trifluoromethyl)-3-fluoro-1,4-phenylene, 2-fluoro-3-(trifluoromethyl)-1,4-phenylene, 2-(difluoromethyl)-3-fluoro-1,4-phenylene or 2-fluoro-3-(difluoromethyl)-1,4-phenylene; and $Z^{11}, Z^{21}, Z^{31}, Z^{32}, Z^{41}, Z^{42}$, and $Z^{43}$ are independently a single bond, —(CH₂)₂—, —CH=CH—, —CH₂O—, —OCH₂—, —(CH₂)₄—, —C≡C—, —CH₂SiH₂—, —SiH₂CH₂—, —CH=CH—CH₂O— or —OCH₂—CH=CH—.

Item 8. The compound according to item 7, wherein, in formula (1-1) to formula (1-5), Ra and Rb are independently fluorine, alkyl having 1 to 8 carbons, alkenyl having 2 to 8 carbons, alkoxy having 1 to 7 carbons, alkoxyalkyl having 2 to 7 carbons or alkenyloxy having 3 to 7 carbons; $A^{21}$, $A^{31}$, $A^{32}$, $A^{41}$ and $A^{42}$ are independently 1,4-cyclohexylene, 1,4-phenylene, cyclohexene-1,4-diyl, tetrahydropyran-2,5-diyl, 2-fluoro-1,4-phenylene, 3-fluoro-1,4-phenylene, 2,3-difluoro-1,4-phenylene, 2-(trifluoromethyl)-3-fluoro-1,4-phenylene, 2-fluoro-3-(trifluoromethyl)-1,4-phenylene, 2-(difluoromethyl)-3-fluoro-1,4-phenylene or 2-fluoro-3-(difluoromethyl)-1,4-phenylene, but at least one of $A^{21}$, $A^{31}$, $A^{32}$, $A^{41}$ and $A^{42}$ is 2,3-difluoro-1,4-phenylene, 2-(trifluoromethyl)-3-fluoro-1,4-phenylene, 2-fluoro-3-(trifluoromethyl)-1,4-phenylene, 2-(difluoromethyl)-3-fluoro-1,4-phenylene or 2-fluoro-3-(difluoromethyl)-1,4-phenylene; and $Z^{21}$, $Z^{31}$, $Z^{32}$, $Z^{41}$ and $Z^{42}$ are independently a single bond, —(CH$_2$)$_2$—, —CH=CH—, —CH$_2$O—, —OCH$_2$—, —(CH$_2$)$_4$— or —C≡C—.

Item 9. The compound according to item 7, wherein, in formula (1-1) to formula (1-5), Ra and Rb are independently alkyl having 1 to 5 carbons, alkenyl having 2 to 5 carbons or alkoxy having 1 to 4 carbons; $A^{21}$, $A^{31}$, $A^{32}$, $A^{41}$ and $A^{42}$ are independently 1,4-cyclohexylene, 1,4-phenylene, 2-fluoro-1,4-phenylene, 3-fluoro-1,4-phenylene or 2,3-difluoro-1,4-phenylene, but at least one of $A^{21}$, $A^{31}$, $A^{32}$, $A^{41}$ and $A^{42}$ is 2,3-difluoro-1,4-phenylene; and $Z^{21}$, $Z^{31}$, $Z^{32}$, $Z^{41}$ and $Z^{42}$ are independently a single bond, —(CH$_2$)$_2$—, —CH$_2$O—, —OCH$_2$— or —CH=CH—.

Item 10. The compound according to item 7, wherein, in formula (1-1) to formula (1-3), $A^{21}$, $A^{31}$, $A^{32}$ and $A^{42}$ are independently 1,4-cyclohexylene, 1,4-phenylene or 2,3-difluoro-1,4-phenylene, but at least one of $A^{21}$, $A^{31}$, $A^{32}$ and $A^{42}$ is 2,3-difluoro-1,4-phenylene, and $Z^{21}$, $Z^{31}$, $Z^{32}$ and $Z^{42}$ are a single bond, —CH$_2$O— or —OCH$_2$—.

Item 11. The compound according to item 2, represented by any one of formula (1-1-1) to formula (1-1-2), formula (1-2-1) to formula (1-2-4), formula (1-3-1) to formula (1-3-3), formula (I-4-1) to formula (1-4-6) and formula (1-5-1) to formula (1-5-7):

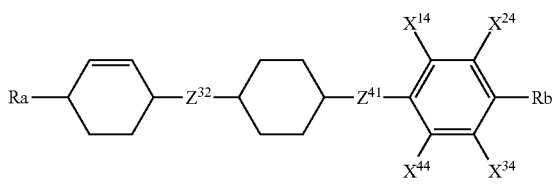

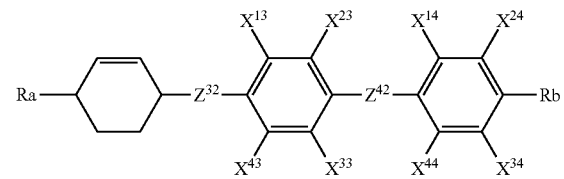

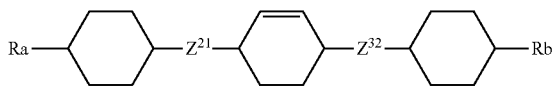

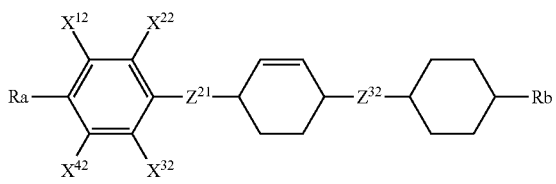

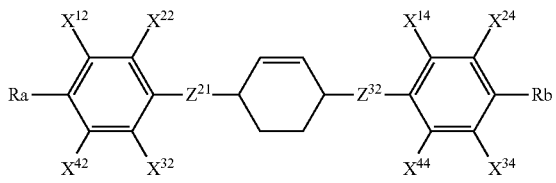

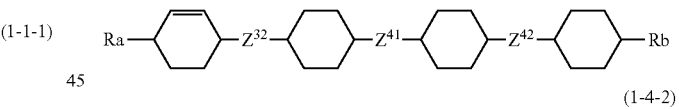

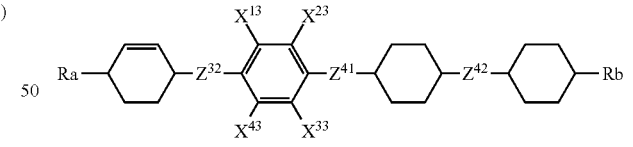

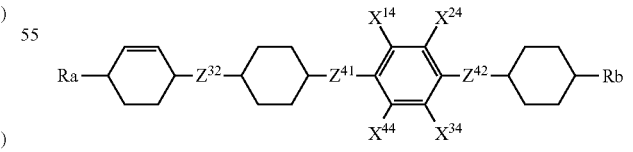

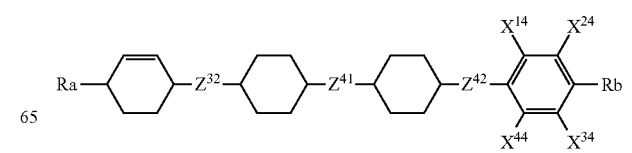

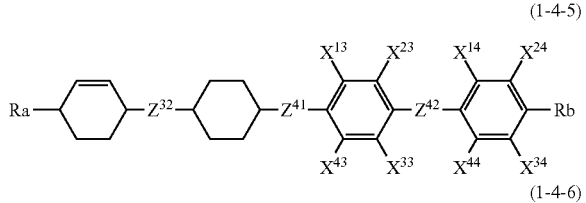
(1-4-5)

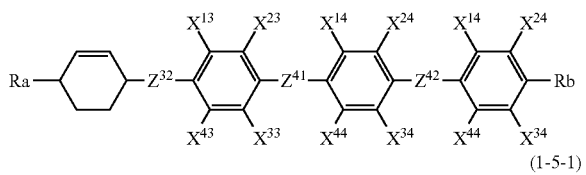
(1-4-6)

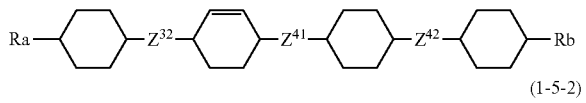
(1-5-1)

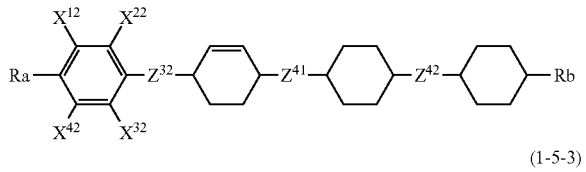
(1-5-2)

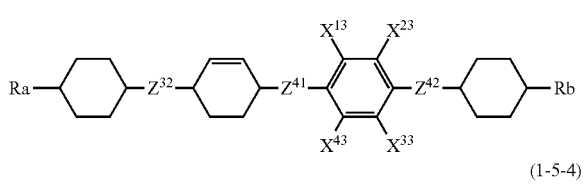
(1-5-3)

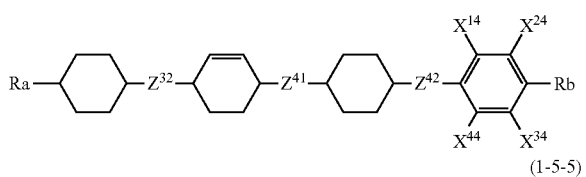
(1-5-4)

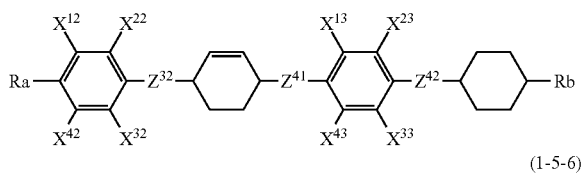
(1-5-5)

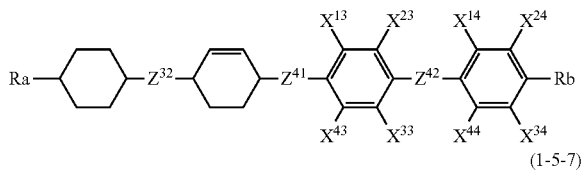
(1-5-6)

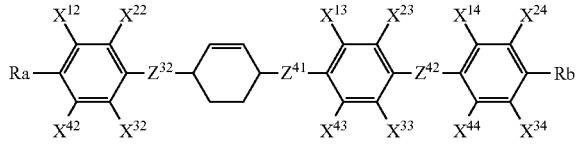
(1-5-7)

wherein, in formula (1-1-1), formula (1-2-1) to formula (1-2-4), formula (1-3-1) to formula (1-3-3), formula (1-4-1) to formula (1-4-6) and formula (1-5-1) to formula (1-5-7), Ra and Rb are independently alkyl having 2 to 10 carbons, alkoxy having 1 to 9 carbons or alkenyl having 2 to 10 carbons; $Z^{21}$, $Z^{31}$, $Z^{32}$, $Z^{41}$ and $Z^{42}$ are independently a single bond, —(CH$_2$)$_2$—, —CH=CH—, —CH$_2$O—, —OCH$_2$—, —CF$_2$O— or —OCF$_2$—; $X^{12}$ to $X^{14}$, $X^{22}$ to $X^{24}$, $X^{32}$ to $X^{34}$ and $X^{42}$ to $X^{44}$ are independently fluorine or hydrogen; in formula (1-1-2), $R^3$ and $R^4$ are independently alkyl having 1 to 10 carbons, alkenyl having 2 to 10 carbons, alkoxy having 1 to 9 carbons, alkoxyalkyl having 2 to 9 carbons or alkenyloxy having 2 to 9 carbons; $X^{10}$, $X^{20}$, $X^{30}$ and $X^{40}$ are independently hydrogen or fluorine, and at least one of $X^{10}$, $X^{20}$, $X^{30}$ and $X^{40}$ is fluorine; and $Z^{31}$ is a single bond, —(CH$_2$)$_2$—, —CH=CH—, —CH$_2$O—, —OCH$_2$—, —CF$_2$O— or —OCF$_2$—.

Item 12. The compound according to item 2, represented by any one of formulas (1-1-1), (1-2-1) and (1-3-1):

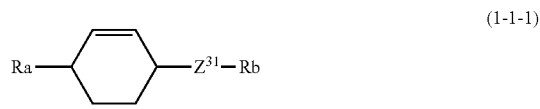
(1-1-1)

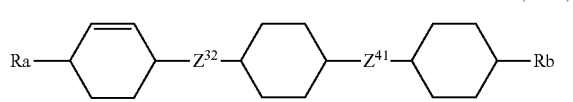
(1-2-1)

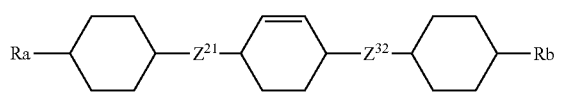
(1-3-1)

wherein, in formulas (1-1-1), (1-2-1) and (1-3-1), Ra and Rb are independently alkyl having 1 to 8 carbons, alkoxy having 1 to 7 carbons or alkenyl having 2 to 8 carbons; and $Z^{21}$, $Z^{31}$, $Z^{32}$ and $Z^{41}$ are independently a single bond, —(CH$_2$)$_2$—, —CH=CH—, —CH$_2$O— or —OCH$_2$—.

Item 13. The compound according to item 12, wherein, in formulas (1-1-1), (1-2-1) and (1-3-1), Ra and Rb are alkyl having 1 to 5 carbons or alkenyl having 2 to 5 carbons; and $Z^{21}$, $Z^{31}$, $Z^{32}$ and $Z^{41}$ are independently a single bond or —CH=CH—.

Item 14. The compound according to item 12, wherein, in formulas (1-1-1), (1-2-1) and (1-3-1), one of Ra and Rb is alkenyl having 2 to 5 carbons; and $Z^{21}$, $Z^{31}$, $Z^{32}$ and $Z^{41}$ are independently a single bond or —CH=CH—.

Item 15. The compound according to item 12, wherein, in formulas (1-1-1), (1-2-1) and (1-3-1), Ra and Rb are alkenyl having 2 to 5 carbons, and $Z^{21}$, $Z^{31}$, $Z^{32}$ and $Z^{41}$ are independently a single bond or —CH=CH—.

Item 16. The compound according to item 7, represented by any one of formula (1-1-2), formula (1-2-2) to formula (1-2-4), formula (1-3-2), formula (1-3-3), formula (1-4-2) to formula (1-4-6) and formula (1-5-2) to formula (1-5-7):

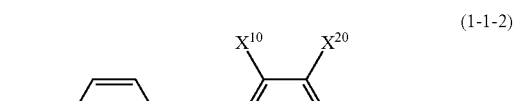
(1-1-2)

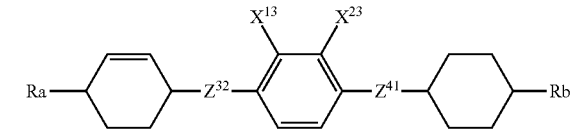
(1-2-2)

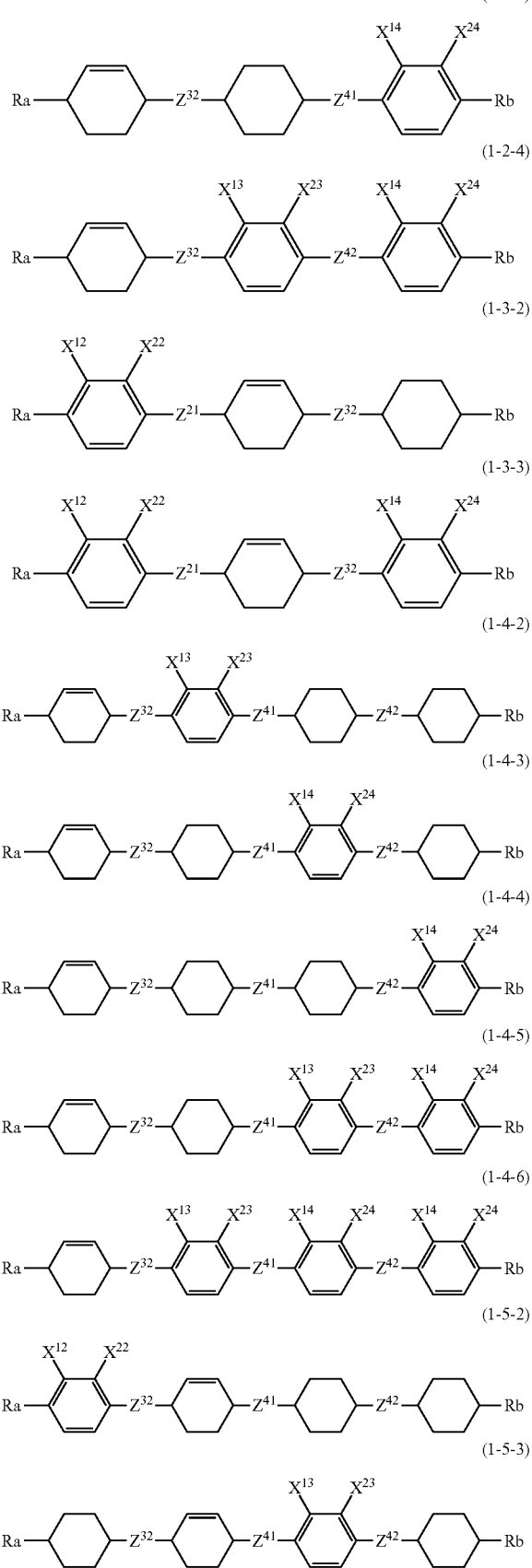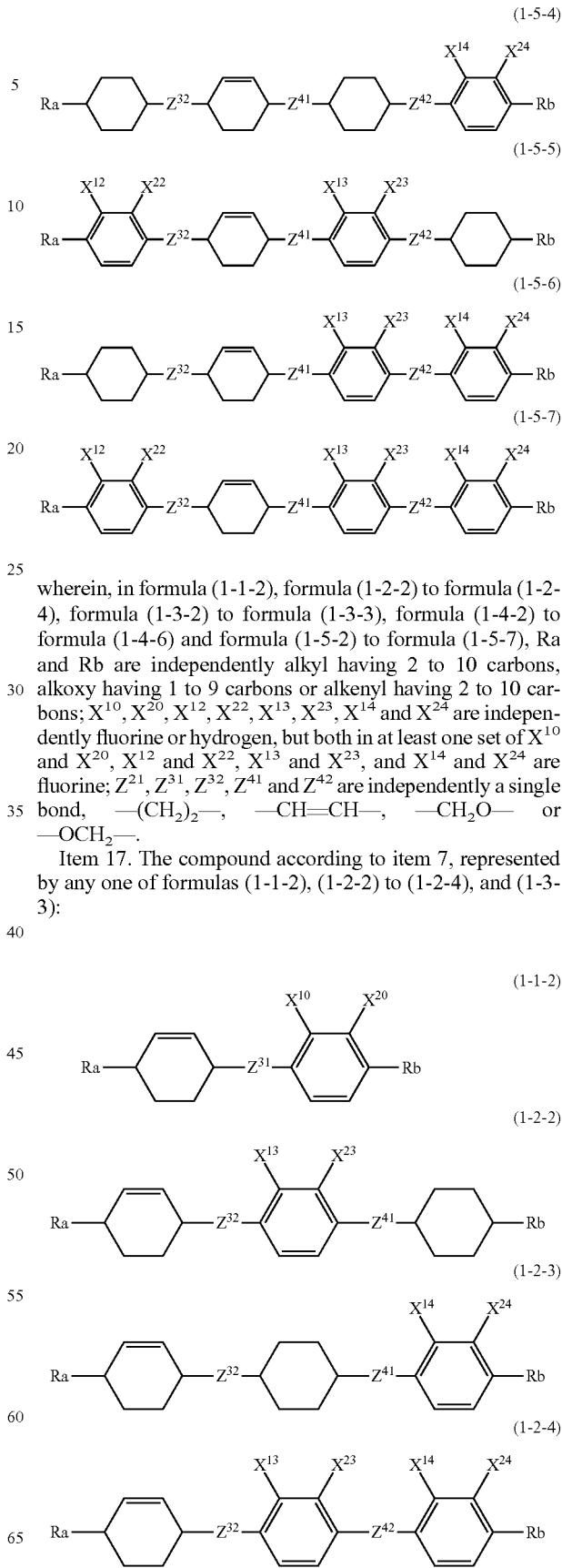

wherein, in formula (1-1-2), formula (1-2-2) to formula (1-2-4), formula (1-3-2) to formula (1-3-3), formula (1-4-2) to formula (1-4-6) and formula (1-5-2) to formula (1-5-7), Ra and Rb are independently alkyl having 2 to 10 carbons, alkoxy having 1 to 9 carbons or alkenyl having 2 to 10 carbons; $X^{10}$, $X^{20}$, $X^{12}$, $X^{22}$, $X^{13}$, $X^{23}$, $X^{14}$ and $X^{24}$ are independently fluorine or hydrogen, but both in at least one set of $X^{10}$ and $X^{20}$, $X^{12}$ and $X^{22}$, $X^{13}$ and $X^{23}$, and $X^{14}$ and $X^{24}$ are fluorine; $Z^{21}$, $Z^{31}$, $Z^{32}$, $Z^{41}$ and $Z^{42}$ are independently a single bond, —$(CH_2)_2$—, —CH=CH—, —$CH_2O$— or —$OCH_2$—.

Item 17. The compound according to item 7, represented by any one of formulas (1-1-2), (1-2-2) to (1-2-4), and (1-3-3):

(1-3-3)

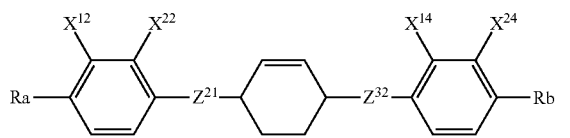

wherein, in formulas (1-1-2), (1-2-2) to (1-2-4), and (1-3-3), $R^a$ and Rb are independently alkyl having 1 to 8 carbons, alkoxy having 1 to 7 carbons or alkenyl having 2 to 8 carbons; $X^{10}, X^{20}, X^{12}, X^{22}, X^{13}, X^{23}, X^{14}$ and $X^{24}$ are independently fluorine or hydrogen, but both in at least one set of $X^{10}$ and $X^{20}, X^{12}$ and $X^{22}, X^{13}$ and $X^{23}$, and $X^{14}$ and $X^{24}$ are fluorine; $Z^{21}, Z^{31}, Z^{32}$ and $Z^{41}$ are independently a single bond, —(CH$_2$)$_2$—, —CH=CH—, —CH$_2$O— or —OCH$_2$—.

Item 18. The compound according to item 17, wherein, in formulas (1-1-2), (1-2-3) and (1-2-4), Ra and Rb are alkyl having 1 to 5 carbons, alkoxy having 1 to 5 carbons or alkenyl having 2 to 5 carbons; $X^{10}, X^{20}, X^{14}$ and $X^{24}$ are fluorine, $X^{13}$ and $X^{23}$ are independently fluorine or hydrogen; and $Z^{21}, Z^{31}, Z^{32}$ and $Z^{41}$ are independently a single bond, —CH=CH—, —CH$_2$O— or —OCH$_2$—.

Item 19. The compound according to item 17, wherein, in formulas (1-1-2), (1-2-3) and (1-2-4), Ra and Rb are alkyl having 1 to 5 carbons, alkoxy having 1 to 5 carbons or alkenyl having 2 to 5 carbons; $X^{10}, X^{20}, X^{14}$ and $X^{24}$ are fluorine, and $X^{13}$ and $X^{23}$ are independently fluorine or hydrogen; and $Z^{21}, Z^{31}, Z^{32}$ and $Z^{41}$ are independently a single bond, —CH$_2$O— or —OCH$_2$—.

Item 20. The compound according to item 17, wherein, in formulas (1-1-2), (1-2-3) and (1-2-4), Ra and Rb are alkyl having 1 to 5 carbons, alkoxy having 1 to 5 carbons or alkenyl having 2 to 5 carbons; $X^{10}, X^{20}, X^{14}$ and $X^{24}$ are fluorine, and $X^{13}$ and $X^{23}$ are hydrogen; and $Z^{21}, Z^{31}, Z^{32}$ and $Z^{41}$ are independently a single bond or —CH$_2$O—.

Item 21. A liquid crystal composition containing at least one compound according to any one of items 1 to 20.

Item 22. The liquid crystal composition according to item 21, further containing at least one compound selected from the group of compounds represented by formulas (2), (3) and (4):

(2)

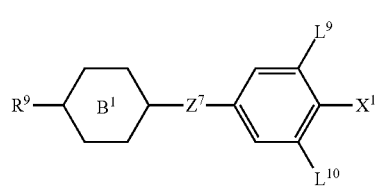

(3)

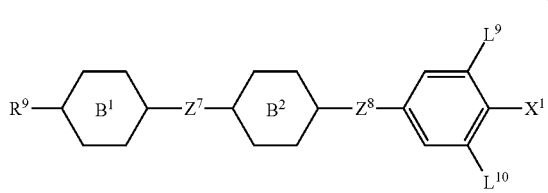

(4)

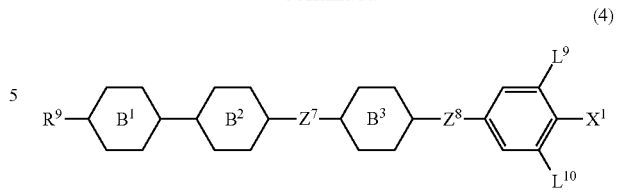

wherein, in formulas (2) to (4), $R^9$ is independently alkyl having 1 to 10 carbons or alkenyl having 2 to 10 carbons, and in the alkyl and the alkenyl, arbitrary hydrogen may be replaced by fluorine and arbitrary —CH$_2$— may be replaced by —O—;

$X^1$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$;

ring $B^1$, ring $B^2$ and ring $B^3$ are independently 1,4-cyclohexylene, 1,3-dioxane-2,5-diyl, pyrimidine-2,5-diyl, tetrahydropyran-2,5-diyl, 1,4-phenylene, 2-fluoro-1,4-phenylene, 3-fluoro-1,4-phenylene or 3,5-difluoro-1,4-phenylene;

$Z^7$ and $Z^8$ are independently —(CH$_2$)$_2$—, —(CH$_2$)$_4$—, —COO—, —CF$_2$O—, —OCF$_2$—, —CH=CH—, —C≡C—, —CH$_2$O— or a single bond; and $L^9$ and $L^{10}$ are independently hydrogen or fluorine.

Item 23. The liquid crystal composition according to item 21, further containing at least one compound selected from the group of compounds represented by formula (5):

(5)

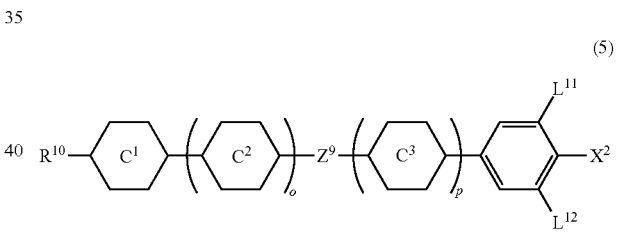

wherein, in formula (5), $R^{10}$ is alkyl having 1 to 10 carbons or alkenyl having 2 to 10 carbons, and in the alkyl and the alkenyl, arbitrary hydrogen may be replaced by fluorine and arbitrary —CH$_2$— may be replaced by —O—;

$X^2$ is —C≡N or —C≡C—C≡N;

ring $C^1$, ring $C^2$ and ring $C^3$ are independently 1,4-cyclohexylene, 1,4-phenylene in which arbitrary hydrogen may be replaced by fluorine, 1,3-dioxane-2,5-diyl, tetrahydropyran-2,5-diyl or pyrimidine-2,5-diyl;

$Z^9$ is —(CH$_2$)$_2$—, —COO—, —CF$_2$O—, —OCF$_2$—, —C≡C—, —CH$_2$O— or a single bond;

$L^{11}$ and $L^{12}$ are independently hydrogen or fluorine; and o is 0, 1 or 2, p is 0 or 1, and a sum of o and p is 0, 1, 2 or 3.

Item 24. The liquid crystal composition according to item 21, further containing at least one compound selected from the group of compounds represented by formulas (6), (7), (8), (9), (10) and (11):

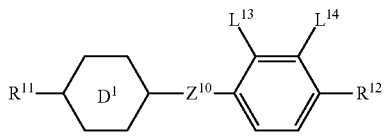

(6)

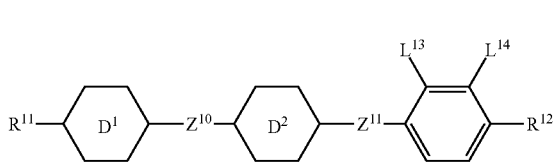

(7)

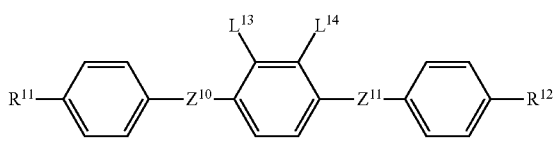

(8)

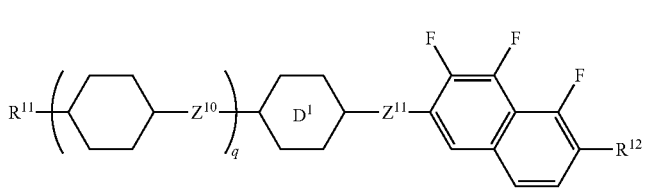

(9)

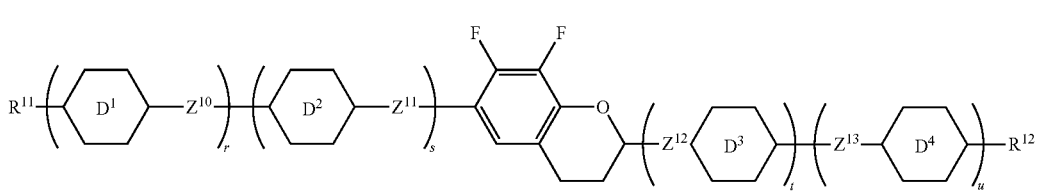

(10)

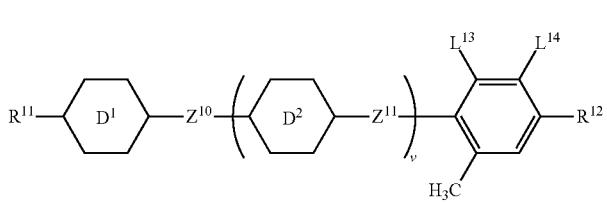

(11)

wherein, in formulas (6) to (11), $R^{11}$ and $R^{12}$ are independently alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;

ring $D^1$, ring $D^2$, ring $D^3$ and ring $D^4$ are independently 1,4-cyclohexylene, 1,4-cyclohexenylene, 1,4-phenylene in which arbitrary hydrogen may be replaced by fluorine, 6-tetrahydropyran-2,5-diyl or decahydro-2,6-naphthalene;

$Z^{10}$, $Z^{11}$, $Z^{12}$ and $Z^{13}$ are independently —$(CH_2)_2$—, —COO—, —$CH_2O$—, —$OCF_2$—, —$OCF_2(CH_2)_2$— or a single bond;

$L^{13}$ and $L^{14}$ are independently fluorine or chlorine; and q, r, s, t, u and v are independently 0 or 1, and a sum of r, s, t and u is 1 or 2.

Item 25. The liquid crystal composition according to item 21, further containing at least one compound selected from the group of compounds represented by formulas (12), (13) and (14):

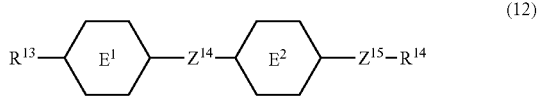

(12)

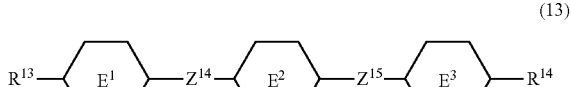

(13)

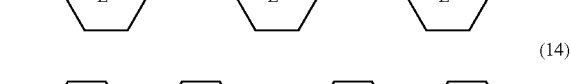

(14)

wherein, in formulas (12) to (14), $R^{13}$ and $R^{14}$ are independently alkyl having 1 to 10 carbons or alkenyl having 2 to 10 carbons, and in the alkyl and the alkenyl, arbitrary —$CH_2$— may be replaced by —O—;

ring $E^1$, ring $E^2$ and ring $E^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are independently —C≡C—, —COO—, —(CH$_2$)$_2$—, —CH═CH— or a single bond.

Item 26. The liquid crystal composition according to item 22, further containing at least one compound selected from the group of compounds represented by formula (5) according to item 23.

Item 27. The liquid crystal composition according to item 22, further containing at least one compound selected from the group of compounds represented by formulas (12), (13) and (14) according to item 25.

Item 28. The liquid crystal composition according to item 23, further containing at least one compound selected from the group of compounds represented by formulas (12), (13) and (14) according to item 25.

Item 29. The liquid crystal composition according to item 24, further containing at least one compound selected from the group of compounds represented by formulas (12), (13) and (14) according to item 25.

Item 30. The liquid crystal composition according to any one of items 21 to 29, further containing at least one optically active compound and/or at least one polymerizable compound.

Item 31. The liquid crystal composition according to any one of items 21 to 30, further containing at least one antioxidant and/or at least one ultraviolet light absorber.

Item 32. A liquid crystal display device including the liquid crystal composition according to any one of items 21 to 31.

Advantageous Effects of Invention

A compound of the invention has both a high clearing point and a low crystallization temperature, and thus has a wide temperature range of a liquid crystal phase, and an excellent solubility in other liquid crystal compounds. The compound of the invention has general physical properties necessary for the compound, namely, stability to heat, light and so forth, a suitable optical anisotropy and a suitable dielectric anisotropy. A liquid crystal composition of the invention contains at least one of the compounds, and has a high maximum temperature of a nematic phase, a low minimum temperature of the nematic phase, a small viscosity, a suitable optical anisotropy and a low threshold voltage. A liquid crystal display device of the invention includes the composition, and has a wide temperature range in which the device can be used, a short response time, a large contrast ratio and a low driving voltage.

DESCRIPTION OF EMBODIMENTS

Usage of terms herein is as described below. A liquid crystal compound is a generic term for a compound having a liquid crystal phase such as a nematic phase and a smectic phase and a compound having no liquid crystal phase but being useful as a component of the liquid crystal composition. "Liquid crystal compound," "liquid crystal composition" and "liquid crystal display device" may be occasionally abbreviated as "compound," "composition," and "device," respectively. The liquid crystal display device is a generic term for a liquid crystal display panel and a liquid crystal display module. A maximum temperature of the nematic phase is a phase transition temperature between the nematic phase and an isotropic phase, and may be occasionally abbreviated simply as "maximum temperature." A minimum temperature of the nematic phase may be occasionally abbreviated simply as "minimum temperature." A compound represented by formula (1) may be occasionally abbreviated as compound (1). The abbreviation may be occasionally applied to a compound represented by formula (2), or the like. In formulas (1) to (14), a symbol such as $A^1$ and $A^2$ corresponds to each of ring $A^1$, ring $B^1$, ring E, ring M, or the like. A ratio (percentage) of components or liquid crystal compounds is expressed in terms of weight percent (% by weight) based on the total weight of liquid crystal compound. Hereinafter, the invention will be further explained.

First, compound (1) of the invention will be further explained. A fused ring such as a naphthalene ring is counted to be a monocycle. Compound (1) includes a bicyclic compound, a tricyclic compound, a tetracyclic compound and a pentacyclic compound each having a cyclohexene-3,6-diyl ring. The compound is physically and chemically stable under conditions in which the device is ordinarily used, and has a good solubility in other liquid crystal compounds. A composition containing the compound is stable under conditions in which the device is ordinarily used. Even if the composition is stored at a low temperature, the compound does not precipitate as crystals (or smectic phase). The compound has general physical properties necessary for the compound, namely, a suitable optical anisotropy and a suitable dielectric anisotropy.

Physical properties of compound (1), such as optical anisotropy, can be arbitrarily adjusted by suitably selecting a terminal group, a ring and a bonding group of compound (1). An effect of types of terminal groups $R^1$ and $R^2$, rings $A^1$, $A^2$, $A^3$ and $A^4$, bonding groups $Z^1$, $Z^2$, $Z^3$ and $Z^4$ on physical properties of compound (1) will be explained below.

When Ra or Rb is a non-branched chain, a temperature range of the liquid crystal phase is wide, and viscosity is small. When Ra or Rb is a branched chain, solubility in other liquid crystal compounds is satisfactory. A compound in which Ra or Rb is an optically active group is useful as a chiral dopant. A reverse twisted domain generated in the device can be prevented by adding the compound to the composition. A compound in which Ra or Rb is not the optically active group is useful as a component of the composition. When Ra or Rb is alkenyl, a preferred configuration depends on a position of a double bond. An alkenyl compound having a preferred configuration has a high maximum temperature or a wide temperature range of the liquid crystal phase. A detailed description is found in Mol. Cryst. Liq. Cryst., 1985, 131, 109 and Mol. Cryst. Liq. Cryst., 1985, 131, 327.

When rings $A^1$ to $A^4$ are 1,4-phenylene, 2-fluoro-1,4-phenylene or 3-fluoro-1,4-phenylene, the optical anisotropy is large. When rings $A^1$ to $A^4$ are 1,4-cyclohexylene, the optical anisotropy small.

When at least two rings are 1,4-cyclohexylene, the maximum temperature is high, the optical anisotropy is small and the viscosity is small. When at least one ring is 1,4-phenylene, the optical anisotropy is relatively large and an orientational order parameter is large.

When rings $A^1$ to $A^4$ are 1,4-phenylene in which arbitrary hydrogen is replaced by halogen, pyridine-2,5-diyl or 1,3-dioxane-2,5-diyl, dielectric anisotropy is positively large. When rings $A^1$ to $A^4$ are 2,3-difluoro-1,4-phenylene, the dielectric anisotropy is negatively large. When rings $A^1$ to $A^4$ are 2-(trifluoromethyl)-3-fluoro-1,4-phenylene, 2-fluoro-3-(trifluoromethyl)-1,4-phenylene, 2-(difluoromethyl)-3-fluoro-1,4-phenylene or 2-fluoro-3-(difluoromethyl)-1,4-phenylene, the dielectric anisotropy is further negatively large. When rings $A^1$ to $A^4$ are 1,4-phenylene in which arbitrary hydrogen may be replaced by halogen, pyridine-2,5- diyl, pyrimidine-2,5-diyl or pyridazine-3,6-diyl, the optical anisotropy is large. When ring $A^1$ or $A^2$ is 1,4-cyclohexylene, 1,4-cyclohexenylene or 1,3-dioxane-2,5-diyl, the optical anisotropy is small.

When rings $A^1$ to $A^4$ are cyclohexene-1,4-diyl or cyclohexene-3,6-diyl, a melting point is low. In particular, in a case of cyclohexene-3,6-diyl, the temperature range of the liquid crystal phase is wide, and a crystallization temperature is low. When a compound simultaneously has cyclohexene-1,4-diyl and 1,4-phenylene, the optical anisotropy is large.

When bonding group $Z^1$, $Z^2$, $Z^3$ or $Z^4$ is a single bond, $-(CH_2)_2-$, $-CH_2O-$, $-CH=CH-$ or $-(CH_2)_4-$, the viscosity is small. When the bonding group is a single bond, $-(CH_2)_2-$ or $-CH=CH-$, the viscosity is further smaller. When the bonding group is $-CH=CH-$, the temperature range of the liquid crystal phase is wide, and an elastic constant ratio $K_{33}/K_{11}$ ($K_{33}$: bend elastic constant, $K_{11}$: spray elastic constant) is large. When the bonding group is $-C\equiv C-$, the optical anisotropy is large.

When compound (1) has a bicyclic or tricyclic structure, the viscosity is small. When compound (1) has a tricyclic or tetracyclic structure, the maximum temperature is high. As described above, a compound having objective physical properties can be obtained by suitably selecting the types of terminal groups, rings and bonding groups, and the number of rings. Accordingly, compound (1) is useful as a component of the composition used for a device according to PC, TN, STN, ECB, OCB, IPS, VA or the like.

Preferred examples of compound (1) include compounds represented by formulas (1-1) to (1-8) according to item 2 of the invention. Symbols Ra, Rb, $A^{11}$, $A^{21}$, $A^{31}$ to $A^{32}$ and $A^{41}$ to $A^{43}$, $Z^{11}$, $Z^{21}$, $Z^{31}$ to $Z^{32}$, and $Z^{41}$ to $Z^{43}$ in the compounds are defined in a manner identical with the definitions of symbols as described in item 2.

Compound (1) is synthesized by suitably combining techniques in synthetic organic chemistry. Methods for introducing an objective terminal group, ring, and bonding group into a starting material are described in books such as Organic Syntheses (John Wiley & Sons, Inc.), Organic Reactions (John Wiley & Sons, Inc), Comprehensive Organic Synthesis (Pergamon Press) and New Experimental Chemistry Course (Shin Jikken Kagaku Koza in Japanese) (Maruzen Co., Ltd.).

With regard to one example of a method for forming bonding groups $Z^1$, $Z^2$ or $Z^4$, a scheme is first shown, and next each scheme will be explained in sections (I) to (XI). In the scheme, $MSG^1$ or $MSG^2$ is a monovalent organic group having at least one ring. A plurality of organic groups represented by $MSG^1$ (or $MSG^2$) may be identical or different. Compounds (1A) to (1K) correspond to compound (1).

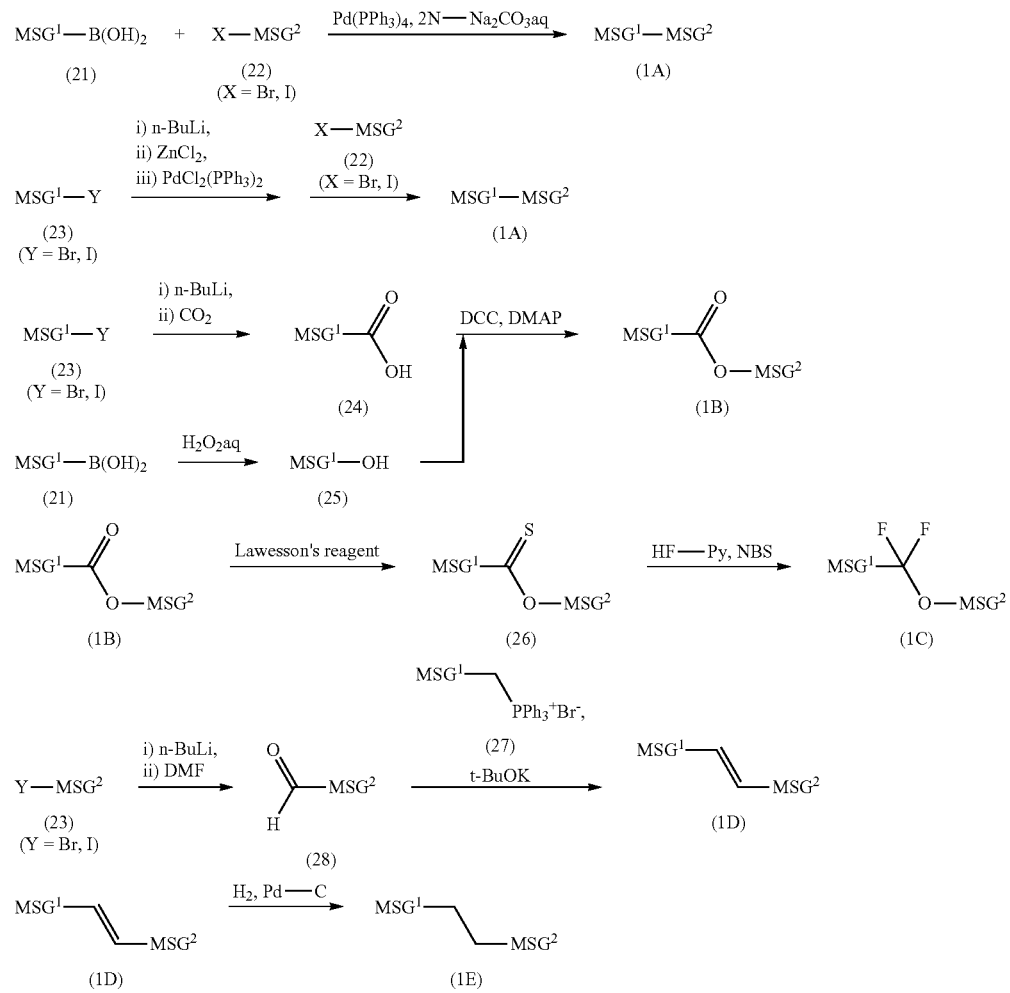

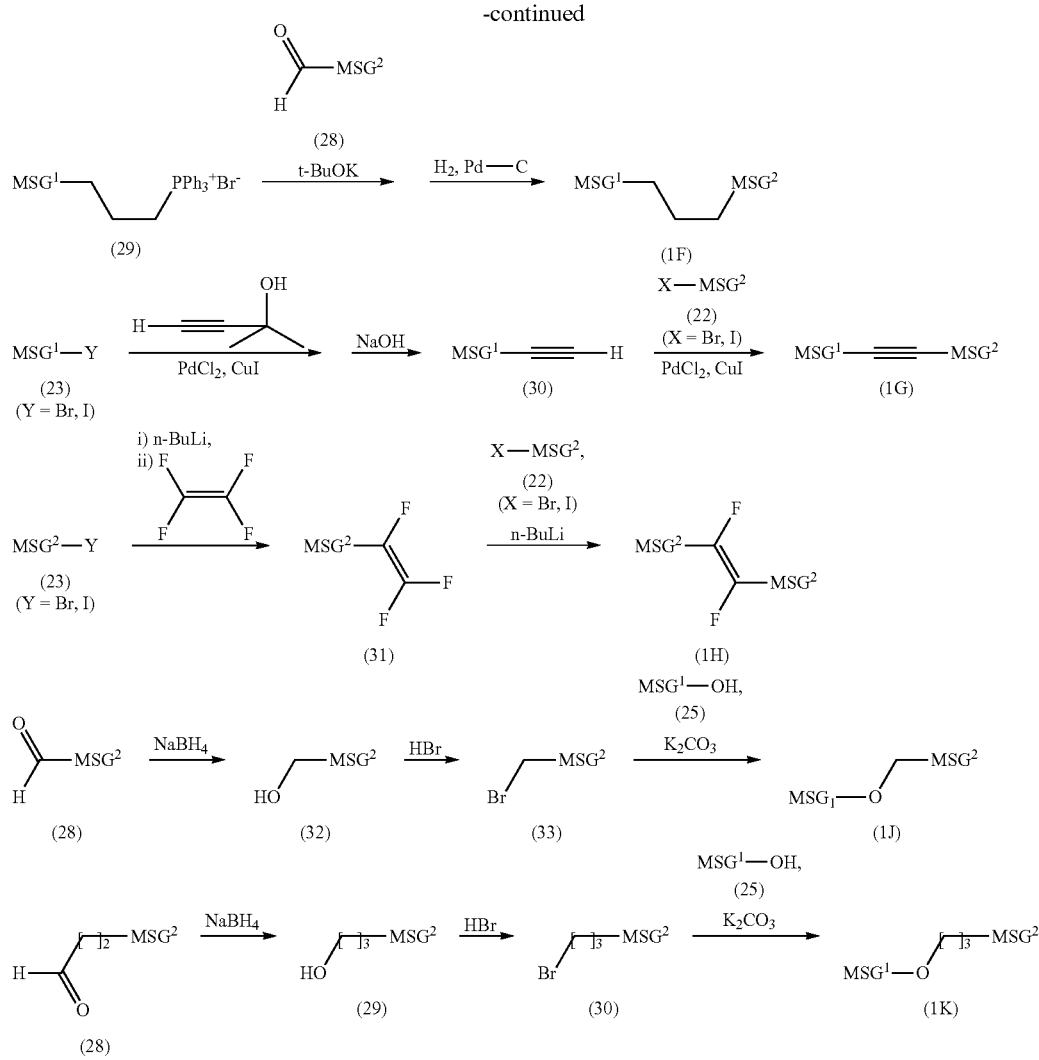

(I) Formation of a Single Bond

Compound (1A) is prepared by allowing arylboronic acid (21) to react, in the presence of an aqueous solution of carbonate and a catalyst such as tetrakis(triphenylphosphine)palladium, with compound (22) to be prepared according to a publicly known method. Compound (1A) is also prepared by allowing compound (23) prepared according to a publicly known method to react with n-butyllithium and subsequently with zinc chloride, and further with compound (22) in the presence of a catalyst such as dichlorobis(triphenylphosphine)palladium.

(II) Formation of —COO— and —OCO—

Carboxylic acid (24) is obtained by allowing compound (23) to react with n-butyllithium, and subsequently with carbon dioxide. Compound (1B) having —COO— is prepared by dehydrating, in the presence of 1,3-dicyclohexylcarbodiimide (DDC) and 4-dimethylaminopyridine (DMAP), compound (24) and phenol (25) prepared according to a publicly known method. A compound having —OCO— is also prepared according to the method.

(III) Formation of —CF$_2$O— and —OCF$_2$—

Compound (26) is obtained by treating compound (1B) with a thiation reagent such as Lawesson's reagent. Compound (1C) having —CF$_2$O— is prepared by fluorinating compound (26) with a hydrogen fluoride pyridine complex and N-bromosuccinimide (NBS). See M. Kuroboshi et al., Chem. Lett., 1992, 827. Compound (1C) is also prepared by fluorinating compound (26) with (diethylamino)sulfur trifluoride (DAST). See W. H. Bunnelle et al., J. Org. Chem. 1990, 55, 768. A compound having —OCF$_2$— is also prepared according to the method. The bonding groups can also be formed according to the method described in Peer. Kirsch et al., Angew. Chem. Int. Ed. 2001, 40, 1480.

(IV) Formation of —CH=CH—

Aldehyde (28) is obtained by treating compound (23) with n-butyllithium and then allowing a treated compound to react with formamide such as N,N-dimethylformamide (DMF). Compound (1D) is prepared by allowing phosphorus ylide generated by treating phosphonium salt (27) prepared according to a known method with a base such as potassium tert-butoxide to react with aldehyde (28). Because a cis isomer is formed depending on reaction conditions, the cis isomer is isomerized into a trans isomer according to a known method, when necessary.

(V) Formation of —(CH$_2$)$_2$—

Compound (1E) is prepared by hydrogenating compound (1D) in the presence of a catalyst such as palladium on carbon.

(VI) Formation of —(CH$_2$)$_4$—

A compound having —(CH$_2$)$_2$—CH=CH— is obtained by using phosphonium salt (29) in place of phosphonium salt (27) according to the method in section (IV). Compound (1F) is prepared by performing catalytic hydrogenation of the compound obtained.

(VII) Formation of —C≡C—

Compound (30) is obtained by allowing compound (23) to react with 2-methyl-3-butyn-2-ol in the presence of a catalyst including dichloropalladium and copper halide, and then performing deprotection under basic conditions. Compound (1G) is prepared by allowing compound (30) to react with compound (22) in the presence of a catalyst including dichloropalladium and copper halide.

(VIII) Formation of —CF=CF—

Compound (31) is obtained by treating compound (23) with n-butyllithium and then allowing a treated compound to react with tetrafluoroethylene. Compound (1H) is prepared by treating compound (22) with n-butyllithium and then allowing a treated compound to react with compound (31).

(IX) Formation of —CH$_2$O— or —OCH$_2$—

Compound (32) is obtained by reducing compound (28) with a reducing agent such as sodium borohydride. Compound (33) is obtained by halogenating compound (32) with hydrobromic acid or the like. Compound (1J) is prepared by allowing compound (33) to react with compound (25) in the presence of potassium carbonate or the like.

(X) Formation of —(CH$_2$)$_3$O— or —O(CH$_2$)$_3$—

Compound (1K) is prepared by using compound (29) in place of compound (32) in a manner similar to section (IX).

(XI) Formation of —(CF$_2$)$_2$—

A compound having —(CF$_2$)$_2$— is obtained by fluorinating, in the presence of a hydrogen fluoride catalyst, diketone (—COCO—) with sulfur tetrafluoride according to the method described in J. Am. Chem. Soc., 2001, 123, 5414.

One example of a method for synthesizing compound (1) is shown in a scheme as described below. A scheme for synthesizing synthetic intermediate (38) having cyclohexene-3,6-diyl will be first explained, and one example of a method for synthesizing cyclohexene-3,6-diyl compound (41) in which (38) is used as a starting material will then be described.

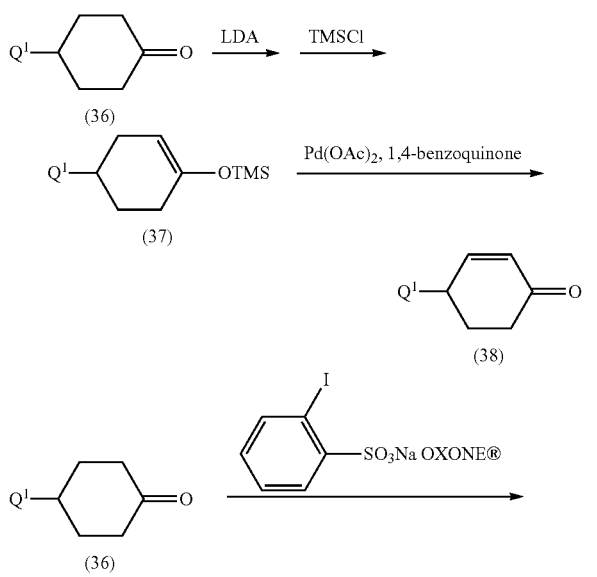

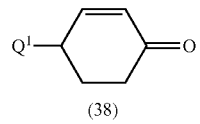

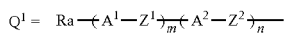

In compounds (36) to (38), Q$^1$ is a structural unit in formula (1). The structural unit is shown in the scheme. Symbols Ra, A$^1$, A$^2$, m, n, Z$^1$ and Z$^2$ in the compounds are defined in a manner identical with the definitions of symbols as described in item 1.

Compound (37) is prepared by allowing LDA to act on compound (36) to form an enolate, and then allowing trimethylsilyl chloride to act thereon. The reactions are preferably performed in a solvent such as THF, in the presence of a bulky strong base such as LDA that selectively performs deprotonation, and at a low temperature, namely, at room temperature or lower. Compound (38) is prepared by allowing palladium acetate and 1,4-benzoquinone to act on compound (37). As an alternative method, compound (38) can also be prepared by an oxidization reaction using OXONE (registered tradename) and using a 2-iodosulfonic acid derivative such as sodium 2-iodosulfonate as a catalyst. In addition, compound (36) being a starting material can be easily prepared according to a method of synthetic organic chemistry.

Next, one example of a synthetic process of compound (41) is shown.

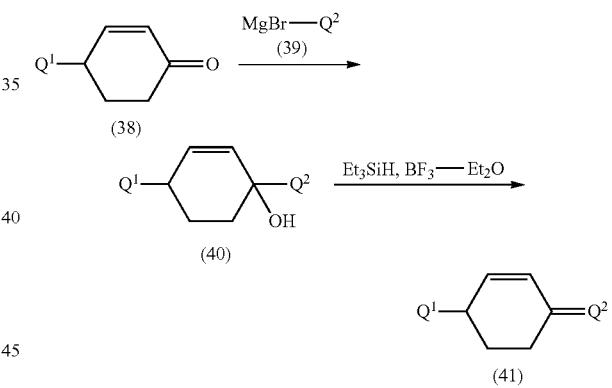

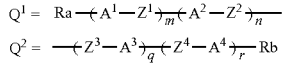

In compounds (38) to (41), Q$^1$ or Q$^2$ is a structural unit in formula (1). The structural unit is shown in the scheme. Symbols Ra, Rb, A$^1$ to A$^4$, Z$^2$ to Z$^4$, m, n, q and r in the compounds are defined in a manner identical with the definitions of symbols as described in item 1.

Compound (40) is prepared by a reaction between compound (38) and compound (39). The reaction is preferably performed in an ether solvent such as tetrahydrofuran at a temperature in the range of 50° C. to 30° C. Compound (41) is prepared by allowing compound (40) to react in a solvent such as dichloromethane in the presence of triethylsilane and a boron trifluoride-diethyl ether complex at a temperature of −50° C. or lower. In addition, compound (39) can be easily prepared according to a method of synthetic organic chemistry.

Next, one example of a method for synthesizing cyclohexene-3,6-diyl compound (44) will be described.

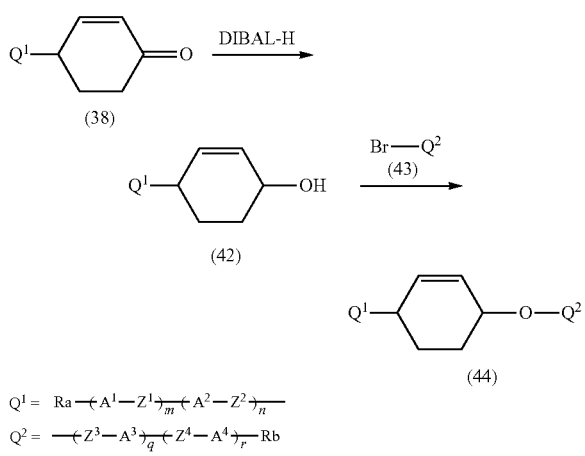

In compounds (38), and (42) to (44), $Q^1$ or $Q^2$ is a structural unit in formula (1). The structural unit is shown in the scheme. Symbols Ra, Rb, $A^1$ to $A^4$, $Z^2$ to $Z^4$, m, n, q and r are defined in a manner identical with the definitions of symbols as described in item 1.

Compound (42) is obtained by reducing compound (38) with DIBAL-H or the like. The reaction is preferably performed in a solvent such as toluene at a temperature of −60° C. or lower. Compound (44) is prepared by allowing compound (42) to react with compound (43) in the presence of potassium carbonate or the like. In addition, compound (43) can be easily prepared according to a method of synthetic organic chemistry.

Liquid Crystal Composition

Hereinafter, the liquid crystal composition of the invention will be explained. The component of the liquid crystal composition is characterized by containing at least one compound (1). The composition may contain two or more compounds (1), and may be constituted of only compound (1). Moreover, when preparing the liquid crystal composition of the invention, a component can also be selected, for example, in consideration of the dielectric anisotropy of compound (1). The composition prepared by selecting the component has a low viscosity, a suitable dielectric anisotropy and a low threshold voltage, and also a high maximum temperature of the nematic phase, and a low minimum temperature of the nematic phase.

Liquid Crystal Composition (1)

The liquid crystal composition of the invention needs to contain compound (1) as component A. The liquid crystal composition of the invention may include a composition of only component A or a composition of component A with any other component whose component name is not particularly shown herein, but a liquid crystal composition having various characteristics can be provided by adding to component A a component selected from components B, C, D and E shown below.

As the component to be added to component A, the liquid crystal composition of the invention preferably contains a mixture containing component B including at least one compound selected from the group of compounds represented by formulas (2), (3) and (4), and/or component C including at least one compound selected from the group of compounds represented by formula (5), and/or component D including at least one compound selected from the group of compounds represented by formulas (6), (7), (8), (9), (10) and (11). Furthermore, when component E including at least one compound selected from the group of compounds represented by formulas (12), (13) and (14) is mixed, a threshold voltage, the temperature range of the liquid crystal phase, refractive index anisotropy, the dielectric anisotropy, the viscosity or the like can be adjusted.

Moreover, the liquid crystal composition of the invention does not have a large difference in physical properties even when each component of the liquid crystal composition used in the invention is constituted of an analog including an isotopic element of each element.

Among types of component B, suitable examples of compounds represented by formula (2) include compounds (2-1) to (2-16), suitable examples of compounds represented by formula (3) include compounds (3-1) to (3-112), and suitable examples of compounds represented by formula (4) include compounds (4-1) to (4-54).

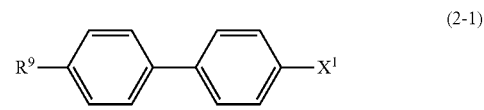
(2-1)

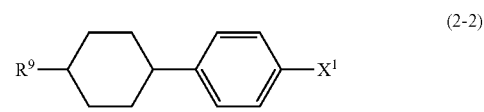
(2-2)

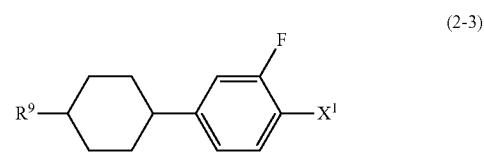
(2-3)

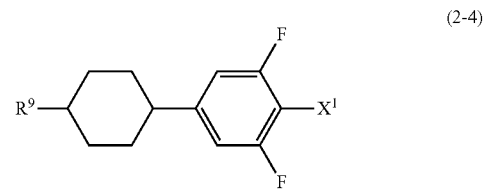
(2-4)

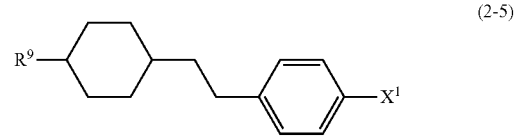
(2-5)

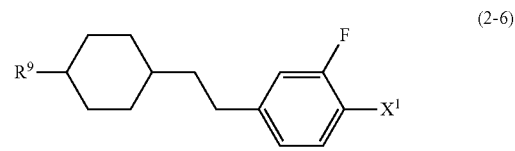
(2-6)

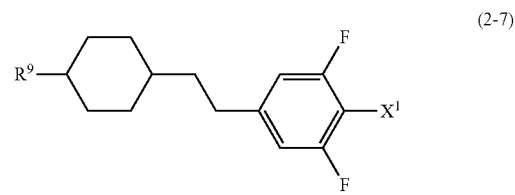
(2-7)

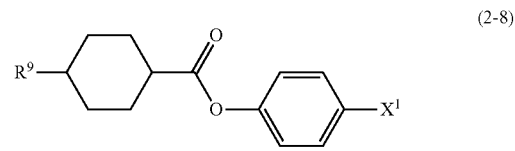
(2-8)

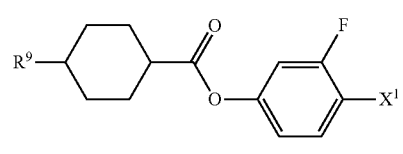 (2-9)
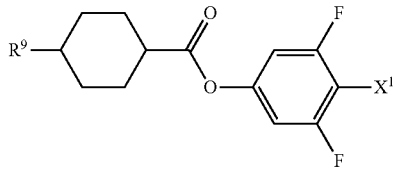 (2-10)
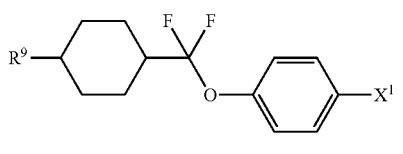 (2-11)
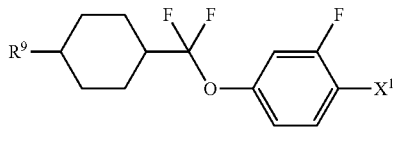 (2-12)
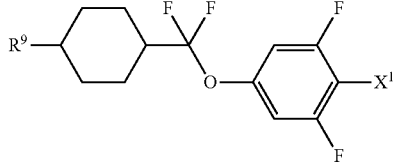 (2-13)
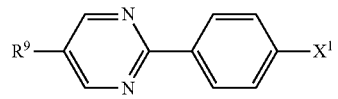 (2-14)
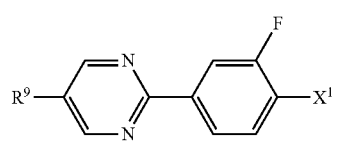 (2-15)
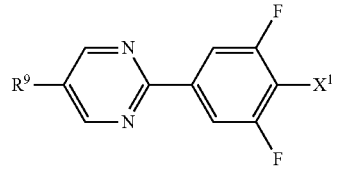 (2-16)
 (3-1)
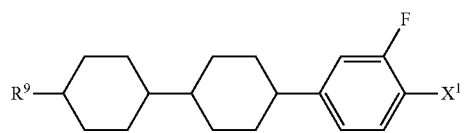 (3-2)
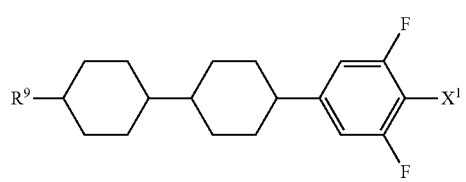 (3-3)
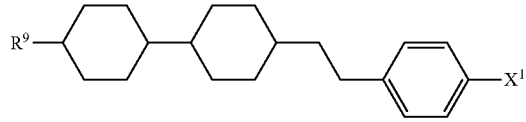 (3-4)
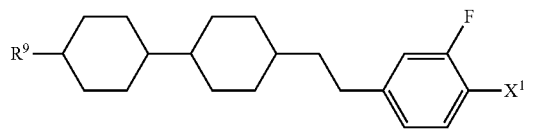 (3-5)
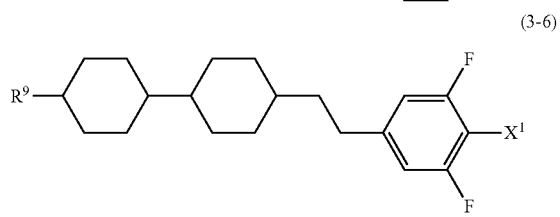 (3-6)
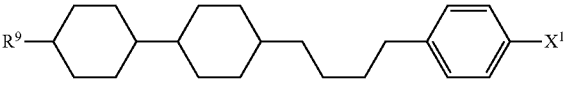 (3-7)
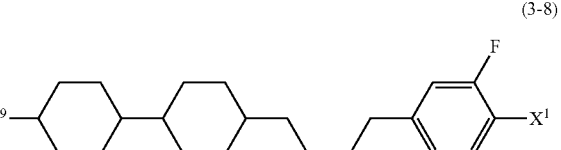 (3-8)
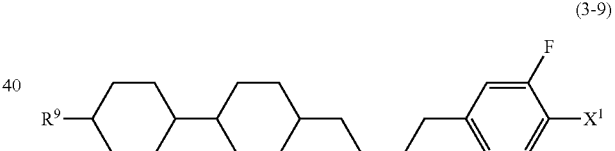 (3-9)
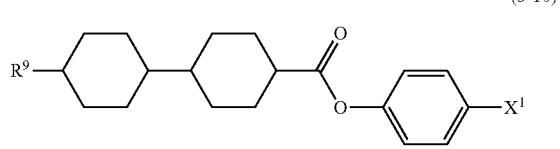 (3-10)
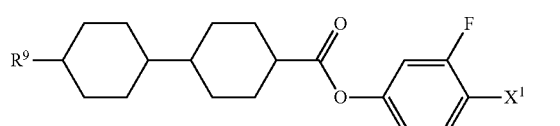 (3-11)
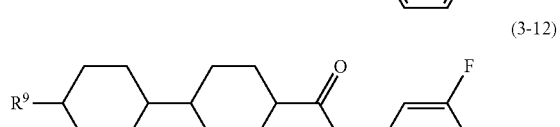 (3-12)

(3-13) 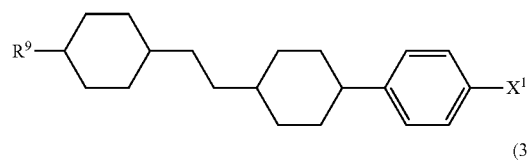
(3-14) 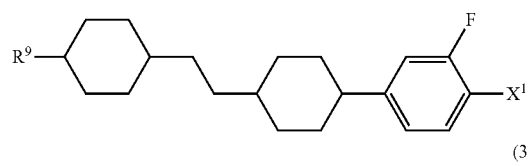
(3-15) 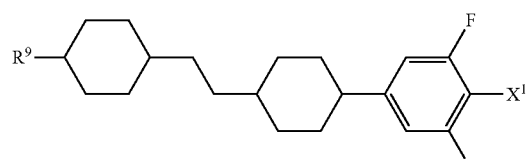
(3-16) 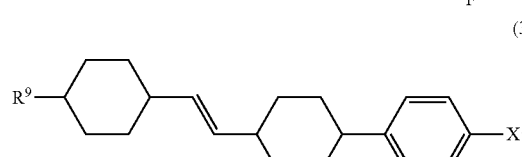
(3-17) 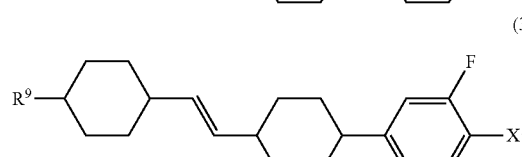
(3-18) 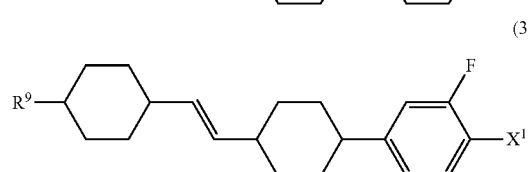
(3-19) 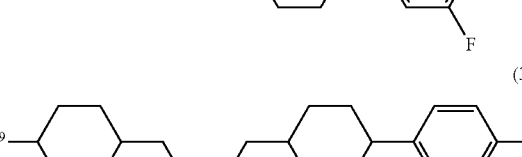
(3-20) 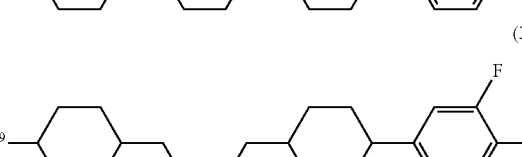
(3-21) 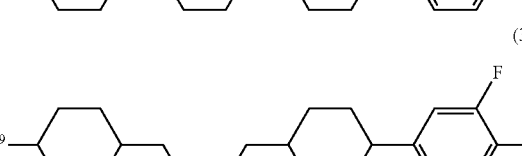
(3-22) 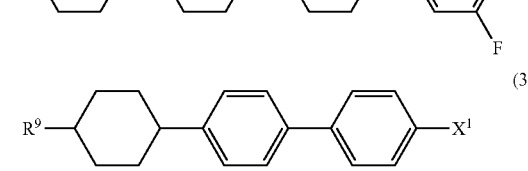
(3-23) 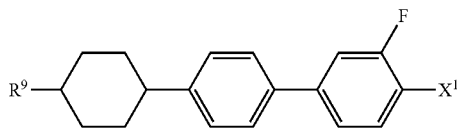
(3-24) 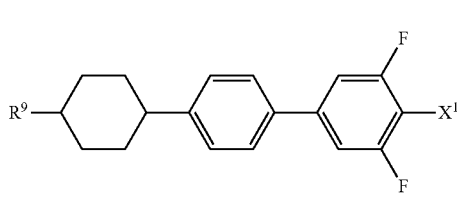
(3-25) 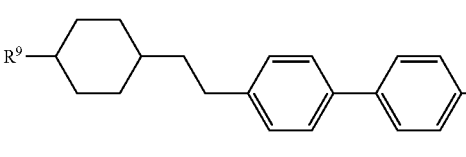
(3-26) 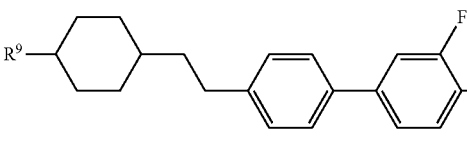
(3-27) 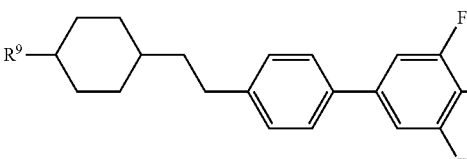
(3-28) 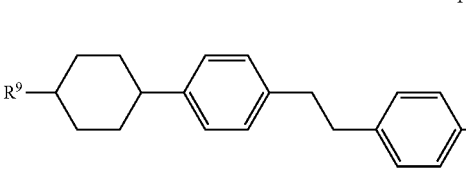
(3-29) 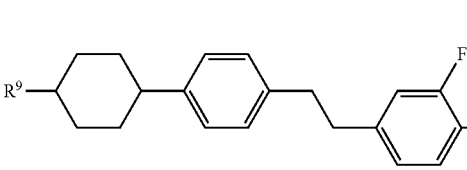
(3-30) 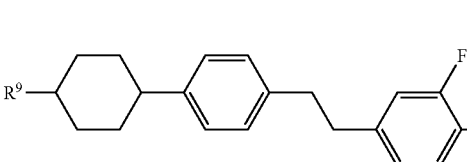
(3-31) 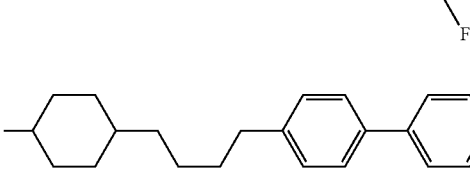
(3-32) 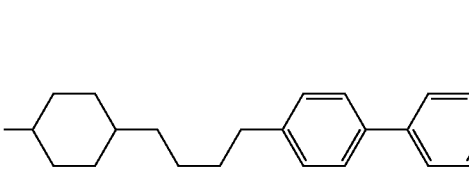

(3-33)
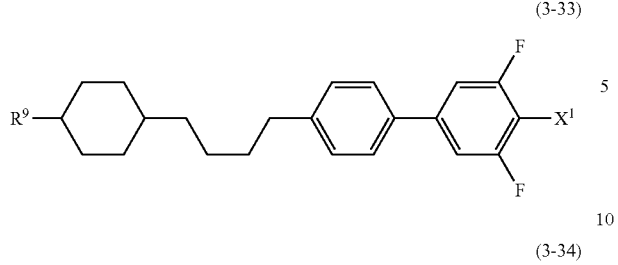
(3-34)
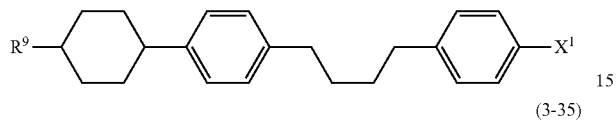
(3-35)
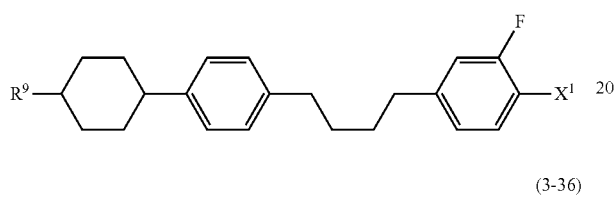
(3-36)
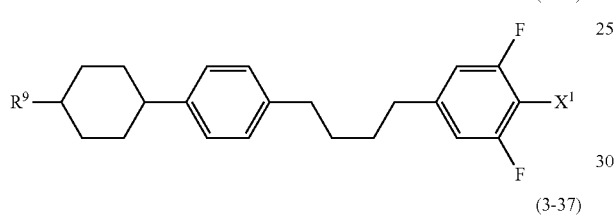
(3-37)
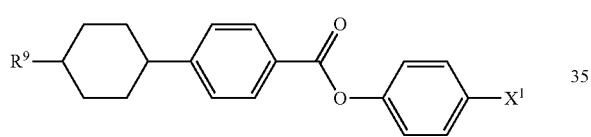
(3-38)
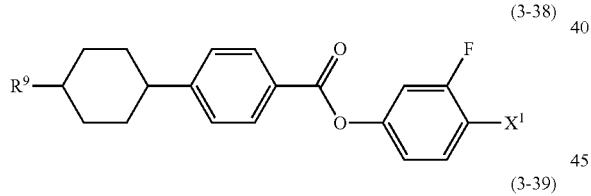
(3-39)
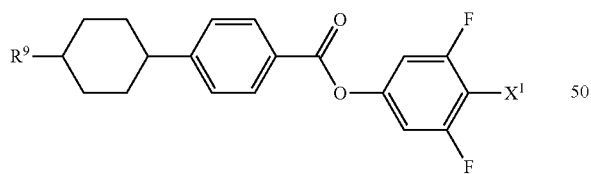
(3-40)
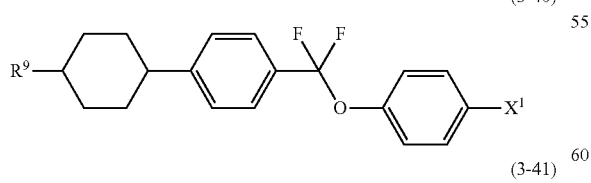
(3-41)
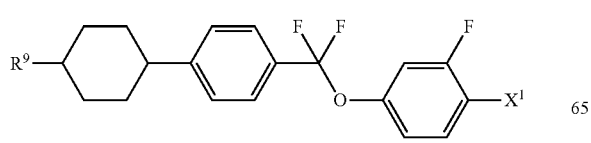
(3-42)
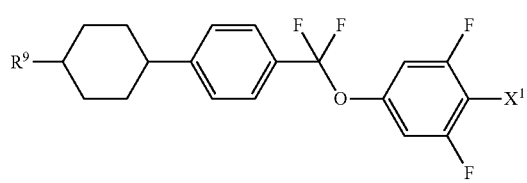
(3-43)
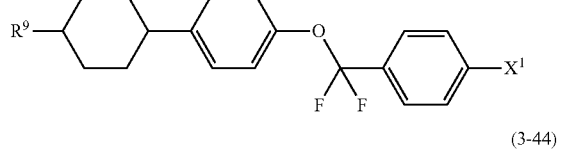
(3-44)
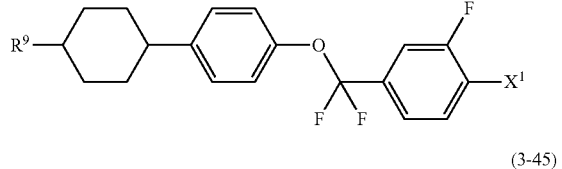
(3-45)
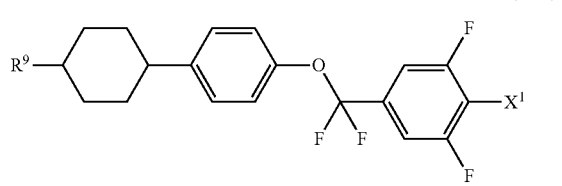
(3-46)
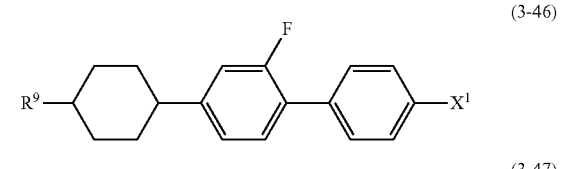
(3-47)
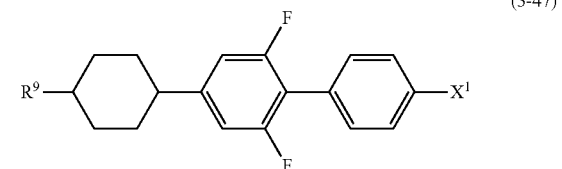
(3-48)
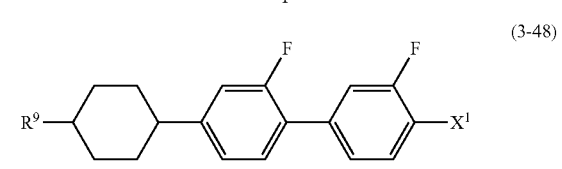
(3-49)
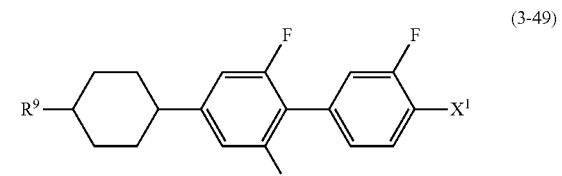
(3-50)

(3-51) 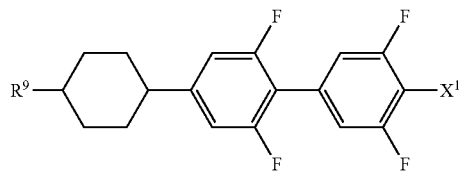
(3-52) 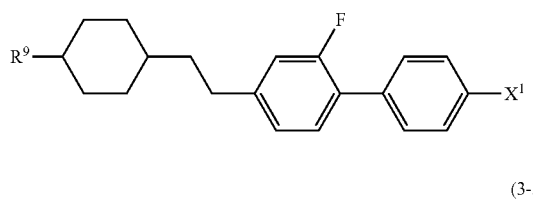
(3-53) 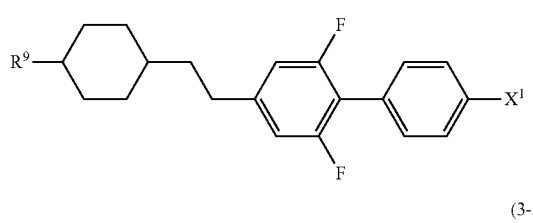
(3-54) 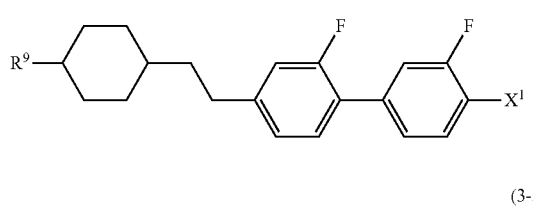
(3-55) 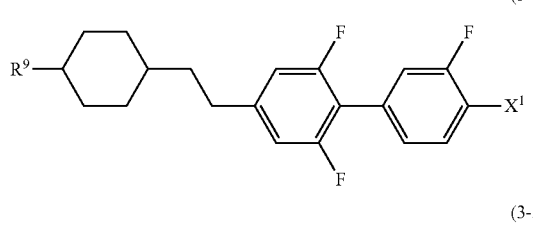
(3-56) 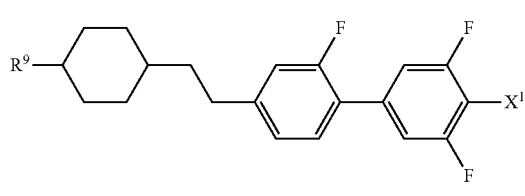
(3-57) 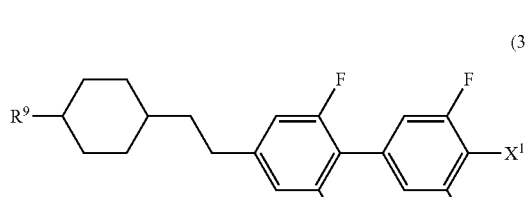
(3-58) 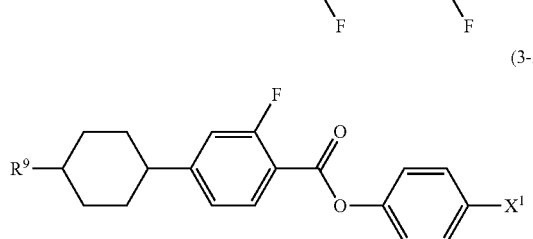
(3-59) 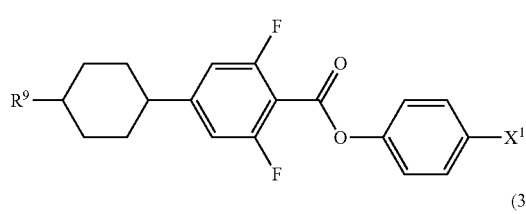
(3-60) 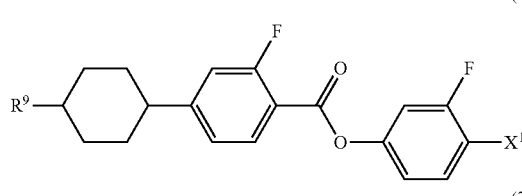
(3-61) 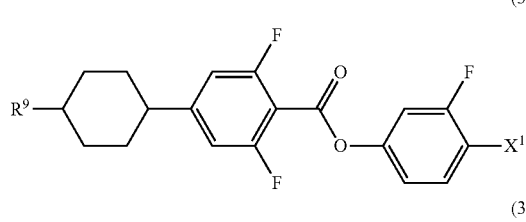
(3-62) 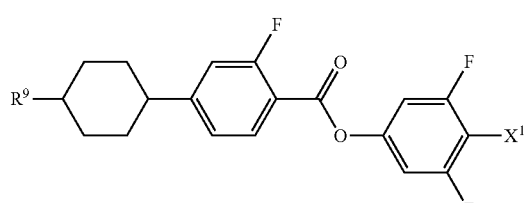
(3-63) 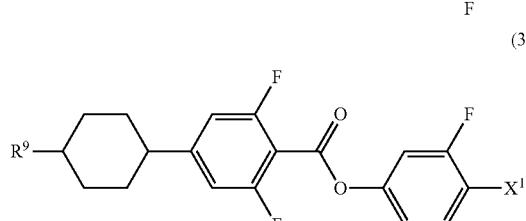
(3-64) 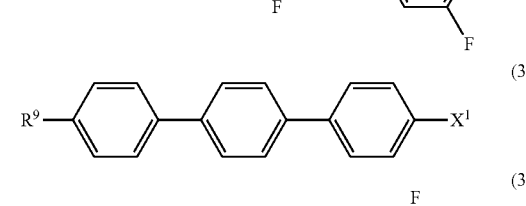
(3-65) 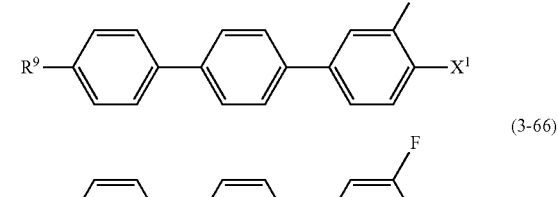
(3-66) 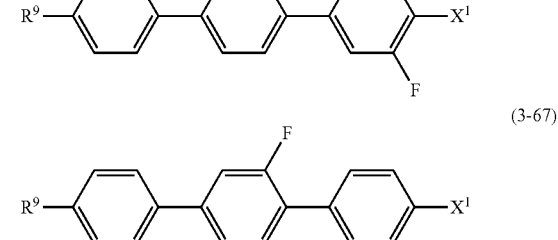
(3-67)

-continued
(3-68) 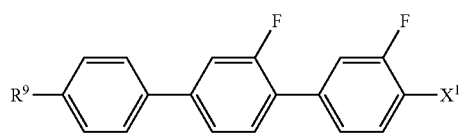
(3-69) 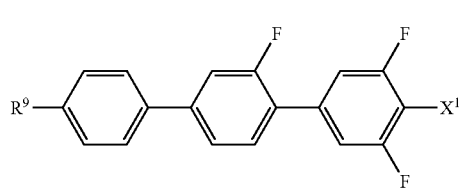
(3-70) 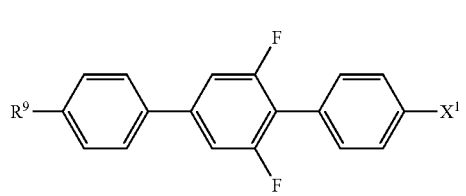
(3-71) 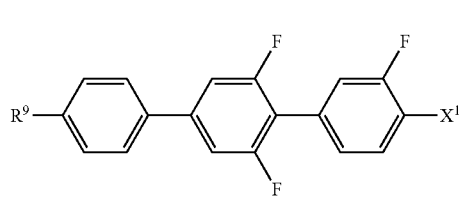
(3-72) 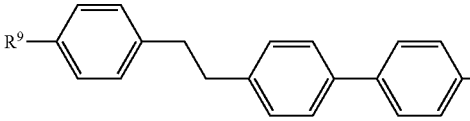
(3-73) 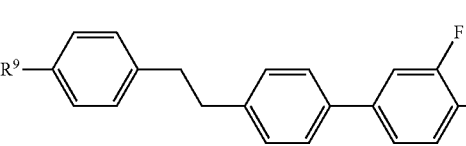
(3-74) 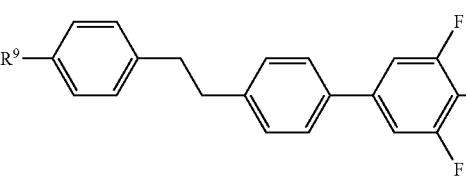
(3-75) 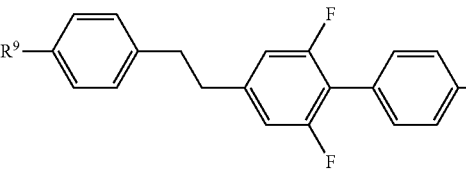
(3-76) 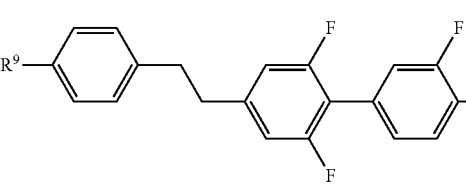
-continued
(3-77) 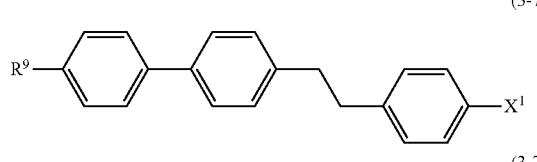
(3-78) 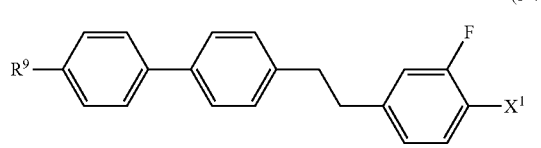
(3-79) 
(3-80) 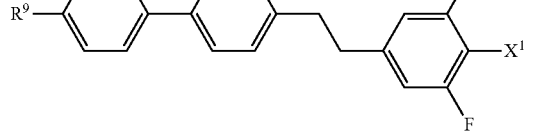
(3-81) 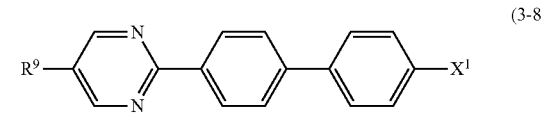
(3-82) 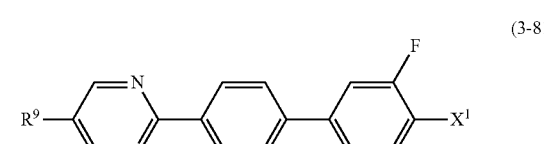
(3-83) 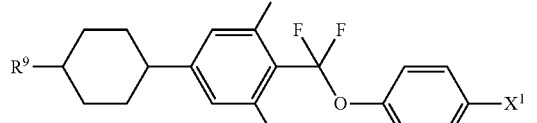
(3-84) 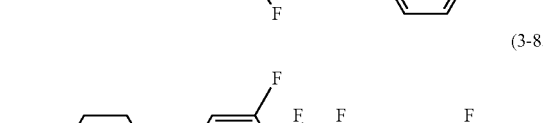
(3-85) 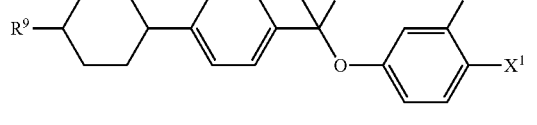

(3-86) 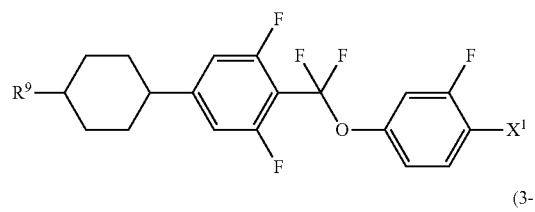
(3-87) 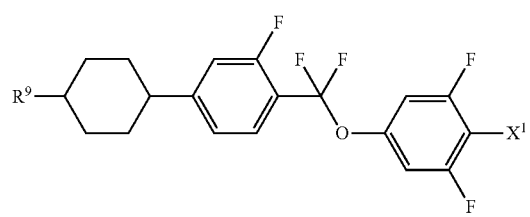
(3-88) 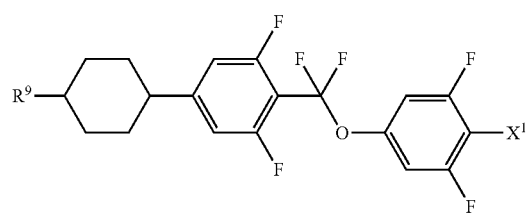
(3-89) 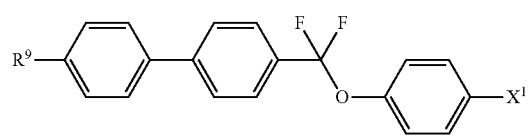
(3-90) 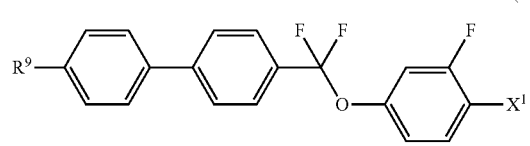
(3-91) 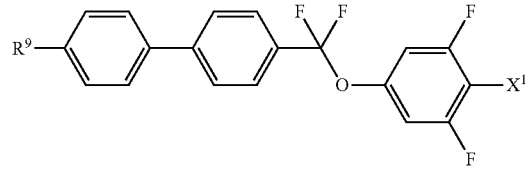
(3-92) 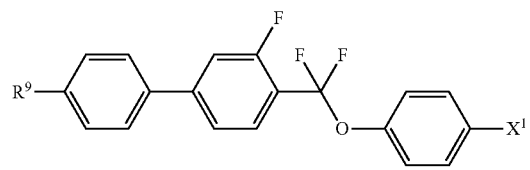
(3-93) 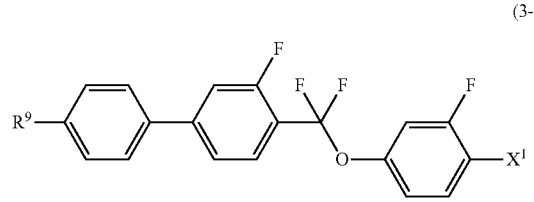
(3-94) 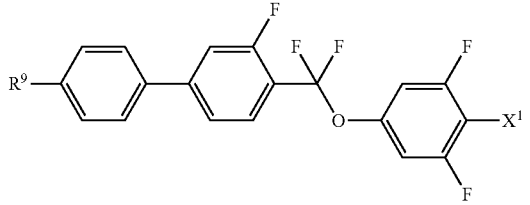
(3-95) 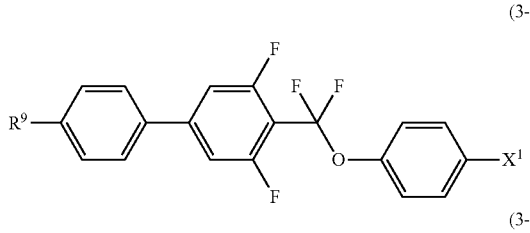
(3-96) 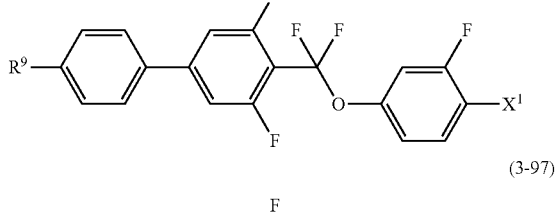
(3-97) 
(3-98) 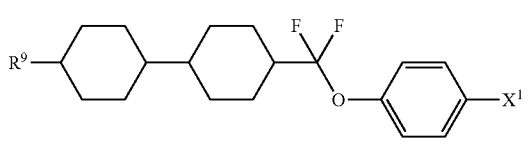
(3-99) 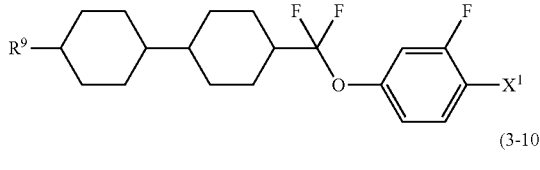
(3-100) 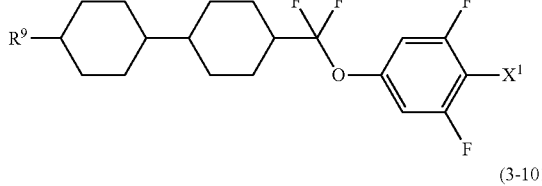
(3-101) 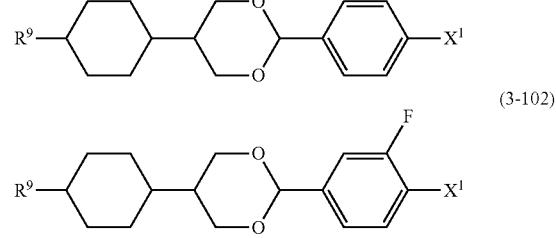
(3-102)

(3-103) 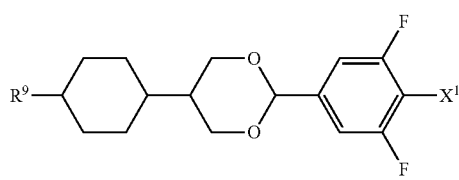
(3-104) 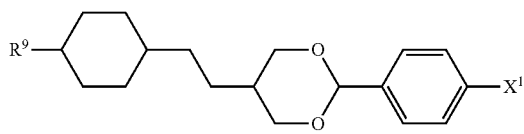
(3-105) 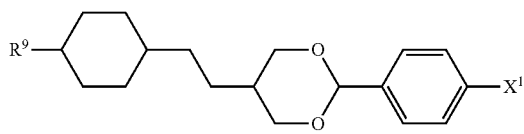
(3-106) 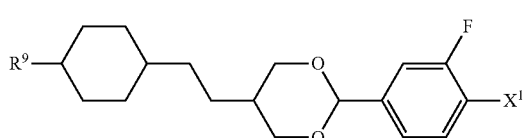
(3-107) 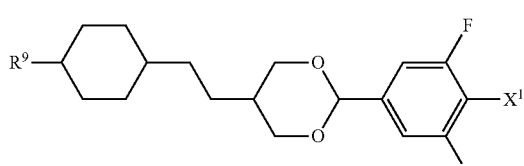
(3-108) 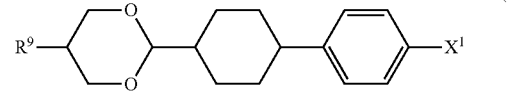
(3-109) 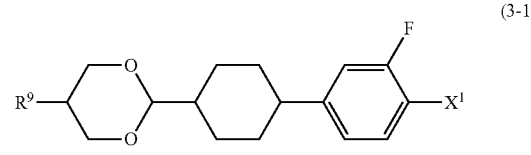
(3-110) 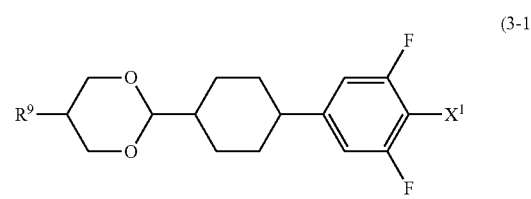
(3-111) 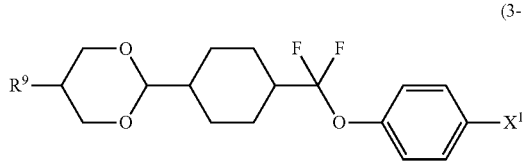
(3-112) 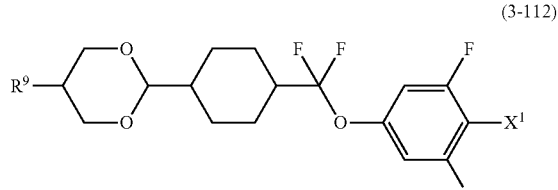
(4-1) 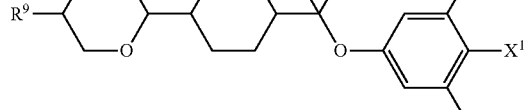
(4-2) 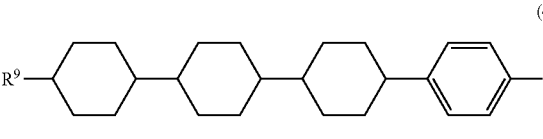
(4-3) 
(4-4) 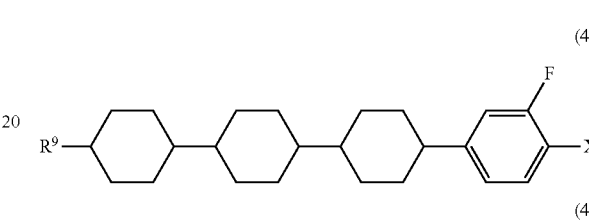
(4-5)
(4-6)
(4-7)
(4-8)

(4-9)
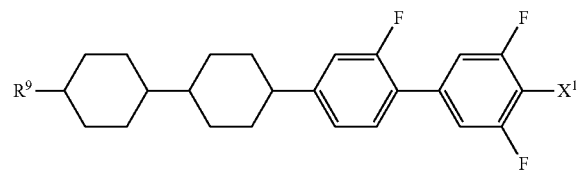
(4-10)
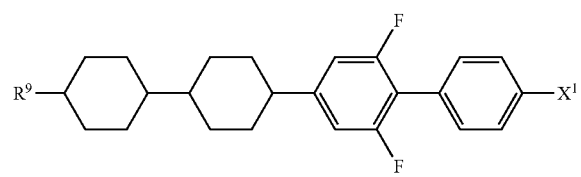
(4-11)
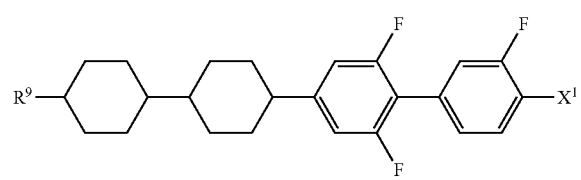
(4-12)
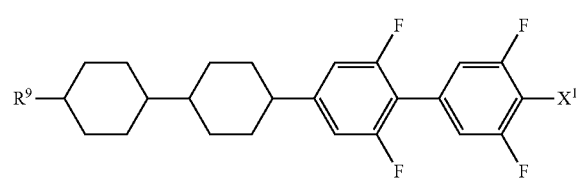
(4-13)
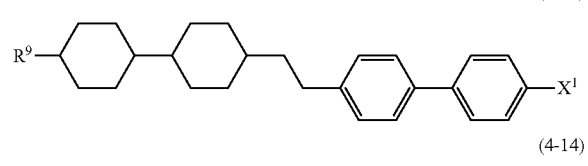
(4-14)
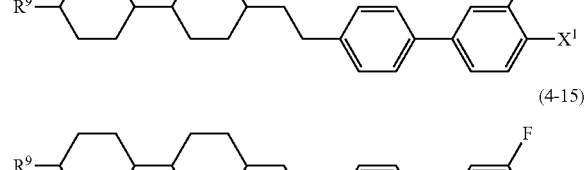
(4-15)
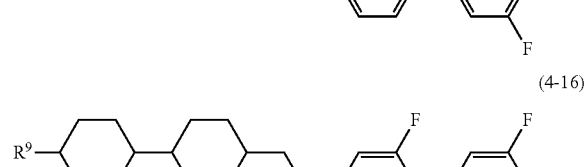
(4-16)
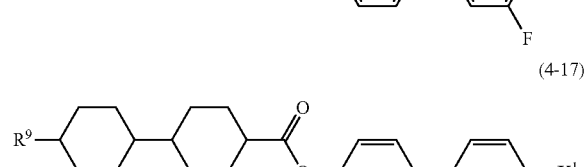
(4-17)
(4-18)
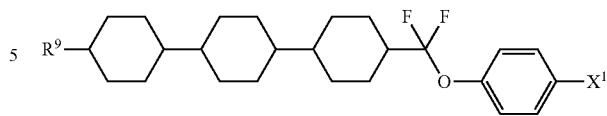
(4-19)
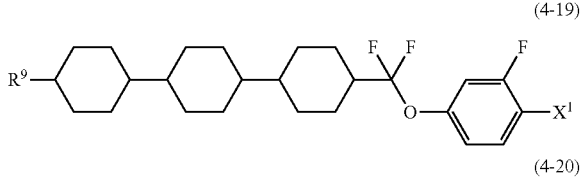
(4-20)
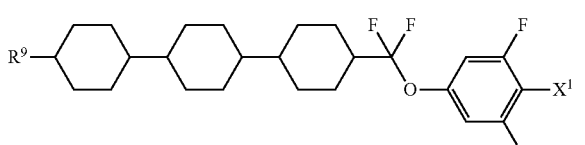
(4-21)
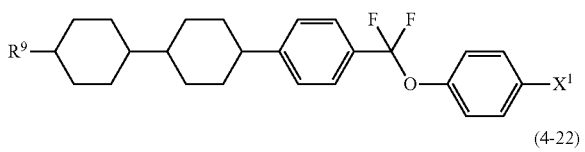
(4-22)
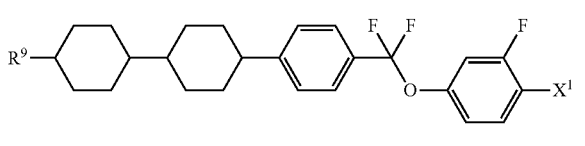
(4-23)
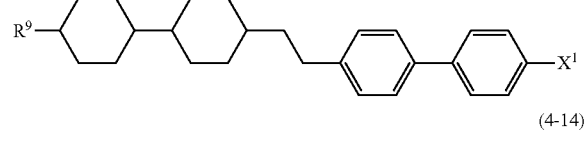
(4-24)
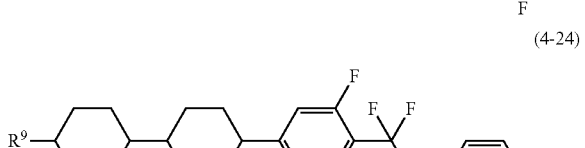
(4-25)
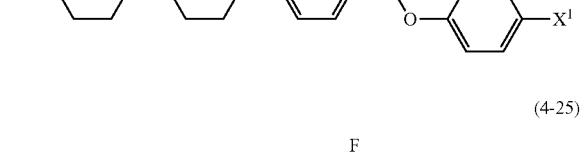
(4-26)
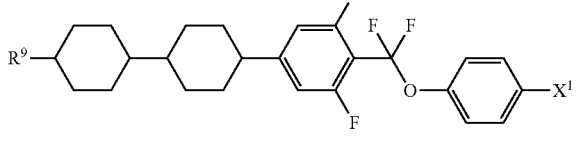

(4-27) 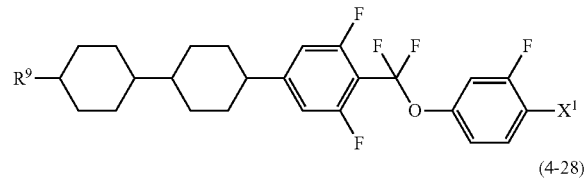
(4-28) 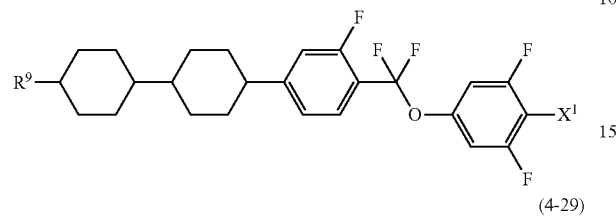
(4-29) 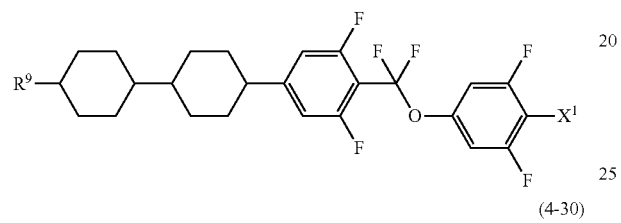
(4-30) 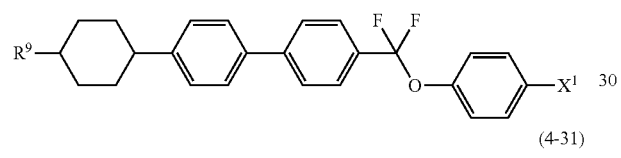
(4-31) 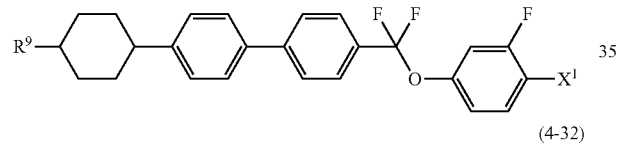
(4-32) 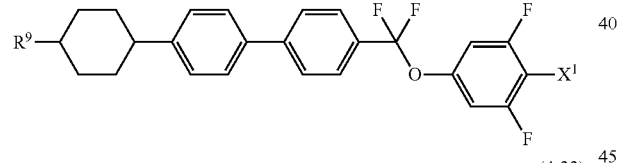
(4-33) 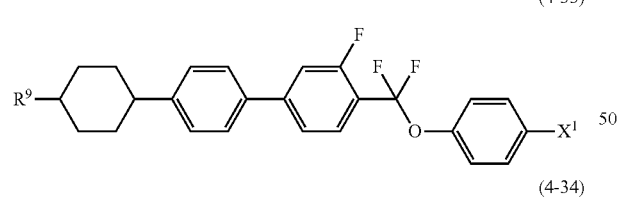
(4-34) 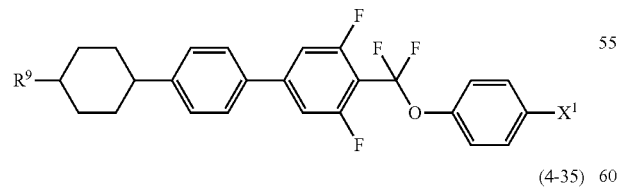
(4-35) 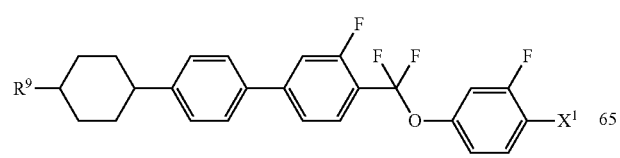
(4-36) 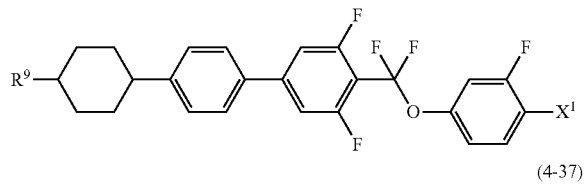
(4-37) 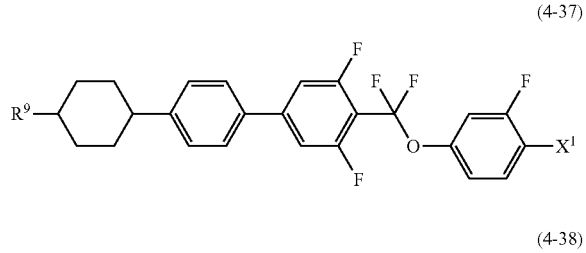
(4-38) 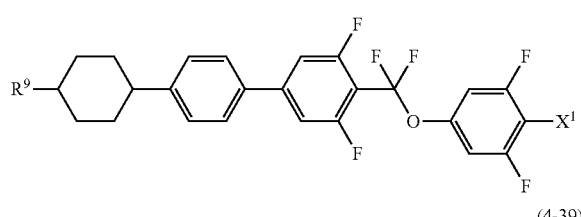
(4-39) 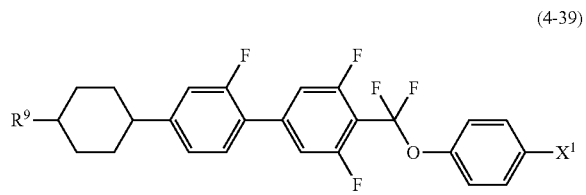
(4-40) 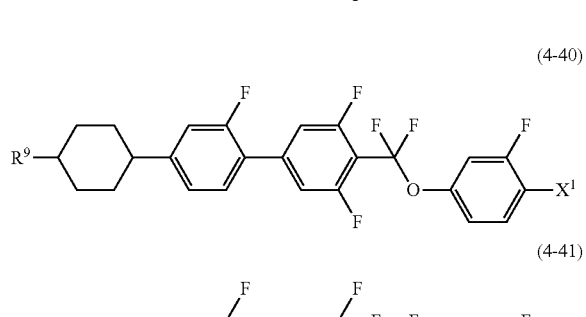
(4-41) 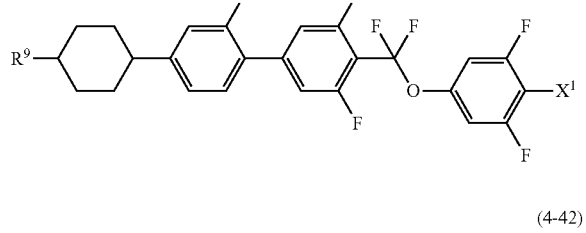
(4-42) 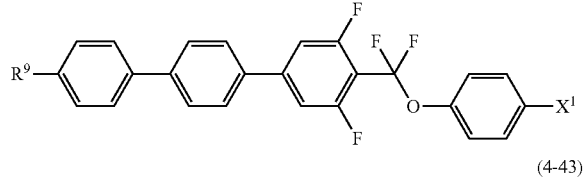
(4-43) 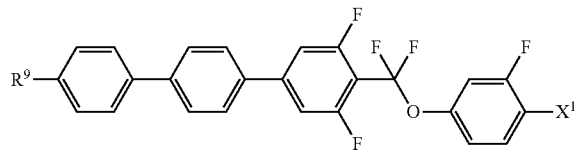

(4-44)
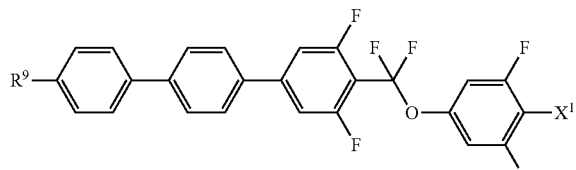

(4-45)
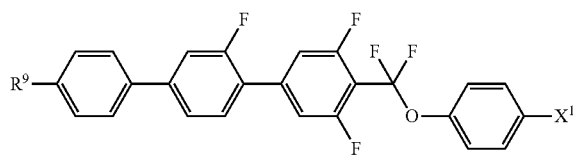

(4-46)
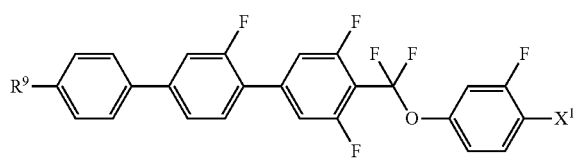

(4-47)
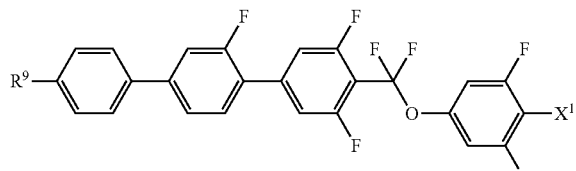

(4-48)
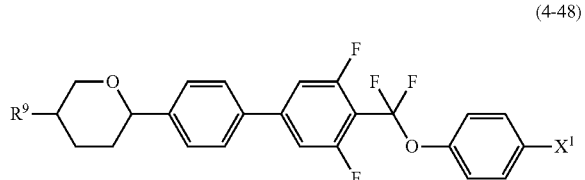

(4-49)
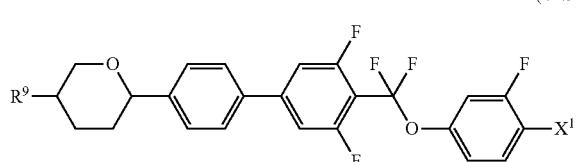

(4-50)
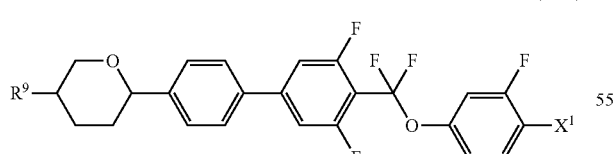

(4-51)
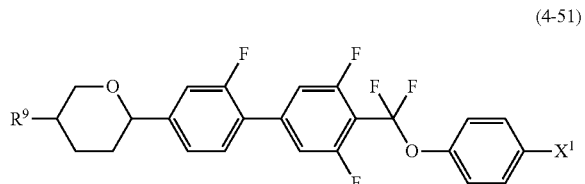

(4-52)
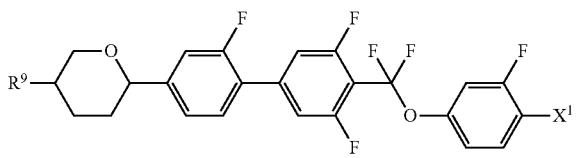

(4-53)
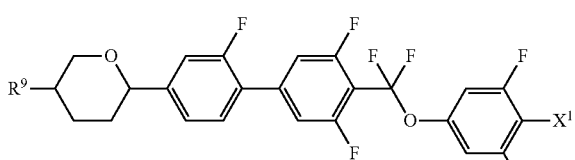

(4-54)
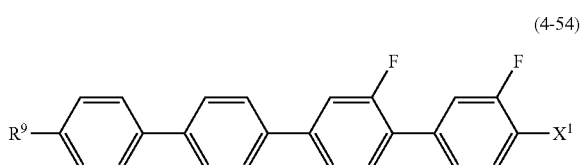

In the formulas, $R^9$ and $X^1$ are defined in a manner identical with the definitions as described above.

Components represented by formulas (2) to (4), namely, component B, have a positive dielectric anisotropy, and a superb thermal and chemical stability, and therefore are used when preparing a liquid crystal composition for TFT and PSA. Content of component B in the liquid crystal composition of the invention is suitably in the range of 1 to 99% by weight, preferably, in the range of 10 to 97% by weight, further preferably, 40 to 95% by weight, based on the total weight of liquid crystal composition. Moreover, when compounds represented by formulas (12) to (14) (component E) are further introduced into the composition, the viscosity can be controlled.

Suitable examples of compounds represented by formula (5), namely, component C, include compounds represented by formulas (5-1) to (5-64)

(5-1)
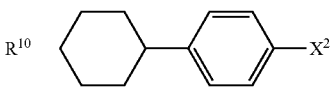

(5-2)

(5-3)
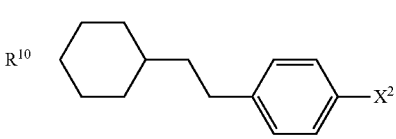

-continued (5-4) through (5-23): chemical structure formulas

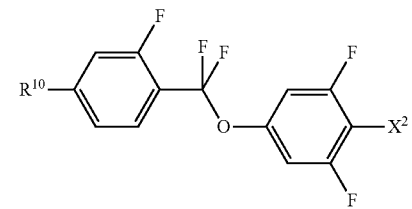 (5-24)
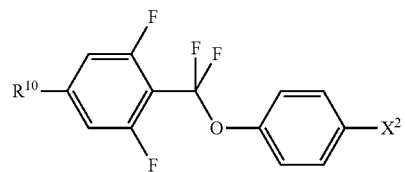 (5-25)
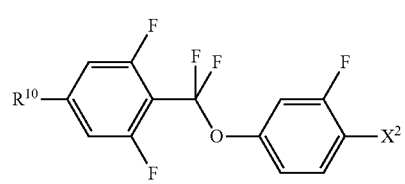 (5-26)
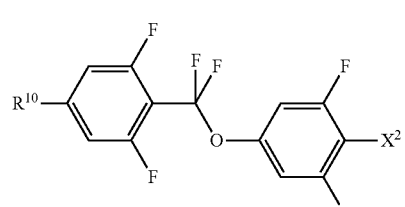 (5-27)
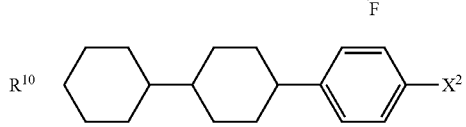 (5-28)
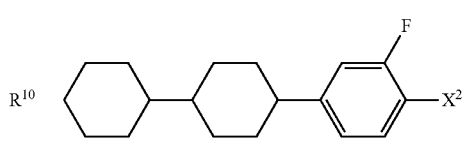 (5-29)
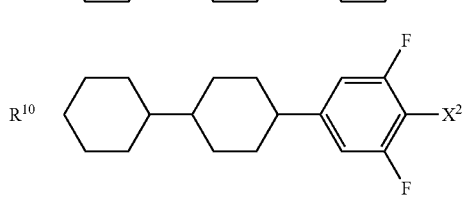 (5-30)
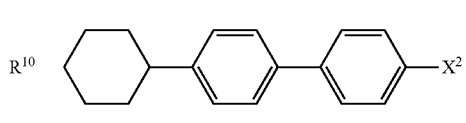 (5-31)
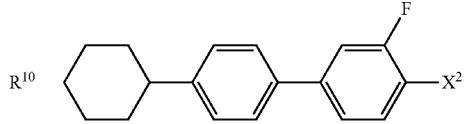 (5-32)
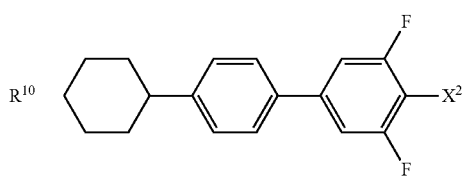 (5-33)
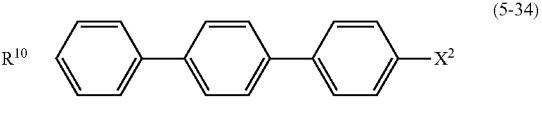 (5-34)
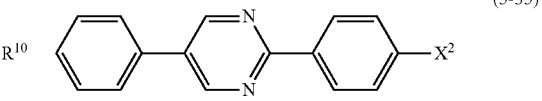 (5-35)
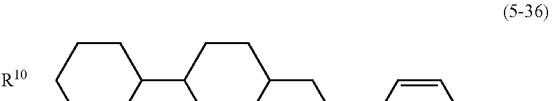 (5-36)
 (5-37)
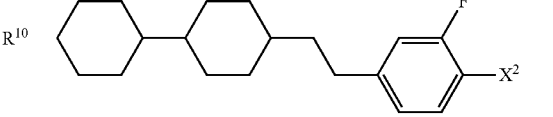 (5-38)
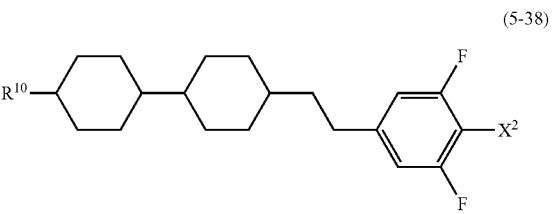 (5-39)
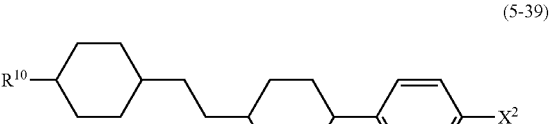 (5-40)
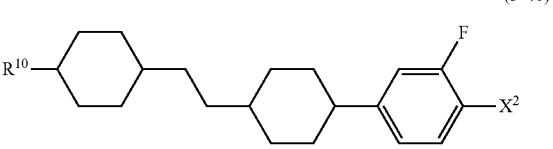 (5-41)
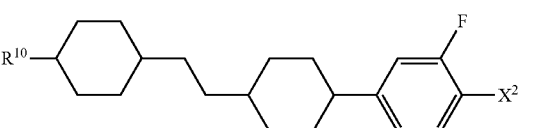 (5-42)
 (5-43)
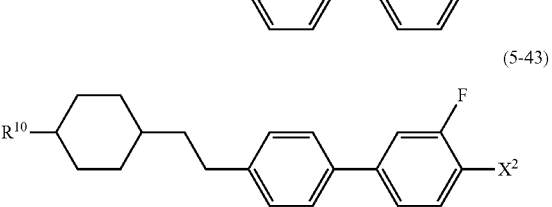

(5-44)
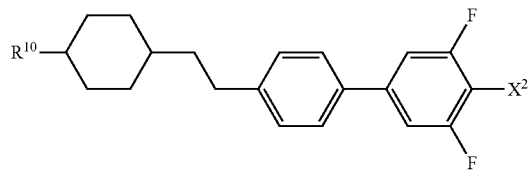
(5-45)
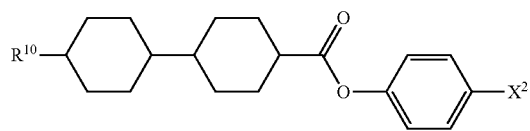
(5-46)
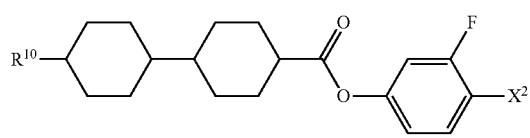
(5-47)
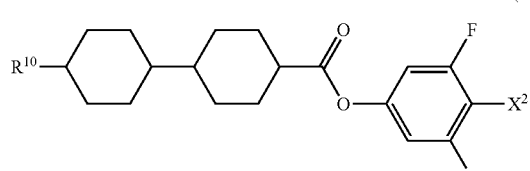
(5-48)
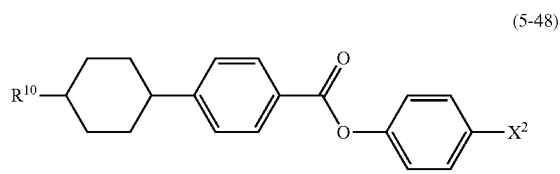
(5-49)
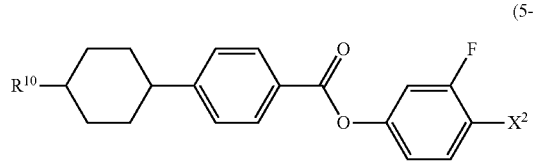
(5-50)
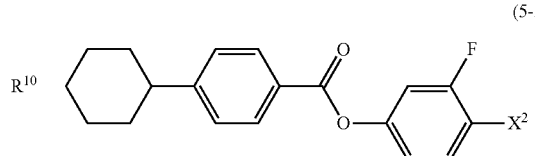
(5-51)
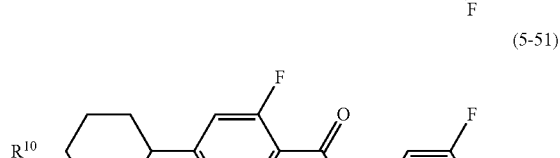
(5-52)
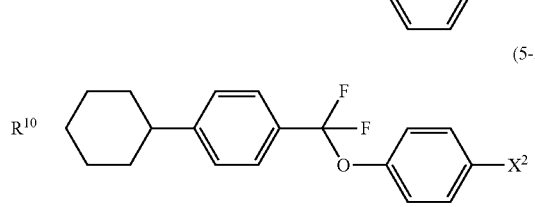
(5-53)
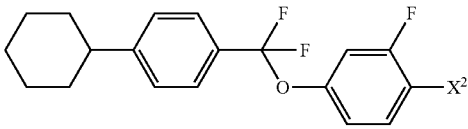
(5-54)
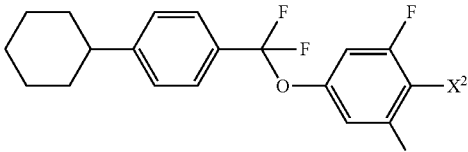
(5-55)
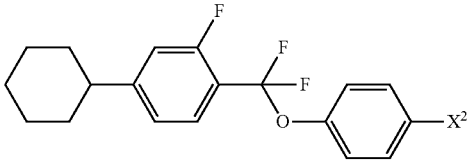
(5-56)
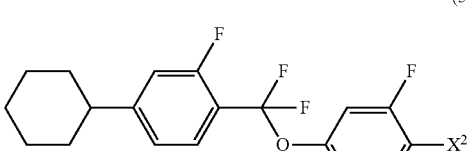
(5-57)
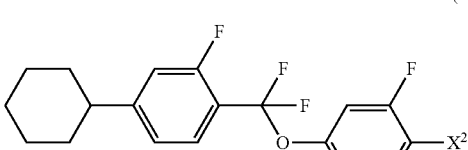
(5-58)
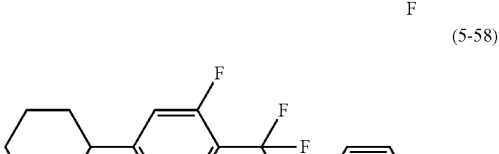
(5-59)
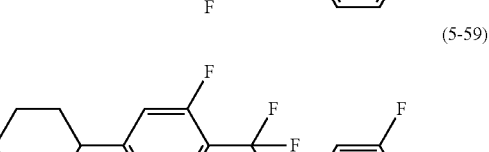
(5-60)
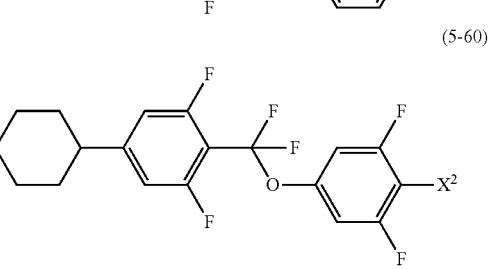

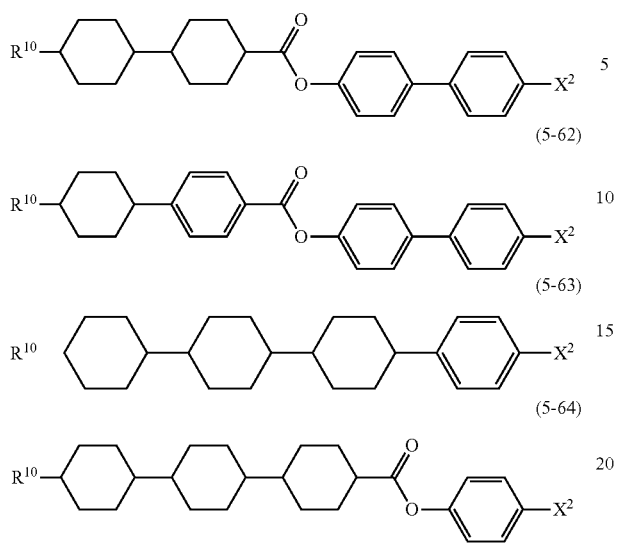

In the formulas, $R^{10}$ and $X^2$ are defined in a manner identical with the definitions as described above.

In formula (5), two of ring $C^2$ when o is 2 may be identical or different.

Components represented by formula (5), namely, component C, have a positive dielectric anisotropy and a very large value, and therefore are mainly used when preparing a liquid crystal composition for STN, TN or PSA. When the component C is introduced into the composition, the threshold voltage of the composition can be decreased. Moreover, the viscosity and the refractive index anisotropy can be adjusted, and the temperature range of the liquid crystal phase can be extended. Moreover, the composition can be also used for improvement in steepness.

When preparing a liquid crystal composition for STN or TN, content of component C is suitably in the range of 0.1 to 99.9% by weight, preferably, in the range of 10 to 97% by weight, further preferably, 40 to 95% by weight, based on the total weight of liquid crystal composition. Moreover, when a component as described layer is mixed, the threshold voltage, the temperature range of the liquid crystal phase, the refractive index anisotropy, the dielectric anisotropy, the viscosity or the like can be adjusted.

Component D including at least one kind compound selected from the group of compounds represented by formulas (6) to (11) is preferred when preparing a liquid crystal composition having a negative dielectric anisotropy used for a vertical alignment mode (VA mode) and a polymer sustained alignment mode (PSA mode) and so forth.

Suitable examples of compounds represented by formulas (6) to (11) (component D) include compounds represented by formulas (6-1) to (6-6), (7-1) to (7-15), (8-1), (9-1) to (9-3), (10-1) to (10-11), and (11-1) to (11-10), respectively.

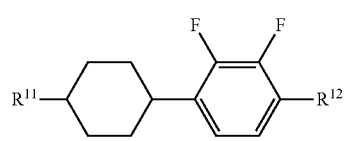

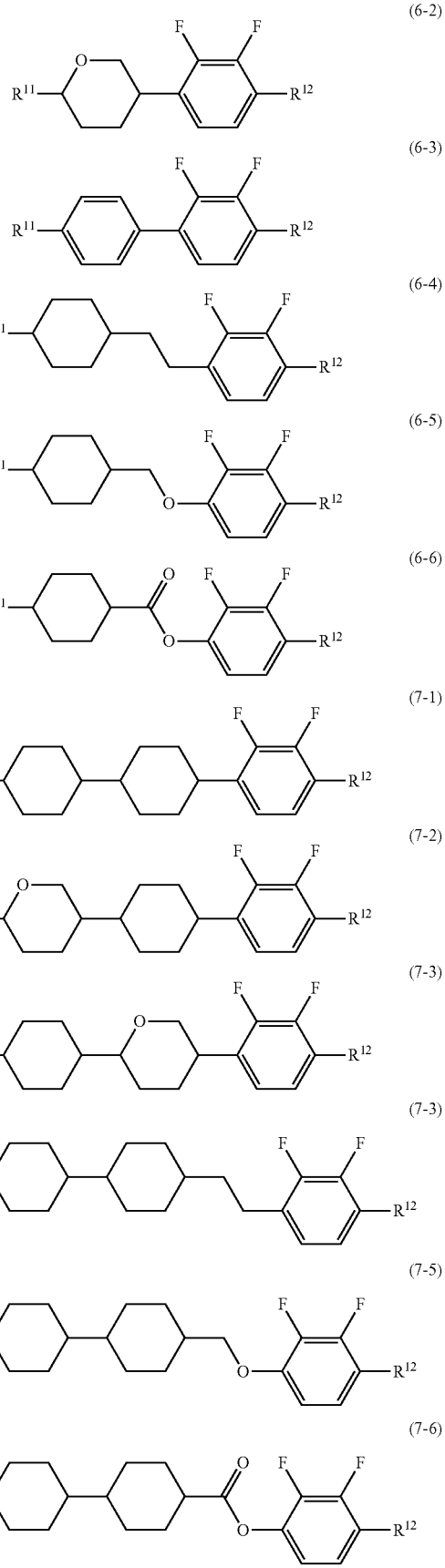

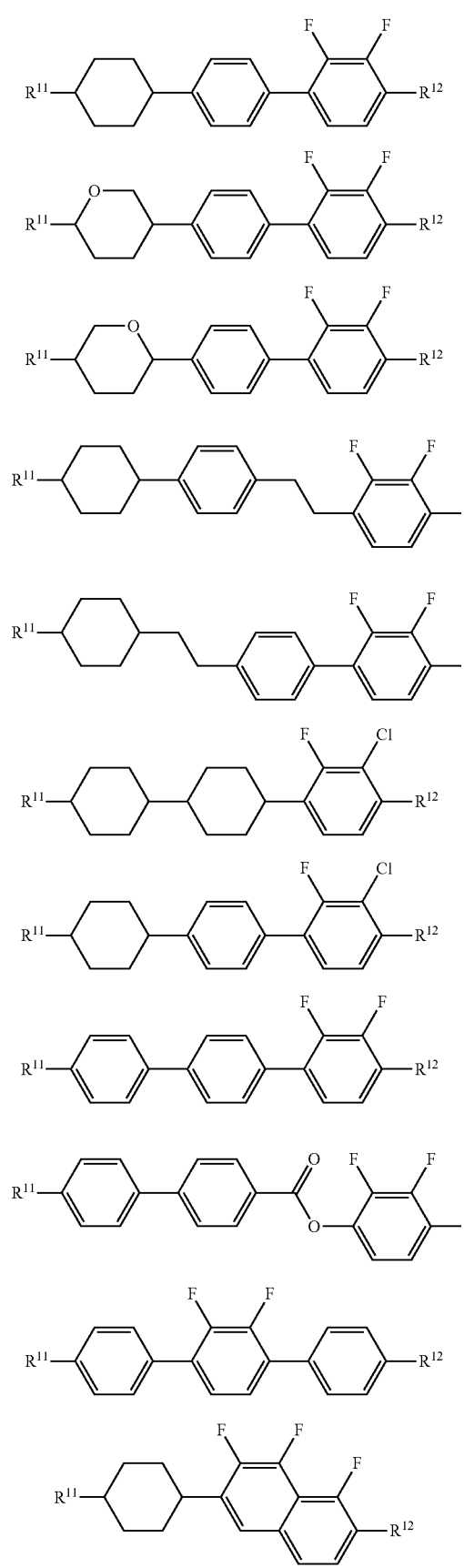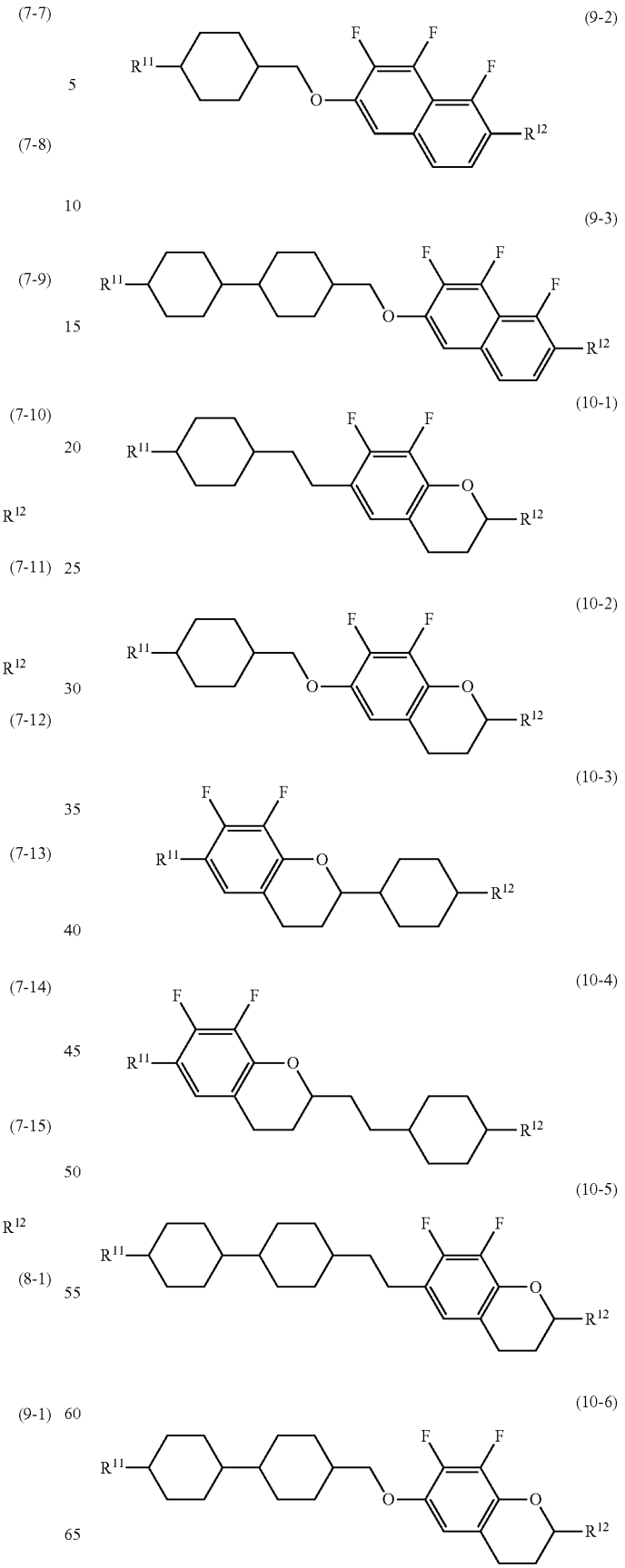

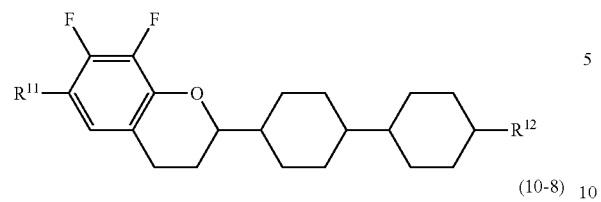

(10-7)

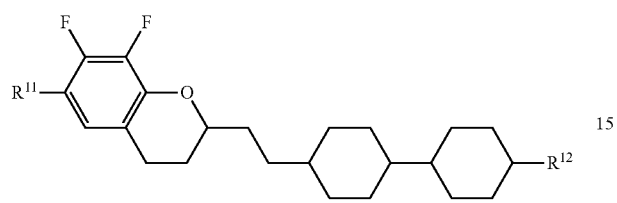

(10-8)

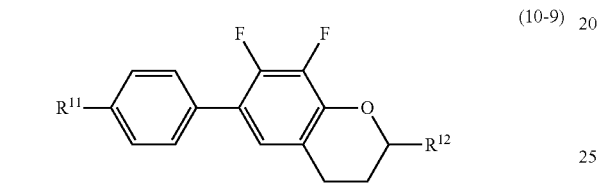

(10-9)

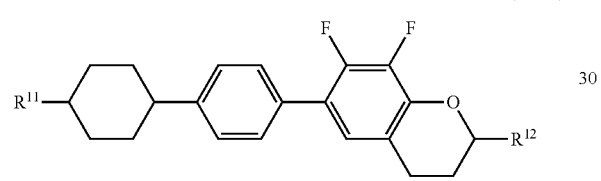

(10-10)

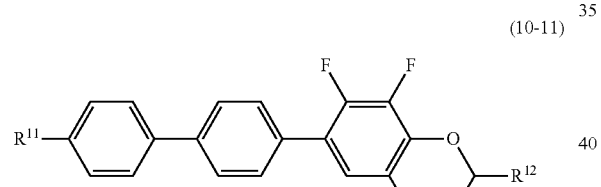

(10-11)

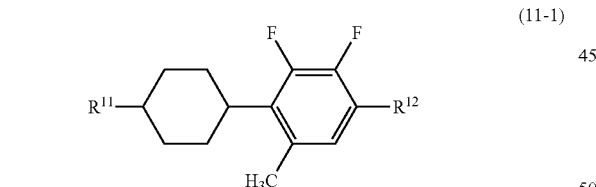

(11-1)

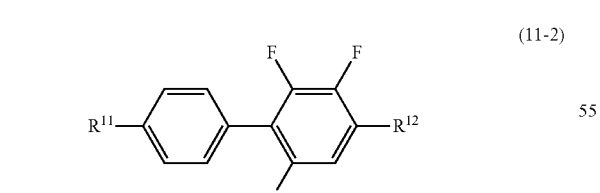

(11-2)

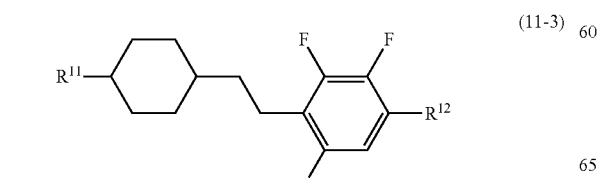

(11-3)

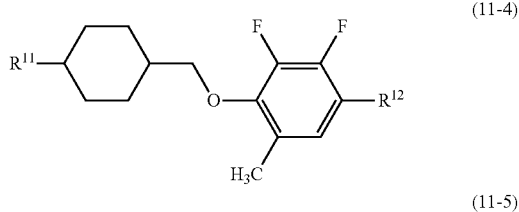

(11-4)

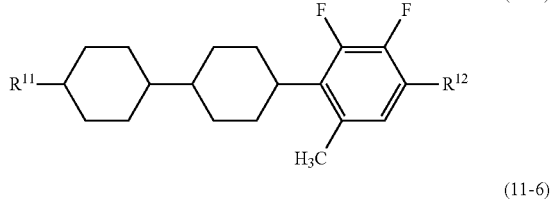

(11-5)

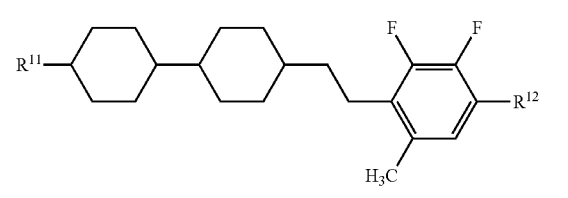

(11-6)

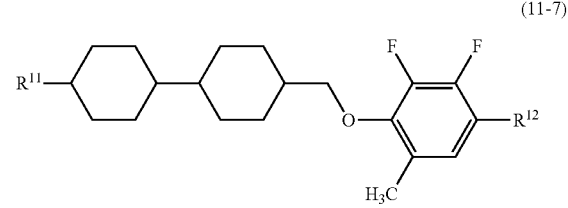

(11-7)

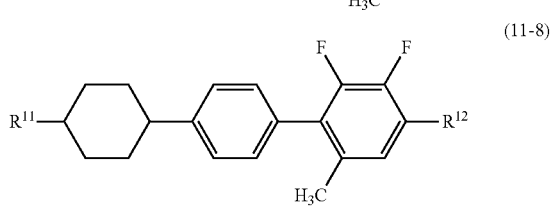

(11-8)

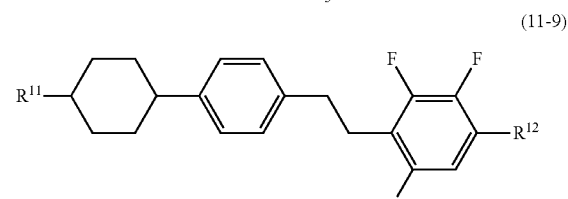

(11-9)

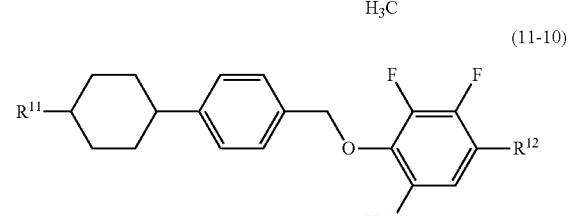

(11-10)

In the formulas, $R^{11}$ and $R^{12}$ are defined in a manner identical with the definitions as described above.

The compounds of component D are used mainly for a liquid crystal composition having a negative dielectric anisotropy for the VA mode or the PSA mode. If the content thereof is increased, the threshold voltage of the composition decreases, but the viscosity increases, and therefore the content is preferably as small as possible, as long as a requirement for the threshold voltage is met. However, an absolute value of dielectric anisotropy is about 5, and therefore the content is preferably 40% by weight or more in order to perform sufficient voltage driving.

Among types of component D, the compound represented by formula (6) is a bicyclic compound, and therefore effective mainly in adjusting the threshold voltage, the viscosity or the refractive index anisotropy. Moreover, the compounds represented by formula (7) and formula (8) each are a tricyclic compound, and therefore effective in increasing the clearing point, extending the temperature range of the nematic phase, decreasing the threshold voltage, increasing the refractive index anisotropy, or the like. Moreover, the compounds represented by formulas (9), (10) and (11) are effective in decreasing the threshold voltage.

When preparing a liquid crystal composition for the VA mode or the PSA mode, content of component D is preferably 40% by weight or more, further preferably, in the range of 50 to 95% by weight, based on the total weight of liquid crystal composition. Moreover, when component D is mixed, the elastic constant can be controlled, and a voltage-transmittance curve of the composition. When component D is mixed with a composition having a positive dielectric anisotropy, the content thereof is preferably 30% by weight or less based on the total amount of the composition.

Suitable examples of compounds represented by formulas (12), (13) and (14) (component E) include compounds represented by formulas (12-1) to (12-11), (13-1) to (13-19), and (14-1) to (14-6), respectively.

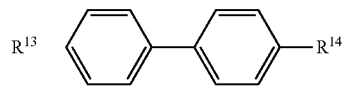
(12-1)

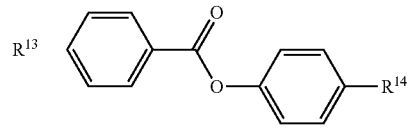
(12-2)

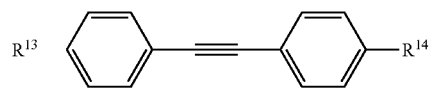
(12-3)

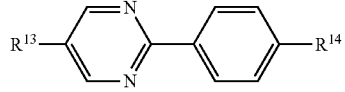
(12-4)

(12-5)

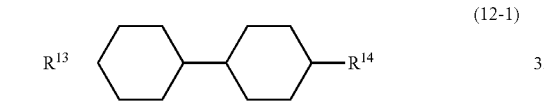
(12-6)

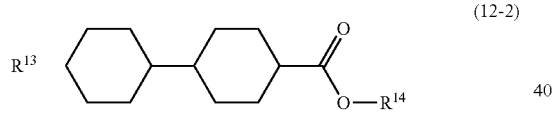
(12-7)

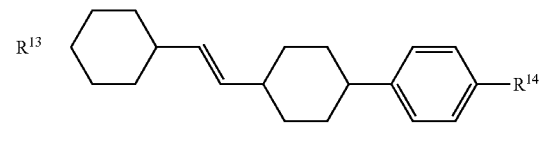
(12-8)

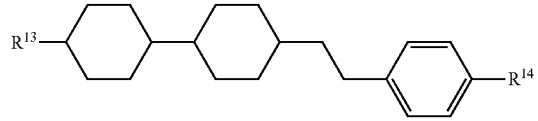
(12-9)

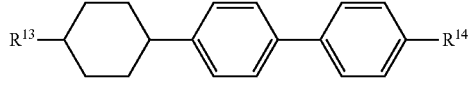
(12-10)

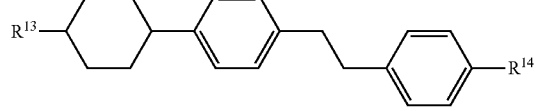
(12-11)

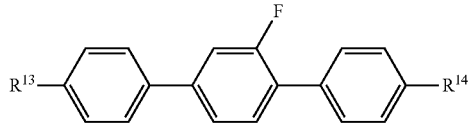
(13-1)

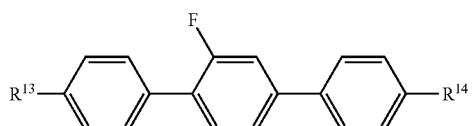
(13-2)

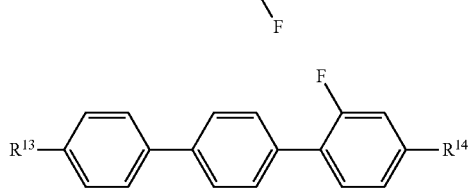
(13-3)

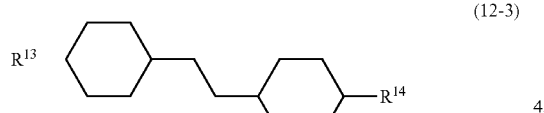
(13-4)

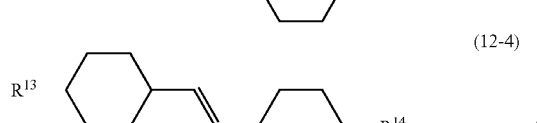
(13-5)

(13-6)

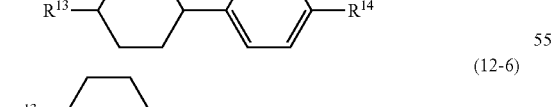
(13-7)

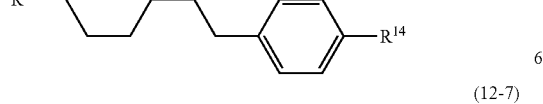
(13-8)

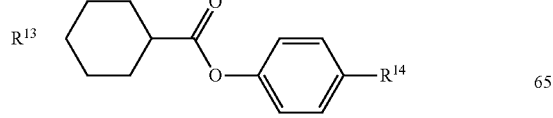

(13-9) 

(13-10) 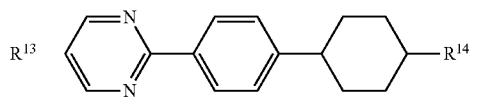

(13-11) 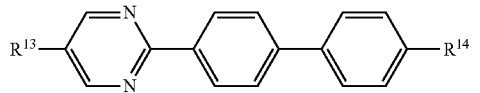

(13-12) 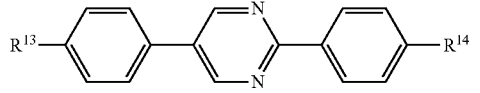

(13-13) 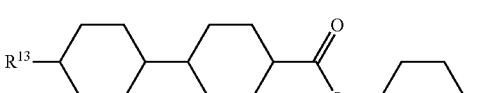

(13-14) 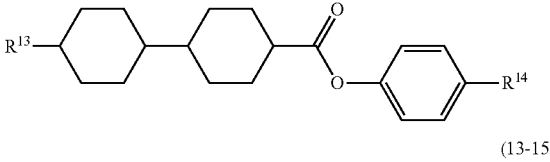

(13-15) 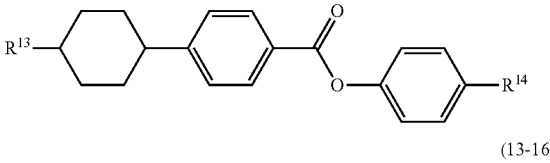

(13-16) 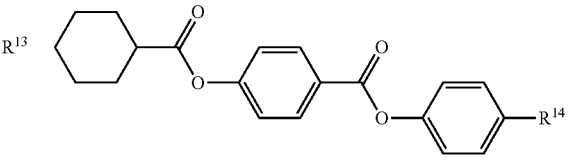

(13-17) 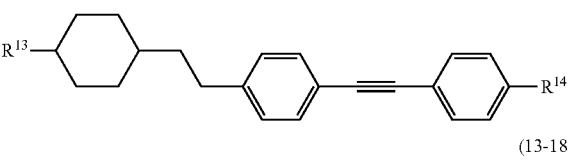

(13-18) 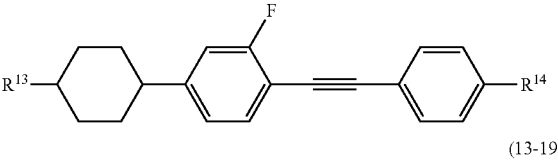

(13-19) 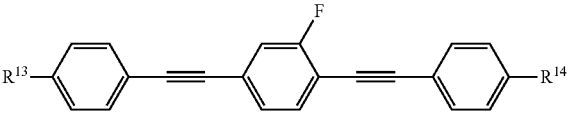

(14-1) 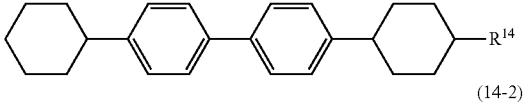

(14-2) 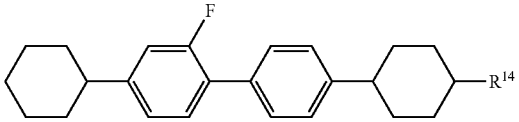

(14-3) 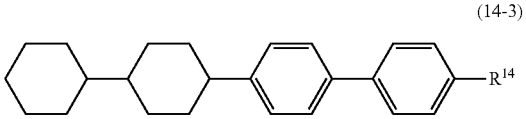

(14-4) 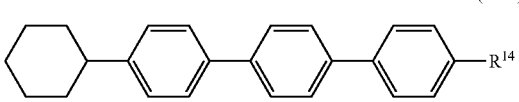

(14-5) 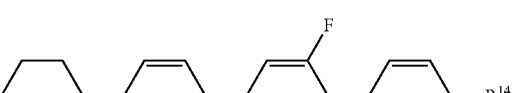

(14-6) 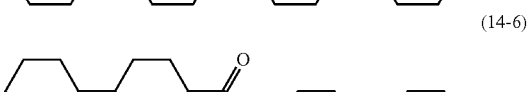

In the formulas, $R^{13}$ and $R^{14}$ are defined in a manner identical with the definitions as described above.

The compounds represented by formulas (12) to (14) (component E) each have a small absolute value of dielectric anisotropy, and close to neutrality. The compound represented by formula (12) is effective mainly in adjusting the viscosity and the refractive index anisotropy, and the compounds represented by formulas (13) and (14) are effective in extending the temperature range of the nematic phase, such as increasing the clearing point, or adjusting the refractive index anisotropy.

If content of the compound represented by component E is increased, the threshold voltage of the liquid crystal composition increases, and the viscosity decreases, and therefore content thereof is desirably as high as possible, as long as a required value of the threshold voltage of the liquid crystal composition is satisfied. When preparing a liquid crystal composition for TFT or PSA, the content of component E is preferably 30% by weight or more, further preferably, 50% by weight or more, based on the total weight of the composition. Moreover, when preparing a liquid crystal composition for TN, STN or PSA, the content of component E is preferably 30% by weight or more, further preferably, 40% by weight or more, based on the total weight of the composition.

The liquid crystal composition of the invention preferably contains at least one of compound (1) in a ratio of 0.1 to 99% by weight in order to develop excellent characteristics.

The liquid crystal composition of the invention is generally prepared according to a publicly known method, for example, a method for dissolving necessary components under a high temperature. Moreover, an additive well known to those skilled in the art is added according to an application, and thus a liquid crystal composition for a GH mode can be prepared to which an optically active compound or a polymerizable compound, or a liquid crystal composition containing a polymerization initiator, or a dye as described later is added, for example. The additive is ordinarily well known to those skilled in the art, and described in a literature or the like in detail.

The liquid crystal composition of the invention may further contain at least one optically active compound. As the optically active compound, a publicly known chiral dopant is added. The chiral dopant is effective in inducing a helical structure of liquid crystals to adjust a required twist angle, and preventing an inverted twist. Specific examples of the chiral dopants include optically active compounds represented by formulas (Op-1) to (Op-13)

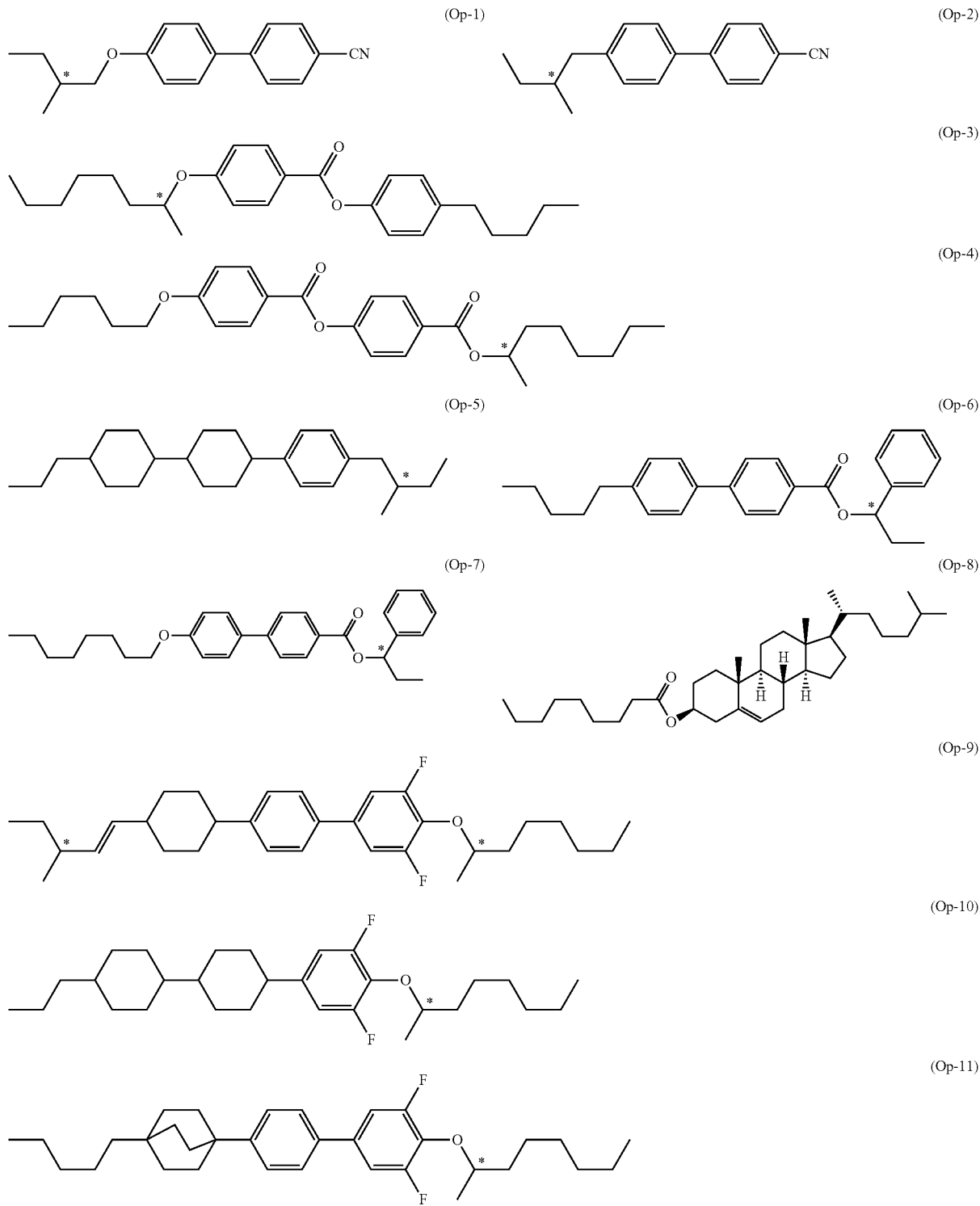

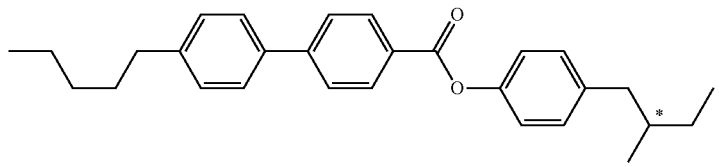
(Op-12)

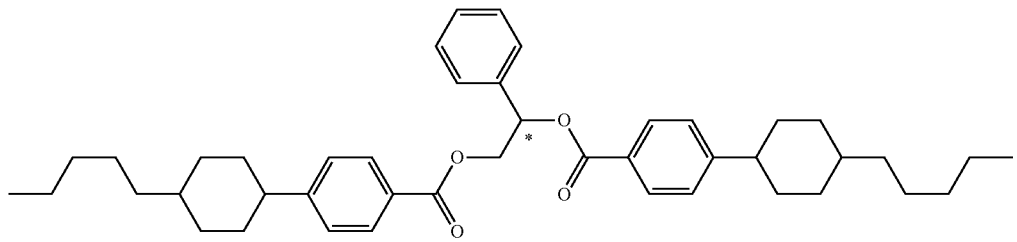
(Op-13)

A helical pitch of the liquid crystal composition of the invention can be adjusted by adding the optically active compounds to the composition. The helical pitch is preferably adjusted in the range of 40 to 200 micrometers for a liquid crystal composition for TFT and TN. The helical pitch is preferably adjusted in the range of 6 to 20 micrometers for a liquid crystal composition for STN. Moreover, the helical pitch is preferably adjusted in the range of 1.5 to 4 micrometers in a case of a bistable TN mode. Moreover, two or more optically active compounds may be added for the purpose of adjusting temperature dependence of the pitch.

The liquid crystal composition of the invention can also be used as a liquid crystal composition for the GH mode, if a dichroic dye such as a merocyanine, styryl, azo, azomethine, azoxy, quinophthalone, anthraquinone or tetrazine dye is added.

The liquid crystal composition of the invention can also be used as a liquid crystal composition for NCAP prepared by microencapsulating nematic liquid crystals, a polymer dispersed liquid crystal display device (PDLCD) prepared by forming a three-dimensional network polymer in liquid crystals, for example, a polymer network liquid crystal display device (PNLCD), and a liquid crystal display device having an electrically controlled birefringence (ECB) mode or DS mode.

Moreover, the liquid crystal composition of the invention can also be used as a liquid crystal composition for the polymer sustained alignment (PSA) mode by adding the polymerizable compound. Examples of the polymerizable compound include a compound having a polymerizable group such as acrylate, methacrylate, vinyl, vinyloxy, propenyl ether, epoxy, vinyl ketone and oxetane. The polymerizable compound is preferably polymerized by irradiation with UV or the like under presence of a suitable initiator such as a photopolymerization initiator. Suitable conditions for polymerization, suitable types and suitable amounts of initiators are known to those skilled in the art and described in a literature. For example, Irgacure 651 (registered tradename), Irgacure 184 (registered tradename) or Darocure 1173 (registered tradename) (Ciba Japan K. K.), each being the photopolymerization initiator, is suitable for radical polymerization.

Method for Manufacturing a Liquid Crystal Composition

The liquid crystal composition concerning the invention can be prepared, for example, by mixing individual compounds when the compounds constituting each component are liquid, or by mixing individual compounds and making the compounds liquid by heating and dissolution and then shaking the compounds when the compounds contain a solid. Moreover, the liquid crystal composition concerning the invention can also be prepared by other publicly known methods.

Characteristics of a Liquid Crystal Composition

In the liquid crystal composition concerning the invention, the maximum temperature of the nematic phase can be adjusted to 70° C. or higher, and the minimum temperature of the nematic phase to −20° C. or lower, and thus the temperature range of the nematic phase is wide. Accordingly, the liquid crystal display device including the liquid crystal composition can be used in a wide temperature range.

In the liquid crystal composition concerning the invention, when the composition or the like is appropriately adjusted, the optical anisotropy can be adjusted, for example, to the range of 0.10 to 0.13, or to the range of 0.05 to 0.18.

In the liquid crystal composition concerning the invention, a liquid crystal composition having the dielectric anisotropy ordinarily in the range of −5.0 to −2.0, preferably, in the range of −4.5 to −2.5, can be obtained. A liquid crystal composition having the dielectric anisotropy in the range −4.5 to −2.5 can be suitably used as a liquid crystal display device that operates according to the IPS mode, the VA mode or the PSA mode.

Liquid Crystal Display Device

The liquid crystal composition concerning the invention can be used not only for a liquid crystal display device that has an operating mode such as the PC mode, the TN mode, the STN mode, the OCB mode or the PSA mode, and is driven according to an active matrix (AM) mode, but also for a liquid crystal display device that has an operating mode such as the PC mode, the TN mode, the STN mode, the OCB mode, the VA mode and the IPS mode, and is driven according to a passive matrix (PM) mode.

The liquid crystal display device according to the AM mode and the PM mode can be applied to any liquid crystal display of a reflective type, a transmissive type, a transflective type, or the like.

Moreover, the liquid crystal composition concerning the invention can also be used for a dynamic scattering (DS) mode device using a liquid crystal composition to which a conducting agent is added, a nematic curvilinear aligned phase (NCAP) device prepared by microencapsulating the liquid crystal composition, or a polymer dispersed (PD) device prepared by forming a three-dimensional network polymer in the liquid crystal composition, for example, a polymer network (PN) device.

Above all, the liquid crystal composition concerning the invention has the characteristics as described above. Therefore, the liquid crystal composition can be suitably used for a liquid crystal display device according to the AM mode to be driven by the operating mode using a liquid crystal composition having the negative dielectric anisotropy, such as the VA mode, the IPS mode or the PSA mode, particularly suitably, a liquid crystal display device according to the AM mode to be driven by the VA mode.

In the liquid crystal display device driven by the TN mode, the VA mode or the like, a direction of an electric field is perpendicular to a direction of a liquid crystal layer. On the other hand, in the liquid crystal display device driven by the IPS mode or the like, the direction of the electric field is parallel to the direction of the liquid crystal layer. In addition, a structure of the liquid crystal display device driven by the VA mode is reported in K. Ohmuro, S. Kataoka, T. Sasaki and Y. Koike, SID'97 Digest of Technical Papers, 28, 845 (1997), and a structure of the liquid crystal display device driven by the IPS mode is reported in WO 91/10936 A (family: U.S. Pat. No. 5,576,867).

EXAMPLES

Examples of Compound (1)

Hereinafter, the invention will be explained in more detail by way of Examples, but the invention is not limited by the Examples. Unless otherwise noted, "%" is expressed in terms of "% by weight."

A compound obtained was identified using a spectrum obtained by $^1$H NMR analysis. Therefore, an analytical method will be first explained.

$^1$H NMR Analysis

As a measuring apparatus, DRX-500 (made by Bruker BioSpin Corporation) was used. A sample manufactured in Examples and so forth was dissolved in a deuterated solvent such as $CDCl_3$ in which the sample was soluble, and measurement was carried out under the conditions of room temperature, 500 MHz and 32 times of accumulation. In the explanation of the nuclear magnetic resonance spectrum obtained, s, d, t, q, quin, sex, m and br stand for a singlet, a doublet, a triplet, a quartet, a quintet, a sextet, a multiplet and broad, respectively. Tetramethylsilane (TMS) was used for a reference material for a zero point of chemical shifts (δ values).

Measurement Sample

As a sample for determining values of physical properties of a liquid crystal compound, two methods were applied: namely a case where the compound per se was used as the sample, and a case where the compound was mixed with base liquid crystals to be used as the sample.

In the latter case where the sample prepared by mixing the liquid crystal compound with the base liquid crystals was used, measurement was carried out according to the method described below. First, a sample was prepared by mixing 15% of a liquid crystal compound obtained and 85% of base liquid crystals. Then, extrapolated values were calculated, from measured values of the sample obtained, according to an extrapolation method shown in an equation as described below. The extrapolated values were described as values of physical properties of the compound.

Equation:

(Extrapolated value)={100×(measured value of a sample)−(% of base liquid crystals)×(measured value of the base liquid crystals)}/(% of liquid crystal compound).

When a smectic phase or crystals precipitated at 25° C. even at the ratio of the liquid crystal compound to the base liquid crystals as described above, a ratio of the liquid crystal compound to the base liquid crystals was changed in the order of (10%:90%), (5%:95%) and (1%:99%), and values of physical properties of the sample were determined at a ratio at which the smectic phase or the crystals did not precipitate at 25° C.

As the base liquid crystals, base liquid crystals i was used when a compound having a positive dielectric anisotropy was used, and base liquid crystals (ii) was used when a compound having a negative dielectric anisotropy was used. Compositions of base liquid crystals (i) and (ii) are as described below.

Base Liquid Crystals (i):

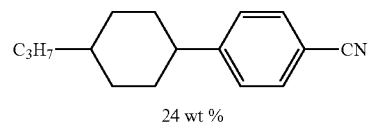

24 wt %

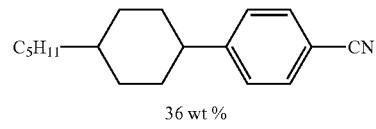

36 wt %

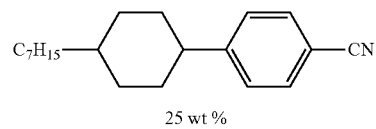

25 wt %

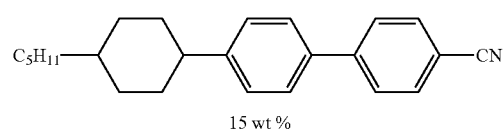

15 wt %

Base Liquid Crystals (ii):

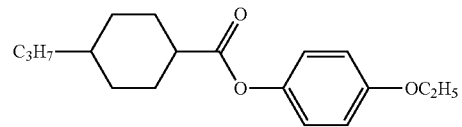

17.2%

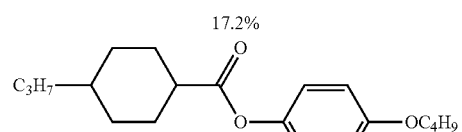

27.6%

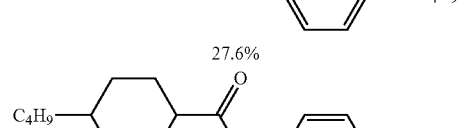

20.7%

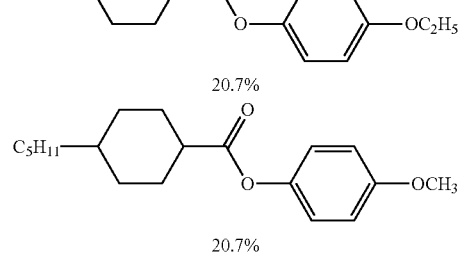

20.7%

-continued

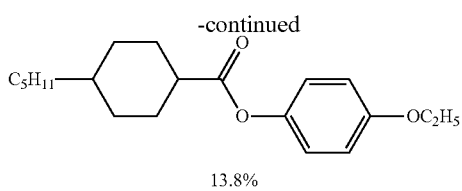

13.8%

Measuring Method

Values of physical properties were determined according to the methods described below. Most of the measuring methods are described in EIAJ ED-2521A of the Standard of Electronic Industries Association of Japan, or modified thereon. Moreover, no TFT was attached to a TN device or a VA device used for measurement.

Among measured values, values obtained using the liquid crystal compound per se as the sample, and values obtained using the liquid crystal composition per se as the sample were described as were. In the case of the sample obtained by mixing the compound with the base liquid crystals, values obtained according to the extrapolation method were described.

Phase Structure and Phase Transition Temperature (° C.)

Measurement was carried out according to methods (1) and (2) as described below.

(1) A sample was placed on a hot plate of a melting point apparatus (FP-52 Hot Stage made by Mettler-Toledo International Inc.) equipped with a polarizing microscope, and a state of phase and a change thereof were observed with the polarizing microscope while the sample was heated at a rate of 3° C. per minute, and a kind of the phase was specified.

(2) A sample was heated and then cooled at a rate of 3° C. per minute using a differential scanning calorimeter, DSC-7 System or Diamond DSC System, made by PerkinElmer, Inc. A starting point (on set) of an endothermic peak or an exothermic peak caused by a phase change of the sample was determined by extrapolation, and thus a phase transition temperature was determined.

Hereinafter, the crystals were expressed as Cr, and when the crystals were further distinguishable, each of the crystals was expressed as $Cr_1$ or $Cr_2$. The smectic phase was expressed as Sm and a nematic phase as N. An isotropic liquid (isotropic) was expressed as Iso. When smectic B phase or smectic A phase was distinguishable between the smectic phases, the phases were expressed as $S_B$ or $S_A$, respectively. As an expression of the phase transition temperature, for example, "Cr 50.0 N 100.0 Iso" shows that a phase transition temperature (CN) from the crystals to the nematic phase is 50.0° C., and a phase transition temperature (NI) from the nematic phase to the isotropic liquid is 100.0° C. A same rule was applied to other expressions.

Maximum Temperature of a Nematic Phase ($T_{NI}$; ° C.)

A sample (a liquid crystal composition, or a mixture of a liquid crystal compound and base liquid crystals) was placed on a hot plate of a melting point apparatus (FP-82 Hot Stage made by Mettler-Toledo International Inc.) equipped with a polarizing microscope, and was observed with the polarizing microscope while the sample was heated at a rate of 1° C. per minute. Temperature when part of the sample changed from the nematic phase to the isotropic liquid was described as a maximum temperature of the nematic phase. Hereinafter, the maximum temperature of the nematic phase may be occasionally abbreviated simply as "maximum temperature."

Compatibility at a Low Temperature

Samples were prepared in which base liquid crystals and a liquid crystal compound were mixed to be 20%, 15%, 10%, 5%, 3% and 1% in an amount of the liquid crystal compound, and the samples were put in glass vials. The glass vials were put in freezers at −10° C. or −20° C. and kept for a fixed period of time, and then whether or not a domain of crystals or a smectic phase was generated was observed.

Viscosity (Bulk Viscosity; η; Measured at 20° C.; mPa·s)

A cone-plate (E type) rotational viscometer was used for measurement.

Viscosity (Rotational Viscosity; γ1; Measured at 25° C.; mPa·s)

Measurement was carried out according to a method described in M. Imai et al., Molecular Crystals and Liquid Crystals, Vol. 259, 37 (1995). A sample (a liquid crystal composition, or a mixture of a liquid crystal composition and base liquid crystals) was put in a VA device in which a distance (cell gap) between two glass substrates was 20 micrometers. Voltage was stepwise applied to the device in the range of 30 V to 50 V at an increment of 1 V. After a period of 0.2 second with no voltage application, application was repeated under conditions of only one of rectangular waves (rectangular pulse; 0.2 second) and no application (2 seconds). A peak current and a peak time of a transient current generated by the application were measured. A value of rotational viscosity was obtained from the measured values according to calculating equation (8) on page 40 of the paper by Imai et al. In addition, a value obtained by measuring dielectric anisotropy as described below was used as the dielectric anisotropy necessary for the calculation.

Optical anisotropy (refractive index anisotropy; measured at 25° C.; Δn)

Measurement was carried out by means of Abbe refractometer with a polarizing plate mounted on an ocular by using light at a wavelength of 589 nanometers at a temperature of 25° C. A surface of a main prism was rubbed in one direction, and then a sample (a liquid crystal composition, or a mixture of a liquid crystal compound and base liquid crystals) was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy (Δn) was calculated from an equation: Δn=n∥−n⊥.

Dielectric Anisotropy (Δ∈; Measured at 25° C.)

Dielectric anisotropy was measured according to a method as described below.

An ethanol (20 mL) solution of octadecyl triethoxysilane (0.16 mL) was applied to a well-washed glass substrate. After rotating the glass substrate with a spinner, the glass substrate was heated at 150° C. for 1 hour. A VA device in which a distance (cell gap) between two glass substrates was 20 micrometers was assembled.

In a similar manner, a polyimide alignment film was formed on the glass substrate. After rubbing treatment was applied to the alignment film obtained on the glass substrate, a TN device in which a distance (cell gap) between two glass substrates was 9 micrometers and a twist angle was 80 degrees was assembled.

A sample (a liquid crystal composition, or a mixture of a liquid crystal compound and base liquid crystals) was put in the VA device obtained, a voltage of 0.5 V (1 kHz, sine waves) was applied to the device, and a dielectric constant (∈∥) in the major axis direction of liquid crystal molecules was measured.

Moreover, a sample (a liquid crystal composition, or a mixture of a liquid crystal compound and base liquid crystals) was put in the TN device obtained, a voltage of 0.5 V (1 kHz, sine waves) was applied to the device, and a dielectric constant ($\in\perp$) in the minor axis direction of the liquid crystal molecules was measured. A value of dielectric anisotropy was calculated from an equation: $\Delta\in=\in\|-\in\perp$.

Voltage holding ratio (VHR; Measured at 25° C.; %)

A TN device used for measurement had a polyimide alignment film, and a distance (cell gap) between two glass substrates was 6 micrometers. A sample (a liquid crystal composition, or a mixture of a liquid crystal compound and base liquid crystals) was put in the device, and then the device was sealed with an ultraviolet-polymerizable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio was expressed in terms of a percentage of area A to area B.

Elastic Constant ($K_{11}$, $K_{33}$; Measured at 25° C.)

Elastic Constant Measurement System Model EC-1 made by TOYO Corporation was used for measurement. A sample was put in a vertical alignment cell in which a distance (cell gap) between two glass substrates was 20 micrometers. An electric charge from 20 V to 0 V was applied to the cell, and electrostatic capacity and applied voltage were measured. Measured values of the electrostatic capacity (C) and the applied voltage (V) were fitted to equation (2.98) and equation (2.101) on page 75 of "Liquid Crystal Device Handbook" (Ekisho Debaisu Handobukku in Japanese) (The Nikkan Kogyo Shimbun, Ltd.) and a value of elastic constant was obtained from equation (2.100).

Example 1

Synthesis of 6-(trans-4-propylcyclohexyl)-3-(trans-4-pentylcyclohexyl)methoxy-3-cyclohexene (compound (1-3-1-18))

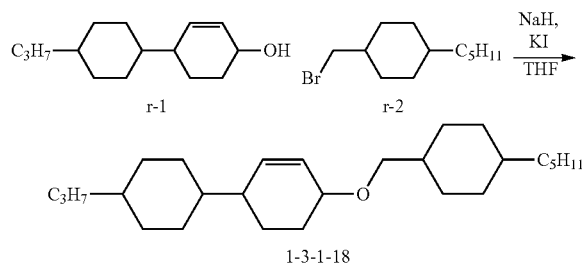

First Step

Under a nitrogen atmosphere, 2.4 g of 4-(trans-4-propylcyclohexyl)-2-cyclohexene-1-ol (r-1) was dissolved into 50 mL of THF, 0.52 g of 60% sodium hydride was added under ice-cooling, and the resultant mixture was stirred at room temperature for 1 hour. Thereto, 2.3 g of potassium iodide and 3.2 g of (trans-4-pentylcyclohexyl)bromomethane (r-2) dissolved in 30 mL of THF were added, and the resultant mixture was stirred under heating reflux for 8 hours. The resultant reaction mixture was poured into water, and subjected to extraction with toluene. Combined organic layers were washed with saturated brine, and then dried over anhydrous magnesium sulfate. A solvent was evaporated under reduced pressure, and a residue was purified by silica gel column chromatography (eluate:heptane:toluene=1:1 (in a volume ratio)), and further purified by recrystallization from a mixed solvent of heptane:Solmix A-11 (registered tradename; Japan Alcohol Trading Co., Ltd.)=1:2 (in a volume ratio), and thus 0.15 g of 6-(trans-4-propylcyclohexyl)-3-(trans-4-pentylcyclohexyl)methoxy cyclohexene [compound (1-3-1-18) was obtained.

$^1$H-NMR (CDCl$_3$, δ (ppm)); 5.73 (dd, 2H), 3.87-3.83 (m, 1H), 3.33-3.25 (m, 2H), 2.10-2.08 (m, 1H), 2.02-1.98 (m, 1H), 1.83-1.63 (m, 10H), 1.51-1.41 (m, 2H), 1.35-1.15 (m, 16H), 1.03 (m, 2H), 0.96-0.83 (t, 13H).

As a transition temperature, an intrinsic value of the compound was described. Values of physical properties of compound (1-3-1-18) were as described below.

Transition temperature: Cr 16.2 SmB 127 Iso.

Example 2

Synthesis of 3-(4-(trans-4-butylcyclohexyl)cyclohexyl)-6-pentylcyclohexene (compound (1-2-1-4))

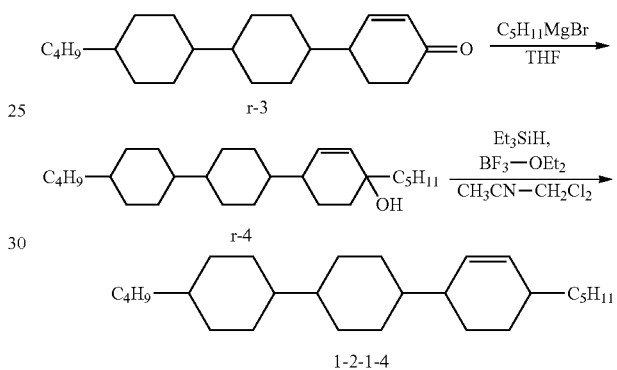

First Step

Under a nitrogen atmosphere, 3.0 g of 4-(4-(trans-4-butylcyclohexyl)cyclohexyl)-2-cyclohexenone (r-3) was dissolved into 50 mL of THF, 11.4 mL of pentylmagnesium bromide THF solution (1 M/L) was added dropwise thereto, and the resultant mixture was stirred at 50° C. for 30 minutes, and then stirred at room temperature overnight. A saturated aqueous solution of ammonium chloride was added dropwise under ice-cooling, the resultant mixture was subjected to extraction with ethyl acetate, and then organic layers were combined, the resultant organic layer was washed with saturated brine, and then dried over anhydrous magnesium sulfate. A solvent was evaporated under reduced pressure, and the resultant residue was purified by fractionation on silica gel column chromatography (eluate:heptane:ethyl acetate=7:3 (in a volume ratio)), and thus 2.68 g of 4-(4-(trans-4-butylcyclohexyl)cyclohexyl)-1-pentyl-2-cyclohexene-1-ol (compound (r-4)) was obtained.

Second Step

Under a nitrogen atmosphere, 2.68 g of compound (r-4) was dissolved into a mixed solvent of 70 mL of dichloromethane and 70 mL of acetonitrile, and 1.65 g of triethylsilane was added thereto, and then 12.3 g of a trifluoroborane-diethyl ether complex was added dropwise at −50° C., the resultant mixture was stirred at −78° C. for 30 minutes, and then stirred at room temperature for 1 hour. A saturated aqueous solution of sodium hydrogencarbonate was added dropwise to terminate a reaction, the resultant mixture was subjected to extraction with dichloromethane, and then organic layers were combined, the resultant organic layer was washed with a saturated aqueous solution of sodium hydrogencarbonate and saturated brine, and then dried over anhydrous magnesium sulfate. A solvent was evaporated under reduced pressure, and the resultant residue was purified by fractionation on silica gel column chromatography (eluate:heptane), and further purified by recrystallization from a mixed solvent of heptane:Solmix A-11 (registered tradename; Japan Alcohol Trading Co., Ltd.)=1:2 (in a volume ratio), and dried, and thus 1.11 g of 3-(4-(trans-4-butylcyclohexyl)cyclohexyl)-6-pentylcyclohexene (compound (1-2-1-4)) was obtained.

$^1$H-NMR (CDCl$_3$, δ (ppm)); 5.58 (dd, 1H), 5.39 (d, 1H), 2.45-1.92 (m, 6H), 1.83-1.71 (m, 10H), 1.41-1.14 (m, 10H), 1.00-0.85 (m, 20H).

As a transition temperature, an intrinsic value of the compound was described, and as a maximum temperature (T$_{NI}$), dielectric anisotropy (Δ∈) and optical anisotropy (Δn), extrapolated values converted according to the extrapolation method from measured values of the sample prepared by mixing the compound with base liquid crystals (i) were described. Values of physical properties of compound (1-2-1-4) were as described below.

Transition temperature: Cr 14.4 SmB 218.4 Iso.
T$_{NI}$=159.7° C., Δ∈=0.40, Δn=0.077.

Example 3

Synthesis of 3-(4-(trans-4-propylcyclohexyl)cyclohexyl)-6-pentylcyclohexene (compound (1-2-1-1))

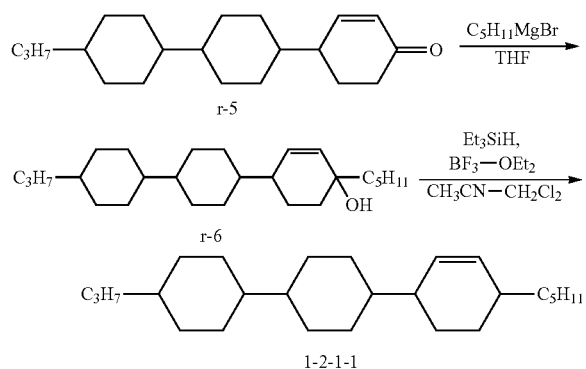

First Step

Under a nitrogen atmosphere, 4.0 g of 4-(4-(trans-4-pentylcyclohexyl)cyclohexyl)-2-cyclohexenone (r-4) was dissolved into 50 mL of THF, 15.8 mL of pentylmagnesium bromide THF solution (1 M/L) was added dropwise thereto at room temperature, and the resultant mixture was stirred at 50° C. for 30 minutes, and then stirred at room temperature overnight. A saturated aqueous solution of ammonium chloride was added dropwise thereto under ice-cooling, the resultant mixture was subjected to extraction with ethyl acetate, and then organic layers were combined, the resultant organic layer was washed with saturated brine, and then dried over anhydrous magnesium sulfate. A solvent was evaporated under reduced pressure, and the resultant residue was purified by fractionation on silica gel column chromatography (eluate:heptane:ethyl acetate=7:3 (in a volume ratio)), and thus 3.95 g of 4-(4-(trans-4-butylcyclohexyl)cyclohexyl)-1-pentyl-2-cyclohexene-1-ol (compound (r-6)) was obtained.

Second Step

Under a nitrogen atmosphere, 3.95 g of compound (r-6) was dissolved into a mixed solvent of 70 mL of dichloromethane and 70 mL of acetonitrile, 1.83 g of triethylsilane was added thereto, and then 1.94 g of a trifluoroborane-diethyl ether complex was added dropwise at −50° C., the resultant mixture was stirred at −78° C. for 30 minutes, and then stirred at room temperature for 1 hour. A saturated aqueous solution of sodium hydrogencarbonate was added dropwise to terminate a reaction, the resultant mixture was subjected to extraction with dichloromethane, and then organic layers were combined, the resultant organic layer was washed with a saturated aqueous solution of sodium hydrogencarbonate and saturated brine, and then dried over anhydrous magnesium sulfate. A solvent was evaporated under reduced pressure, and the resultant residue was purified by fractionation on silica gel column chromatography (eluate:heptane), and further purified by recrystallization from ethyl acetate, and dried, and thus 1.44 g of 3-(4-(trans-4-propylcyclohexyl)cyclohexyl)-6-pentylcyclohexene (compound (1-2-1-1)) was obtained.

$^1$H-NMR (CDCl$_3$, δ (ppm)); 5.56 (dd, 1H), 5.39 (d, 1H), 2.05-1.92 (m, 6H), 1.86-1.71 (m, 10H), 1.43-1.11 (m, 10H), 1.06-0.85 (m, 18H).

As a transition temperature, an intrinsic value of the compound was described, and as a maximum temperature (T$_{NI}$), dielectric anisotropy (Δ∈) and optical anisotropy (Δn), extrapolated values converted according to the extrapolation method from measured values of the sample prepared by mixing the compound with base liquid crystals (i) were described. Values of physical properties of compound (1-2-1-1) were as described below.

Transition temperature: Cr 16.1 SmB 214.6 Iso.
T$_{NI}$=167.7° C., Δ∈=−0.30, Δn=0.077.

Example 4

Synthesis of 3-(4-(trans-4-ethylcyclohexyl)cyclohexyl)-6-pentylcyclohexene (compound (1-2-1-6))

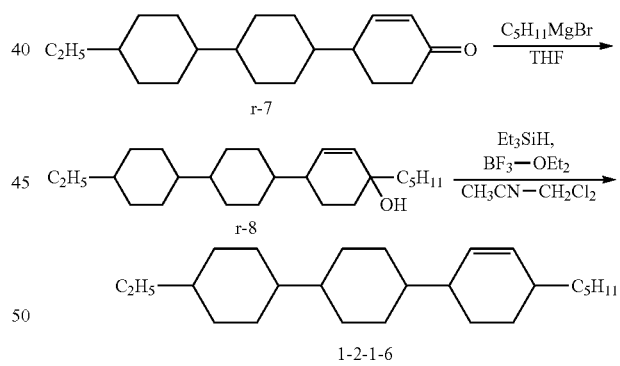

First Step

Under a nitrogen atmosphere, 4.0 g of 4-(4-(trans-4-ethylcyclohexyl)cyclohexyl)-2-cyclohexenone (r-7) was dissolved into 50 mL of THF, 16.8 mL of pentylmagnesium bromide THF solution (1 M/L) was added dropwise thereto at room temperature, and the resultant mixture was stirred at 50° C. for 30 minutes, and then stirred at room temperature overnight. A saturated aqueous solution of ammonium chloride was added dropwise under ice-cooling, the resultant mixture was subjected to extraction with ethyl acetate, and then organic layers were combined, the resultant organic layer was washed with saturated brine, and then dried over anhydrous magnesium sulfate. A solvent was evaporated under reduced pressure, and the resultant residue was purified by fractionation on silica gel column chromatography (eluate:heptane:ethyl acetate=7:3 (in a volume ratio)), and thus 3.83 g of 4-(4-(trans-4-ethylcyclohexyl)cyclohexyl)-1-pentyl-2-cyclohexene-1-ol (compound (r-6)) was obtained.

Second Step

Under a nitrogen atmosphere, 3.83 g of compound (r-8) was dissolved into a mixed solvent of 70 mL of dichloromethane and 70 mL of acetonitrile, 1.85 g of triethylsilane was added thereto, and then 1.80 g of trifluoroborane-diethyl ether complex was added dropwise at −50° C., the resultant mixture was stirred at −78° C. for 30 minutes, and then stirred at room temperature for 1 hour. A saturated aqueous solution of sodium hydrogencarbonate was added dropwise to terminate a reaction, the resultant mixture was subjected to extraction with dichloromethane, and then organic layers were combined, the resultant organic layer was washed with a saturated aqueous solution of sodium hydrogencarbonate and saturated brine, and then dried over anhydrous magnesium sulfate. A solvent was evaporated under reduced pressure, and the resultant residue was purified by fractionation on silica gel column chromatography (eluate:heptane), and further purified by recrystallization from ethyl acetate, and dried, and thus 1.40 g of 3-(4-(trans-4-ethylcyclohexyl)cyclohexyl)-6-pentylcyclohexene (compound (1-2-1-6)) was obtained.

$^1$H-NMR (CDCl$_3$, δ (ppm)); 5.55 (dd, 1H), 5.36 (d, 1H), 2.05-1.92 (m, 6H), 1.86-1.71 (m, 10H), 1.43-1.11 (m, 10H), 1.06-0.85 (m, 16H).

As a transition temperature, an intrinsic value of the compound was described, and as a maximum temperature (T$_{NI}$), dielectric anisotropy (Δ∈) and optical anisotropy (Δn), extrapolated values converted according to the extrapolation method from measured values of the sample prepared by mixing the compound with base liquid crystals (i) were described. Values of physical properties of compound (1-2-1-6) were as described below.

Transition temperature: Cr −14.3 SmB 194.5 Iso.
T$_{NI}$=145.7° C., Δ∈=−0.37, Δn=0.064.

Example 5

Synthesis of 3-(4-(trans-4-propylcyclohexyl)cyclohexyl)-6-pentylcyclohexene (compound (1-2-1-10))

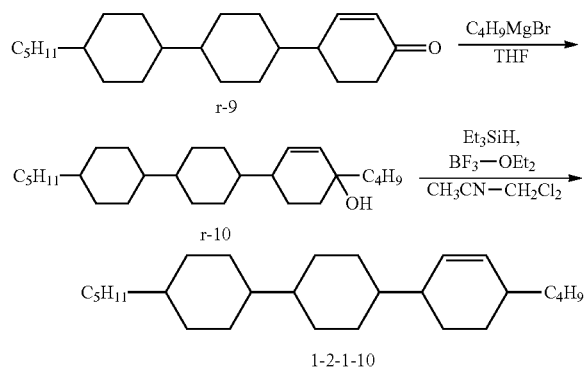

First Step

Under a nitrogen atmosphere, 4.0 g of 4-(4-(trans-4-pentylcyclohexyl)cyclohexyl)-2-cyclohexenone (r-9) was dissolved into 50 mL of THF, 14.5 mL of butylmagnesium bromide THF solution (1 M/L) was added dropwise thereto at room temperature, and the resultant mixture was stirred at 50° C. for 30 minutes, and then stirred at room temperature overnight. A saturated aqueous solution of ammonium chloride was added dropwise under ice-cooling, the resultant mixture was subjected to extraction with ethyl acetate, and then organic layers were combined, the resultant organic layer was washed with saturated brine, and then dried over anhydrous magnesium sulfate. A solvent was evaporated under reduced pressure, and the resultant residue was purified by fractionation on silica gel column chromatography (eluate:heptane:ethyl acetate=7:3 (in a volume ratio)), and thus 4.70 g of 4-(4-(trans-4-pentylcyclohexyl)cyclohexyl)-1-butyl-2-cyclohexene-1-ol (compound (r-10)) was obtained.

Second Step

Under a nitrogen atmosphere, 4.70 g of compound (r-10) was dissolved into a mixed solvent of 70 mL of dichloromethane and 70 mL of acetonitrile, 2.11 g of triethylsilane was added thereto, and then 2.06 g of trifluoroborane-diethyl ether complex was added dropwise at −50° C., the resultant mixture was stirred at −78° C. for 30 minutes, and then stirred at room temperature for 1 hour. A saturated aqueous solution of sodium hydrogencarbonate was added dropwise to terminate a reaction, the resultant mixture was subjected to extraction with dichloromethane, and then organic layers were combined, the resultant organic layer was washed with a saturated aqueous solution of sodium hydrogencarbonate and saturated brine, and then dried over anhydrous magnesium sulfate. A solvent was evaporated under reduced pressure, and the resultant residue was purified by fractionation on silica gel column chromatography (eluate:heptane), and further purified by recrystallization from ethyl acetate, and dried, and thus 2.04 g of 3-(4-(trans-4-pentylcyclohexyl)cyclohexyl)-6-butylcyclohexene (compound (1-2-1-10)) was obtained.

$^1$H-NMR (CDCl$_3$, δ (ppm)); 5.55 (dd, 1H), 5.36 (d, 1H), 2.02-1.90 (m, 6H), 1.83-1.68 (m, 10H), 1.37-1.08 (m, 10H), 1.03-0.79 (m, 20H).

As a transition temperature, an intrinsic value of the compound was described, and as a maximum temperature (T$_{NI}$), dielectric anisotropy (Δ∈) and optical anisotropy (Δn), extrapolated values converted according to the extrapolation method from measured values of the sample prepared by mixing the compound with base liquid crystals (i) were described. Values of physical properties of compound (1-2-1-10) were as described below.

Transition temperature: Cr 7.6 SmB 223.4 Iso.
T$_{NI}$=160.7° C., Δ∈=1.80, Δn=0.067.

Example 6

Synthesis of 3-(trans-4-propylcyclohexyl)-6-pentylcyclohexene (compound (1-1-1-3))

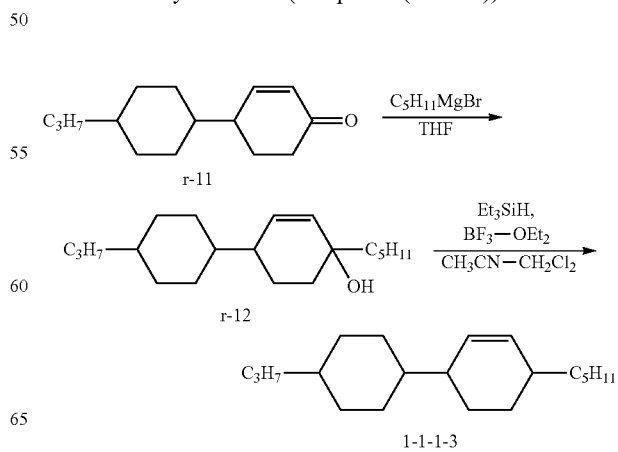

First Step

Under a nitrogen atmosphere, 5.0 g of 4-(trans-4-propylcyclohexyl)-2-cyclohexenone (r-11) was dissolved into 50 mL of THF, 27.2 mL of pentylmagnesium bromide THF solution (1 M/L) was added dropwise thereto at room temperature, and the resultant mixture was stirred at 50° C. for 30 minutes, and then stirred at room temperature overnight. A saturated aqueous solution of ammonium chloride was added dropwise under ice-cooling, the resultant mixture was subjected to extraction with ethyl acetate, and then organic layers were combined, the resultant organic layer was washed with saturated brine, and then dried over anhydrous magnesium sulfate. A solvent was evaporated under reduced pressure, and the resultant residue was purified by fractionation on silica gel column chromatography (eluate:heptane:ethyl acetate=7:3), and thus 6.56 g of 4-(4-(trans-4-butylcyclohexyl)cyclohexyl)-1-pentyl-2-cyclohexene-1-ol (compound (r-12)) was obtained.

Second Step

Under a nitrogen atmosphere, 6.56 g of compound (r-12) was dissolved into a mixed solvent of 100 mL of dichloromethane and 100 mL of acetonitrile, 3.91 g of triethylsilane was added thereto, and then 4.13 g of trifluoroborane-diethyl ether complex was added dropwise at −50° C., the resultant mixture was stirred at −78° C. for 30 minutes, and then stirred at room temperature for 1 hour. A saturated aqueous solution of sodium hydrogencarbonate was added dropwise to terminate a reaction, the resultant mixture was subjected to extraction with dichloromethane, and then organic layers were combined, the resultant organic layer was washed with a saturated aqueous solution of sodium hydrogencarbonate and saturated brine, and then dried over anhydrous magnesium sulfate. A solvent was evaporated under reduced pressure, and the resultant residue was purified by fractionation on silica gel column chromatography (eluate:heptane), and further purified by recrystallization from ethyl acetate, and dried, and thus 1.11 g of 3-(4-(trans-4-propylcyclohexyl)-6-pentylcyclohexene (compound (1-1-3)) was obtained.

$^1$H-NMR (CDCl$_3$, δ (ppm)); 5.59 (dd, 1H), 5.39 (d, 1H), 2.45-1.92 (m, 4H), 1.82-1.74 (m, 6H), 1.43-1.14 (m, 8H), 1.12-1.06 (m, 2H), 1.04-0.97 (m, 2H), 0.95-0.85 (m, 12H).

As a transition temperature, an intrinsic value of the compound was described, and as a maximum temperature (T$_{NI}$), dielectric anisotropy (Δ∈) and optical anisotropy (Δn), extrapolated values converted according to the extrapolation method from measured values of the sample prepared by mixing the compound with base liquid crystals (i) were described. Values of physical properties of compound (1-1-1-3) were as described below.

Transition temperature: Cr −13.0 SmB 26.7 Iso.

T$_{NI}$=13.0° C., Δ∈=−2.03, Δn=0.024.

Example 7

Synthesis of 3-(trans-4-(4-methoxyphenyl)cyclohexyl)-6-pentylcyclohexene (compound (1-2-3-2))

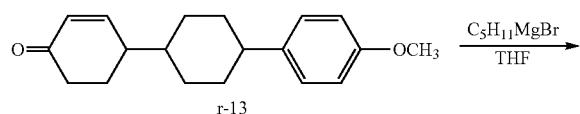

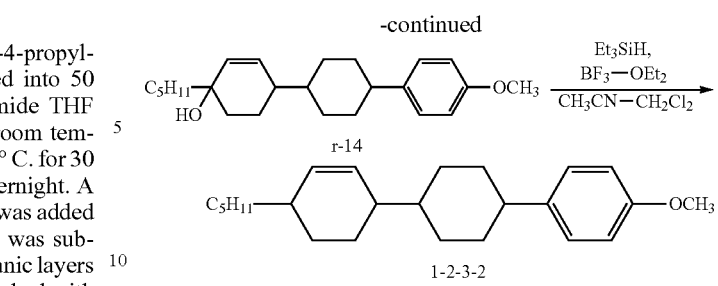

First Step

Under a nitrogen atmosphere, 4.00 g of 4-(trans-4-(methoxyphenyl)cyclohexyl)-2-cyclohexenone (r-13) was dissolved into 60 mL of THF, 17.0 mL of pentylmagnesium bromide THF solution (1 M/L) was added dropwise thereto at room temperature, and the resultant mixture was stirred at 50° C. for 30 minutes, and then stirred at room temperature overnight. A saturated aqueous solution of ammonium chloride was added dropwise under ice-cooling, the resultant mixture was subjected to extraction with ethyl acetate, and then organic layers were combined, the resultant organic layer was washed with saturated brine, and then dried over anhydrous magnesium sulfate. A solvent was evaporated under reduced pressure, and the resultant residue was purified by fractionation on silica gel column chromatography (eluate:heptane:ethyl acetate=7:3), and thus 4.73 g of 4-(trans-4-(4-methoxyphenyl)cyclohexyl)-1-pentyl-2-cyclohexene-1-ol (compound (r-14)) was obtained.

Second Step

Under a nitrogen atmosphere, 4.73 g of compound (r-14) was dissolved into a mixed solvent of 80 mL of dichloromethane and 80 mL of acetonitrile, 2.47 g of triethylsilane was added thereto, and then 2.60 g of trifluoroborane-diethyl ether complex was added dropwise at −50° C., the resultant mixture was stirred at −78° C. for 30 minutes, and then stirred at room temperature for 1 hour. A saturated aqueous solution of sodium hydrogencarbonate was added dropwise to terminate a reaction, the resultant mixture was subjected to extraction with dichloromethane, and then organic layers were combined, the resultant organic layer was washed with a saturated aqueous solution of sodium hydrogencarbonate and saturated brine, and then dried over anhydrous magnesium sulfate. A solvent was evaporated under reduced pressure, and the resultant residue was purified by fractionation on silica gel column chromatography (eluate:heptane:toluene=1:1), and further purified by recrystallization from heptane:Solmix=1:2), and dried, and thus 0.94 g of 3-(trans-4-(2,3-difluoro-4-ethyloxyphenyl)cyclohexyl)-6-propylcyclohexene (compound (1-2-3-2)) was obtained.

$^1$H-NMR (CDCl$_3$, δ (ppm)); 7.13 (d, 2H), 6.83 (d, 2H), 5.59 (dd, 1H), 5.39 (d, 1H), 3.78 (s, 3H), 2.41 (tt, 1H), 2.07-1.76 (m, 10H), 1.45-1.09 (m, 13H), 0.89 (t, 3H).

As a transition temperature, an intrinsic value of the compound was described, and as a maximum temperature (T$_{NI}$), dielectric anisotropy (Δ∈) and optical anisotropy (Δn), extrapolated values converted according to the extrapolation method from measured values of the sample prepared by mixing the compound with base liquid crystals (i) were described. Values of physical properties of compound (1-2-3-2) were as described below.

Transition temperature: Cr 53.8 SmB 79.8 N 143.7 Iso.

T$_{NI}$=134.4° C., Δn=3.90, Δn=0.117.

Example 8

Synthesis of 3-(trans-4-(2,3-difluoro-4-ethyloxyphenyl)cyclohexyl)-6-propylcyclohexene (compound (1-2-3-25))

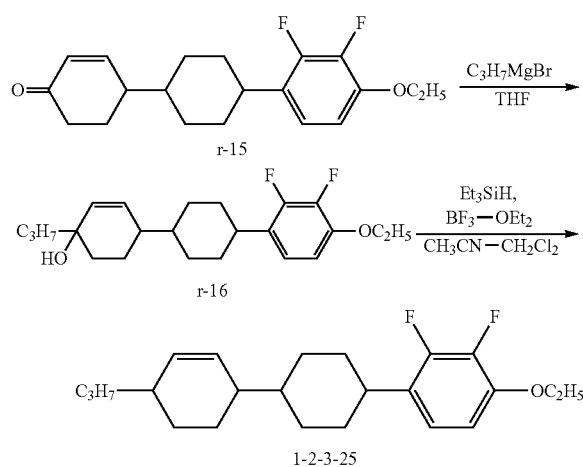

First Step

Under a nitrogen atmosphere, 4.97 g of 4-(trans-4-(2,3-difluoro-4-ethyloxyphenyl)cyclohexyl)-2-cyclohex enone (r-15) was dissolved into 60 mL of THF, 18.0 mL of propylmagnesium bromide THF solution (1 M/L) was added dropwise thereto at room temperature, and the resultant mixture was stirred at 50° C. for 30 minutes, and then stirred at room temperature overnight. A saturated aqueous solution of ammonium chloride was added dropwise under ice-cooling, the resultant mixture was subjected to extraction with ethyl acetate, and then organic layers were combined, the resultant organic layer was washed with saturated brine, and then dried over anhydrous magnesium sulfate. A solvent was evaporated under reduced pressure, and the resultant residue was purified by fractionation on silica gel column chromatography (eluate:heptane:ethyl acetate=6:4), and thus 3.79 g of 4-(trans-4-(2,3-difluoro-4-ethyloxyphenyl)cyclohexyl)-1-propyl-2-cyclohexene-1-ol (compound (r-16)) was obtained.

Second Step

Under a nitrogen atmosphere, 3.79 g of compound (r-16) was dissolved into a mixed solvent of 70 mL of dichloromethane and 70 mL of acetonitrile, 1.79 g of triethylsilane was added thereto, and then 1.84 g of trifluoroborane-diethyl ether complex was added dropwise at −50° C., the resultant mixture was stirred at −78° C. for 30 minutes, and then stirred at room temperature for 1 hour. A saturated aqueous solution of sodium hydrogencarbonate was added dropwise to terminate a reaction, the resultant mixture was subjected to extraction with dichloromethane, and then organic layers were combined, the resultant organic layer was washed with a saturated aqueous solution of sodium hydrogencarbonate and saturated brine, and then dried over anhydrous magnesium sulfate. A solvent was evaporated under reduced pressure, and the resultant residue was purified by fractionation on silica gel column chromatography (eluate:heptane:toluene=7:3), and further purified by recrystallization from heptane:Solmix=1:2), and dried, and thus 1.25 g of 3-(trans-4-(2,3-difluoro-4-ethyloxy phenyl)cyclohexyl)-6-propylcyclohexane (compound (1-2-3-25)) was obtained.

$^1$H-NMR (CDCl$_3$ δ (ppm)); 6.86 (m, 1H), 6.69 (m, 1H), 5.61 (dd, 1H), 5.41 (d, 1H), 4.11 (q, 2H), 2.76 (tt, 1H), 2.15-1.78 (m, 10H), 1.45 (t, 3H), 1.43-1.14 (m, 9H), 0.90 (t, 3H).

As a transition temperature, an intrinsic value of the compound was described, and as a maximum temperature ($T_{NI}$), dielectric anisotropy ($\Delta \in$) and optical anisotropy ($\Delta n$), extrapolated values converted according to the extrapolation method from measured values of the sample prepared by mixing the compound with base liquid crystals (ii) were described. Values of physical properties of compound (1-2-3-25) were as described below.

Transition temperature: Cr 67.4 N 129.1 Iso.
$T_{NI}$=115.3° C., $\Delta\in$=−5.89, $\Delta$n=0.112.

Example 9

Synthesis of 3-(trans-4-(2,3-difluoro-4-ethyloxyphenyl)cyclohexyl)-6-pentylcyclohexene (compound (1-2-3-26))

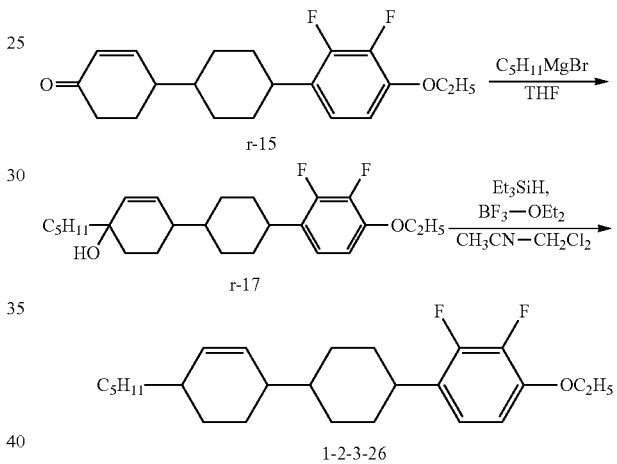

First Step

Under a nitrogen atmosphere, 4.00 g of 4-(trans-4-(2,3-difluoro-4-ethyloxyphenyl)cyclohexyl)-2-cyclohex enone (r-15) was dissolved into 60 mL of THF, 14.4 mL of pentylmagnesium bromide THF solution (1 M/L) was added dropwise thereto at room temperature, and the resultant mixture was stirred at 50° C. for 30 minutes, and then stirred at room temperature overnight. A saturated aqueous solution of ammonium chloride was added dropwise under ice-cooling, the resultant mixture was subjected to extraction with ethyl acetate, and then organic layers were combined, the resultant organic layer was washed with saturated brine, and then dried over anhydrous magnesium sulfate. A solvent was evaporated under reduced pressure, and the resultant residue was purified by fractionation on silica gel column chromatography (eluate:heptane:ethyl acetate=6:4), and thus 3.45 g of 4-(trans-4-(2,3-difluoro-4-ethyloxyphenyl)cyclohexyl)-1-pentyl-2-cyclohexene-1-ol (compound (r-17)) was obtained.

Second Step

Under a nitrogen atmosphere, 3.45 g of compound (r-17) was dissolved into a mixed solvent of 70 mL of dichloromethane and 70 mL of acetonitrile, 1.50 g of triethylsilane was added thereto, and then 1.57 g of trifluoroborane-diethyl ether complex was added dropwise at −50° C., the resultant mixture was stirred at −78° C. for 30 minutes, and then stirred at room temperature for 1 hour. A saturated aqueous solution of sodium hydrogencarbonate was added dropwise to terminate a reaction, the resultant mixture was subjected to extraction with dichloromethane, and then organic layers were combined, the resultant organic layer was washed with a saturated aqueous solution of sodium hydrogencarbonate and saturated brine, and then dried over anhydrous magnesium sulfate. A solvent was evaporated under reduced pressure, and the resultant residue was purified by fractionation on silica gel column chromatography (eluate:heptane:toluene=7:3), and further purified by recrystallization from heptane:Solmix=1:2), and dried, and thus 1.12 g of 3-(trans-4-(2,3-difluoro-4-ethyloxyphenyl)cyclohexyl)-6-pentylcyclohexane (compound (1-2-3-26)) was obtained.

$^1$H-NMR (CDCl$_3$ δ (ppm)); 6.83 (m, 1H), 6.66 (m, 1H), 5.59 (dd, 1H), 5.38 (d, 1H), 4.08 (q, 2H), 2.74 (tt, 1H), 2.06-1.76 (m, 10H), 1.44 (t, 3H), 1.47-1.11 (m, 13H), 0.90 (t, 3H).

As a transition temperature, an intrinsic value of the compound was described, and as a maximum temperature ($T_{NI}$), dielectric anisotropy (Δ∈) and optical anisotropy (Δn), extrapolated values converted according to the extrapolation method from measured values of the sample prepared by mixing the compound with base liquid crystals (ii) were described. Values of physical properties of compound (1-2-3-26) were as described below.

Transition temperature: Cr 52.2 N 126.5 Iso.
$T_{NI}$=113.3° C., Δ∈=−5.60, Δn=0.105.

Example 10

Synthesis of 3-(trans-4-((2,3-difluoro-4-ethyloxyphenyloxy)methyl)cyclohexyl)-6-propylcyclohexene (compound (1-2-3-41))

the resultant mixture was subjected to extraction with ethyl acetate, and then organic layers were combined, the resultant organic layer was washed with saturated brine, and then dried over anhydrous magnesium sulfate. A solvent was evaporated under reduced pressure, and the resultant residue was purified by fractionation on silica gel column chromatography (eluate:heptane:ethyl acetate=6:4), and thus 3.16 g of 3-(trans-4-((2,3-difluoro-4-ethyloxyphenyloxy)methyl)cyclohexyl)-6-propyl-6-hydroxycyclohexene (compound (r-18)) was obtained.

Second Step

Under a nitrogen atmosphere, 3.16 g of compound (r-18) was dissolved into a mixed solvent of 70 mL of dichloromethane and 70 mL of acetonitrile, 1.35 g of triethylsilane was added thereto, and then 1.42 g of trifluoroborane-diethyl ether complex was added dropwise at −50° C., the resultant mixture was stirred at −78° C. for 30 minutes, and then stirred at room temperature for 1 hour. A saturated aqueous solution of sodium hydrogencarbonate was added dropwise to terminate a reaction, the resultant mixture was subjected to extraction with dichloromethane, and then organic layers were combined, the resultant organic layer was washed with a saturated aqueous solution of sodium hydrogencarbonate and saturated brine, and then dried over anhydrous magnesium sulfate. A solvent was evaporated under reduced pressure, and the resultant residue was purified by fractionation on silica gel column chromatography (eluate:heptane:toluene=6:4), and further purified by recrystallization from heptane:Solmix=1:4), and dried, and thus 1.09 g of 3-(trans-4-((2,3-difluoro-4-ethyloxyphenyloxy)methyl)cyclohexyl)-6-propylcyclohexene (compound (1-2-3-41)) was obtained.

$^1$H-NMR (CDCl$_3$, δ (ppm)); 6.63 (m, 2H), 5.59 (dd, 1H), 5.39 (d, 1H), 4.07 (q, 2H), 3.79 (d, 2H), 2.07-1.76 (m, 11H), 1.42 (t, 3H), 1.41-1.04 (m, 9H), 0.90 (t, 3H).

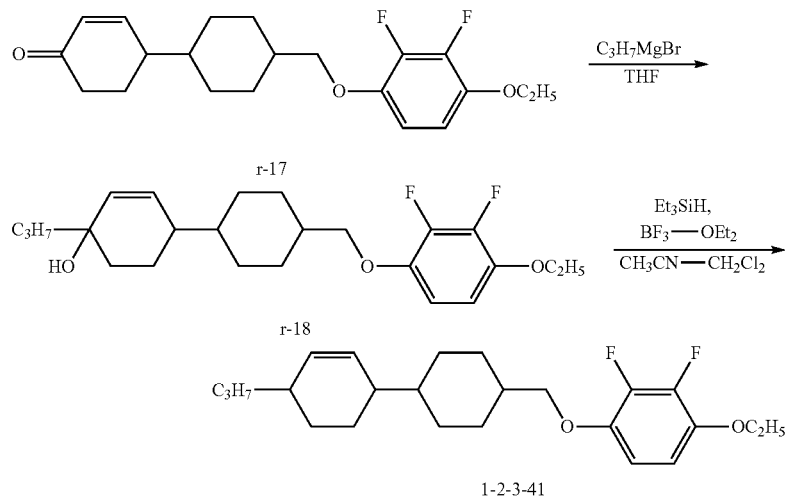

First Step

Under a nitrogen atmosphere, 4.0 g of 3-(trans-4-((2,3-difluoro-4-ethyloxyphenyloxy)methyl)cyclohexyl)-2-cyclohexenone (r-17) was dissolved into 60 mL of THF, 13.0 mL of propylmagnesium bromide THF solution (1 M/L) was added dropwise thereto at room temperature, and the resultant mixture was stirred at 50° C. for 30 minutes, and then stirred at room temperature overnight. A saturated aqueous solution of ammonium chloride was added dropwise under ice-cooling, As a transition temperature, an intrinsic value of the compound was described, and as a maximum temperature ($T_{NI}$), dielectric anisotropy (Δ∈) and optical anisotropy (Δn), extrapolated values converted according to the extrapolation method from measured values of the sample prepared by mixing the compound with base liquid crystals (ii) were described. Values of physical properties of compound (1-2-3-41) were as described below.

Transition temperature: Cr 46.1 N 108.1 Iso.
$T_{NI}$=103.9° C., Δ∈=−7.49, Δn=0.105.

Example 11

Synthesis of 3-(trans-4-((2,3-difluoro-4-ethoxyphenyloxy)methyl)cyclohexyl)-6-pentylcyclohexene (compound (1-2-3-42))

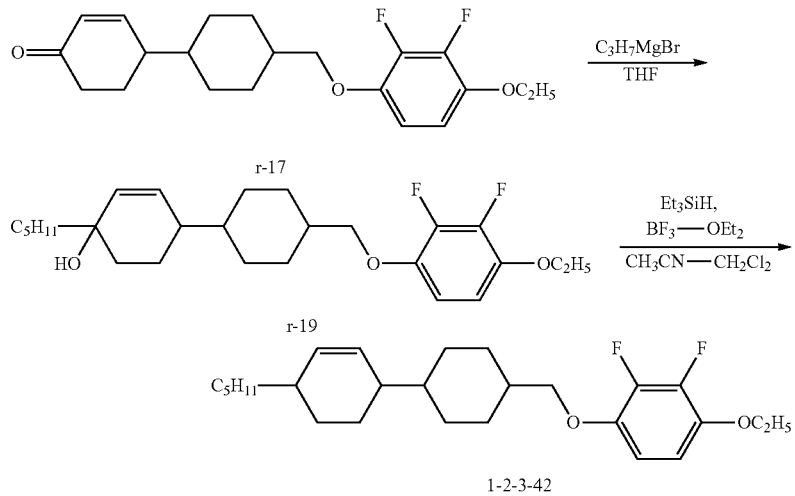

First Step

Under a nitrogen atmosphere, 4.00 g of 3-(trans-4-((2,3-difluoro-4-ethyloxyphenyloxy)methyl)cyclohexyl)-2-cyclohexenone (r-17) was dissolved into 60 mL of THF, 13.2 mL of pentylmagnesium bromide THF solution (1 M/L) was added dropwise thereto at room temperature, and the resultant mixture was stirred at 50° C. for 30 minutes, and then stirred at room temperature overnight. A saturated aqueous solution of ammonium chloride was added dropwise under ice-cooling, the resultant mixture was subjected to extraction with ethyl acetate, and then organic layers were combined, the resultant organic layer was washed with saturated brine, and then dried over anhydrous magnesium sulfate. A solvent was evaporated under reduced pressure, and the resultant residue was purified by fractionation on silica gel column chromatography (eluate:heptane:ethyl acetate=6:4), and thus 1.99 g of 3-(trans-4-((2,3-difluoro-4-ethyloxyphenyloxy)methyl)cyclohexyl)-6-pentyl-6-hydroxycyclohexene (compound (r-19)) was obtained.

Second Step

Under a nitrogen atmosphere, 1.99 g of compound (r-19) was dissolved into a mixed solvent of 70 mL of dichloromethane and 70 mL of acetonitrile, 0.80 g of triethylsilane was added thereto, and then 0.84 g of trifluoroborane-diethyl ether complex was added dropwise at −50° C., the resultant mixture was stirred at −78° C. for 30 minutes, and then stirred at room temperature for 1 hour. A saturated aqueous solution of sodium hydrogencarbonate was added dropwise to terminate a reaction, the resultant mixture was subjected to extraction with dichloromethane, and then organic layers were combined, the resultant organic layer was washed with a saturated aqueous solution of sodium hydrogencarbonate and saturated brine, and then dried over anhydrous magnesium sulfate. A solvent was evaporated under reduced pressure, and the resultant residue was purified by fractionation on silica gel column chromatography (eluate:heptane:toluene=7:3), and further purified by recrystallization from heptane:Solmix=1:4), and dried, and thus 0.45 g of 3-(trans-4-((2,3-difluoro-4-ethoxyphenyloxy)methyl)cyclohexyl)-6-pentylcyclohexene (compound (1-2-3-42)) was obtained.

$^1$H-NMR (CDCl$_3$ δ (ppm)); 6.60 (m, 2H), 5.57 (dd, 1H), 5.37 (d, 1H), 4.05 (q, 2H), 3.76 (d, 2H), 2.07-1.76 (m, 11H), 1.42 (t, 3H), 1.41-1.04 (m, 13H), 0.90 (t, 3H).

As a transition temperature, an intrinsic value of the compound was described, and as a maximum temperature (T$_{NI}$), dielectric anisotropy (Δ∈) and optical anisotropy (Δn), extrapolated values converted according to the extrapolation method from measured values of the sample prepared by mixing the compound with base liquid crystals (ii) were described. Values of physical properties of compound (1-2-3-42) were as described below.

Transition temperature: Cr$_1$ 29.2 Cr$_2$ 32.1 N 107.2 Iso. T$_{NI}$=99.3° C., Δ∈=−7.46, Δn=0.102.

Comparative Example 1

Compatibility at a Low Temperature

As a comparative compound, trans-4-(trans-4-(trans-4-butylcyclohexyl)-pentylcyclohexane (Ex-1) being compound 25 disclosed in JP H9-110734 A was

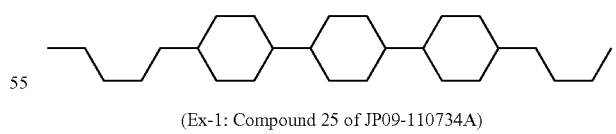

(Ex-1: Compound 25 of JP09-110734A)

Then, five compounds described above were mixed and base liquid crystals i having a nematic phase was prepared. Physical properties of the base liquid crystals i were as described below.

Maximum temperature (T$_{NI}$)=71.7° C.; viscosity (η$_{20}$)=27.0 mPa·s; optical anisotropy (Δn)=0.137; dielectric anisotropy (Δ∈)=11.

Compatibility of compound (Ex-1) at a low temperature was measured by using the base liquid crystals i and cooling a mixture at −20° C. for 30 days. As a result, crystals precipitated and the nematic phase was not maintained at a concentration of 1% or more.

Compatibility of Compound (1-2-1-10) at a Low Temperature

Compatibility, at a low temperature, of 3-(4-(trans-4-propylcyclohexyl)cyclohexyl)-6-pentylcyclohexene (compound 1-2-1-10) obtained in Example 5 was measured by using base liquid crystals i and cooling a mixture at −20° C. for 30 days. As a result, the nematic phase was maintained at a concentration of 5% or less.

The findings show that compound (1-2-1-10) is superior to comparative compound (Ex-1) in solubility in base liquid crystals at a low temperature, and useful as a liquid crystal compound.

Comparative Example 2

Compatibility at a Low Temperature

As a comparative compound, trans-4-(trans-4-(trans-4-ethylcyclohexyl)-pentylcyclohexane (Ex-2) being compound 12 disclosed in JP H9-110734 A was prepared.

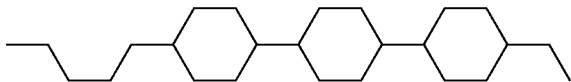

(Ex-2: Compound 12 of JP09-110734A)

In a manner similar to Comparative Example 1, compatibility of compound (Ex-2) at a low temperature was measured by using the base liquid crystals i and cooling a mixture at −20° C. for 30 days. As a result, crystals precipitated after 8 days and the nematic phase was not maintained even at a concentration of 1%.

Compatibility of Compound (1-2-1-6) at a Low Temperature

Compatibility, at a low temperature, of 3-(4-(trans-4-ethylcyclohexyl)cyclohexyl)-6-pentylcyclohexene (compound I-2-1-6) obtained in Example 4 was measured by using base liquid crystals i and cooling a mixture at −20° C. for 30 days. As a result, the nematic phase was maintained at a concentration of 5% or less.

The findings show that compound (1-2-1-6) is superior to comparative compound (Ex-2) in solubility in base liquid crystals at a low temperature, and useful as a liquid crystal compound.

Comparative Example 3

Compatibility at a Low Temperature

As a comparative compound, trans-4-propyl-trans-4'-(2,3-difluoroethoxyphenyl)-1,1'-bicyclohexyl (Ex-3) was prepared.

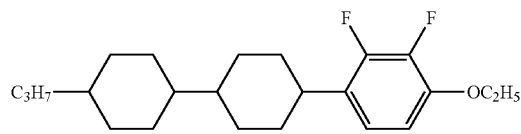

(Ex-3)

Chemical shifts (δ (ppm)) by $^1$H NMR analysis were as described below, and the compound obtained was identified to be trans-4-propyl-trans-4'-(2,3-difluoroethoxyphenyl)-1,1'-bicyclohexyl (Ex-1). $^1$H-NMR (CDCl$_3$, δ (ppm)); 6.82 (dd, 1H), 6.64 (dd, 1H), 4.06 (q, 2H), 2.71 (tt, 1H), 1.89-1.79 (m, 4H), 1.79-1.69 (m, 4H), 1.45-1.26 (m, 14H), 1.20-1.04 (m, 4H), 0.90-0.79 (t, 3H).

A transition temperature of compound (Ex-1) was as described below.

Transition temperature: C 66.9 S$_B$ 79.9 N 185.1 Iso.

Then, five compounds described above were mixed and base liquid crystals (ii) having a nematic phase was prepared. Physical properties of the base liquid crystals (ii) were as described below.

Maximum temperature (T$_{NI}$)=74.6° C.; viscosity (η$_{20}$)= 18.9 mPa·s; optical anisotropy (Δn)=0.087; dielectric anisotropy (Δ∈)=−1.3.

Compatibility of compound (Ex-1) at a low temperature was measured by using the base liquid crystals (ii) and cooling a mixture at −10° C. for 30 days. As a result, crystals precipitated and the nematic phase was not maintained at a concentration of 3% or more.

Compatibility of Compound (1-2-3-25) at a Low Temperature

Compatibility, at a low temperature, namely, at −10° C. for 30 days, of 3-(trans-4-(2,3-difluoro-4-ethyloxyphenyl)cyclohexyl)-6-propylcyclohexene (compound 1-2-3-25) obtained in Example 8 was measured by using base liquid crystals (ii). As a result, the nematic phase was maintained at a concentration of 10% or less.

The findings show that compound (1-2-3-25) is superior to comparative compound (Ex-3) in solubility in base liquid crystals at a low temperature, and useful as a liquid crystal compound.

In a manner similar to the synthetic methods described in Examples 1 to 11, compounds as shown below can be prepared: compounds (1-1-1-1) to (1-1-1-24), (1-1-2-1) to (1-1-2-48), (1-2-1-1) to (1-2-1-24), (1-2-2-1) to (1-2-2-48), (1-2-3-1) to (1-2-3-48), (1-2-4-1) to (1-2-4-48), (1-3-1-1) to (1-3-1-24), (1-3-2-1) to (1-3-2-48), (1-3-3-1) to (1-3-3-48), (1-4-1-1) to (1-4-1-17), (1-4-2-1) to (1-4-2-34), (1-4-3-1) to (1-4-3-34), (1-4-4-1) to (1-4-4-34), (1-4-5-1) to (1-4-5-34), (1-4-6-1) to (1-4-6-34), (1-5-1-1) to (1-5-1-17), (1-5-2-1) to (1-5-2-34), (1-5-3-1) to (1-5-3-34), (1-5-4-1) to (1-5-4-34), (1-5-5-1) to (1-5-5-34), (1-5-6-1) to (1-5-6-34) and (1-5-7-1) to (1-5-7-34). Data added thereto are described as values obtained by measurement in accordance with the techniques described above. As a transition temperature, an intrinsic value of the compound was described, and as a maximum temperature (T$_{NI}$), dielectric anisotropy (Δ∈) and optical anisotropy (Δn), extrapolated values converted according to the extrapolation method from measured values of the sample prepared by mixing the compound with base liquid crystals (i) or (ii) were described.

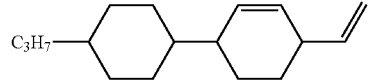

(1-1-1-1)

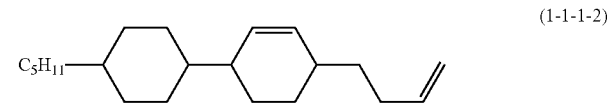

(1-1-1-2)

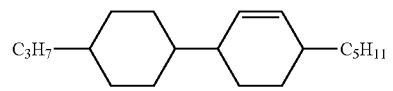
C -13.0 SmB 26.7 Iso (° C.)
$T_{NI}$: 13.0° C. Δε: -2.03 Δn: 0.024
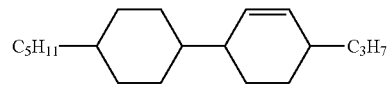
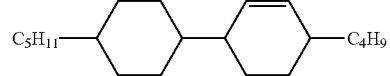
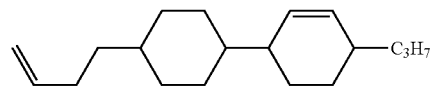
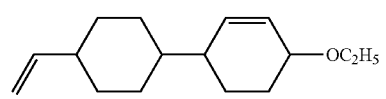
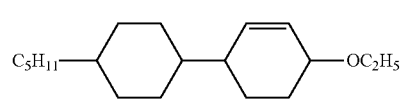
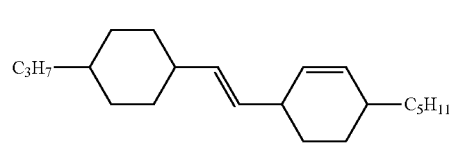
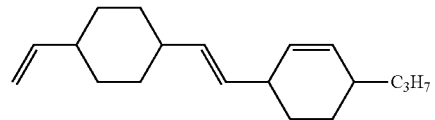
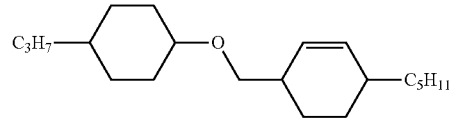
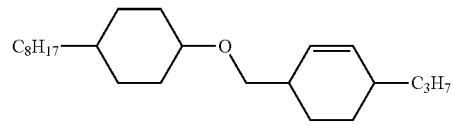
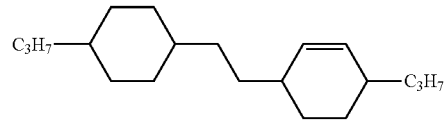
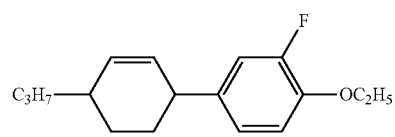
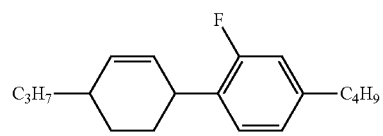
-continued
(1-1-1-3)
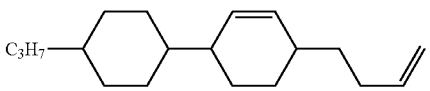
(1-1-1-4)
(1-1-1-5)
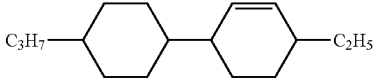
(1-1-1-6)
(1-1-1-7)
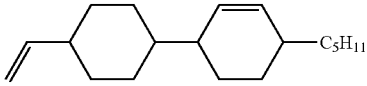
(1-1-1-8)
(1-1-1-9)
(1-1-1-10)
(1-1-1-11)
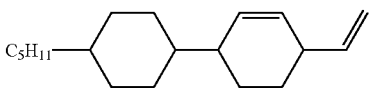
(1-1-1-12)
(1-1-1-13)
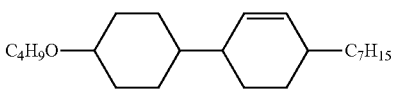
(1-1-1-14)
(1-1-1-15)
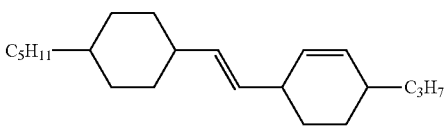
(1-1-1-16)
(1-1-1-17)
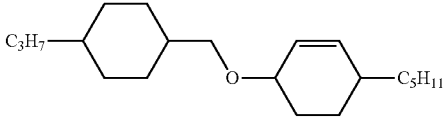
(1-1-1-18)
(1-1-1-19)
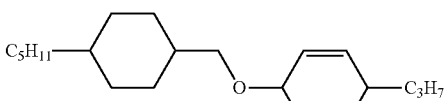
(1-1-1-20)
(1-1-1-21)
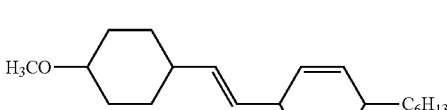
(1-1-1-22)
(1-1-1-23)
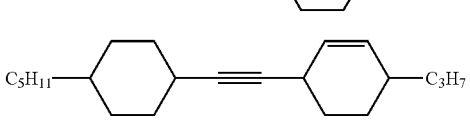
(1-1-1-24)
(1-1-2-1)
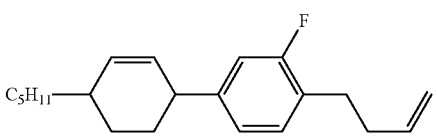
(1-1-2-2)
(1-1-2-3)
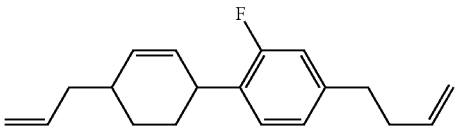
(1-1-2-4)

-continued
(1-1-2-5)
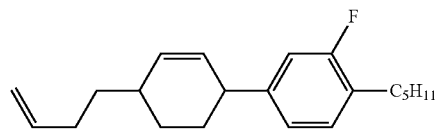
(1-1-2-6)
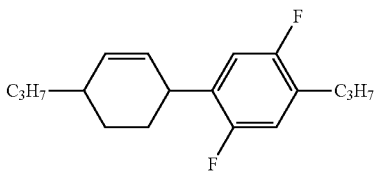
(1-1-2-7)
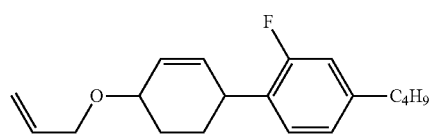
(1-1-2-8)
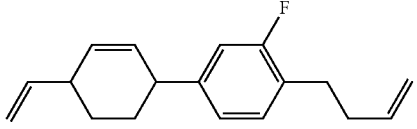
(1-1-2-9)
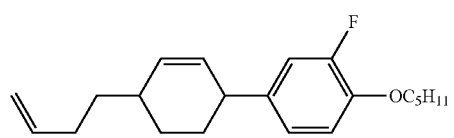
(1-1-2-10)
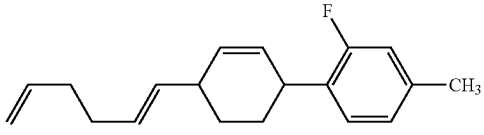
(1-1-2-11)
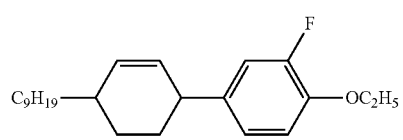
(1-1-2-12)
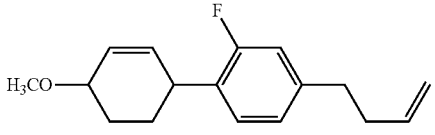
(1-1-2-13)
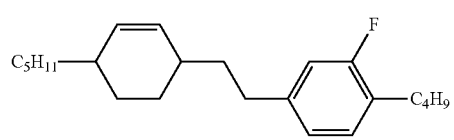
(1-1-2-14)
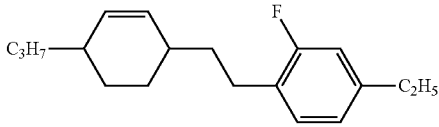
(1-1-2-15)
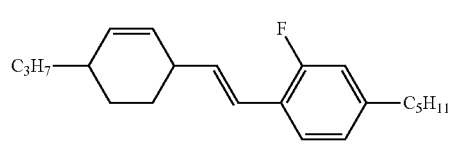
(1-1-2-16)
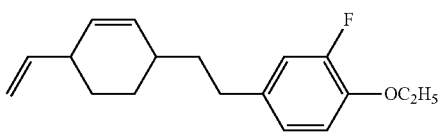
(1-1-2-17)
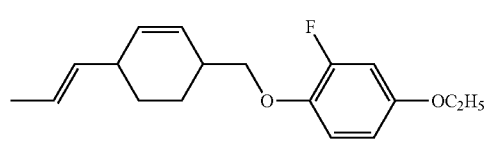
(1-1-2-18)
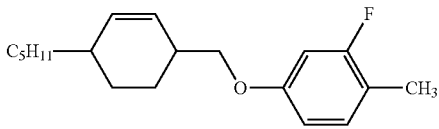
(1-1-2-19)
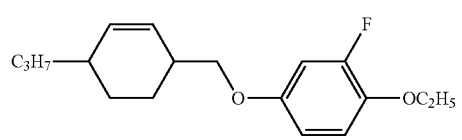
(1-1-2-20)
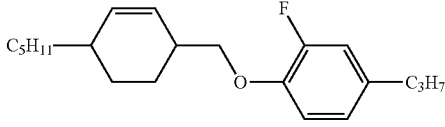
(1-1-2-21)
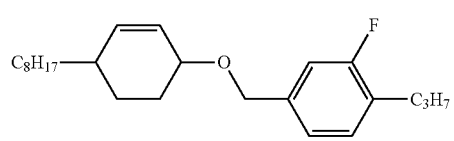
(1-1-2-22)
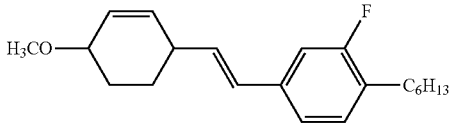
(1-1-2-23)
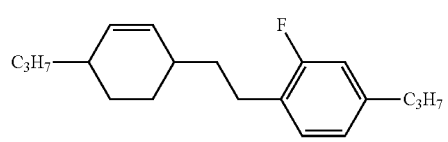
(1-1-2-24)
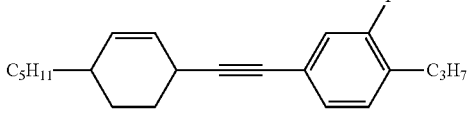
(1-1-2-25)
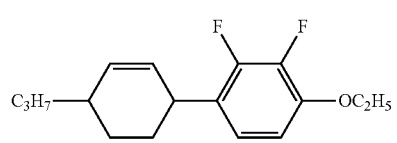
(1-1-2-26)
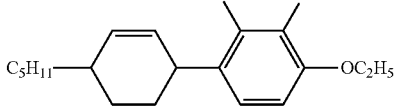

-continued
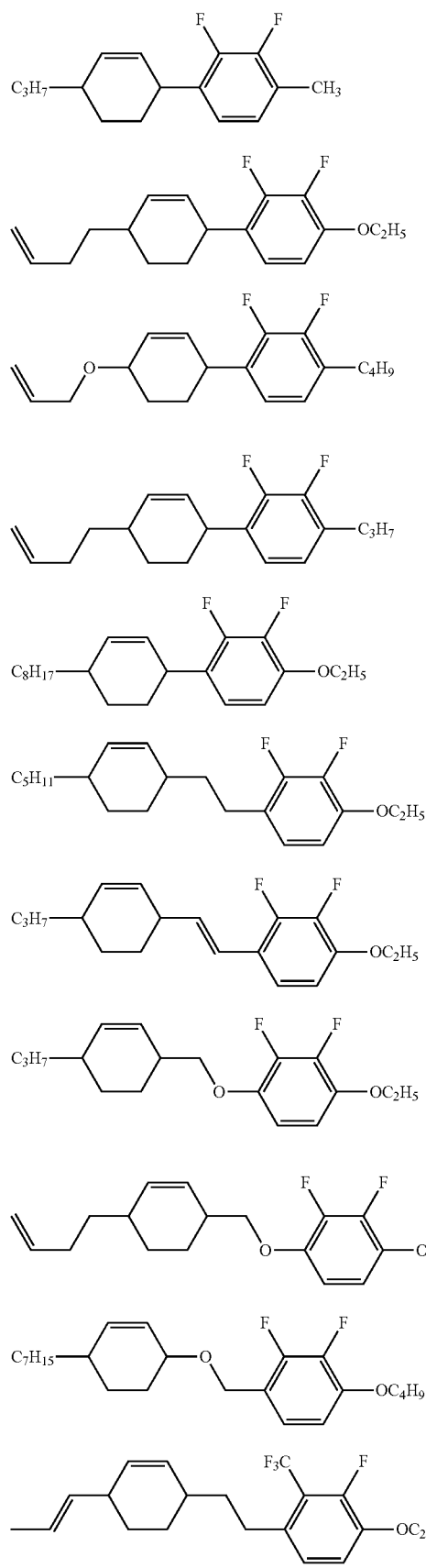
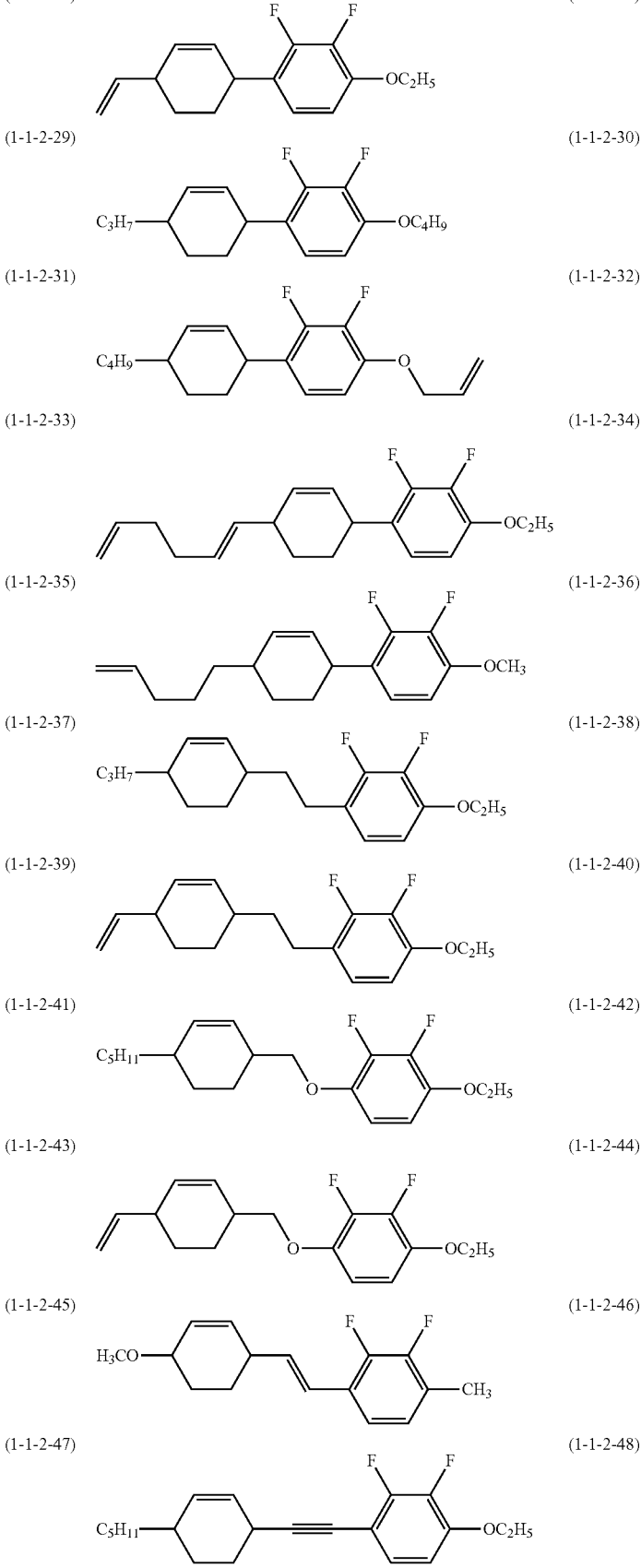

(1-2-1-1)
C 16.1 SmB 214.6 Iso (° C.)
$T_{NI}$: 167.7° C. Δε: -0.30 Δn: 0.077
(1-2-1-2)
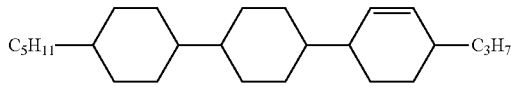
(1-2-1-3)
(1-2-1-4)
C 14.4 SmB 218.4 Iso (° C.)
$T_{NI}$: 159.7° C. Δε: 0.40 Δn: 0.077
(1-2-1-5)
(1-2-1-6)
C -14.3 SmB 194.5 Iso (° C.)
$T_{NI}$: 145.7° C. Δε: 0.37 Δn: 0.064
(1-2-1-7)
(1-2-1-8)
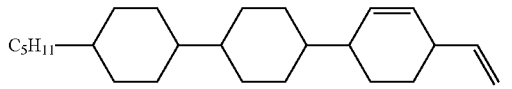
(1-2-1-9)
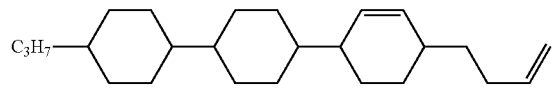
(1-2-1-10)
C 7.6 SmB 223.4 Iso (° C.)
$T_{NI}$: 160.7° C. Δε: 1.80 Δn: 0.067
(1-2-1-11)
(1-2-1-12)
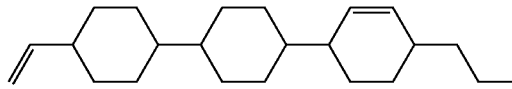
(1-2-1-13)
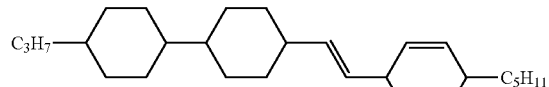
(1-2-1-14)
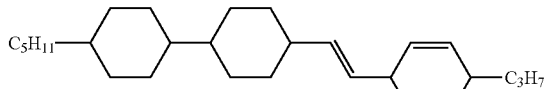
(1-2-1-15)
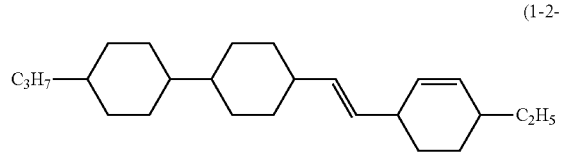
(1-2-1-16)
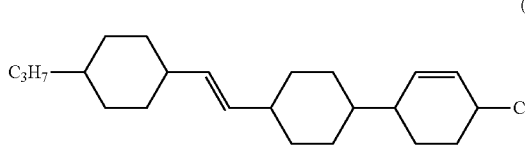
(1-2-1-17)
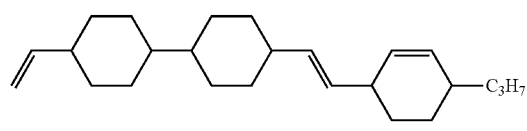
(1-2-1-18)
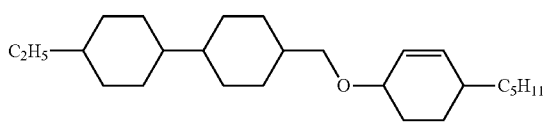
(1-2-1-19)
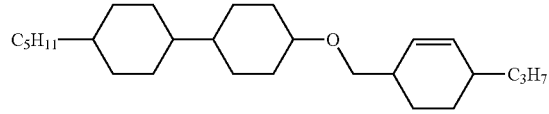
(1-2-1-20)
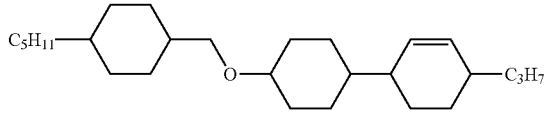

-continued
(1-2-1-21)
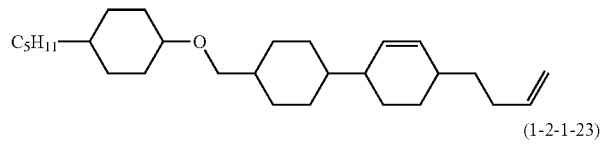
(1-2-1-22)
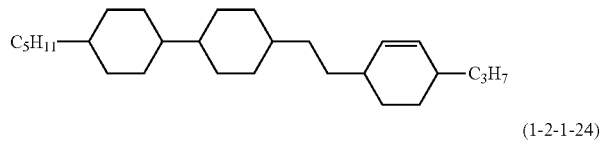
(1-2-1-23)
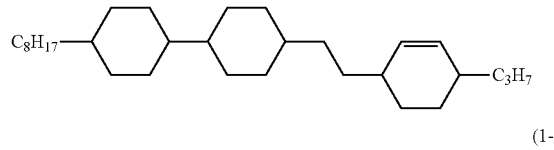
(1-2-1-24)
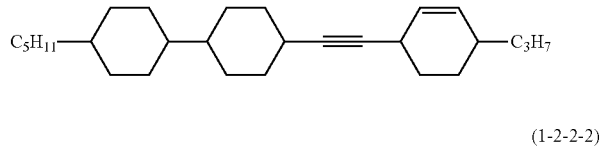
(1-2-2-1)
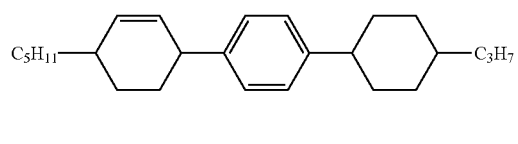
(1-2-2-2)
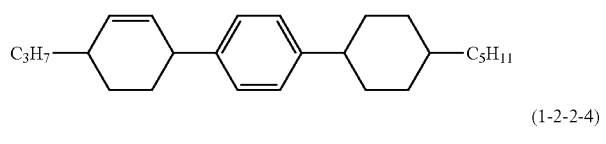
(1-2-2-3)
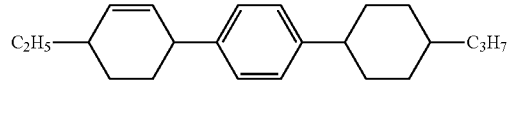
(1-2-2-4)
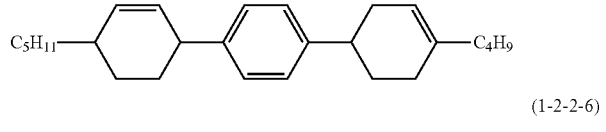
(1-2-2-5)
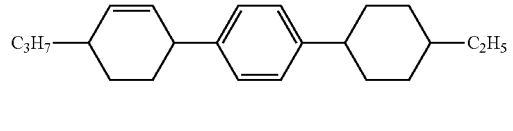
(1-2-2-6)
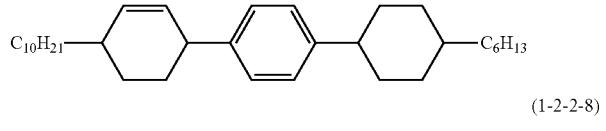
(1-2-2-7)
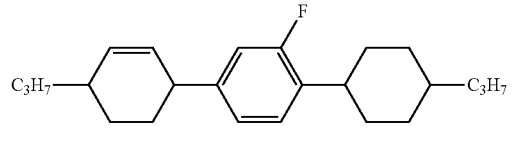
(1-2-2-8)
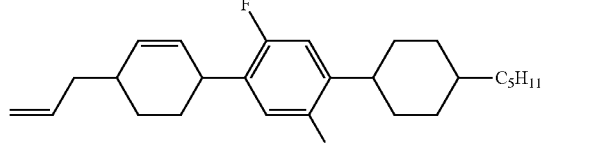
(1-2-2-9)
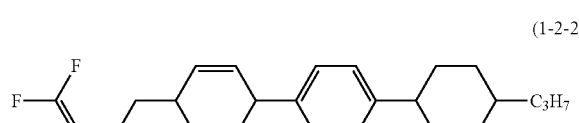
(1-2-2-10)
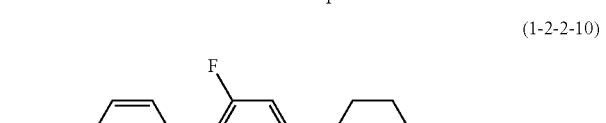
(1-2-2-11)
(1-2-2-12)
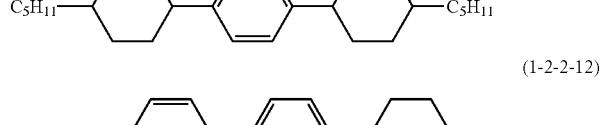
(1-2-2-13)
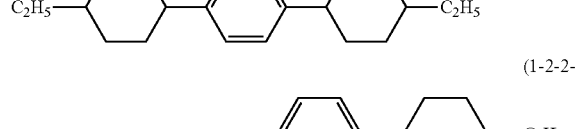
(1-2-2-14)
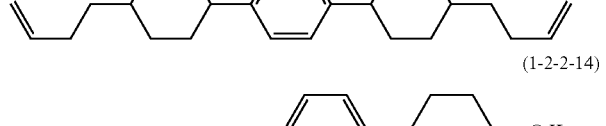
(1-2-2-15)
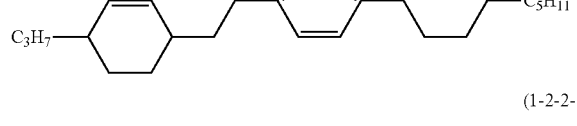
(1-2-2-16)
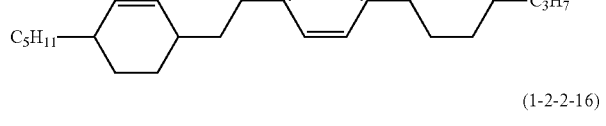
(1-2-2-17)
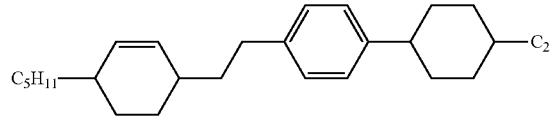
(1-2-2-18)
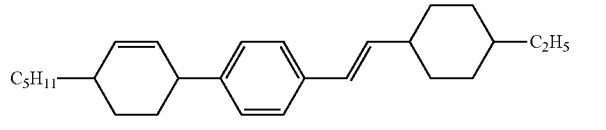

-continued
(1-2-2-19)
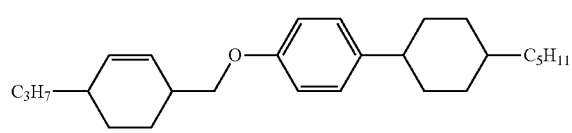
(1-2-2-20)
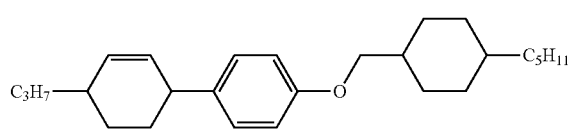
(1-2-2-21)
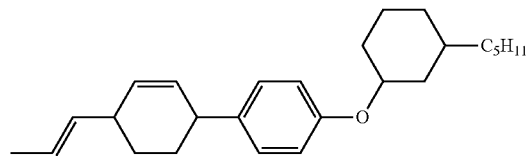
(1-2-2-22)
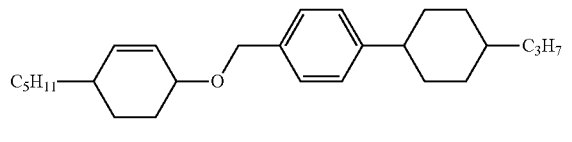
(1-2-2-23)
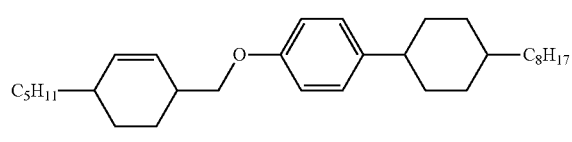
(1-2-2-24)
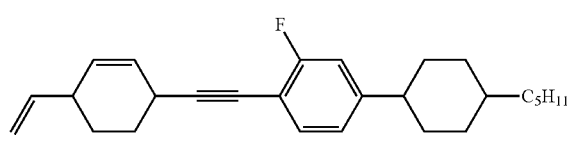
(1-2-2-25)
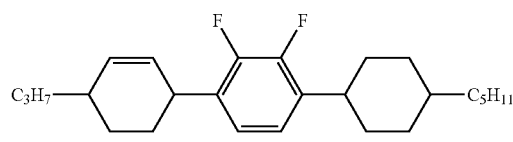
(1-2-2-26)
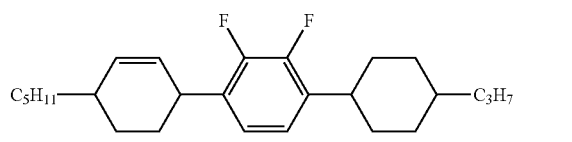
(1-2-2-27)
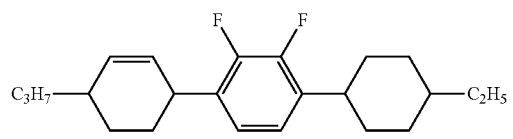
(1-2-2-28)
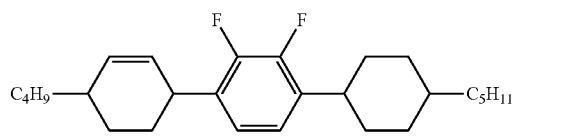
(1-2-2-29)
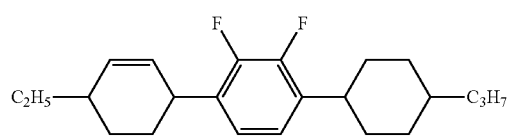
(1-2-2-30)
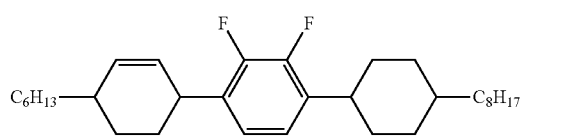
(1-2-2-31)
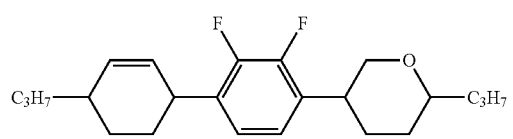
(1-2-2-32)
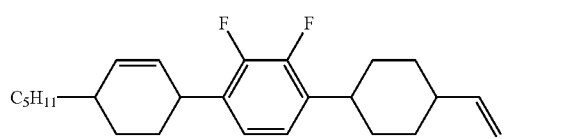
(1-2-2-33)
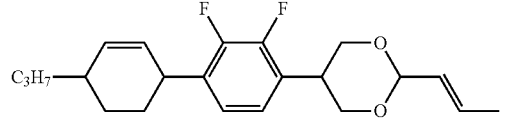
(1-2-2-34)
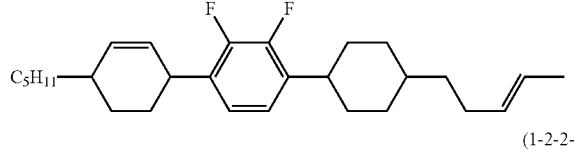
(1-2-2-35)
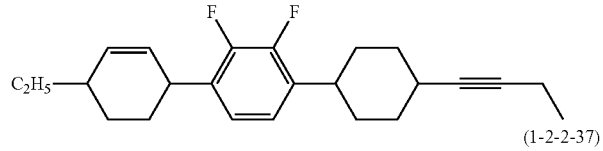
(1-2-2-36)
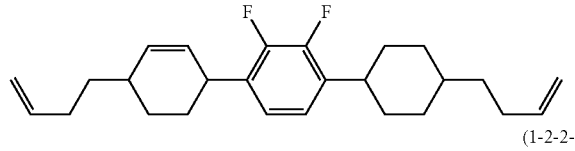
(1-2-2-37)
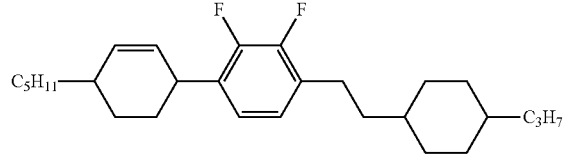

-continued
(1-2-2-39)
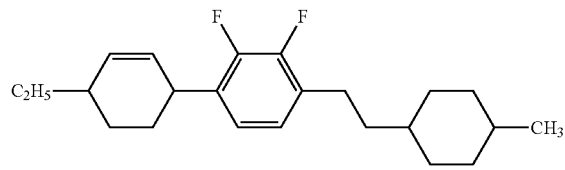
(1-2-2-40)
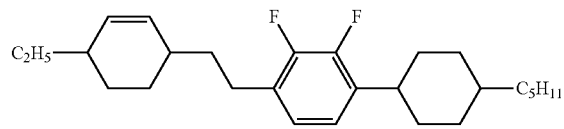
(1-2-2-41)
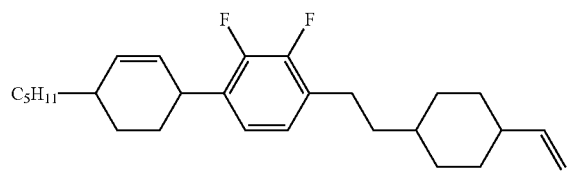
(1-2-2-42)
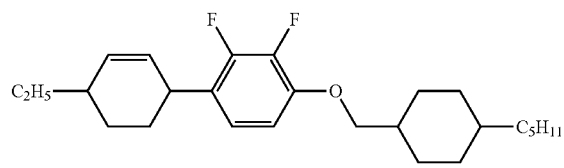
(1-2-2-43)
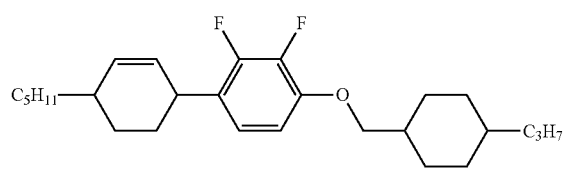
(1-2-2-44)
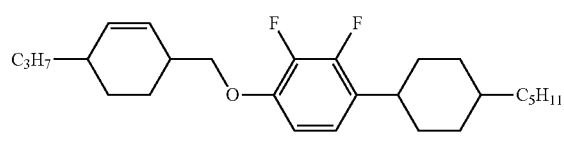
(1-2-2-45)
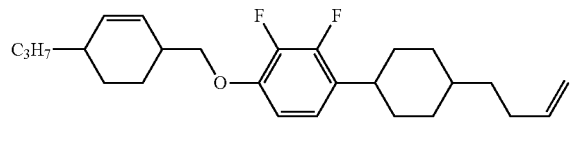
(1-2-2-46)
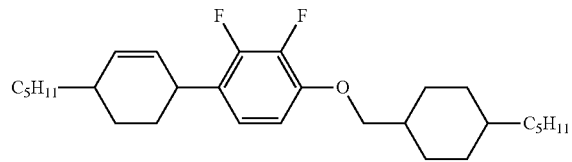
(1-2-2-47)
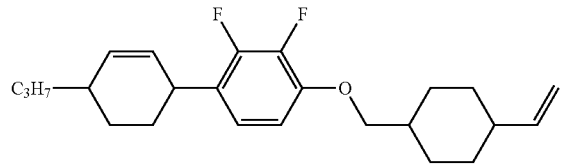
(1-2-2-48)
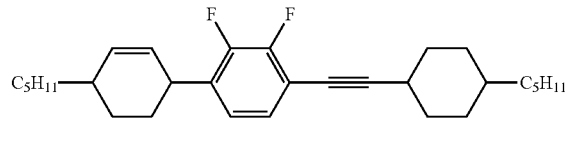
(1-2-3-1)
(1-2-3-2)
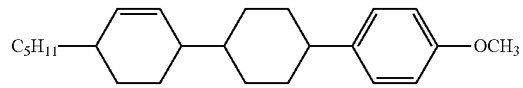
C 53.8 SmB 79.8 N 143.7 Iso (° C.)
$T_{NI}$: 134.4° C. $\Delta\epsilon$: 3.90 $\Delta n$: 0.117
(1-2-3-3)
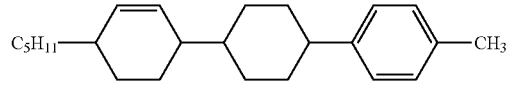
(1-2-3-4)
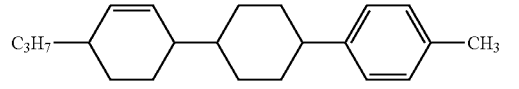
(1-2-3-5)
(1-2-3-6)
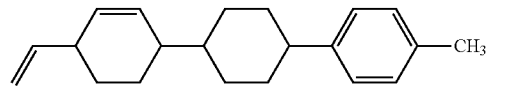
(1-2-3-7)
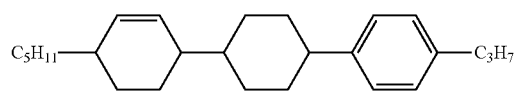
(1-2-3-8)
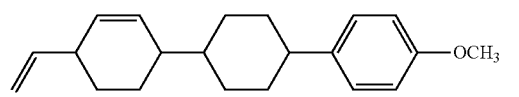
(1-2-3-9)
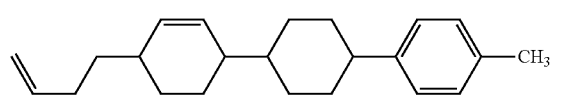
(1-2-3-10)
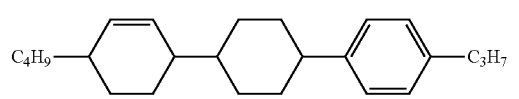

-continued
(1-2-3-11)
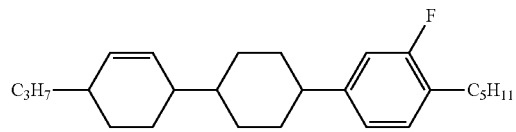
(1-2-3-12)
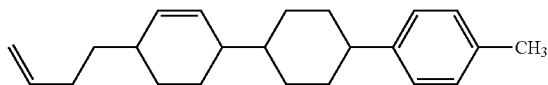
(1-2-3-13)
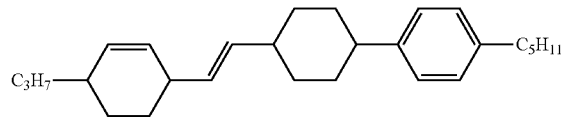
(1-2-3-14)
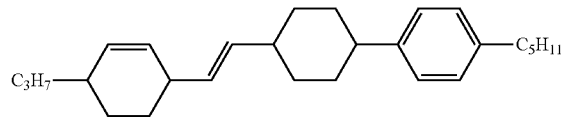
(1-2-3-15)
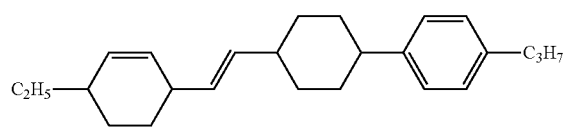
(1-2-3-16)
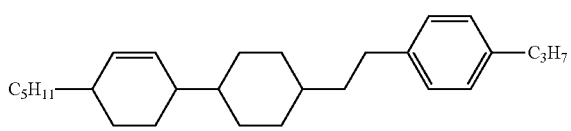
(1-2-3-17)
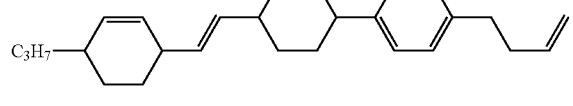
(1-2-3-18)
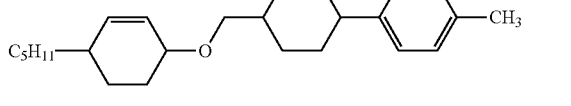
(1-2-3-19)
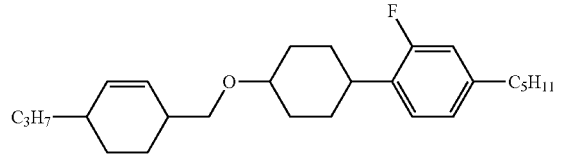
(1-2-3-20)
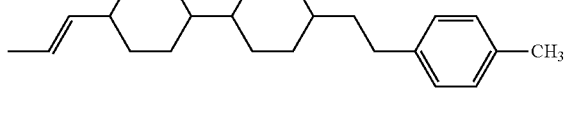
(1-2-3-21)
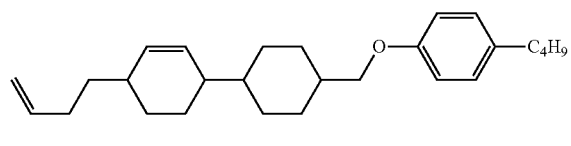
(1-2-3-22)
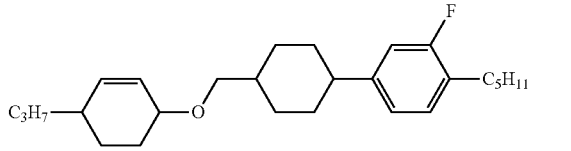
(1-2-3-23)
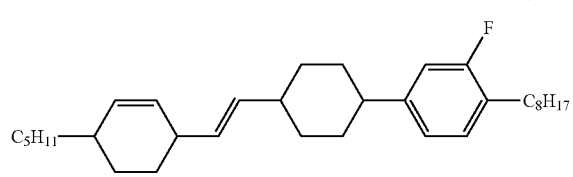
(1-2-3-24)
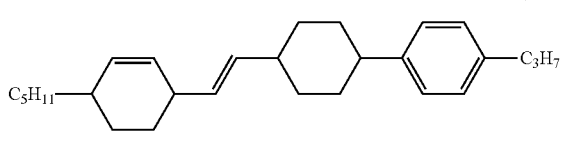
(1-2-3-25)
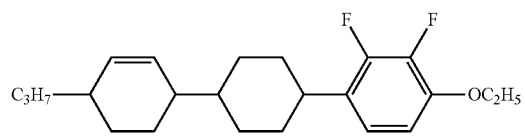
C 27.4 N 129.1 Iso (° C.)
$T_{NI}$: 115.3° C. Δε: -5.89 Δn: 0.112
(1-2-3-26)
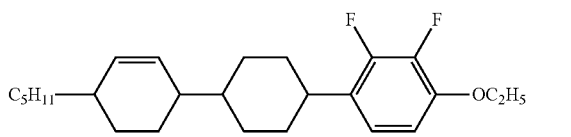
C 52.2 N 126.5 Iso (° C.)
$T_{NI}$: 113.3° C. Δε: -5.60 Δn: 0.105
(1-2-3-27)
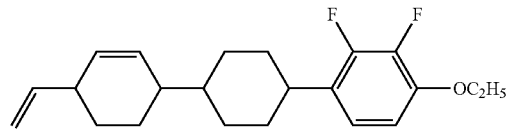
(1-2-3-28)
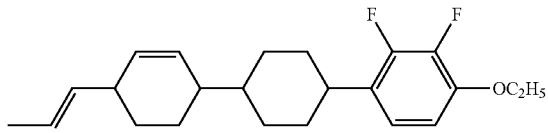

-continued
(1-2-3-29)
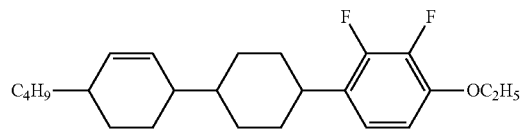
(1-2-3-30)
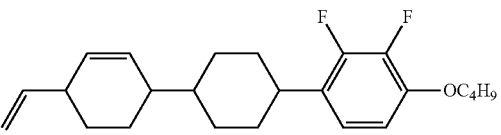
(1-2-3-31)
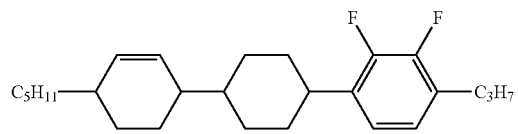
(1-2-3-32)
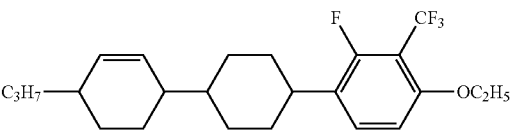
(1-2-3-33)
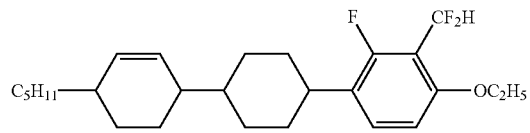
(1-2-3-34)
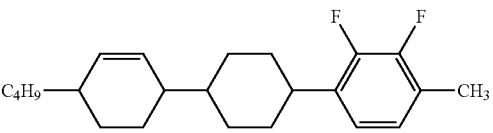
(1-2-3-35)
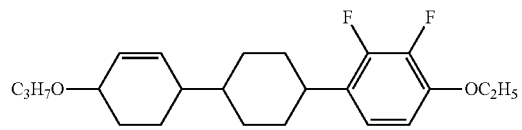
(1-2-3-36)
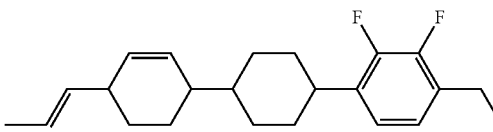
(1-2-3-37)
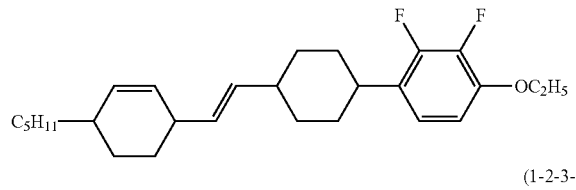
(1-2-3-38)
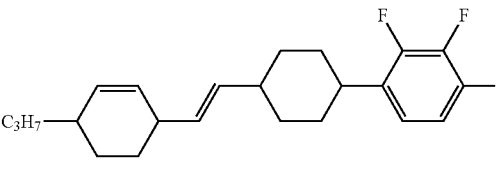
(1-2-3-39)
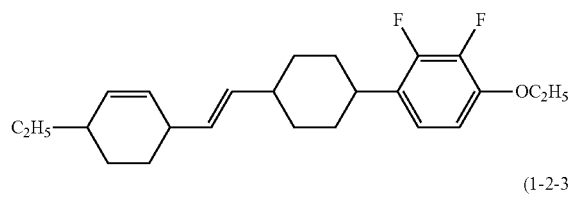
(1-2-3-40)
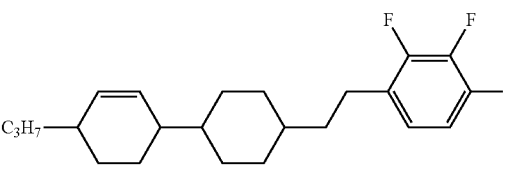
(1-2-3-41)
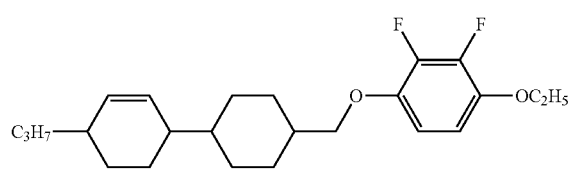
Cr 46.1 N 108.1 Iso (° C.)
T$_{NI}$: 103.9° C. Δε: -7.49 Δn: 0.105
(1-2-3-42)
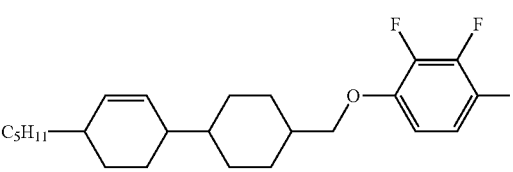
Cr$_1$ 29.2 Cr$_2$ 32.1 N 107.2 Iso (° C.)
T$_{NI}$: 99.3° C. Δε: -7.46 Δn: 0.102
(1-2-3-43)
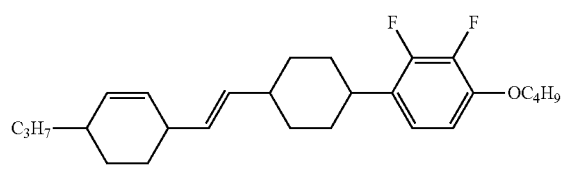
(1-2-3-44)
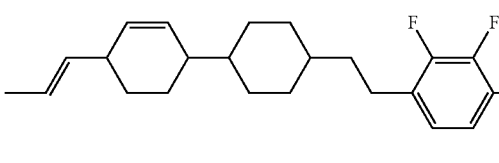
(1-2-3-45)
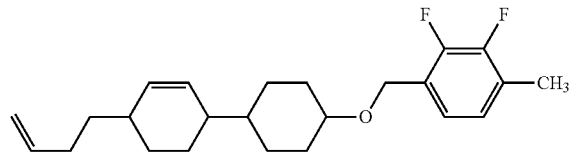
(1-2-3-46)
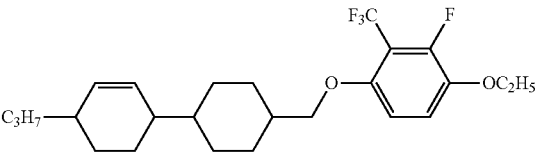

-continued
(1-2-3-47) 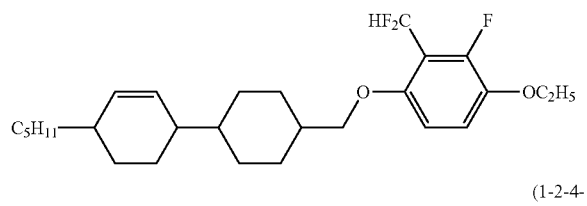
(1-2-3-48) 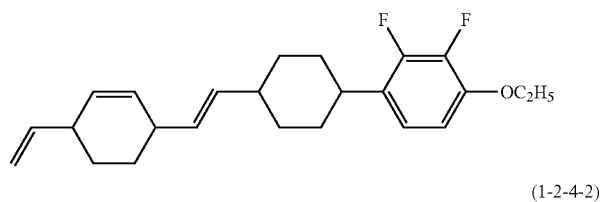
(1-2-4-1) 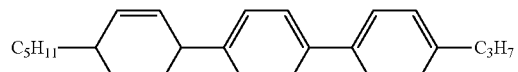
(1-2-4-2) 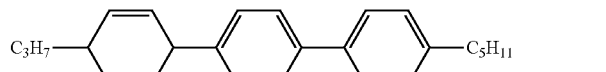
(1-2-4-3) 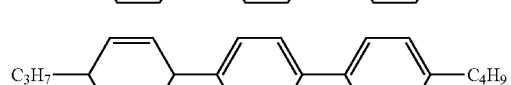
(1-2-4-4) 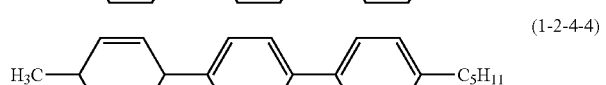
(1-2-4-5) 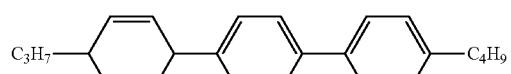
(1-2-4-6) 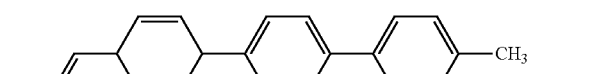
(1-2-4-7) 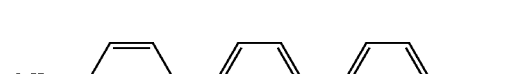
(1-2-4-8) 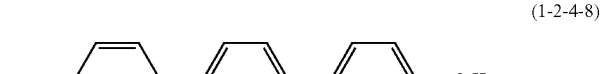
(1-2-4-9) 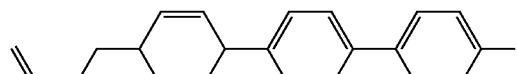
(1-2-4-10) 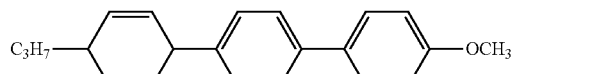
(1-2-4-11) 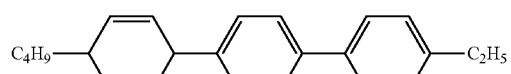
(1-2-4-12) 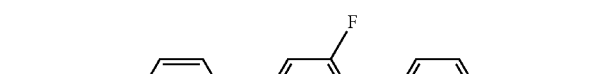
(1-2-4-13) 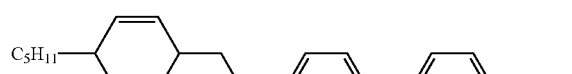
(1-2-4-14) 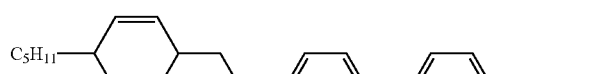
(1-2-4-15) 
(1-2-4-16) 
(1-2-4-17) 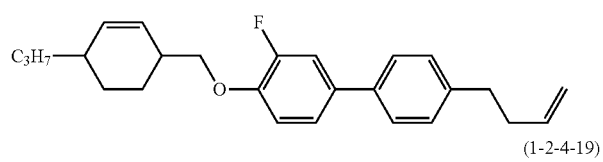
(1-2-4-18) 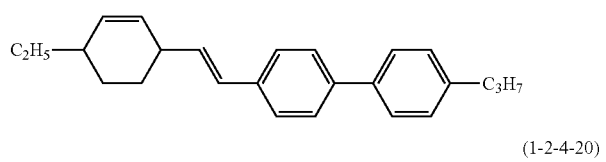
(1-2-4-19) 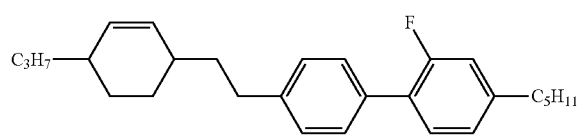
(1-2-4-20) 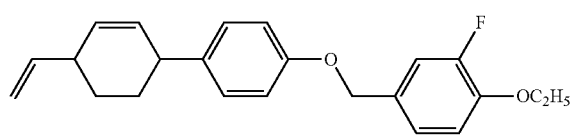

-continued
(1-2-4-21)
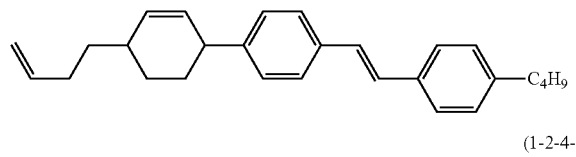
(1-2-4-22)
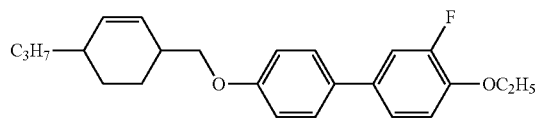
(1-2-4-23)
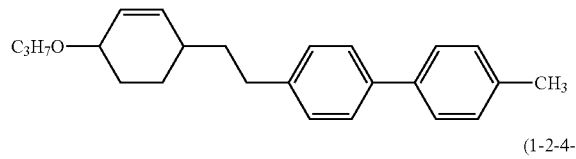
(1-2-4-24)
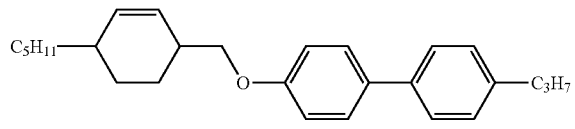
(1-2-4-25)
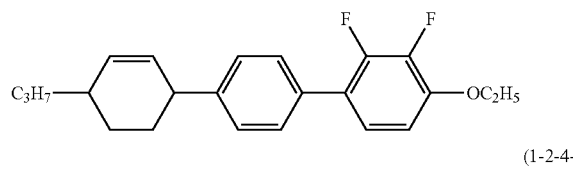
(1-2-4-26)
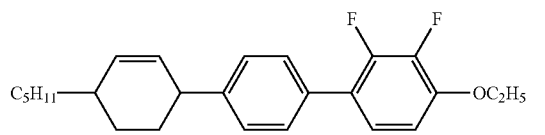
(1-2-4-27)
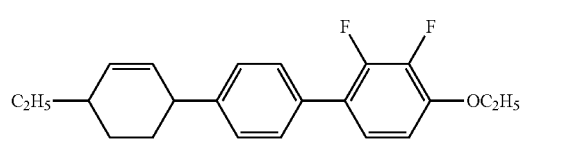
(1-2-4-28)
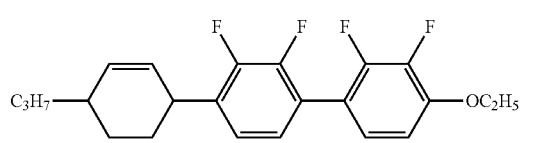
(1-2-4-29)
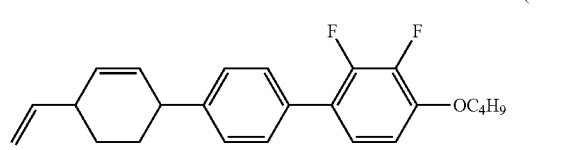
(1-2-4-30)
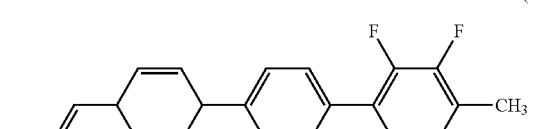
(1-2-4-31)
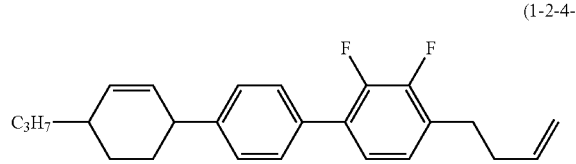
(1-2-4-32)
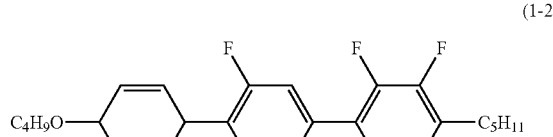
(1-2-4-33)
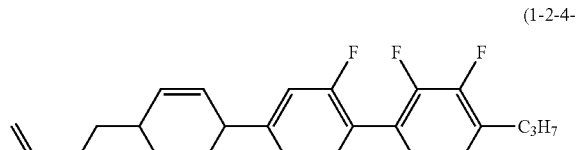
(1-2-4-34)
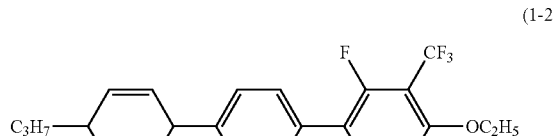
(1-2-4-35)
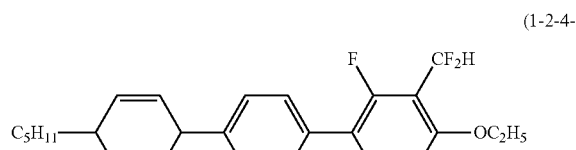
(1-2-4-36)
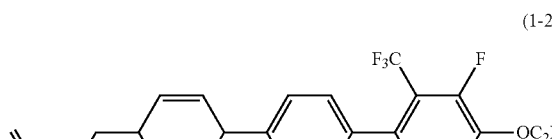
(1-2-4-37)
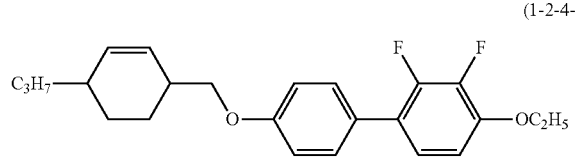
(1-2-4-38)
(1-2-4-39)
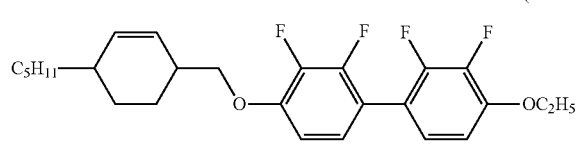
(1-2-4-40)
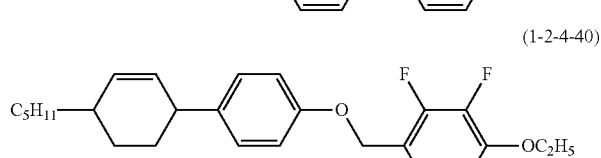

(1-2-4-41) 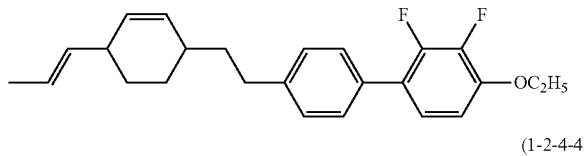
(1-2-4-42) 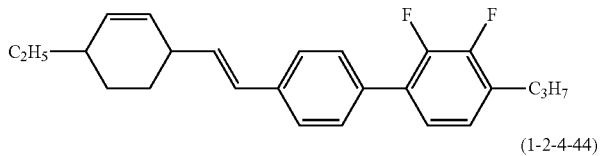
(1-2-4-43) 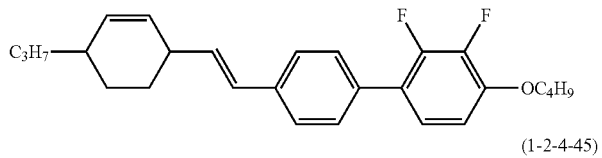
(1-2-4-44) 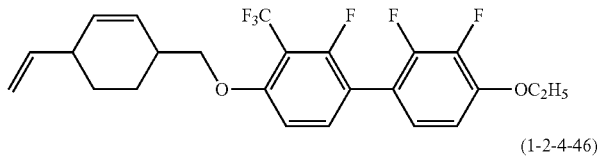
(1-2-4-45) 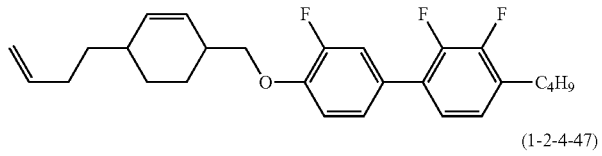
(1-2-4-46) 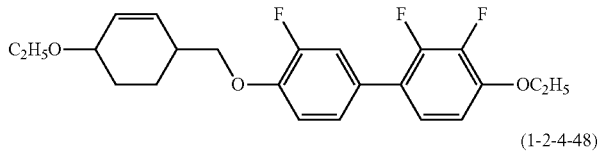
(1-2-4-47) 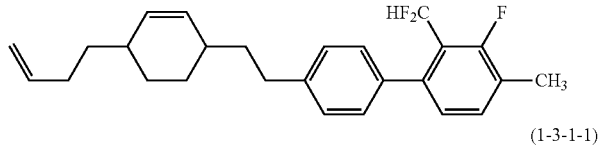
(1-2-4-48) 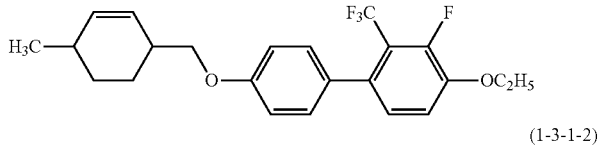
(1-3-1-1) 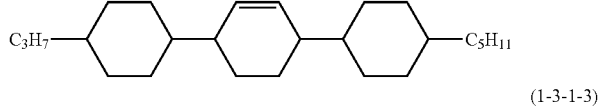
(1-3-1-2) 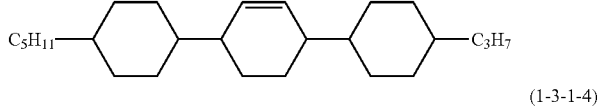
(1-3-1-3) 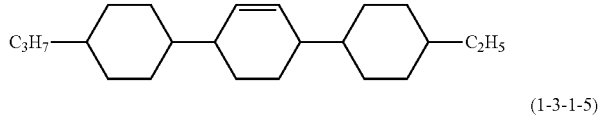
(1-3-1-4) 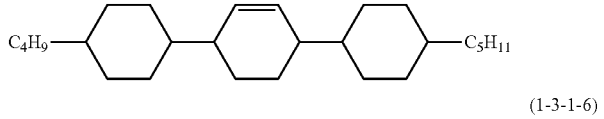
(1-3-1-5) 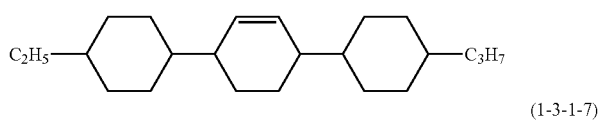
(1-3-1-6) 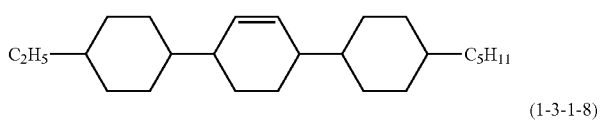
(1-3-1-7) 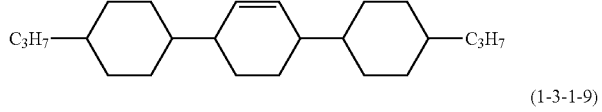
(1-3-1-8) 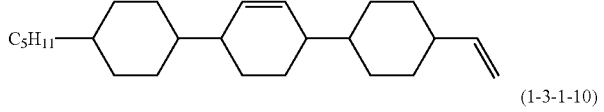
(1-3-1-9) 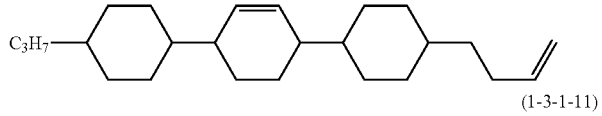
(1-3-1-10) 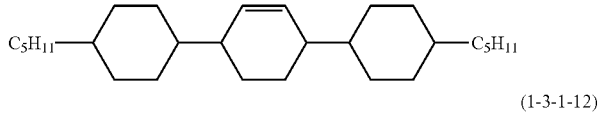
(1-3-1-11) 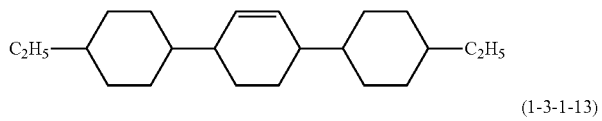
(1-3-1-12) 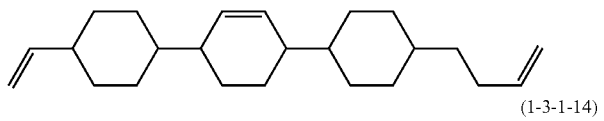
(1-3-1-13) 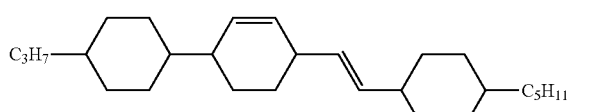
(1-3-1-14) 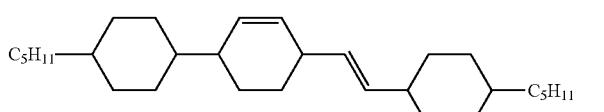
(1-3-1-15) 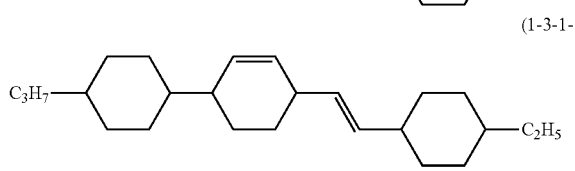
(1-3-1-16) 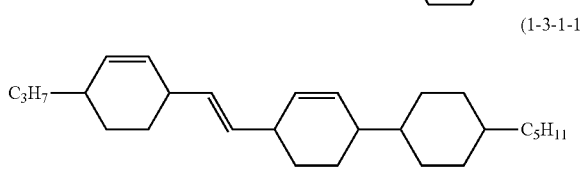

-continued
(1-3-1-17)
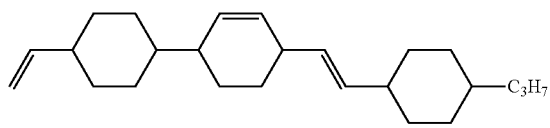
(1-3-1-18)
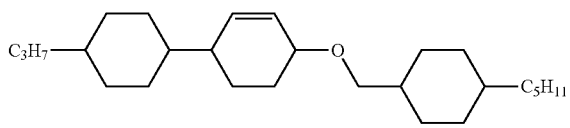
C 16.2 SmB 127 Iso (° C.)
(1-3-1-19)
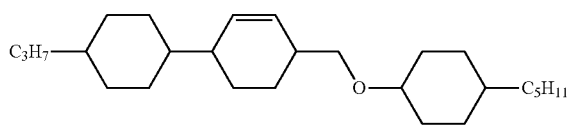
(1-3-1-20)
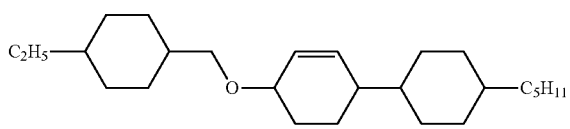
(1-3-1-21)
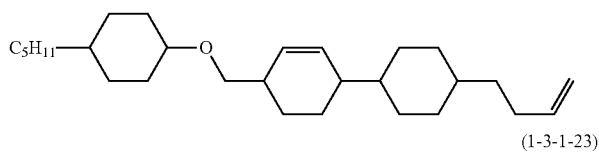
(1-3-1-22)
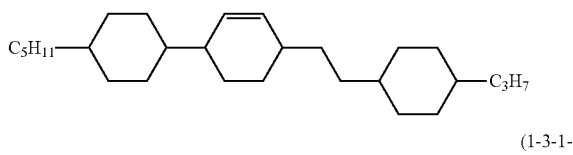
(1-3-1-23)
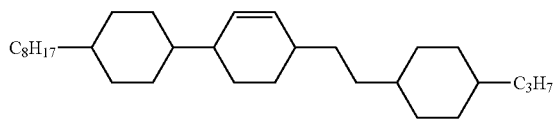
(1-3-1-24)
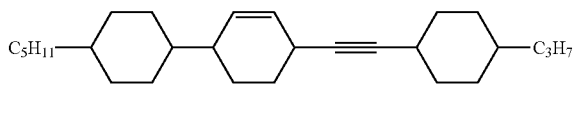
(1-3-2-1)
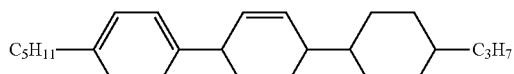
(1-3-2-2)
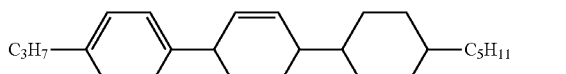
(1-3-2-3)
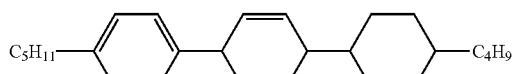
(1-3-2-4)
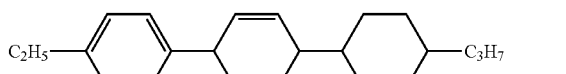
(1-3-2-5)
(1-3-2-6)
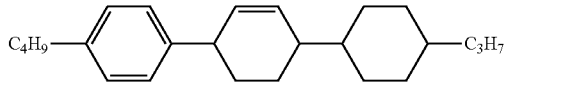
(1-3-2-7)
(1-3-2-8)
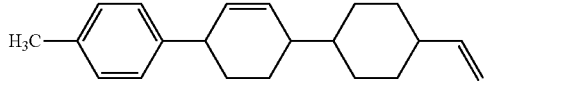
(1-3-2-9)
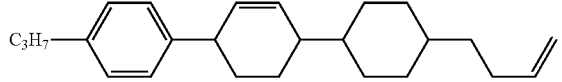
(1-3-2-10)
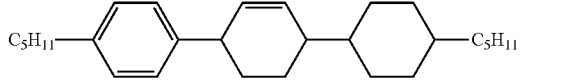
(1-3-2-11)
(1-3-2-12)
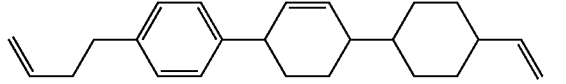
(1-3-2-13)
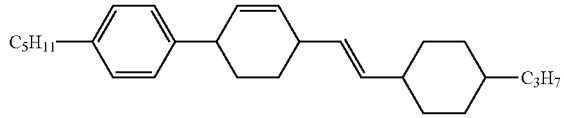
(1-3-2-14)
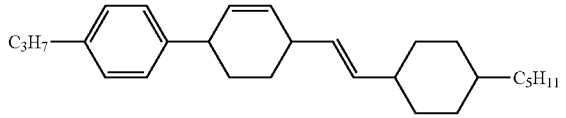

-continued
(1-3-2-15)
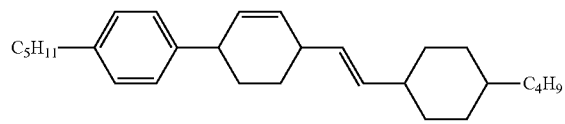
(1-3-2-16)
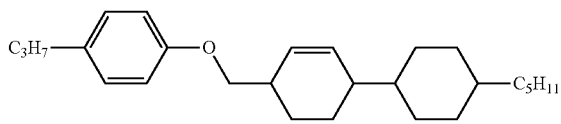
(1-3-2-17)
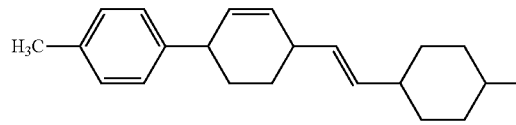
(1-3-2-18)
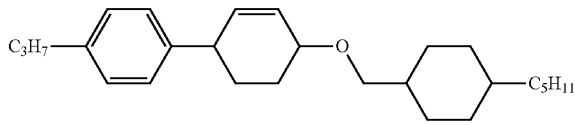
(1-3-2-19)
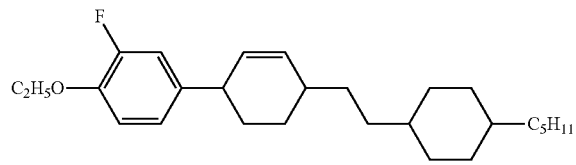
(1-3-2-20)
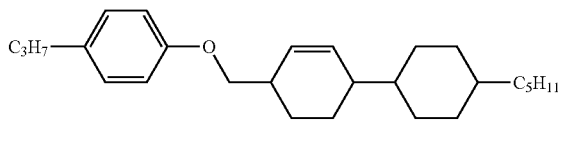
(1-3-2-21)
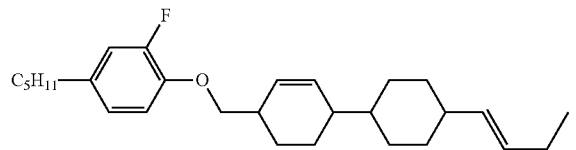
(1-3-2-22)
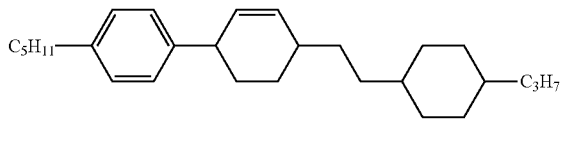
(1-3-2-23)
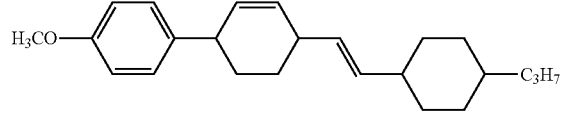
(1-3-2-24)
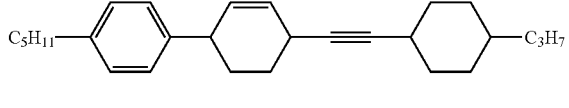
(1-3-2-25)
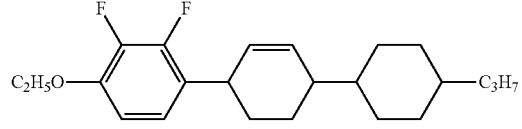
(1-3-2-26)
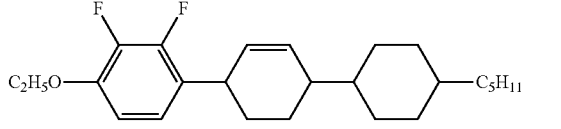
(1-3-2-27)
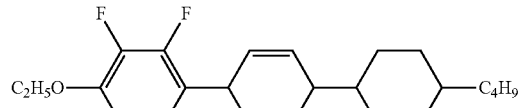
(1-3-2-28)
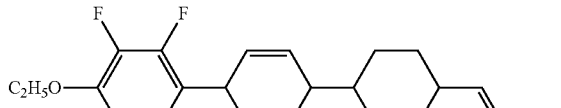
(1-3-2-29)
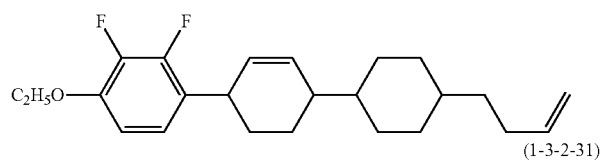
(1-3-2-30)
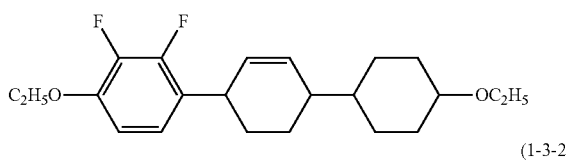
(1-3-2-31)
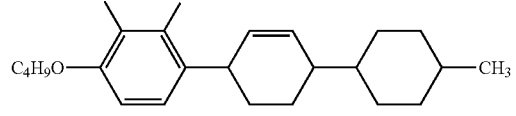
(1-3-2-32)
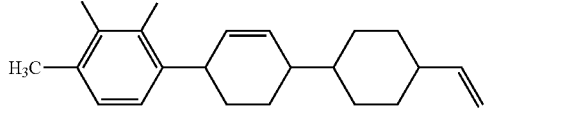
(1-3-2-33)
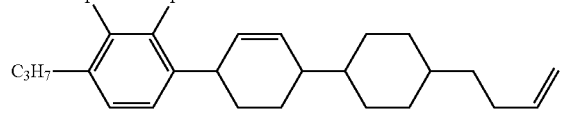
(1-3-2-34)
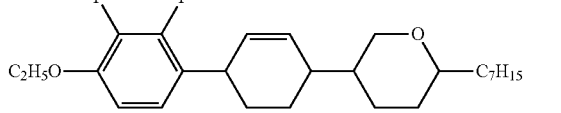

-continued
(1-3-2-35)
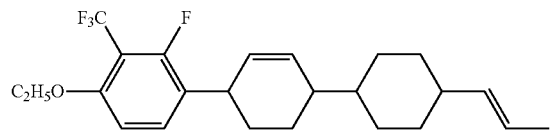
(1-3-2-36)
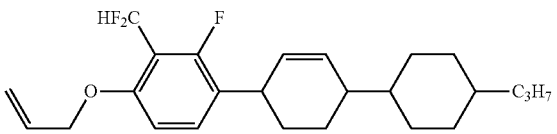
(1-3-2-37)
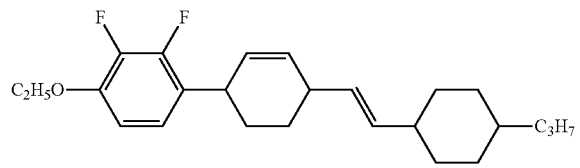
(1-3-2-38)
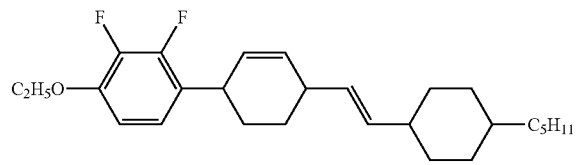
(1-3-2-39)
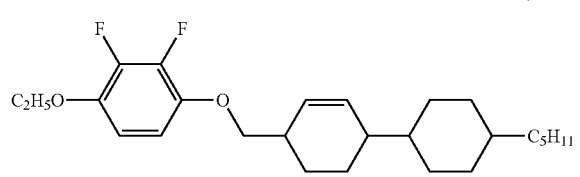
(1-3-2-40)
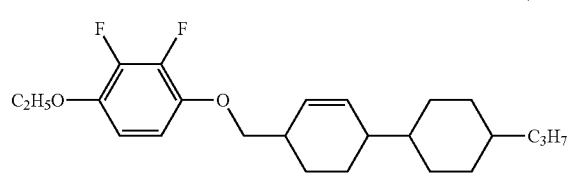
(1-3-2-41)
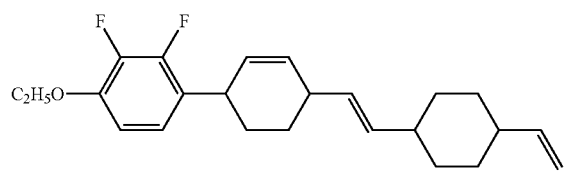
(1-3-2-42)
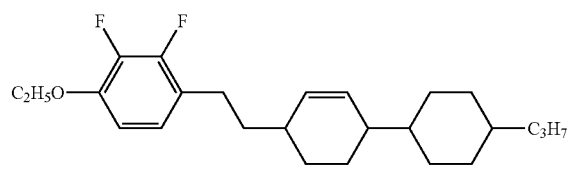
(1-3-2-43)
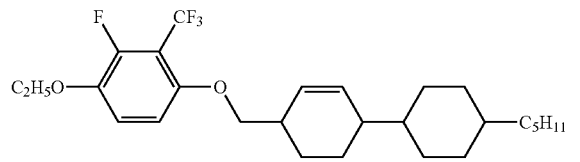
(1-3-2-44)
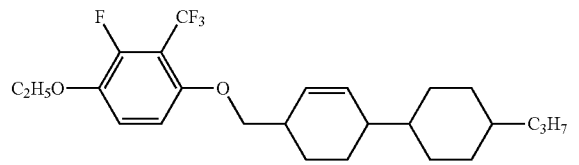
(1-3-2-45)
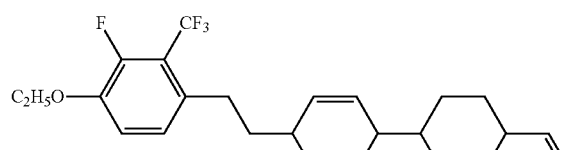
(1-3-2-46)
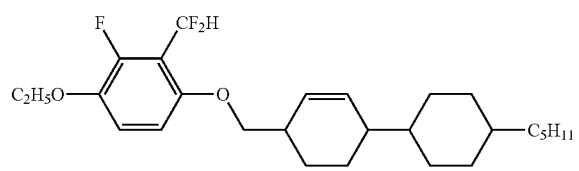
(1-3-2-47)
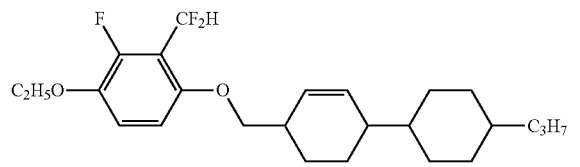
(1-3-2-48)
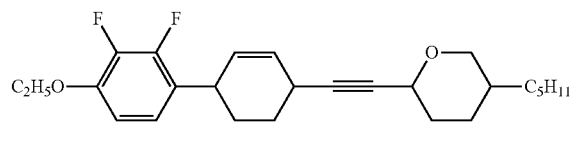
(1-3-3-1)
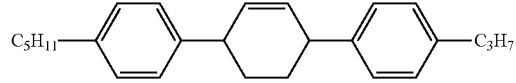
(1-3-3-2)
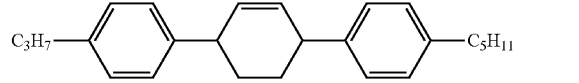
(1-3-3-3)
(1-3-3-4)
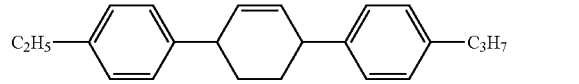

-continued
(1-3-3-5)
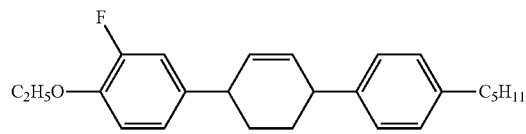
(1-3-3-6)
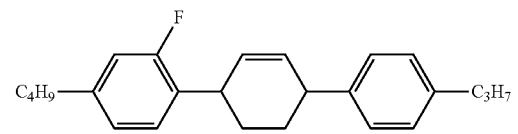
(1-3-3-7)
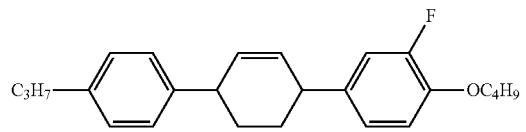
(1-3-3-8)
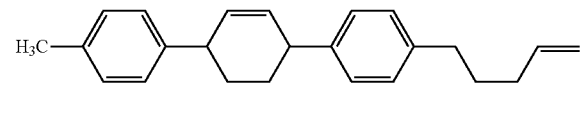
(1-3-3-9)
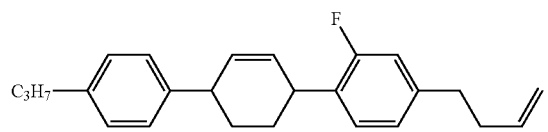
(1-3-3-10)
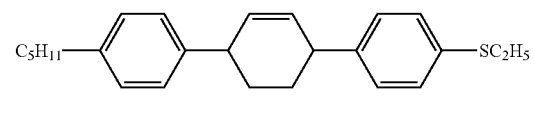
(1-3-3-11)
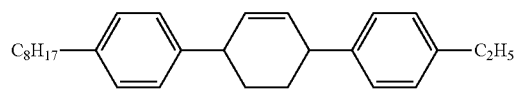
(1-3-3-12)
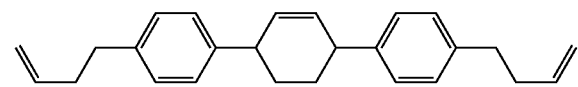
(1-3-3-13)
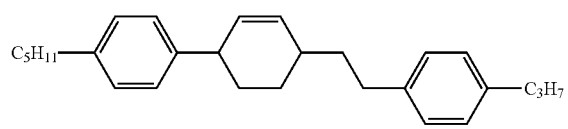
(1-3-3-14)
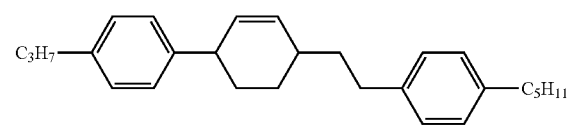
(1-3-3-15)
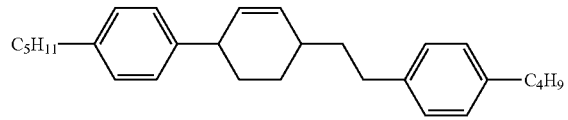
(1-3-3-16)
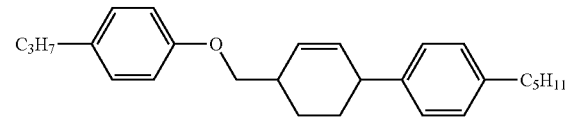
(1-3-3-17)
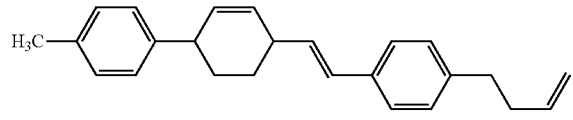
(1-3-3-18)
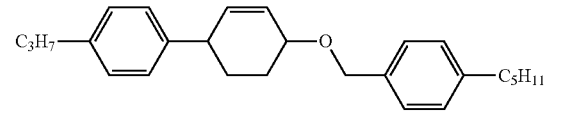
(1-3-3-19)
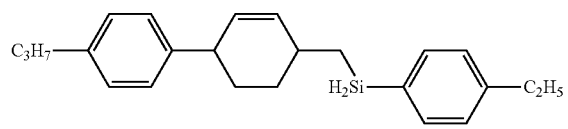
(1-3-3-20)
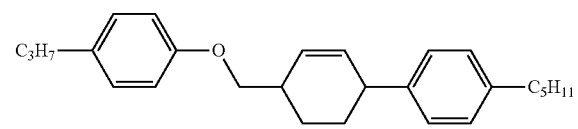
(1-3-3-21)
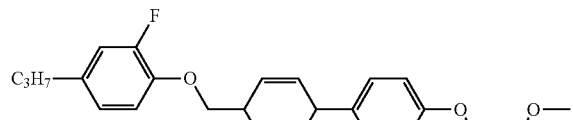
(1-3-3-22)
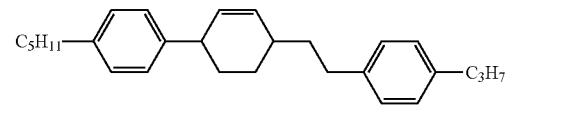
(1-3-3-23)
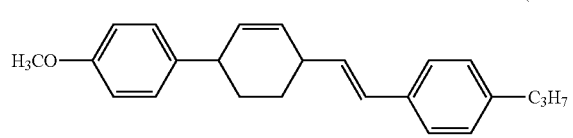
(1-3-3-24)
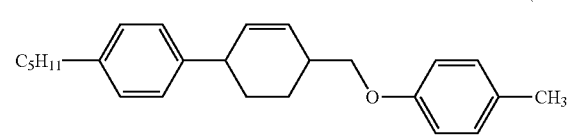

-continued
(1-3-3-25)
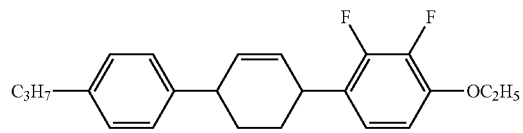
(1-3-3-26)
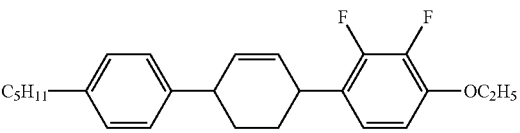
(1-3-3-27)
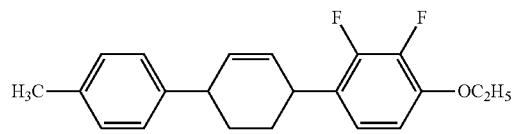
(1-3-3-28)
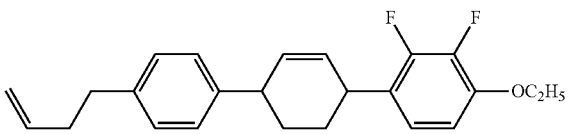
(1-3-3-29)
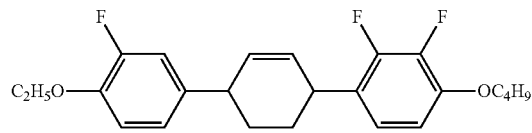
(1-3-3-30)
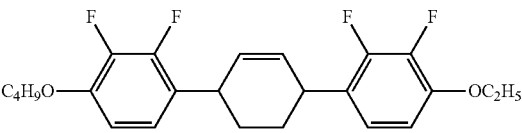
(1-3-3-31)
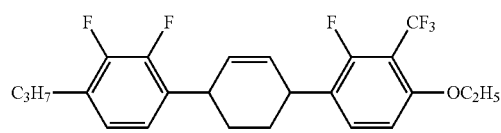
(1-3-3-32)
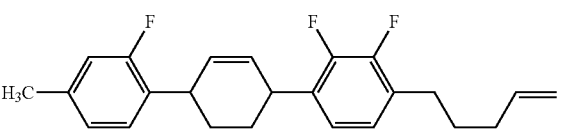
(1-3-3-33)
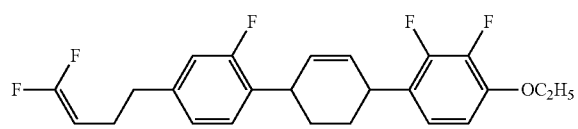
(1-3-3-34)
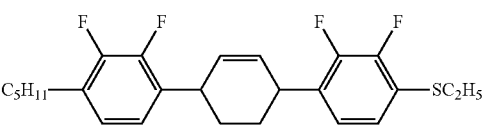
(1-3-3-35)
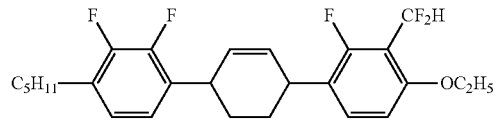
(1-3-3-36)
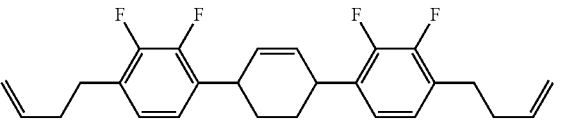
(1-3-3-37)
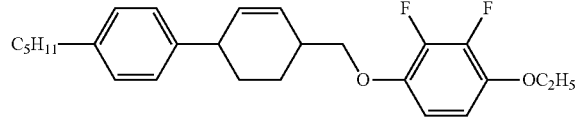
(1-3-3-38)
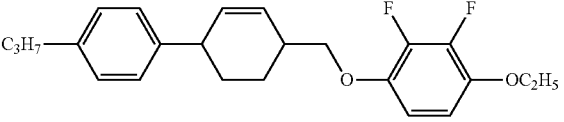
(1-3-3-39)
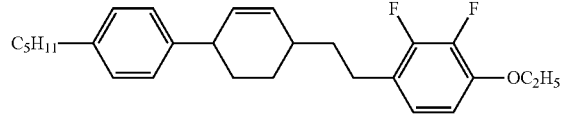
(1-3-3-40)
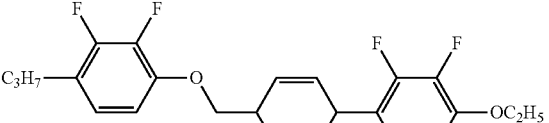
(1-3-3-41)
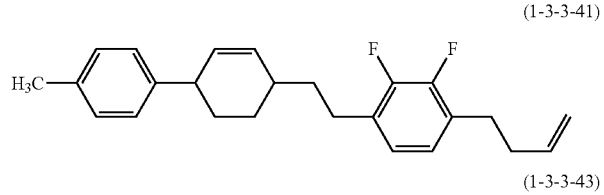
(1-3-3-42)
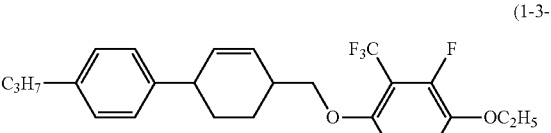
(1-3-3-43)
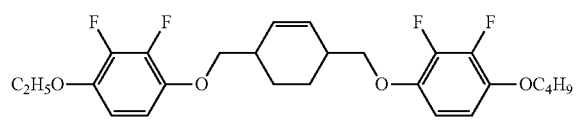
(1-3-3-44)
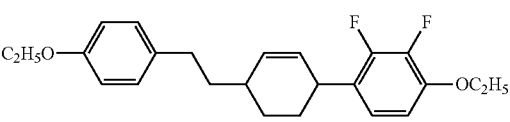

-continued
(1-3-3-45)
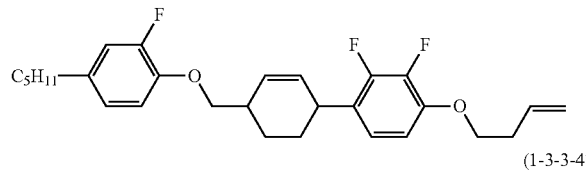
(1-3-3-46)
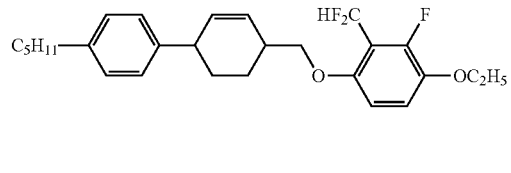
(1-3-3-47)
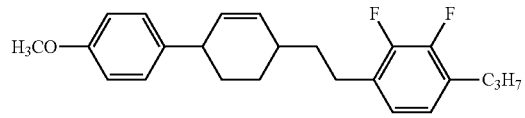
(1-3-3-48)
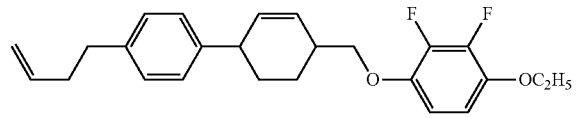
(1-4-1-1)
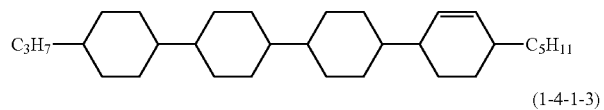
(1-4-1-2)
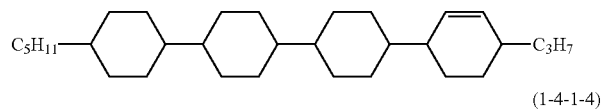
(1-4-1-3)
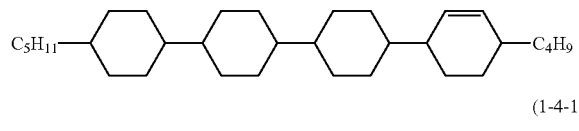
(1-4-1-4)
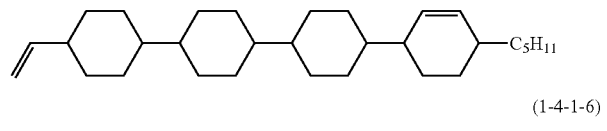
(1-4-1-5)
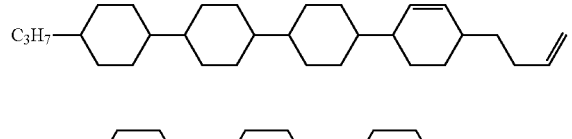
(1-4-1-6)
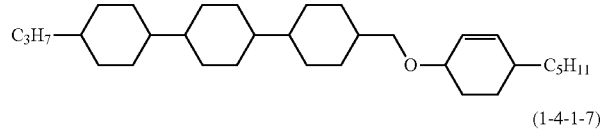
(1-4-1-7)
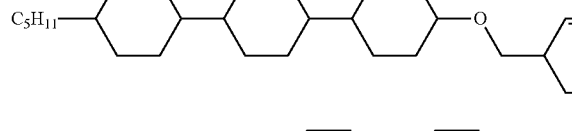
(1-4-1-8)
(1-4-1-9)
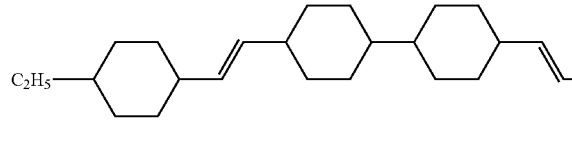
(1-4-1-10)
(1-4-1-11)
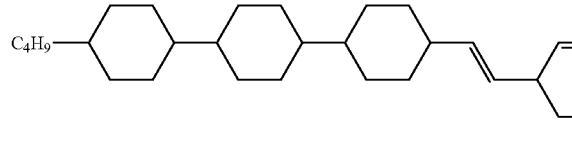
(1-4-1-12)
(1-4-1-13)
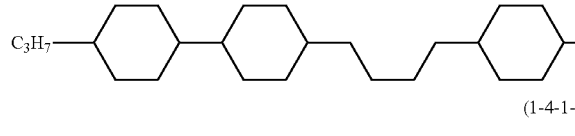
(1-4-1-14)

-continued
(1-4-1-15)
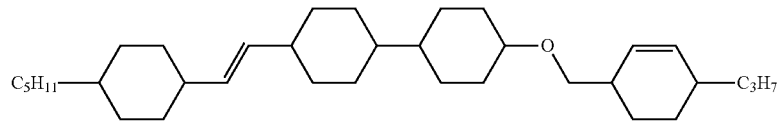
(1-4-1-16)
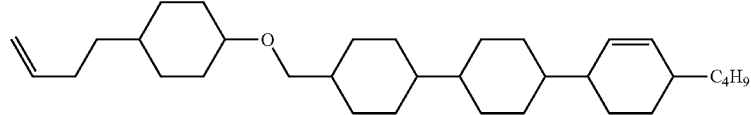
(1-4-1-17)
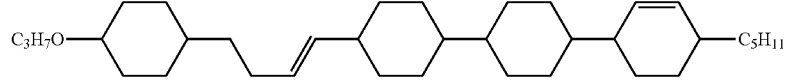
(1-4-2-1)
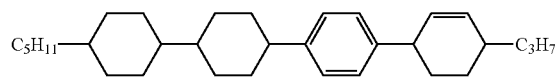
(1-4-2-2)
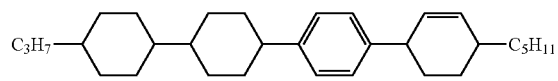
(1-4-2-3)
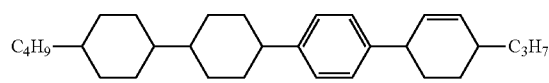
(1-4-2-4)
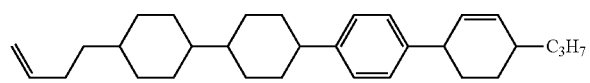
(1-4-2-5)
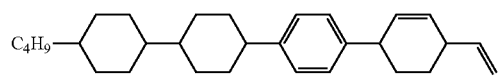
(1-4-2-6)
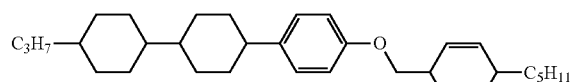
(1-4-2-7)
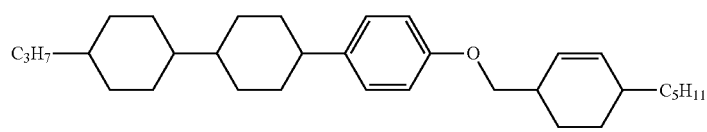
(1-4-2-8)
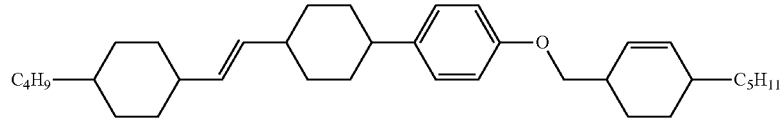
(1-4-2-9)
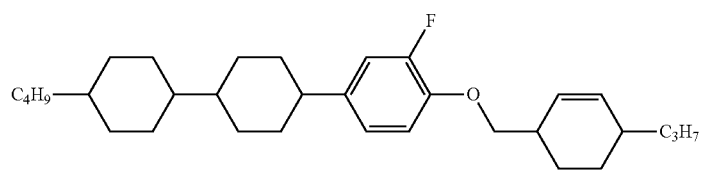
(1-4-2-10)
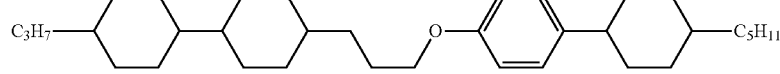
(1-4-2-11)
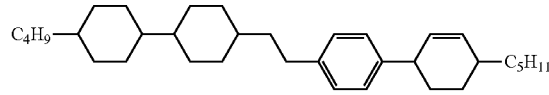
(1-4-2-12)
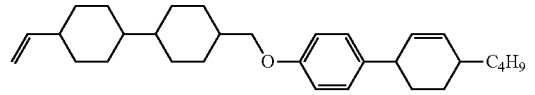
(1-4-2-13)
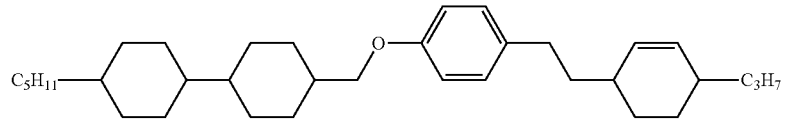

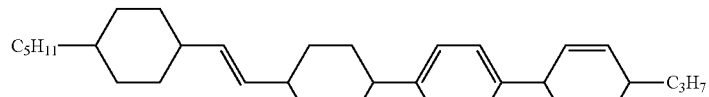
(1-4-2-14)
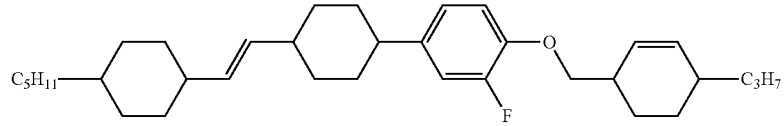
(1-4-2-15)
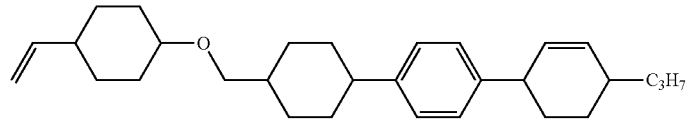
(1-4-2-16)
(1-4-2-17)
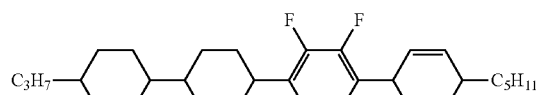
(1-4-2-18)
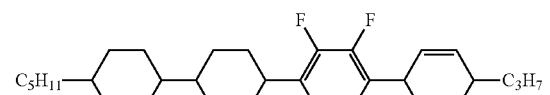
(1-4-2-19)
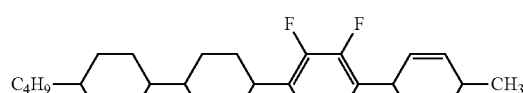
(1-4-2-20)
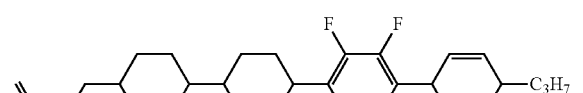
(1-4-2-21)
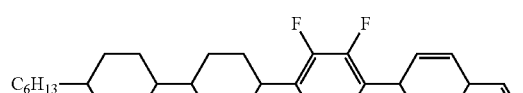
(1-4-2-22)
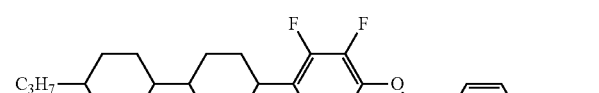
(1-4-2-23)
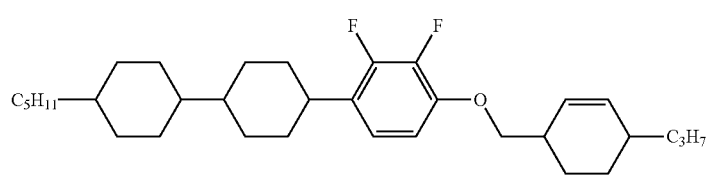
(1-4-2-24)
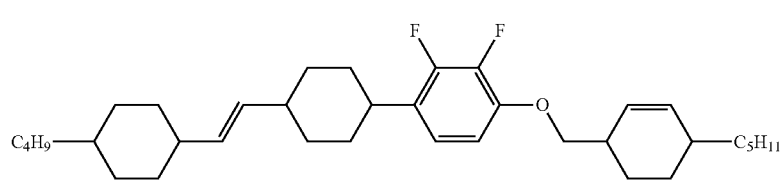
(1-4-2-25)
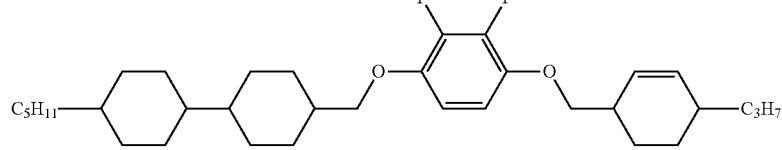
(1-4-2-26)
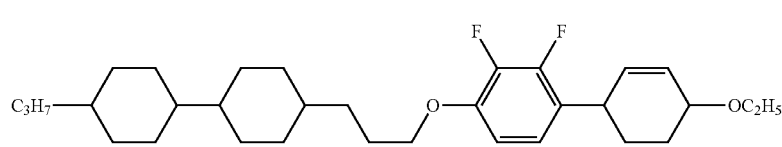
(1-4-2-27)

(1-4-2-28) 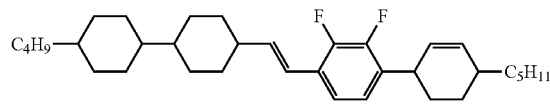
(1-4-2-29) 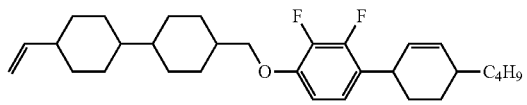
(1-4-2-30) 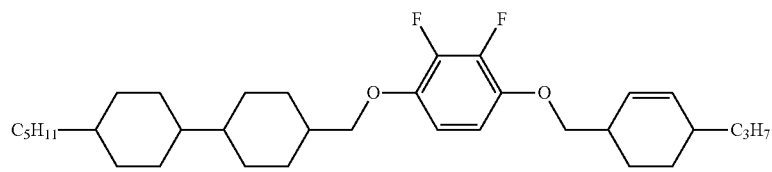
(1-4-2-31) 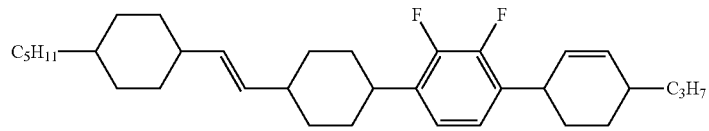
(1-4-2-32) 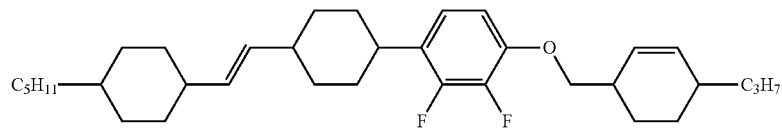
(1-4-2-33) 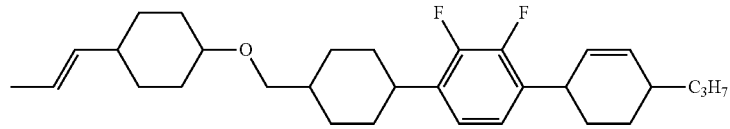
(1-4-2-34) 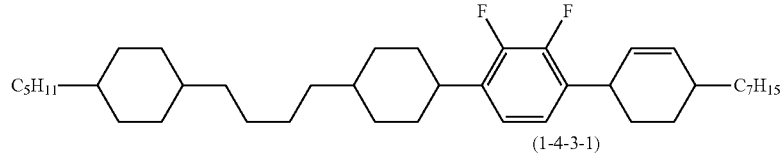
(1-4-3-1) 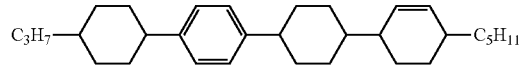
(1-4-3-2) 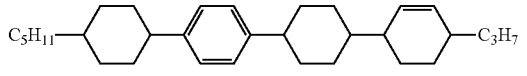
(1-4-3-3) 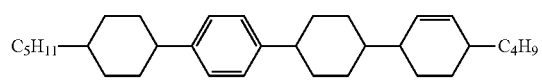
(1-4-3-4) 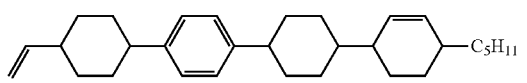
(1-4-3-5) 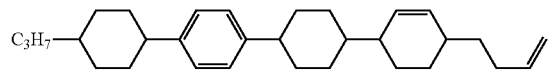
(1-4-3-6) 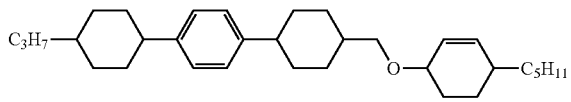
(1-4-3-7) 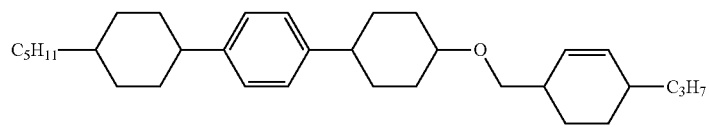
(1-4-3-8) 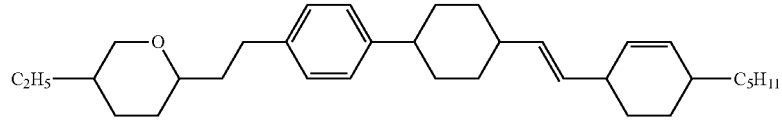
(1-4-3-9) 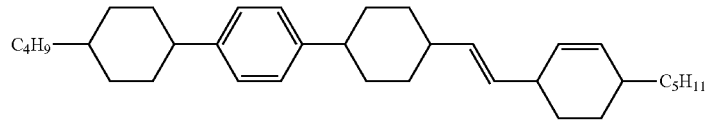

(1-4-3-10)
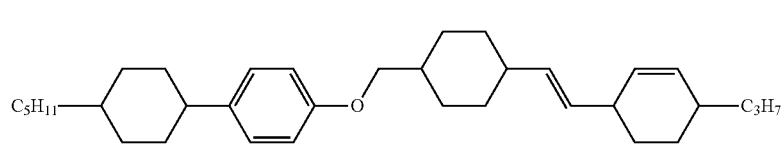
(1-4-3-11)
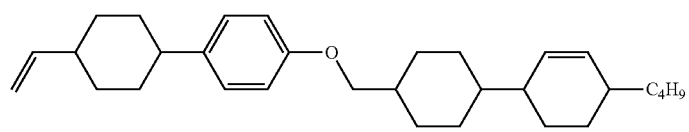
(1-4-3-12)
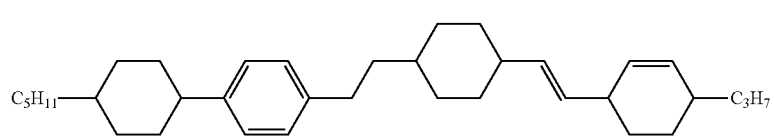
(1-4-3-13)
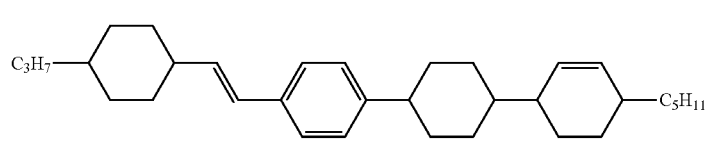
(1-4-3-14)
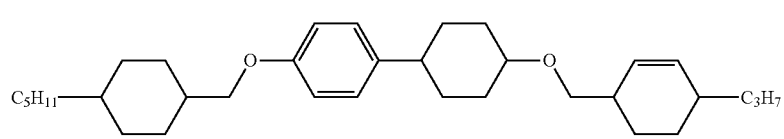
(1-4-3-15)
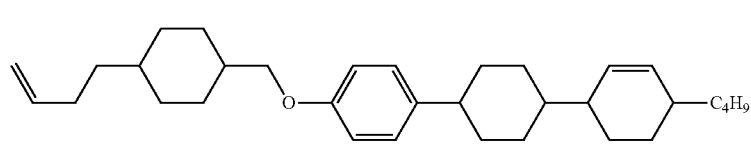
(1-4-3-16)
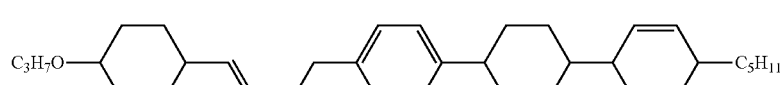
(1-4-3-17)
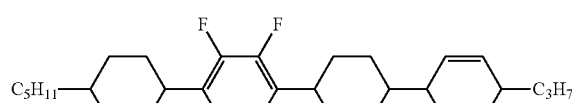
(1-4-3-18)
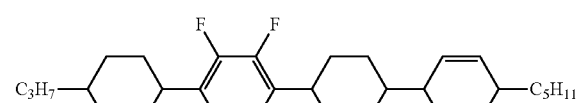
(1-4-3-19)
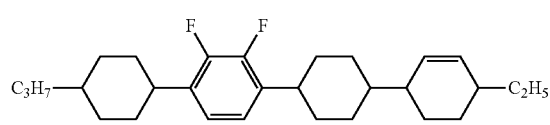
(1-4-3-20)
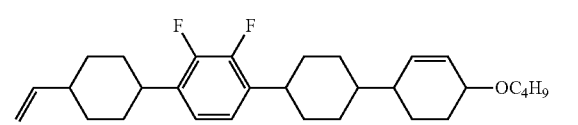
(1-4-3-21)
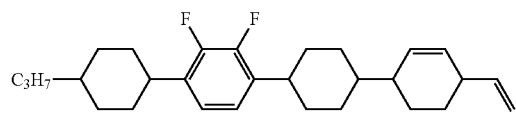
(1-4-3-22)
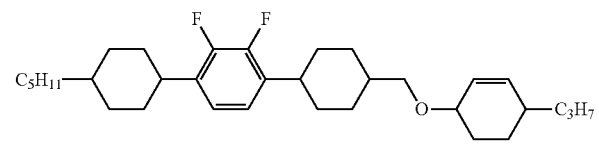
(1-4-3-23)

-continued
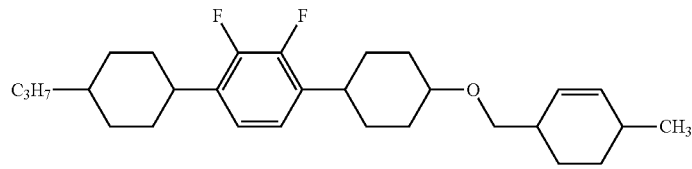
(1-4-3-24)
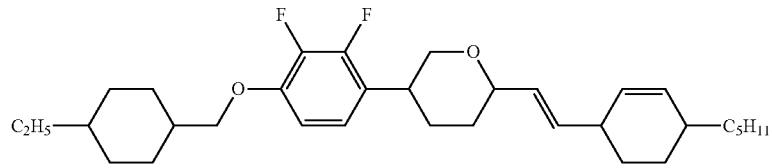
(1-4-3-25)
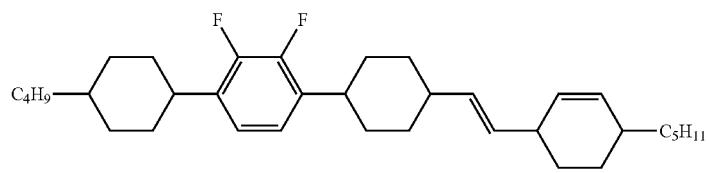
(1-4-3-26)
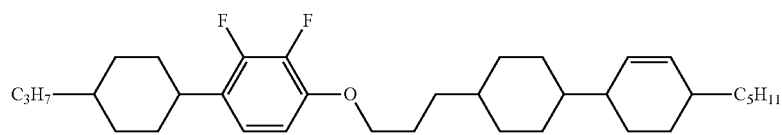
(1-4-3-27)
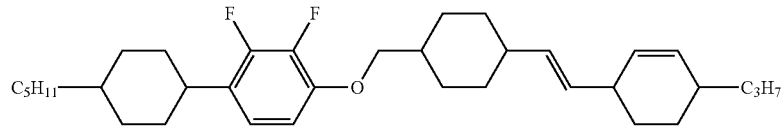
(1-4-3-28)
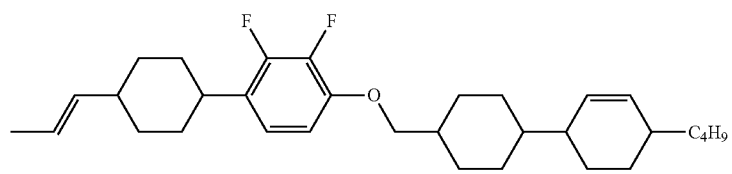
(1-4-3-29)
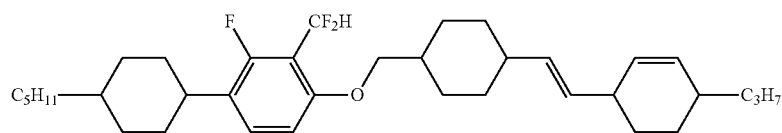
(1-4-3-30)
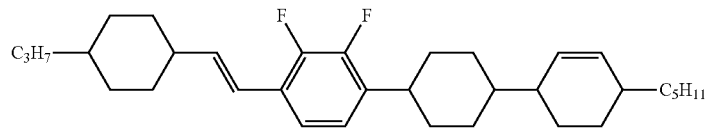
(1-4-3-31)
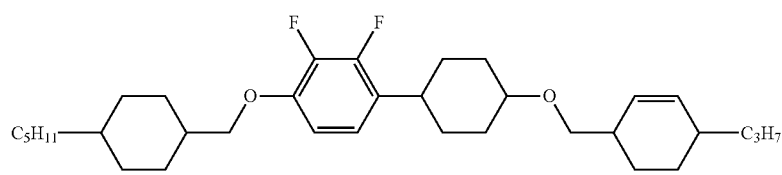
(1-4-3-32)
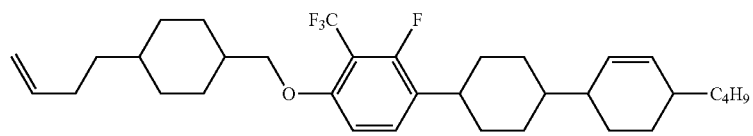
(1-4-3-33)

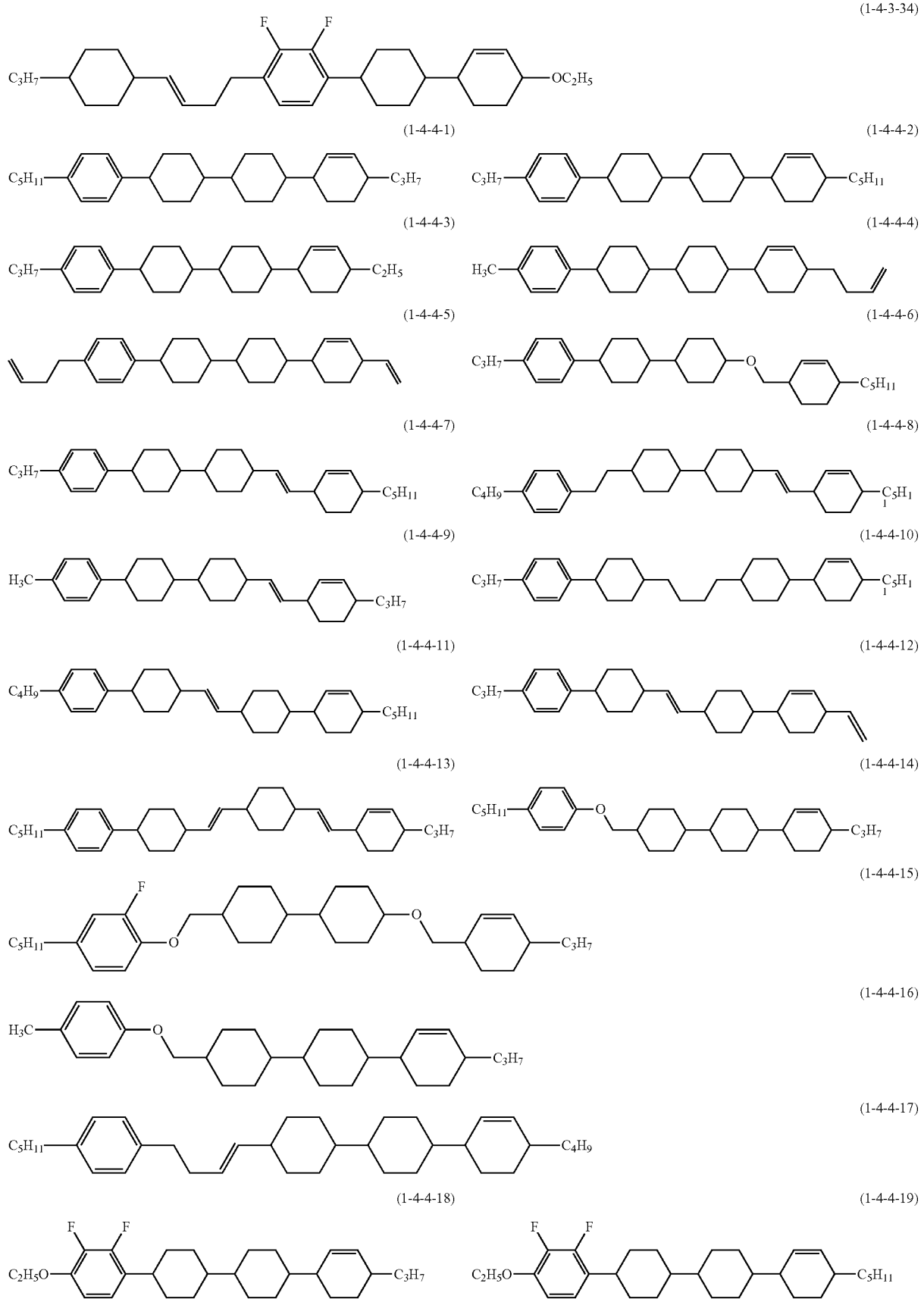

-continued
(1-4-4-20)
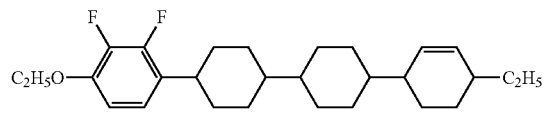
(1-4-4-21)
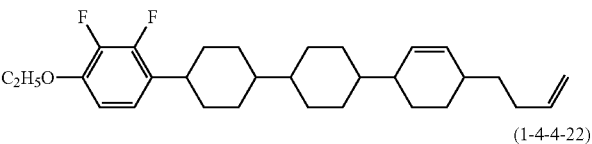
(1-4-4-22)
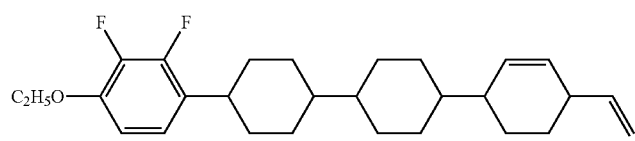
(1-4-4-23)
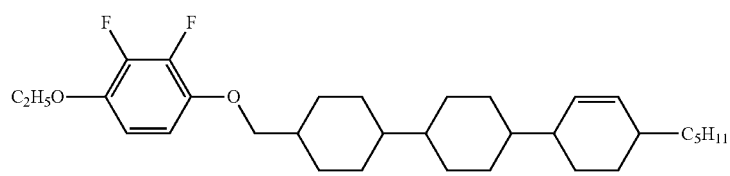
(1-4-4-24)
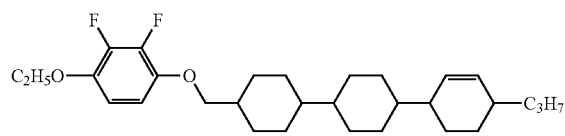
(1-4-4-25)
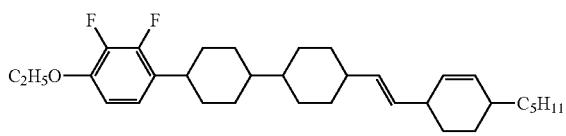
(1-4-4-26)
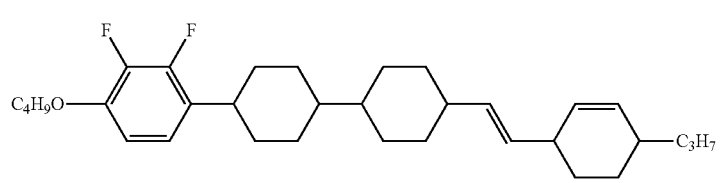
(1-4-4-27)
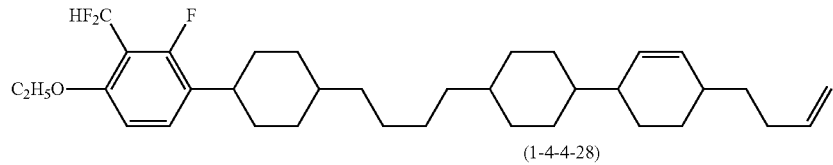
(1-4-4-28)
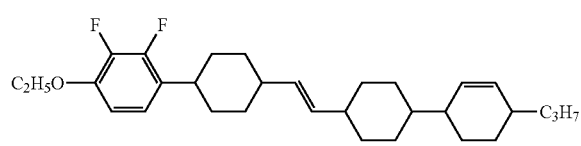
(1-4-4-29)
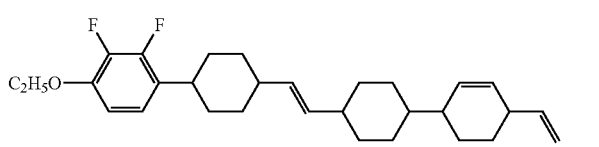
(1-4-4-30)
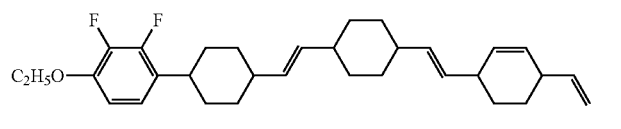
(1-4-4-31)
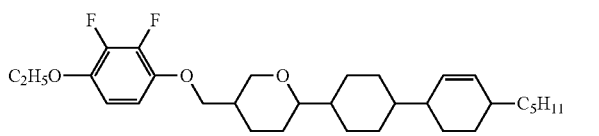
(1-4-4-32)
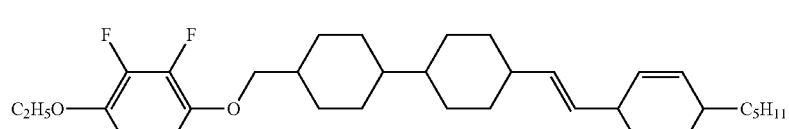
(1-4-4-33)
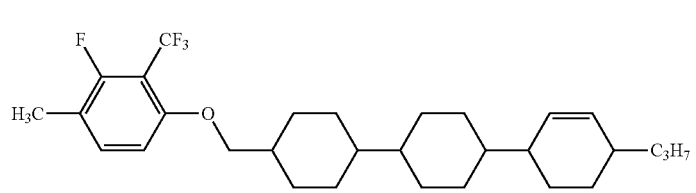

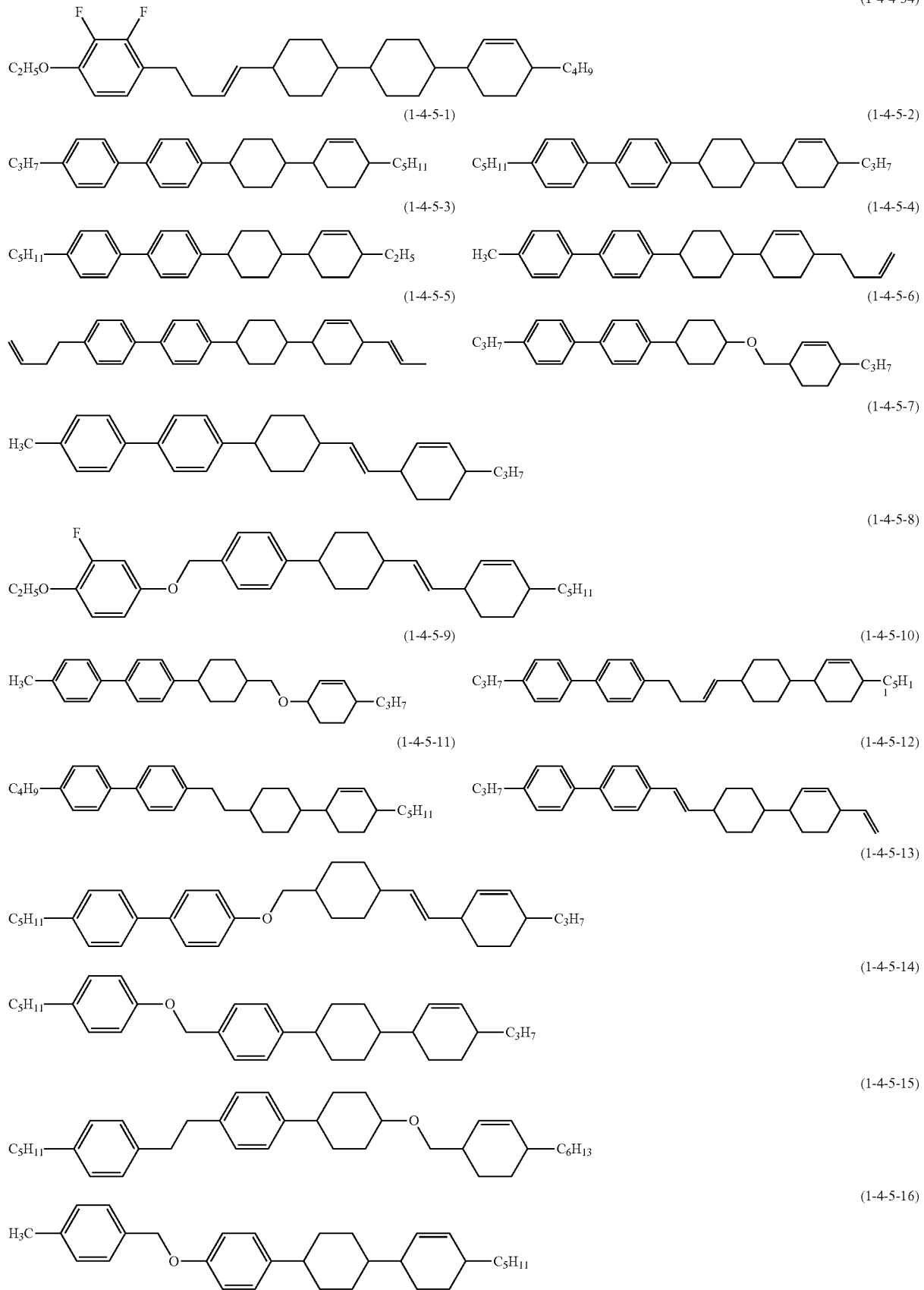

-continued
(1-4-5-17)
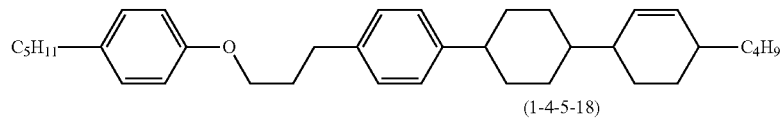
(1-4-5-18)
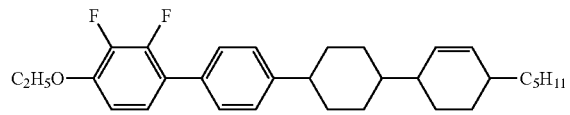
(1-4-5-19)
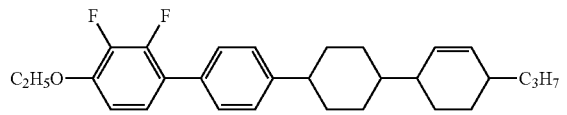
(1-4-5-20)
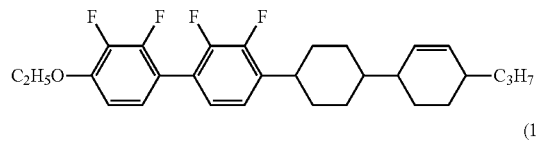
(1-4-5-21)
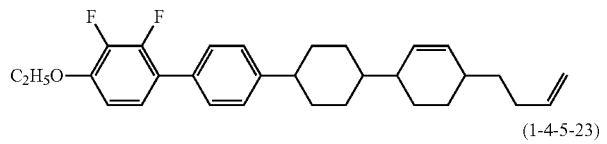
(1-4-5-22)
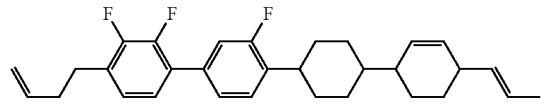
(1-4-5-23)
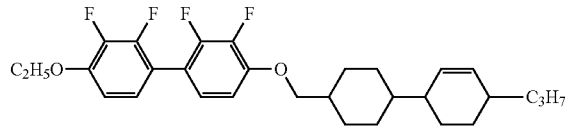
(1-4-5-24)
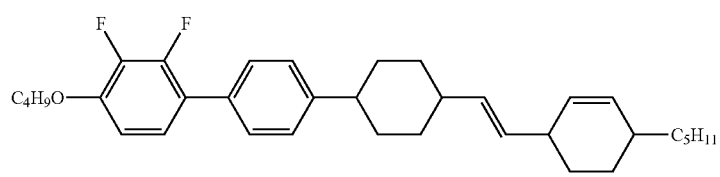
(1-4-5-25)
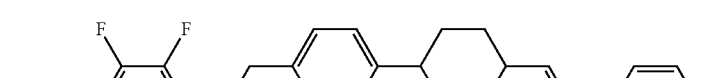
(1-4-5-26)
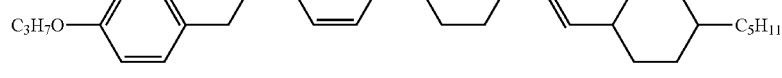
(1-4-5-27)
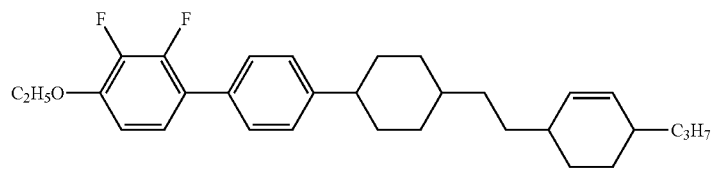
(1-4-5-28)
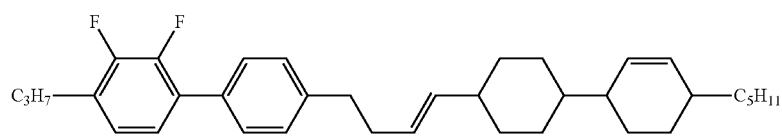
(1-4-5-29)
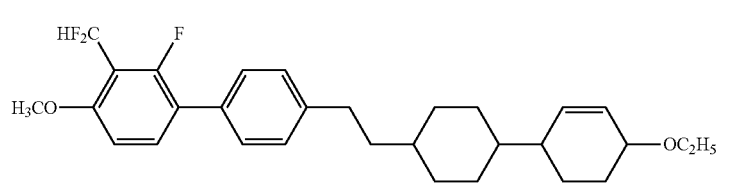
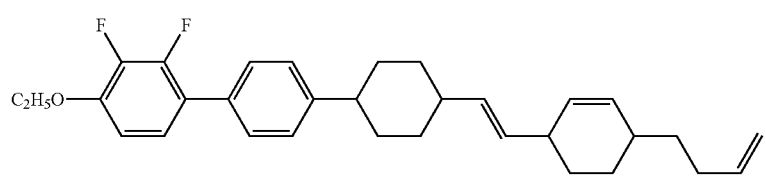

-continued
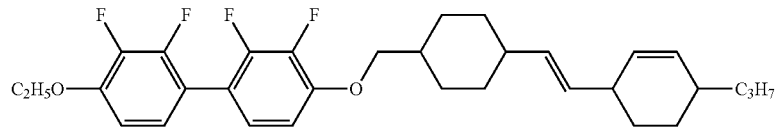 (1-4-5-30)
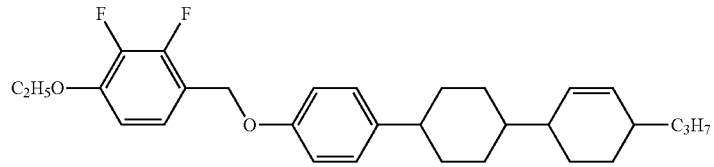 (1-4-5-31)
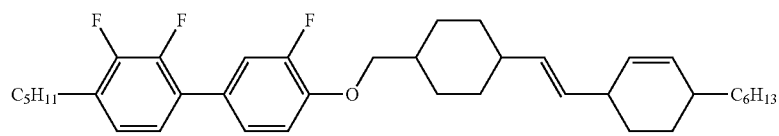 (1-4-5-32)
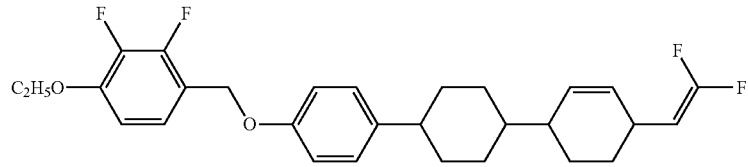 (1-4-5-33)
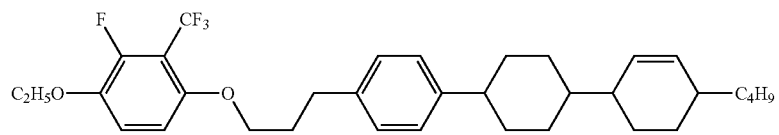 (1-4-5-34)
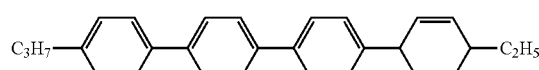 (1-4-6-1)
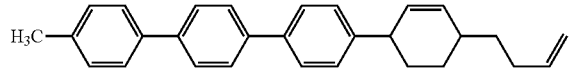 (1-4-6-2)
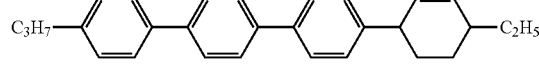 (1-4-6-3)
 (1-4-6-4)
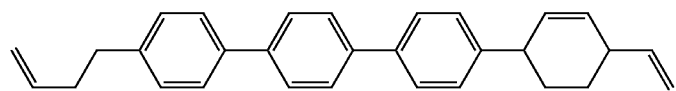 (1-4-6-5)
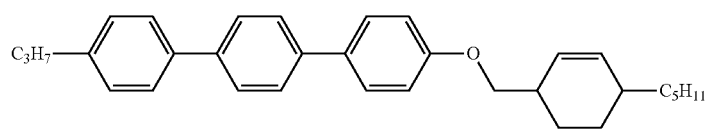 (1-4-6-6)
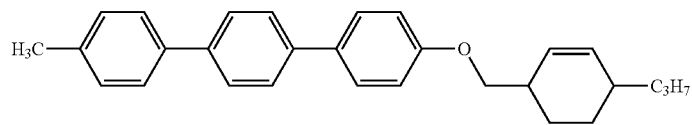 (1-4-6-7)
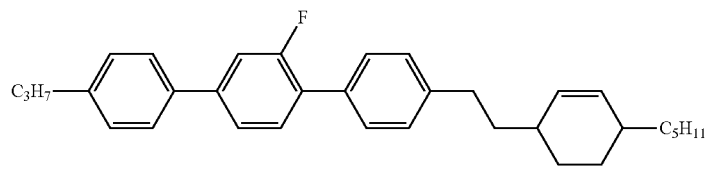 (1-4-6-8)

-continued
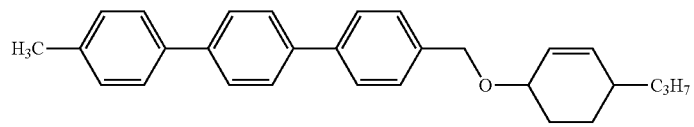
(1-4-6-9)
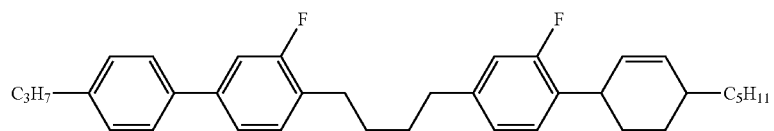
(1-4-6-10)
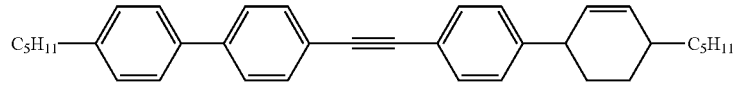
(1-4-6-11)
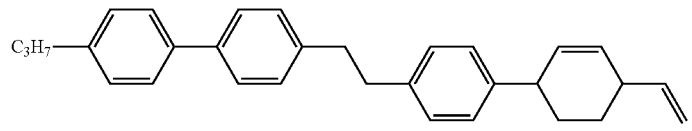
(1-4-6-12)
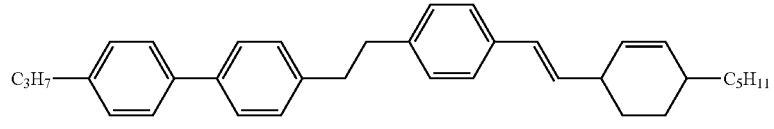
(1-4-6-13)
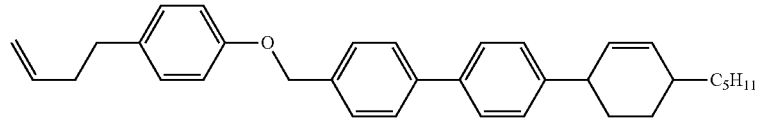
(1-4-6-14)
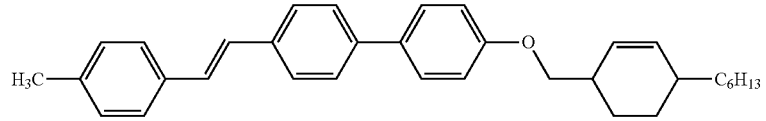
(1-4-6-15)
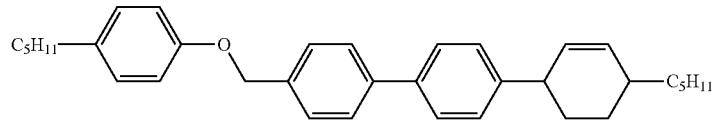
(1-4-6-16)
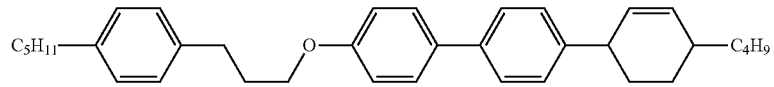
(1-4-6-17)
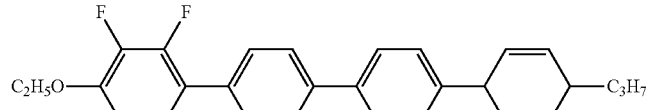
(1-4-6-18)
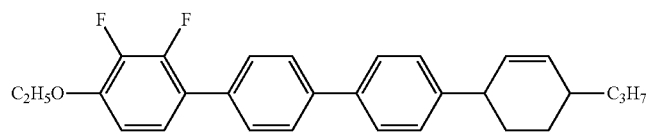
(1-4-6-19)
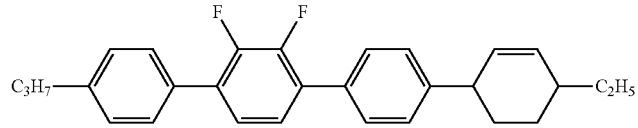
(1-4-6-20)

-continued
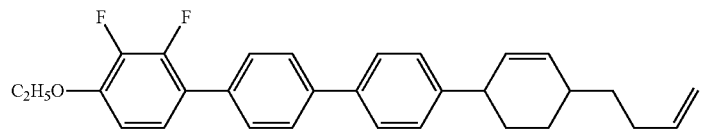
(1-4-6-21)
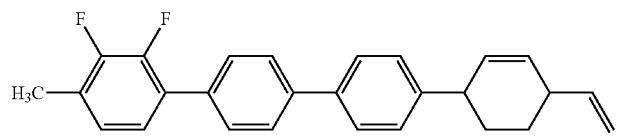
(1-4-6-22)
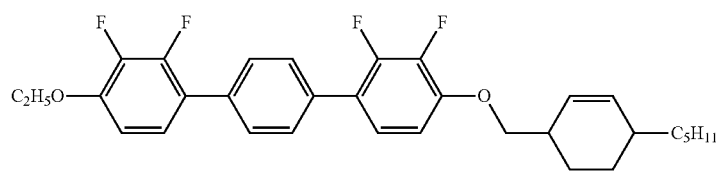
(1-4-6-23)
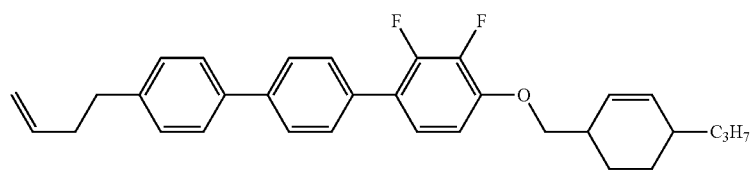
(1-4-6-24)
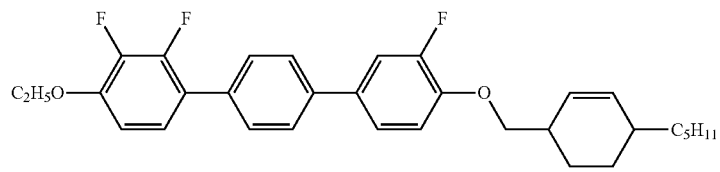
(1-4-6-25)
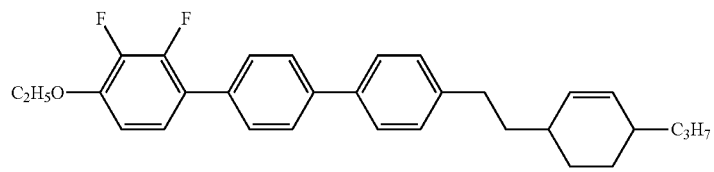
(1-4-6-26)
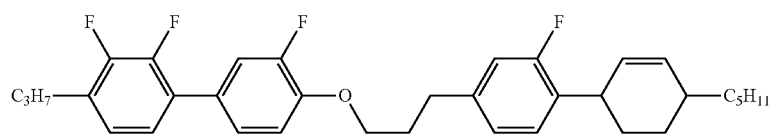
(1-4-6-27)
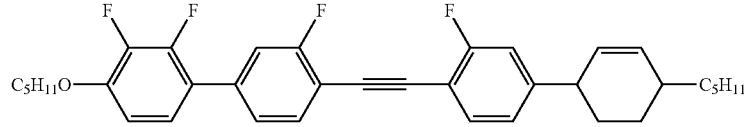
(1-4-6-28)
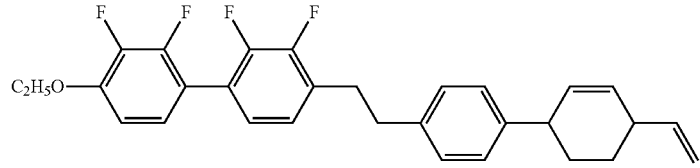
(1-4-6-29)
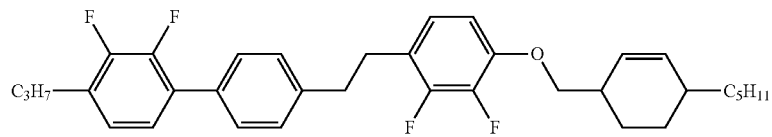
(1-4-6-30)

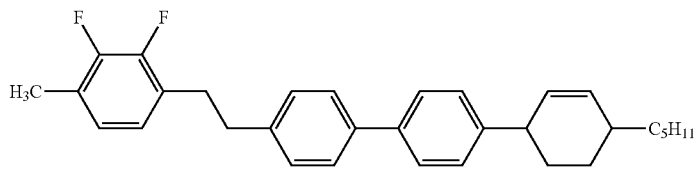
(1-4-6-31)
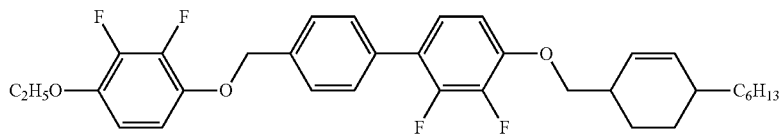
(1-4-6-32)
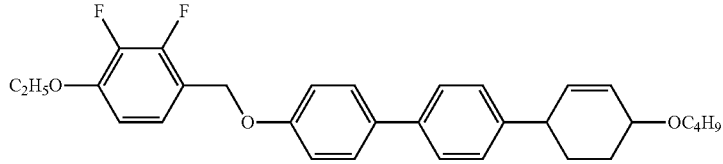
(1-4-6-33)
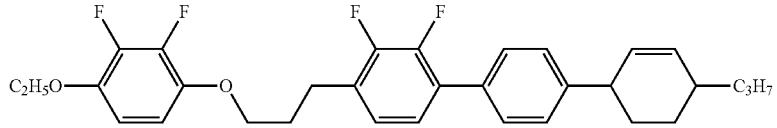
(1-4-6-34)
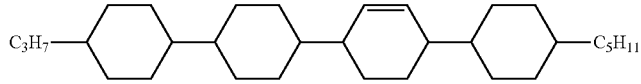
(1-5-1-1)
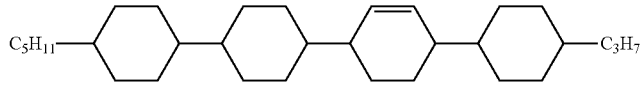
(1-5-1-2)
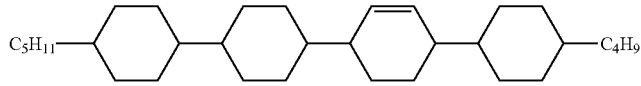
(1-5-1-3)
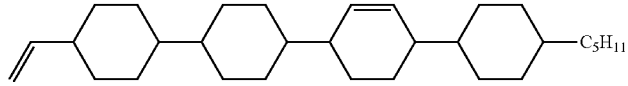
(1-5-1-4)
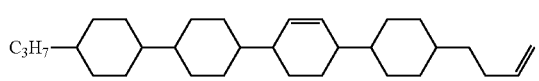
(1-5-1-5)
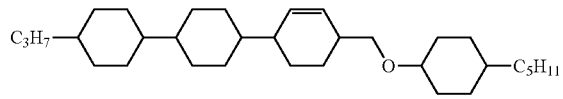
(1-5-1-6)
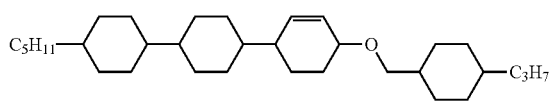
(1-5-1-7)
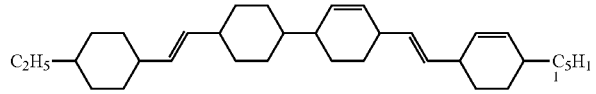
(1-5-1-8)
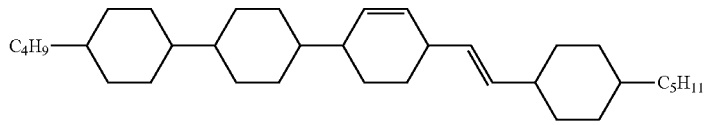
(1-5-1-9)
(1-5-1-10)

-continued
(1-5-1-11)
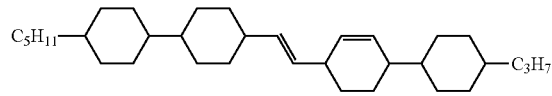
(1-5-1-12)
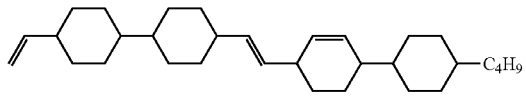
(1-5-1-13)
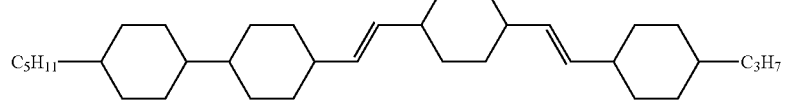
(1-5-1-14)
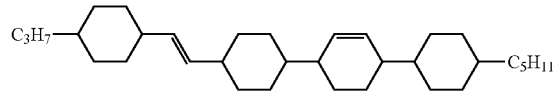
(1-5-1-15)
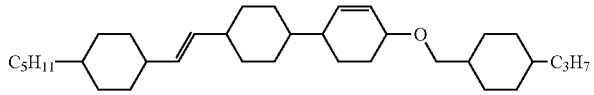
(1-5-1-16)
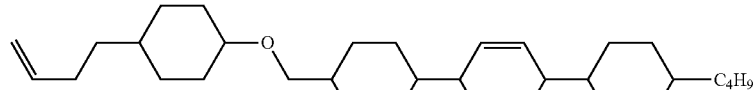
(1-5-1-17)
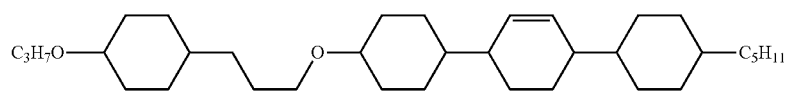
(1-5-2-1)
(1-5-2-2)
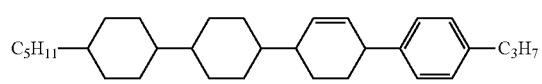
(1-5-2-3)
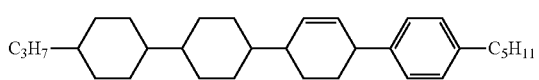
(1-5-2-4)
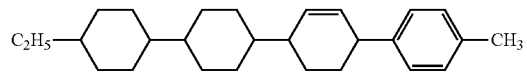
(1-5-2-5)
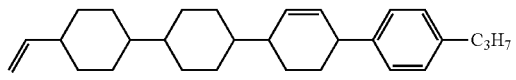
(1-5-2-6)
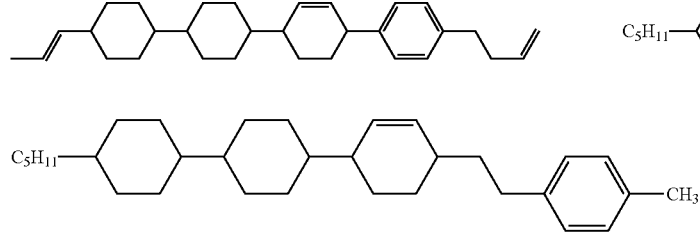
(1-5-2-7)
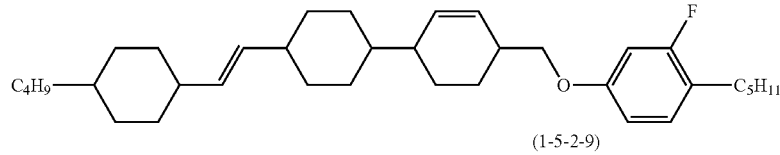
(1-5-2-8)
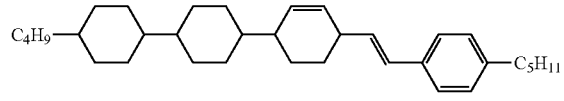
(1-5-2-9)
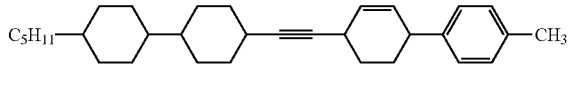
(1-5-2-10)
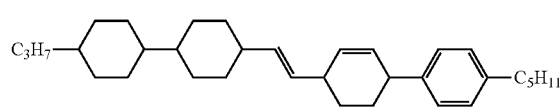
(1-5-2-11)
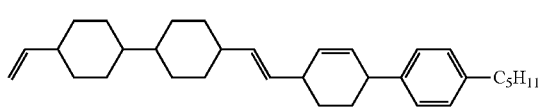
(1-5-2-12)
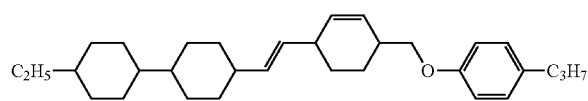
(1-5-2-13)
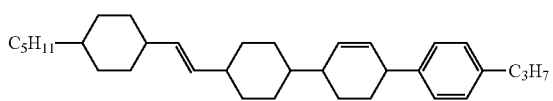

-continued
(1-5-2-15)
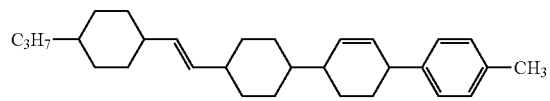
(1-5-2-16)
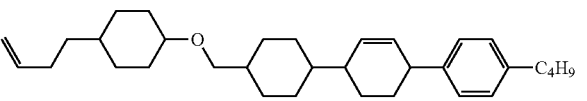
(1-5-2-17)
(1-5-2-18)
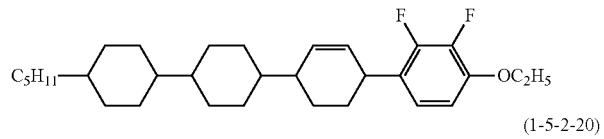
(1-5-2-19)
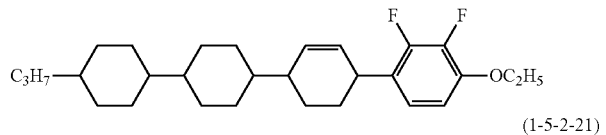
(1-5-2-20)
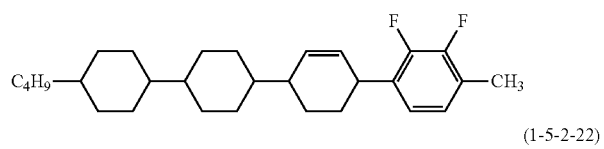
(1-5-2-21)
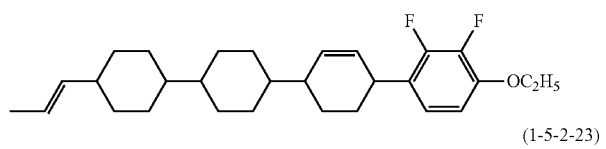
(1-5-2-22)
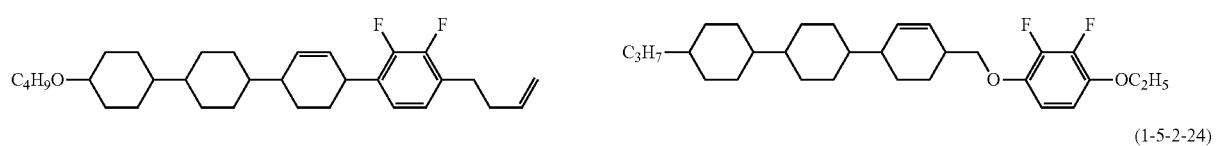
(1-5-2-23)
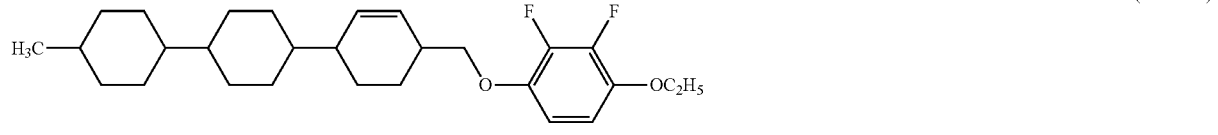
(1-5-2-24)
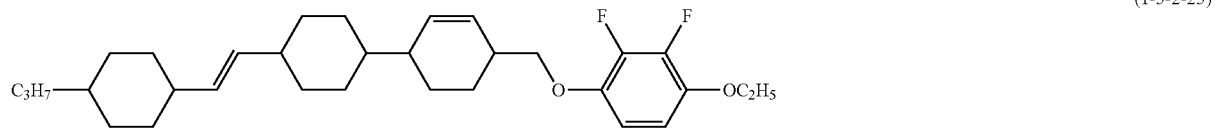
(1-5-2-25)
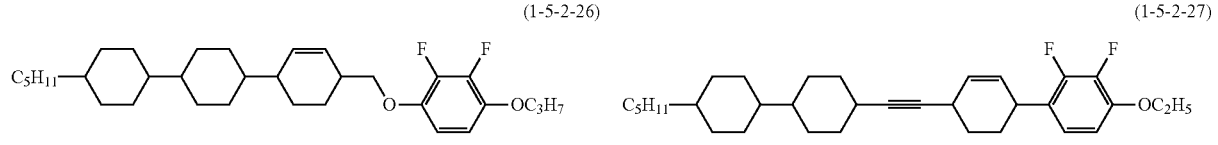
(1-5-2-26)
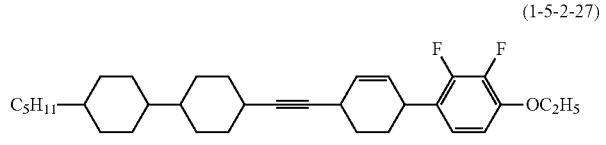
(1-5-2-27)
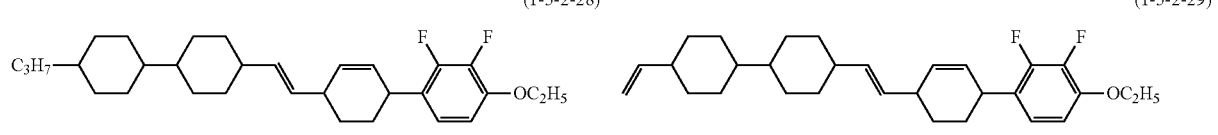
(1-5-2-28)
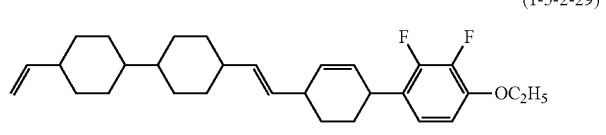
(1-5-2-29)
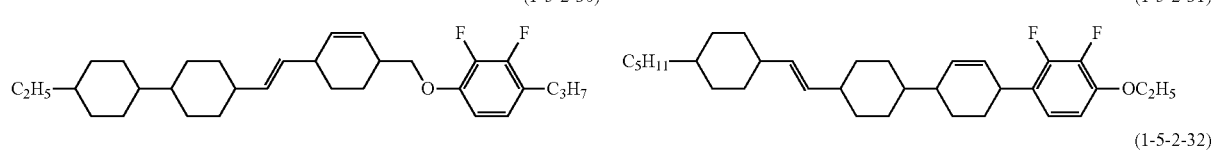
(1-5-2-30)
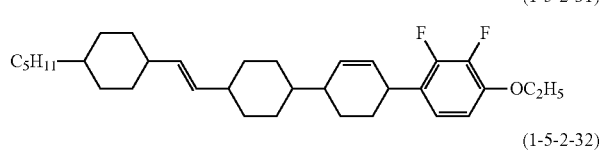
(1-5-2-31)
(1-5-2-32)
(1-5-2-33)
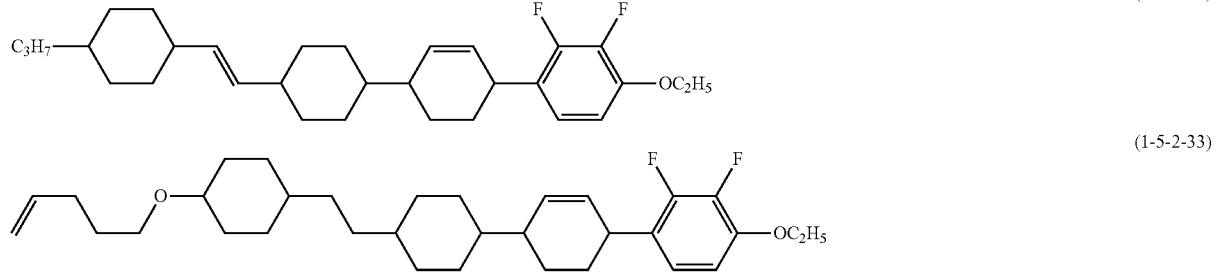

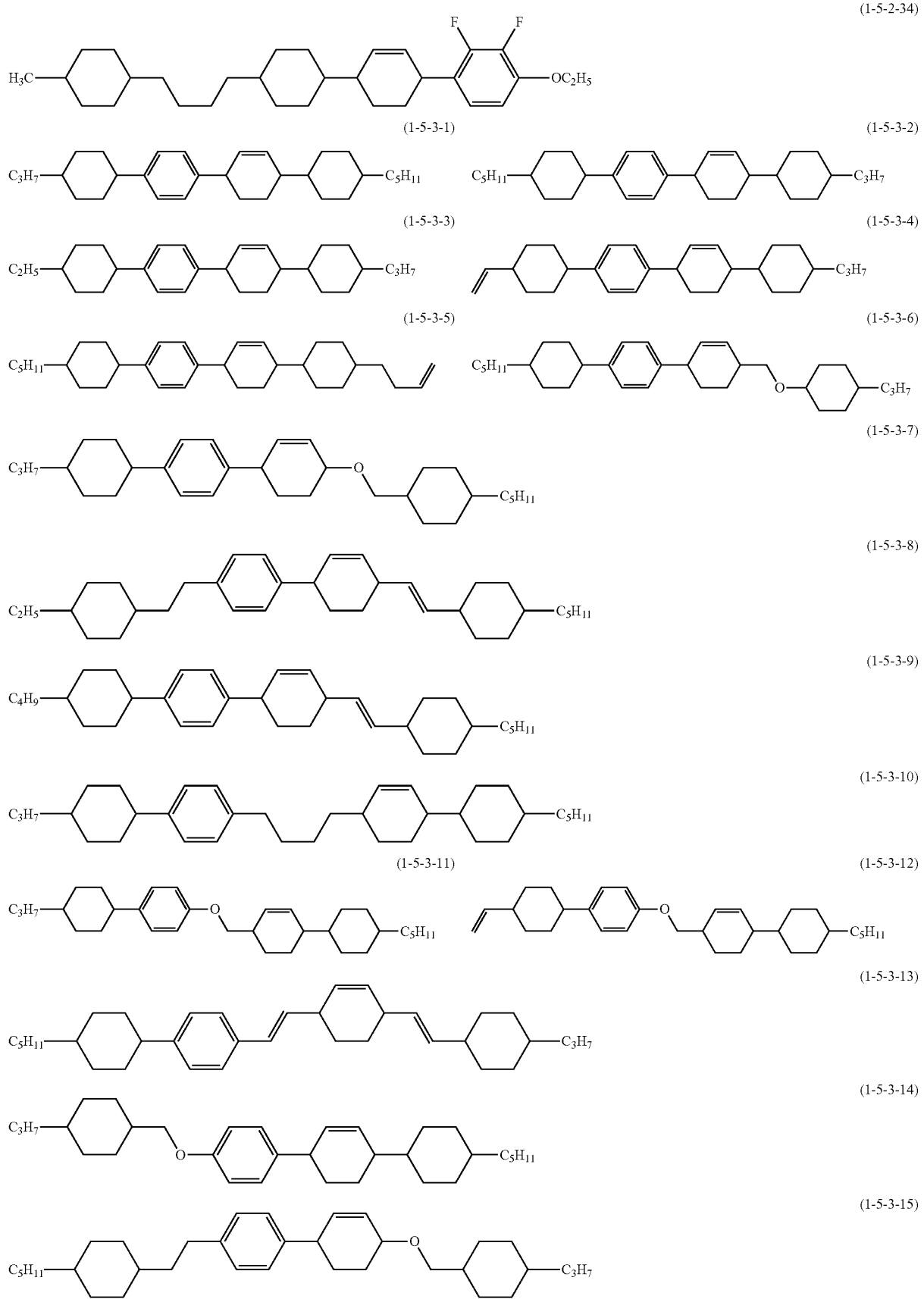

(1-5-3-16)
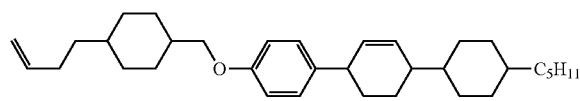
(1-5-3-17)
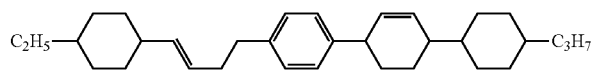
(1-5-3-18)
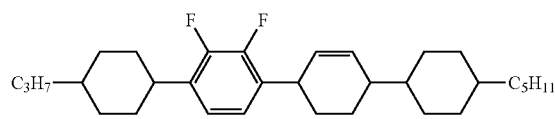
(1-5-3-19)
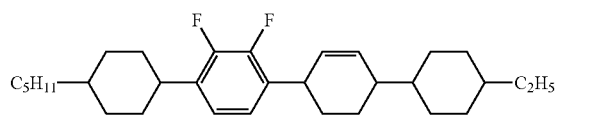
(1-5-3-20)
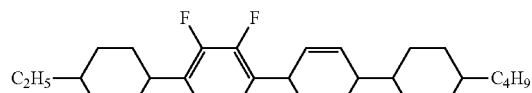
(1-5-3-21)
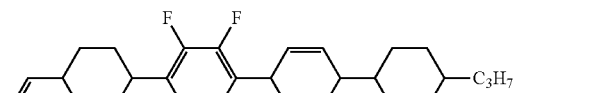
(1-5-3-22)
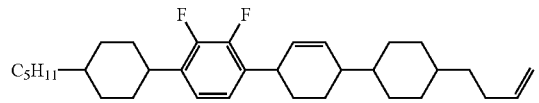
(1-5-3-23)
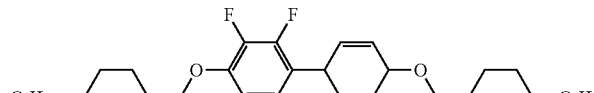
(1-5-3-24)
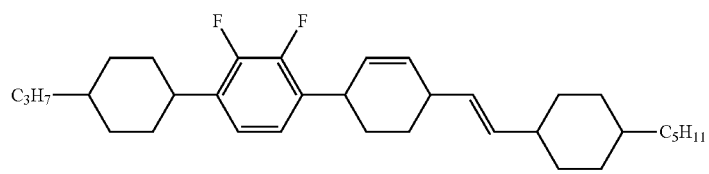
(1-5-3-25)
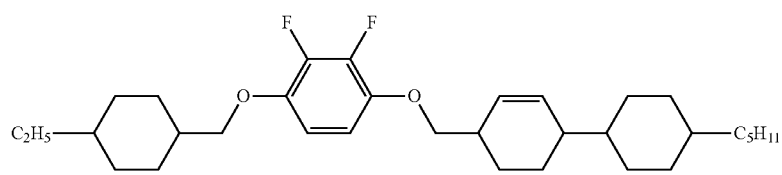
(1-5-3-26)
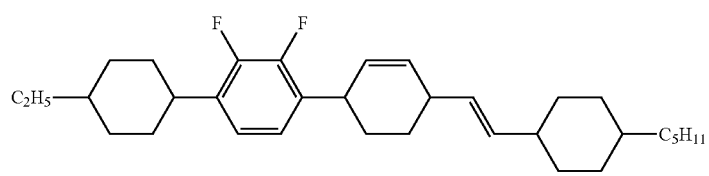
(1-5-3-27)
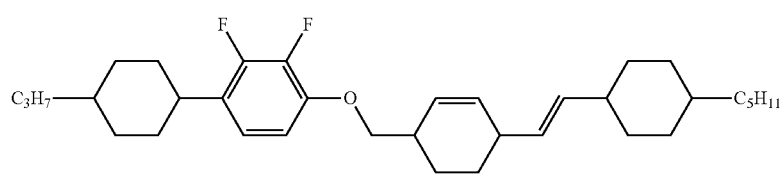
(1-5-3-28)
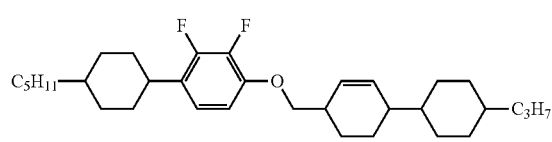
(1-5-3-29)
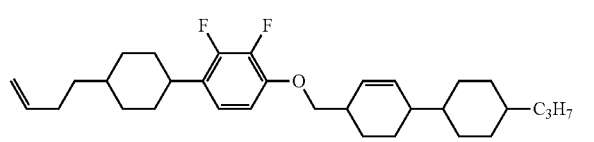
(1-5-3-30)
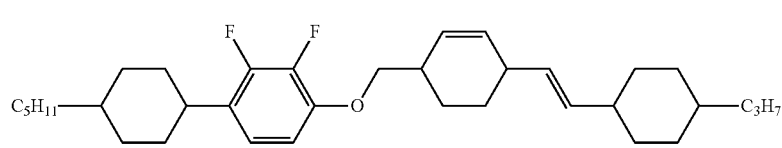

-continued
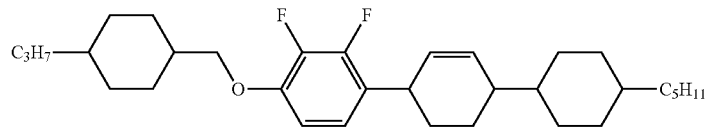
(1-5-3-31)
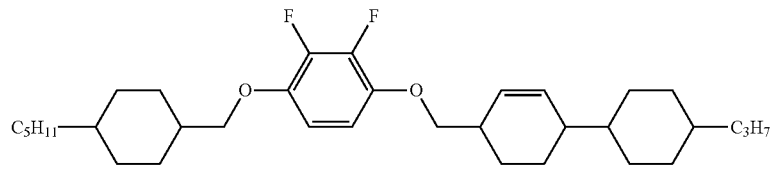
(1-5-3-32)
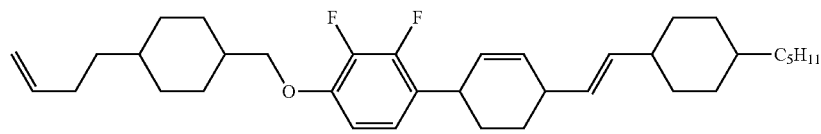
(1-5-3-33)
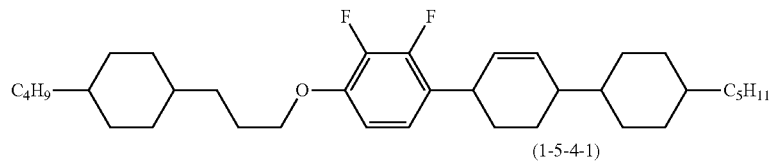
(1-5-3-34)
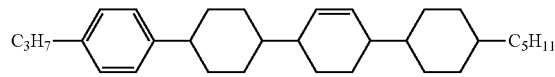
(1-5-4-1)
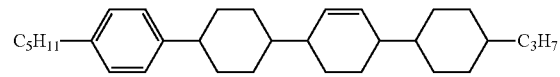
(1-5-4-2)
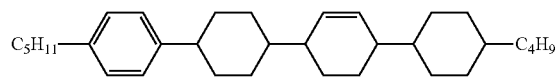
(1-5-4-3)
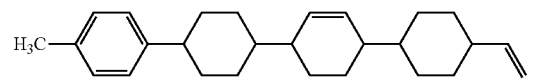
(1-5-4-4)
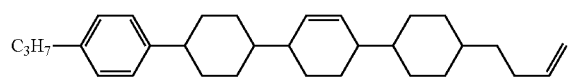
(1-5-4-5)
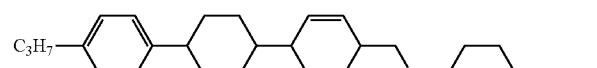
(1-5-4-6)
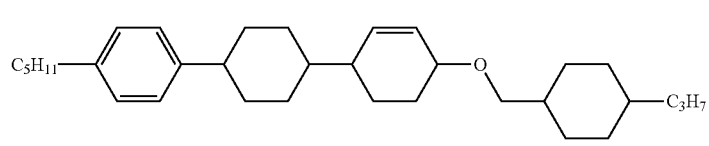
(1-5-4-7)
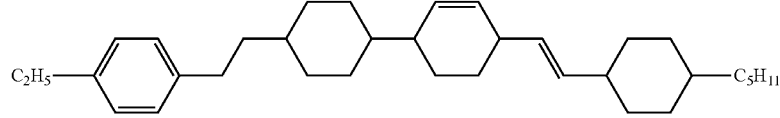
(1-5-4-8)
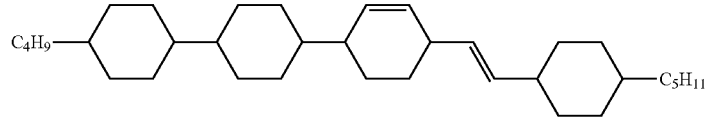
(1-5-4-9)
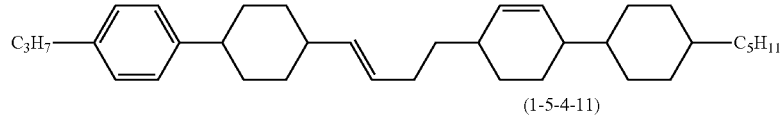
(1-5-4-10)
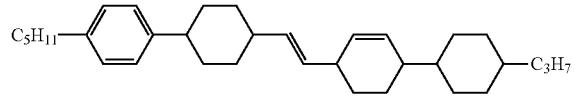
(1-5-4-11)
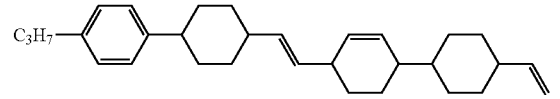
(1-5-4-12)

-continued
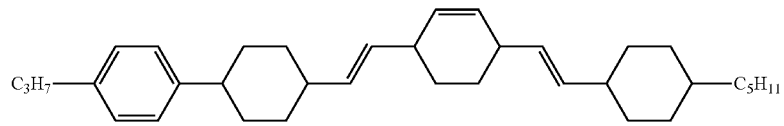
(1-5-4-13)
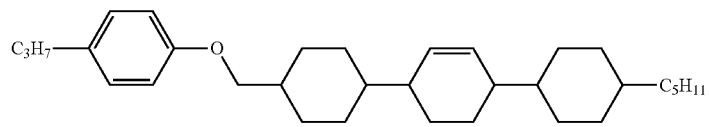
(1-5-4-14)
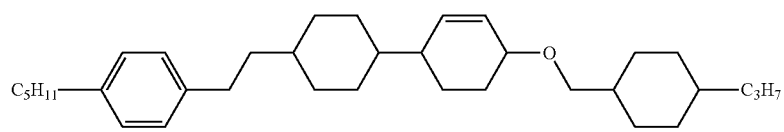
(1-5-4-15)
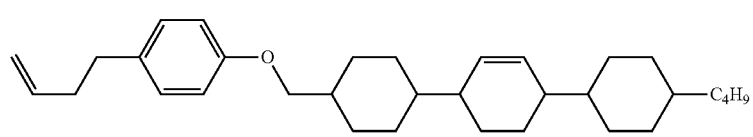
(1-5-4-16)
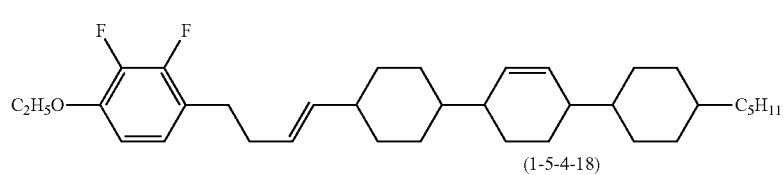
(1-5-4-17)
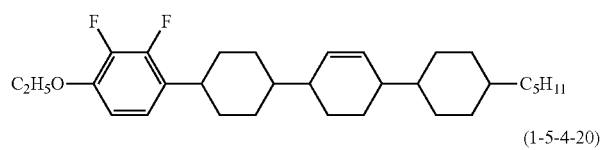
(1-5-4-18)
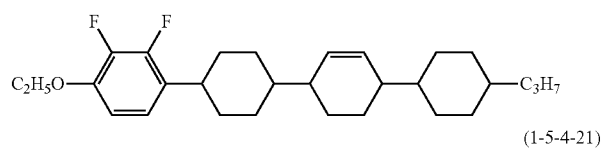
(1-5-4-19)
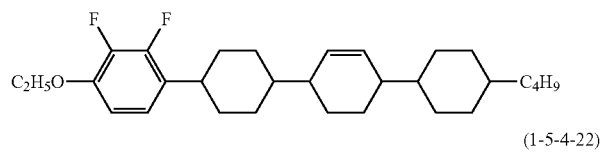
(1-5-4-20)
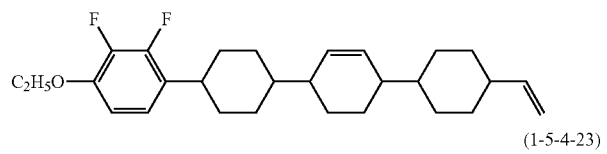
(1-5-4-21)
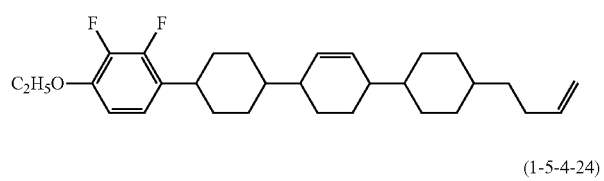
(1-5-4-22)
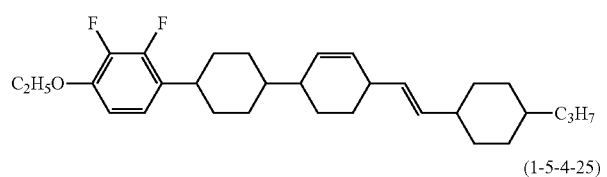
(1-5-4-23)
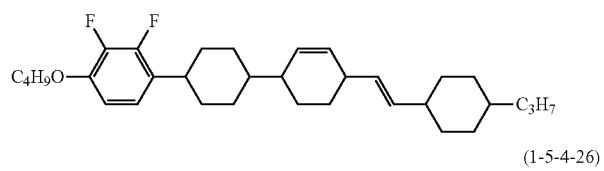
(1-5-4-24)
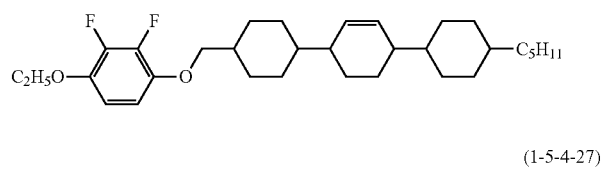
(1-5-4-25)
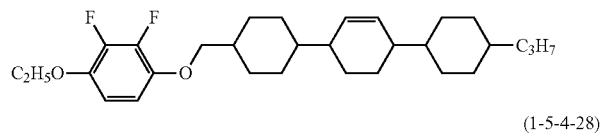
(1-5-4-26)
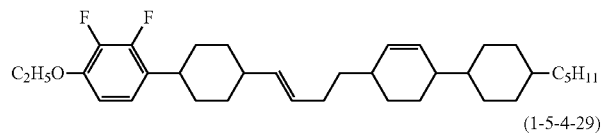
(1-5-4-27)
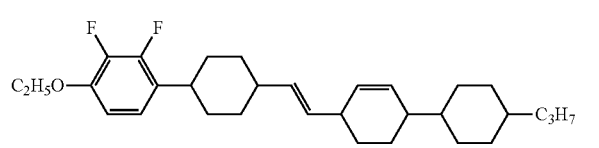
(1-5-4-28)
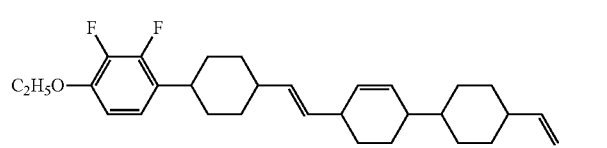
(1-5-4-29)

-continued
(1-5-4-30)
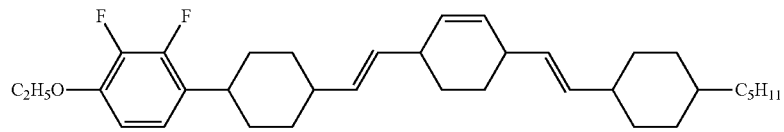
(1-5-4-31)
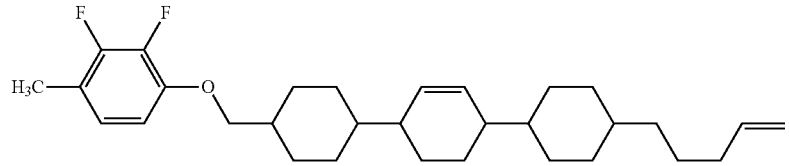
(1-5-4-32)
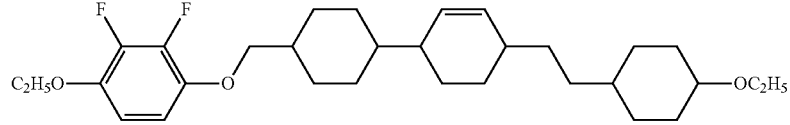
(1-5-4-33)
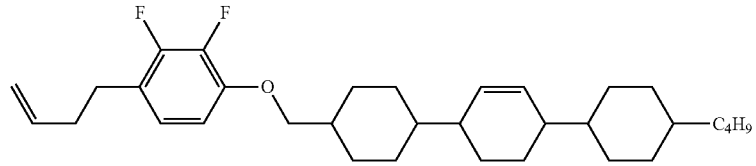
(1-5-4-34)
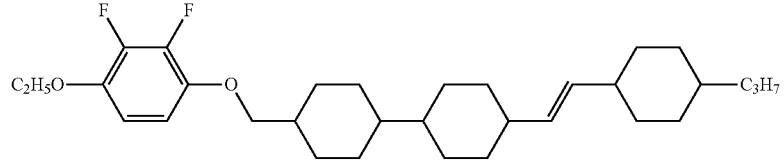
(1-5-5-1)
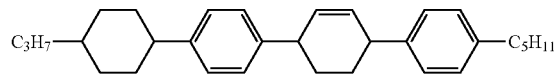
(1-5-5-2)
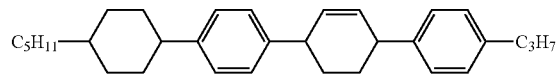
(1-5-5-3)
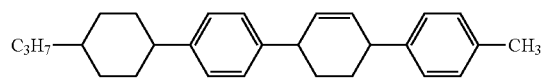
(1-5-5-4)
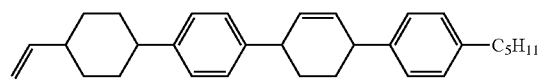
(1-5-5-5)
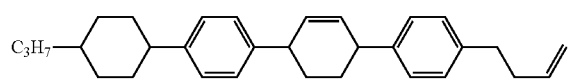
(1-5-5-6)
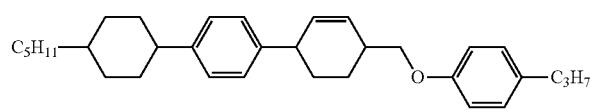
(1-5-5-7)
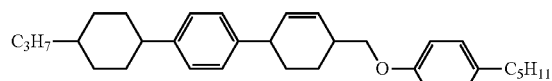
(1-5-5-8)
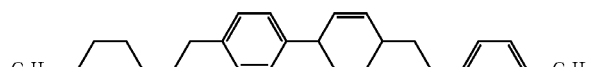
(1-5-5-9)
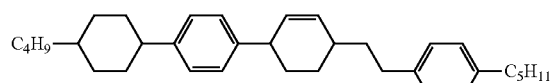
(1-5-5-10)
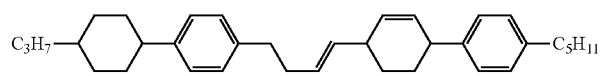
(1-5-5-11)
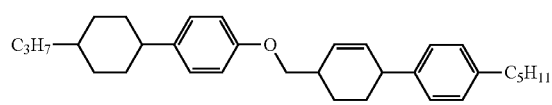
(1-5-5-12)
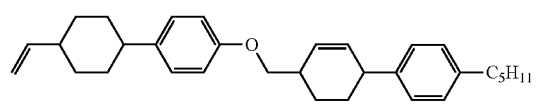

-continued
(1-5-5-13)
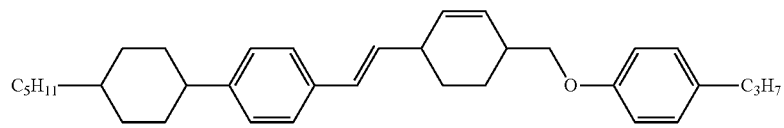
(1-5-5-14)
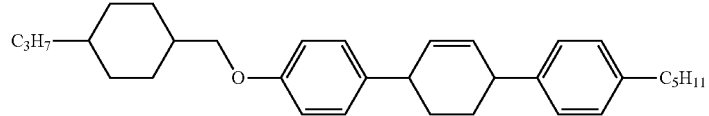
(1-5-5-15)
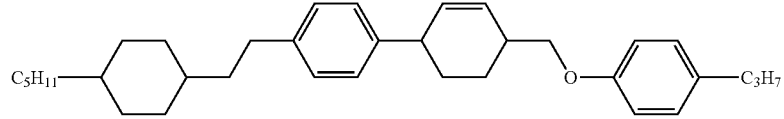
(1-5-5-16)
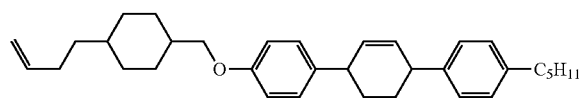
(1-5-5-17)
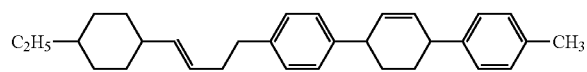
(1-5-5-18)
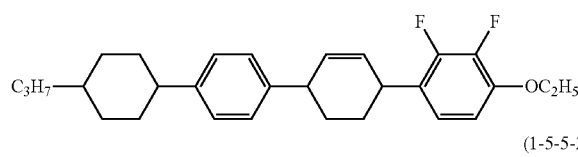
(1-5-5-19)
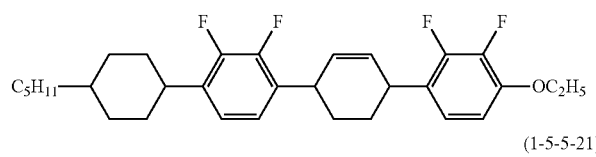
(1-5-5-20)
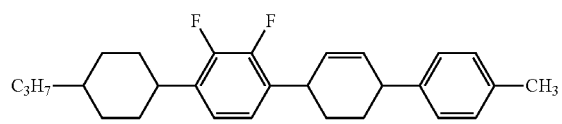
(1-5-5-21)
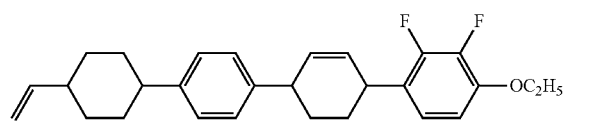
(1-5-5-22)
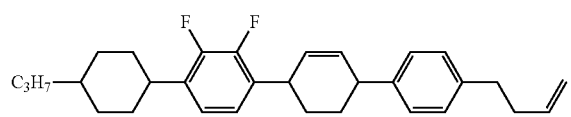
(1-5-5-23)
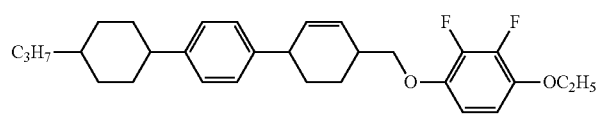
(1-5-5-24)
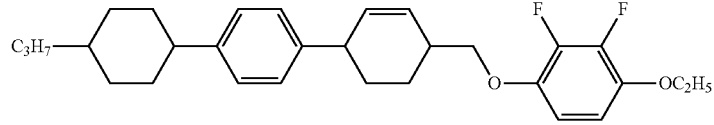
(1-5-5-25)
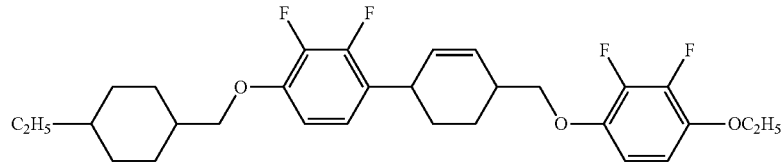
(1-5-5-26)
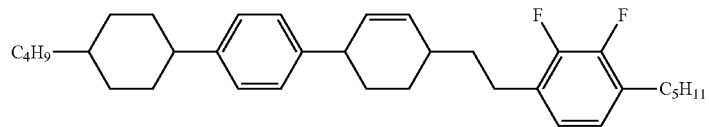
(1-5-5-27)
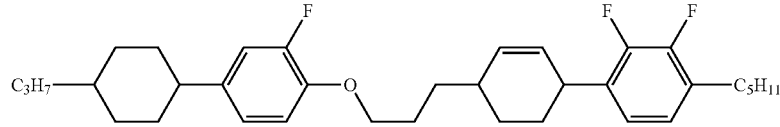

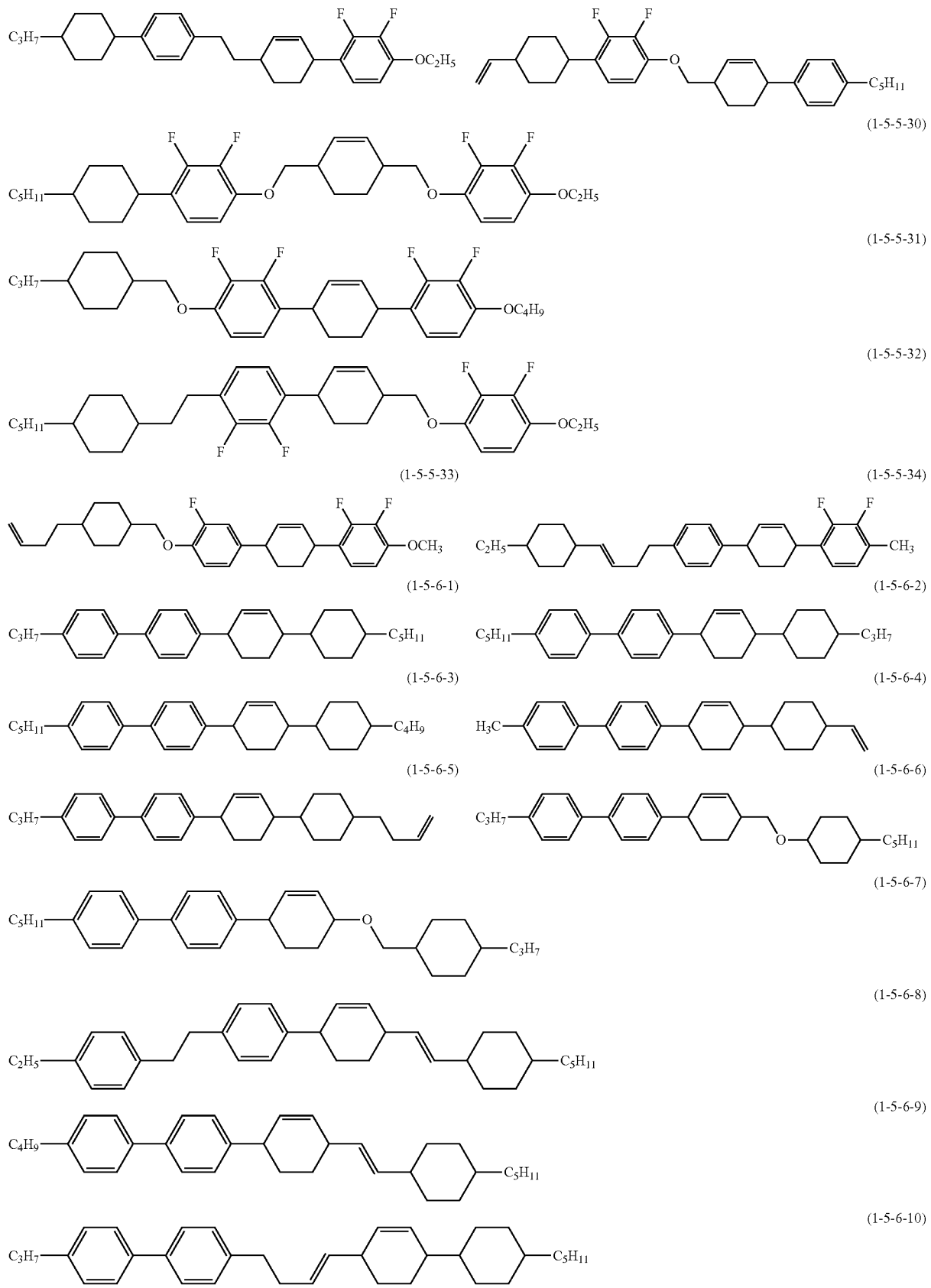

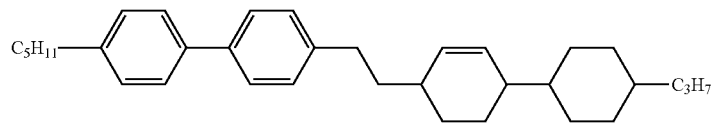 (1-5-6-11)
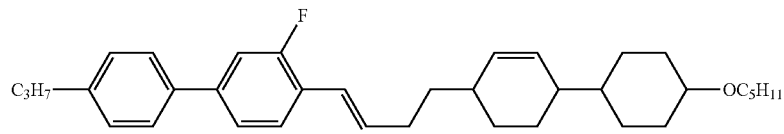 (1-5-6-12)
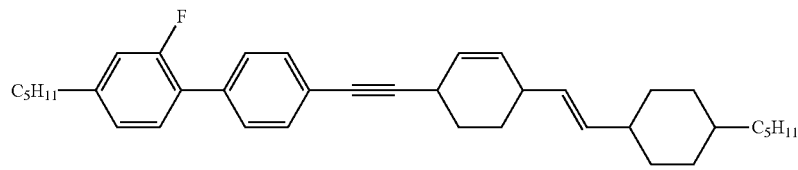 (1-5-6-13)
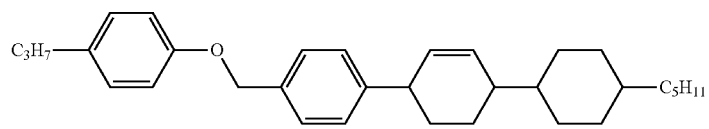 (1-5-6-14)
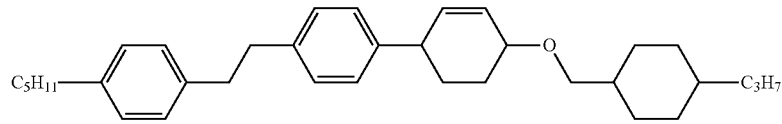 (1-5-6-15)
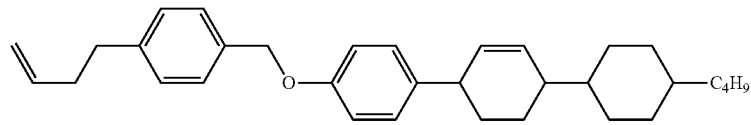 (1-5-6-16)
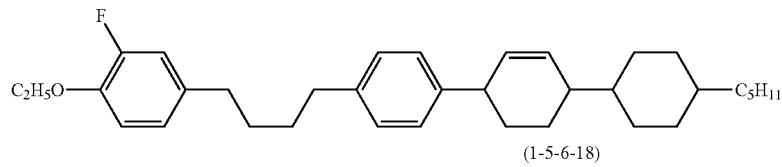 (1-5-6-17)
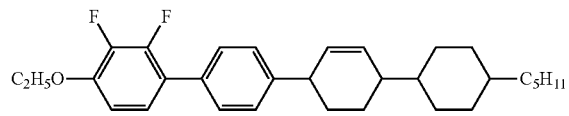 (1-5-6-18)
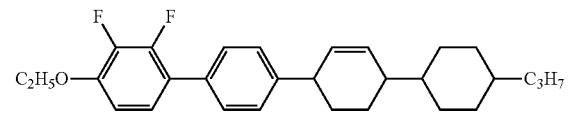 (1-5-6-19)
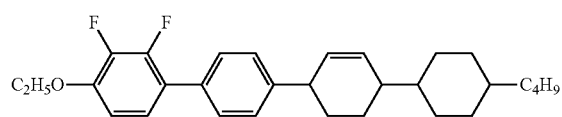 (1-5-6-20)
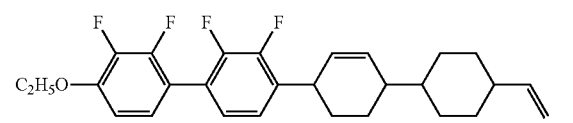 (1-5-6-21)
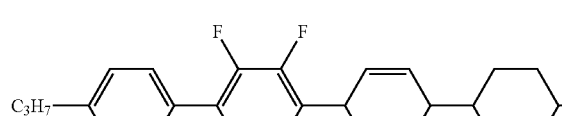 (1-5-6-22)
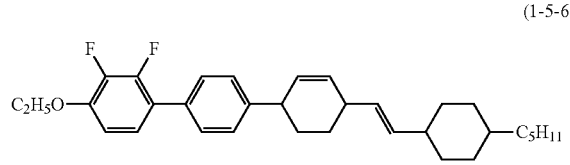 (1-5-6-23)
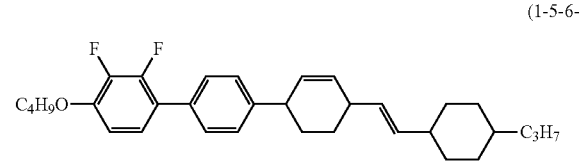 (1-5-6-24)

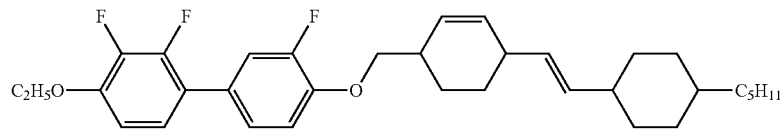
(1-5-6-25)
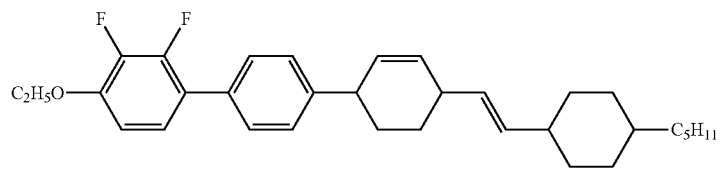
(1-5-6-26)
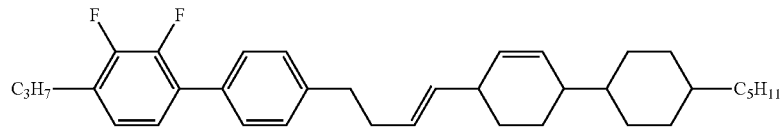
(1-5-6-27)
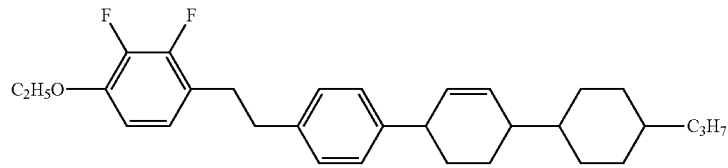
(1-5-6-28)
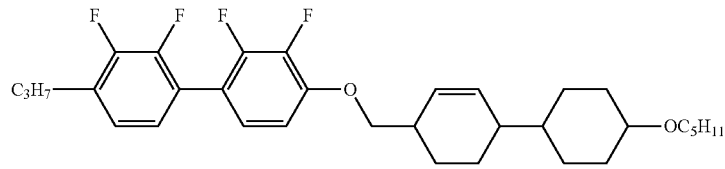
(1-5-6-29)
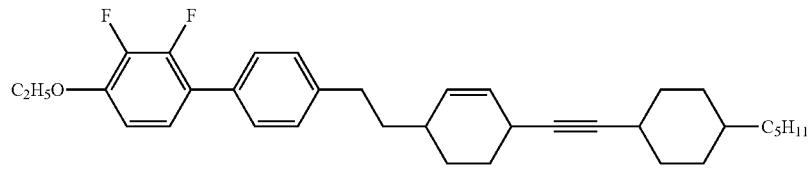
(1-5-6-30)
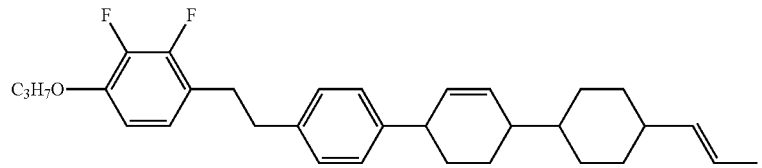
(1-5-6-31)
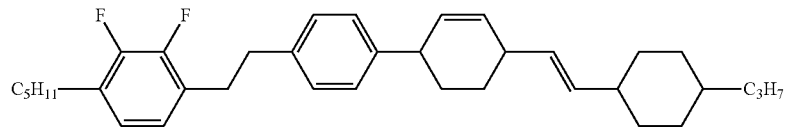
(1-5-6-32)
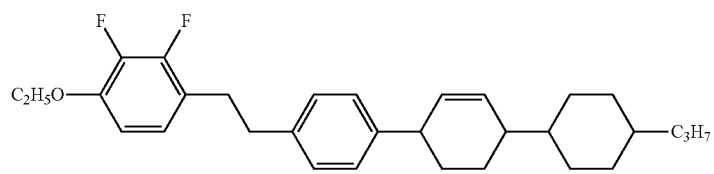
(1-5-6-33)
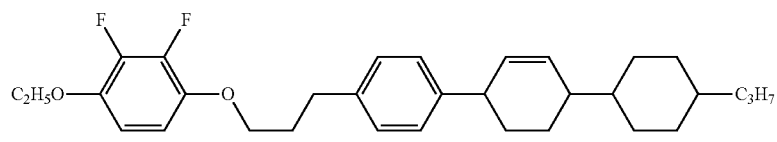
(1-5-6-34)

-continued
(1-5-7-1)
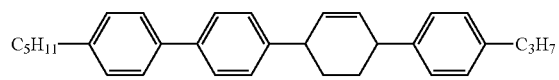
(1-5-7-2)
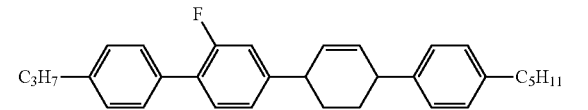
(1-5-7-3)
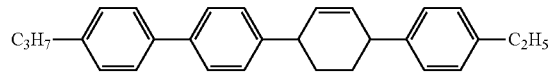
(1-5-7-4)
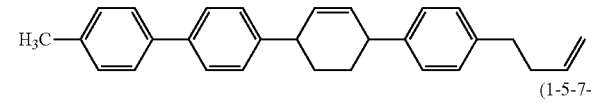
(1-5-7-5)
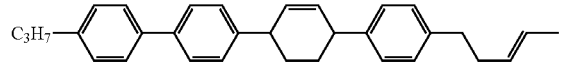
(1-5-7-6)
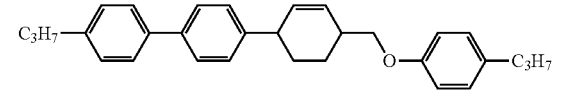
(1-5-7-7)
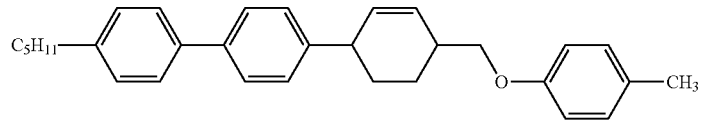
(1-5-7-8)
(1-5-7-9)
(1-5-7-10)
(1-5-7-11)
(1-5-7-12)
(1-5-7-13)
(1-5-7-14)
(1-5-7-15)

-continued
(1-5-7-16)
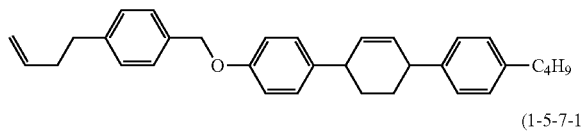
(1-5-7-17)
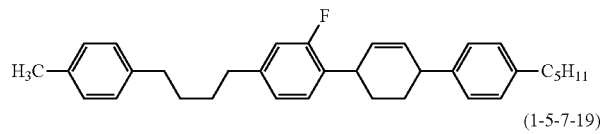
(1-5-7-18)
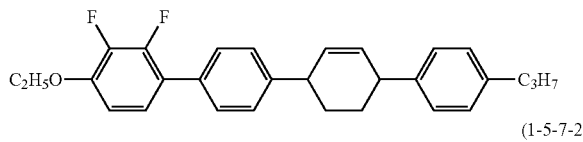
(1-5-7-19)
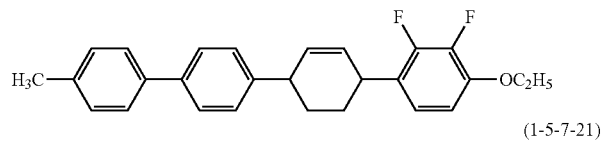
(1-5-7-20)
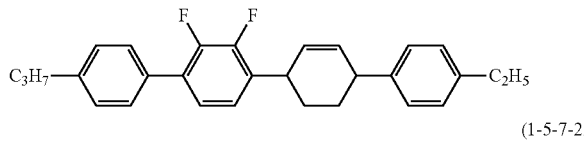
(1-5-7-21)
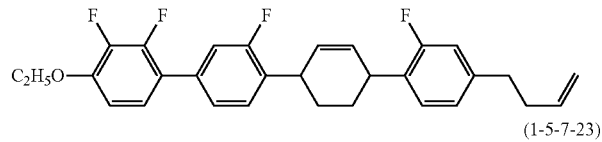
(1-5-7-22)
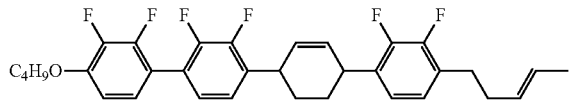
(1-5-7-23)
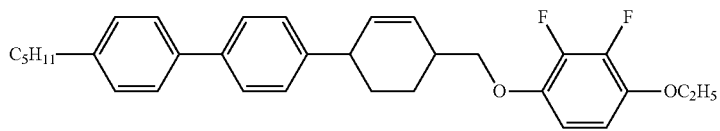
(1-5-7-24)
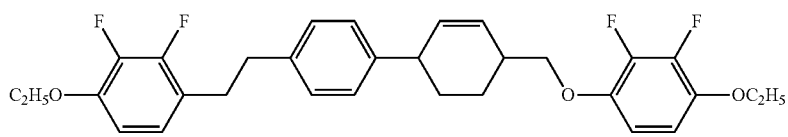
(1-5-7-25)
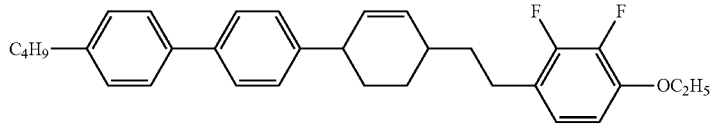
(1-5-7-26)
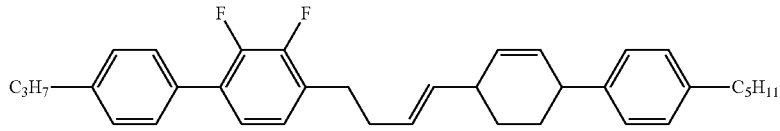
(1-5-7-27)
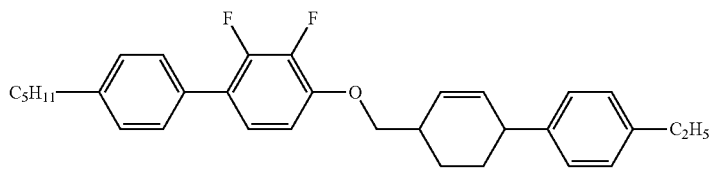
(1-5-7-28)
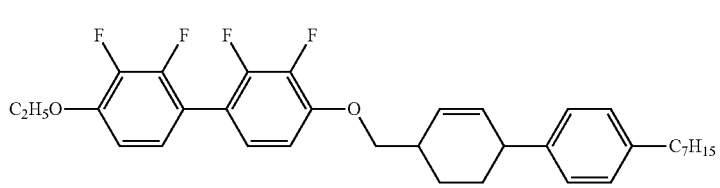
(1-5-7-29)
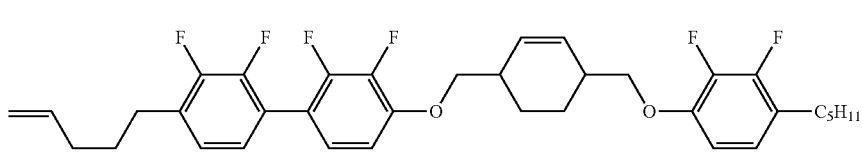
(1-5-7-30)

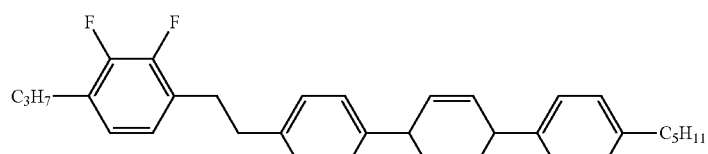
(1-5-7-31)

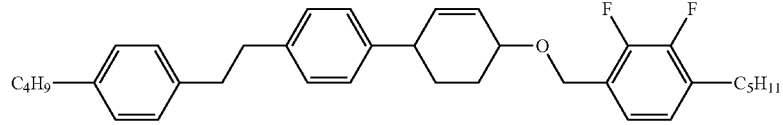
(1-5-7-32)

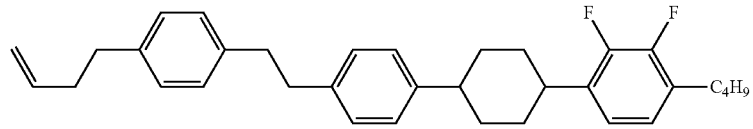
(1-5-7-33)

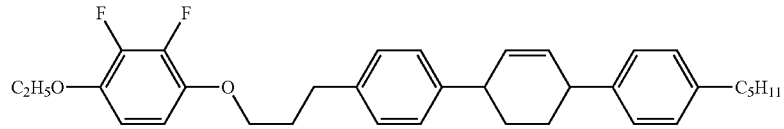
(1-5-7-34)

Examples of Liquid Crystal Compositions

Hereinafter, liquid crystal compositions obtained according to the invention will be explained in detail by way of Examples. The liquid crystal compounds used in Examples are described using symbols based on definitions in the Table below. In addition, a configuration of 1,4-cyclohexylene in the Table is trans. Unless otherwise noted, each ratio (percentage) of compounds is expressed in terms of weight percent (% by weight) based on the total weight of a liquid crystal composition. Values of characteristics of the liquid crystal composition obtained are shown in the last part of each Example.

A method for description of compounds using symbols is shown below. In addition, the number as described in a part of the liquid crystal compound used in each Example corresponds to the number of compound of components A to E described above. When a symbol "-" is simply described without describing the number of compound, the symbol means that the compound is any other compound that does not correspond to the components.

Table Method for Description of Compounds using Symbols
R—(A$_1$)—Z$_1$— ... —Z$_n$—(A$_n$)—R'

| | Symbols |
|---|---|
| 1) Left-terminal Group R— | |
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF— |
| CF$_2$=CH—C$_n$H$_{2n}$— | VFFn- |
| 2) Right-terminal Group —R' | |
| —C$_n$H$_{2n+1}$ | -n |
| —OC$_n$H$_{2n+1}$ | —On |

-continued

Table Method for Description of Compounds using Symbols
R—(A$_1$)—Z$_1$— ... —Z$_n$—(A$_n$)—R'

| | |
|---|---|
| —CH=CH$_2$ | —V |
| —CH=CH—C$_n$H$_{2n+1}$ | —Vn |
| —C$_n$H$_{2n}$—CH=CH$_2$ | -nV |
| —C$_m$H$_{2m}$—CH=CH—C$_n$H$_{2n+1}$ | -mVn |
| —CH=CF$_2$ | -VFF |
| —COOCH$_3$ | -EMe |
| —F | —F |
| —Cl | —CL |
| —CN | —C |
| —OCF$_3$ | —OCF3 |
| 3) Bonding Group —Z$_n$— | |
| —C$_n$H$_{2n}$— | n |
| —COO— | E |
| —CH=CH— | V |
| —CH$_2$O— | 10 |
| —OCH$_2$— | 01 |
| —CF$_2$O— | X |
| —C≡C— | T |
| 4) Ring Structure —A$_n$— | |
| 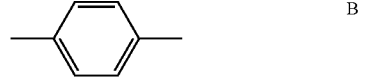 | B |
| 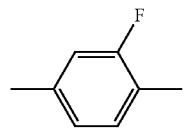 | B (F) |
| 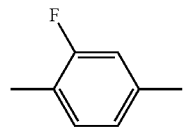 | B (2F) |

| Table Method for Description of Compounds using Symbols R—(A₁)—Z₁— ... —Zₙ—(Aₙ)—R' | |
|---|---|
| 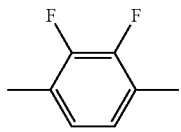 | B (2F,3F) |
| 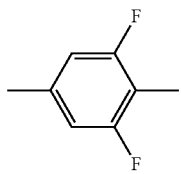 | B (F,F) |
| 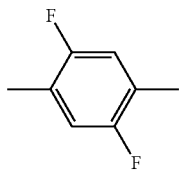 | B (2F,5F) |
| 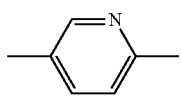 | Pr |
| 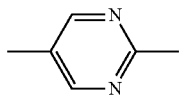 | Py |
| 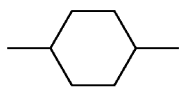 | H |
| 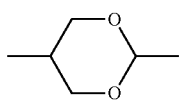 | G |
| 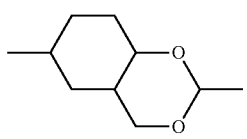 | Gd |
|  | Cx |
| 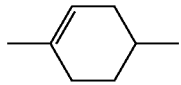 | Ch |

5) Examples of Description
Example 1 3-HCx-5

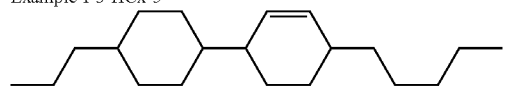

Example 2 4-HHCx-5

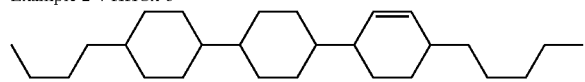

Example 3 5-HBB(F)B-3

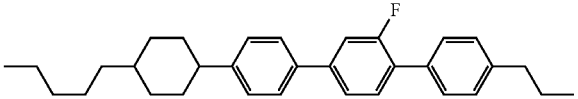 [SMILES: CCCCCC1CCC(c2ccc(-c3ccc(-c4ccc(CCC)cc4)c(F)c3)cc2)CC1]

Example 4 3-HH-4

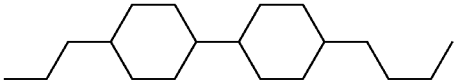 [SMILES: CCCCC1CCC(C2CCC(CCC)CC2)CC1]

Values of characteristics were determined according to methods as described below. Most of the measuring methods are described in EIAJ ED-2521A of the Standard of Electronic Industries Association of Japan, or modified thereon.

(1) Maximum Temperature of a Nematic Phase (NI; ° C.)

A sample was placed on a hot plate of a melting point apparatus equipped with a polarizing microscope, and heated at a rate of 1° C. per minute. Temperature when part of the sample changed from the nematic phase to the isotropic liquid was measured. In the following, a maximum temperature of the nematic phase may be occasionally abbreviated as "maximum temperature."

(2) Minimum Temperature of a Nematic Phase (TC; ° C.)

Samples each having a nematic phase were kept in freezers at 0° C., −10° C., −20° C., −30° C. and −40° C. for 10 days, and then liquid crystal phases were observed. For example, when a sample maintained the nematic phase at −20° C. and changed to crystals or a smectic phase at −30° C., TC was expressed as TC≤−20° C. In the following, a minimum temperature of the nematic phase may be occasionally abbreviated as "minimum temperature."

(3) Optical Anisotropy (Δn; Measured at 25° C.)

Measurement was carried out by means of Abbe refractometer with a polarizing plate mounted on an ocular by using light at a wavelength of 589 nanometers. A surface of a main prism was first rubbed in one direction, and then a sample was added dropwise onto the main prism. A refractive index (n∥) when the direction of polarized light was parallel to the direction of rubbing, and a refractive index (n⊥) when the direction of polarized light was perpendicular to the direction of rubbing were measured. A value of optical anisotropy (Δn) was calculated from an equation: $\Delta n = n_\parallel - n_\perp$.

(4) Viscosity (Bulk Viscosity; η; Measured at 20° C.; mPa·s)

A cone-plate (E type) viscometer was used for measurement.

(5) Dielectric Anisotropy (Δ∈; Measured at 25° C.)

An ethanol (20 mL) solution of octadecyl triethoxysilane (0.16 mL) was applied to a well-washed glass substrate. After rotating the glass substrate with a spinner, the glass substrate was heated at 150° C. for 1 hour. A VA device in which a distance (cell gap) was 20 micrometers was assembled from two glass substrates.

In a similar manner, a polyamide alignment film was prepared on the glass substrate. After rubbing treatment was applied to the alignment film obtained on the glass substrate, a TN device in which a distance (cell gap) between two glass substrates was 9 micrometers and a twist angle was 80 degrees was assembled.

A sample (a liquid crystal composition, or a mixture of a liquid crystal compound and base liquid crystals) was put in the VA device obtained, a voltage of 0.5 V (1 kHz, sine waves)

was applied to the device, and a dielectric constant ($\in_\parallel$) in the major axis direction of liquid crystal molecules was measured.

Moreover, a sample (a liquid crystal composition, or a mixture of a liquid crystal compound and base liquid crystals) was put in the TN device obtained, a voltage of 0.5 V (1 kHz, sine waves) was applied to the device, and a dielectric constant ($\in_\perp$) in the minor axis direction of the liquid crystal molecules was measured.

A value of dielectric anisotropy was calculated from an equation: $\Delta\in = \in_\parallel - \in_\perp$.

A composition in which the value is negative is a composition having a negative dielectric anisotropy (6) Voltage Holding Ratio (VHR; Measured at 25° C. And 100° C.; %)

A sample was put in a cell having a polyimide alignment film in which a distance (cell gap) between two glass substrates was 6 micrometers, and thus a TN device was prepared. A pulse voltage (60 microseconds at 5 V) was applied to the device at 25° C., and thus the TN device was charged. A waveform of the voltage applied to the TN device was observed by means of a cathode-ray oscilloscope, and an area between a voltage curve and a horizontal axis in a unit cycle (16.7 milliseconds) was determined. After removing the TN device, an area was determined from the waveform of the applied voltage in a similar manner. A value of voltage holding ratio (%) was calculated from an equation: (voltage holding ratio)=(value of area with a TN device)/(value of area with no TN device)×100.

The thus obtained voltage holding ratio was described as "VHR-1." Next, the TN device was heated at 100° C. for 250 hours. After the TN device was returned to 25° C., a voltage holding ratio was measured in a similar manner as described above. A voltage holding ratio obtained after the heating test described above was conducted was described as "VHR-2." In addition, the heating test is an accelerated test and was used as a test corresponding to a test of durability of the TN device for a long period of time.

Use Example 1

| 3-HCx-5 | (1-1-1-3) | 6% |
| 4-HHCx-5 | (1-2-1-4) | 3% |
| 2-BEB(F)-C | (5-14) | 5% |
| 3-BEB(F)-C | (5-14) | 4% |
| 4-BEB(F)-C | (5-14) | 6% |
| 1V2-BEB(F,F)-C | (5-15) | 16% |
| 3-HB-O2 | (12-5) | 10% |
| 3-HH-4 | (12-1) | 3% |
| 3-HHB-F | (3-1) | 3% |
| 3-HHB-1 | (13-1) | 8% |
| 3-HHB-O1 | (13-1) | 4% |
| 3-HBEB-F | (3-37) | 4% |
| 3-HHEB-F | (3-10) | 7% |
| 5-HHEB-F | (3-10) | 4% |
| 3-H2BTB-2 | (13-17) | 4% |
| 3-H2BTB-3 | (13-17) | 4% |
| 3-H2BTB-4 | (13-17) | 4% |
| 3-HB(F)TB-2 | (13-18) | 5% |

NI = 87.3° C.;
Δn = 0.134;
Δε = 25.6;
Vth = 1.06 V.

Use Example 2

| 5-HHCx-3 | (1-2-1-2) | 3% |
| 3-HCxO1H-5 | (1-3-1-18) | 3% |
| 2-HB-C | (5-1) | 5% |
| 3-HB-C | (5-1) | 12% |
| 3-HB-O2 | (12-5) | 15% |
| 2-BTB-1 | (12-10) | 3% |
| 3-HHB-F | (3-1) | 4% |
| 3-HHB-1 | (13-1) | 4% |
| 3-HHB-O1 | (13-1) | 5% |
| 3-HHB-3 | (13-1) | 14% |
| 3-HHEB-F | (3-10) | 4% |
| 5-HHEB-F | (3-10) | 4% |
| 2-HHB(F)-F | (3-2) | 5% |
| 3-HHB(F)-F | (3-2) | 7% |
| 5-HHB(F)-F | (3-2) | 7% |
| 3-HHB(F,F)-F | (3-3) | 5% |

NI = 102.5° C.;
Δn = 0.099;
Δε = 4.3;
Vth = 2.66 V;
η = 18.7 mPa·s.

Use Example 3

| 2-HHCx-3 | (1-2-1-5) | 3% |
| 3-HCxVH-5 | (1-3-1-13) | 3% |
| 3-BEB(F)-C | (5-14) | 8% |
| 3-HB-C | (5-1) | 8% |
| V-HB-C | (5-1) | 8% |
| 1V-HB-C | (5-1) | 8% |
| 3-HB-O2 | (12-5) | 3% |
| 3-HH-2V | (12-1) | 14% |
| 3-HH-2V1 | (12-1) | 7% |
| V2-HHB-1 | (13-1) | 12% |
| 3-HHB-1 | (13-1) | 5% |
| 3-HHEB-F | (3-10) | 4% |
| 3-H2BTB-2 | (13-17) | 6% |
| 3-H2BTB-3 | (13-17) | 6% |
| 3-H2BTB-4 | (13-17) | 5% |

NI = 98.0° C.;
Δn = 0.130;
Δε = 8.1;
Vth = 2.23 V;
η = 15.6 mPa·s.

A pitch when 0.25 part of optically active compound (Op-5) was added to 100 parts of the composition was 60.2 micrometers.

Use Example 4

| 2-HHCx-5 | (1-2-1-6) | 3% |
| 3-HHCx-5 | (1-2-1-1) | 3% |
| 5-BEB(F)-C | (5-14) | 4% |
| V-HB-C | (5-1) | 11% |
| 5-PyB-C | (5-9) | 6% |
| 4-BB-3 | (12-8) | 11% |
| 3-HH-2V | (12-1) | 10% |
| 5-HH-V | (12-1) | 11% |
| V-HHB-1 | (13-1) | 7% |
| V2-HHB-1 | (13-1) | 15% |
| 3-HHB-1 | (13-1) | 4% |
| 1V2-HBB-2 | (13-4) | 10% |
| 3-HHEBH-3 | (14-6) | 5% |

NI = 92.6° C.;
Δn = 0.114;
Δε = 4.3;
Vth = 2.51 V;
η = 15.5 mPa·s.

Use Example 5

| | | |
|---|---|---|
| 1-BHCx-3 | (1-2-3-4) | 4% |
| 3-CxHVH-5 | (1-2-1-20) | 4% |
| 1V2-BEB(F,F)-C | (5-15) | 3% |
| 3-HB-C | (5-1) | 18% |
| 2-BTB-1 | (12-10) | 10% |
| 5-HH-VFF | (—) | 30% |
| 3-HHB-1 | (13-1) | 4% |
| VFF-HHB-1 | (—) | 3% |
| VFF2-HHB-1 | (—) | 11% |
| 3-H2BTB-2 | (13-17) | 5% |
| 3-H2BTB-3 | (13-17) | 4% |
| 3-H2BTB-4 | (13-17) | 4% |

NI = 90.2° C.;
Δn = 0.129;
Δε = 4.2;
Vth = 2.79 V;
η = 11.8 mPa · s.

Use Example 6

| | | |
|---|---|---|
| 3-HCx-5 | (1-1-1-3) | 5% |
| 3-HHCx-2V | (1-2-1-9) | 3% |
| 5-HB-CL | (2-1) | 16% |
| 3-HH-4 | (12-1) | 12% |
| 3-HH-5 | (12-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 10% |
| 4-HHB(F)-F | (3-2) | 9% |
| 5-HHB(F)-F | (3-2) | 5% |
| 7-HHB(F)-F | (3-2) | 4% |
| 5-HBB(F)-F | (3-23) | 4% |
| 1O1-HBBH-5 | (14-1) | 3% |
| 3-HHBB(F,F)-F | (4-6) | 2% |
| 4-HHBB(F,F)-F | (4-6) | 3% |
| 5-HHBB(F,F)-F | (4-6) | 3% |
| 3-HH2BB(F,F)-F | (4-15) | 3% |
| 4-HH2BB(F,F)-F | (4-15) | 3% |

NI = 111.9° C.;
Δn = 0.089;
Δε = 3.2;
Vth = 2.69 V;
η = 17.6 mPa · s.

Use Example 7

| | | |
|---|---|---|
| 2-HHCx-3 | (1-2-1-5) | 3% |
| 5-HHCx-3 | (1-2-1-2) | 3% |
| 3-HHB(F,F)-F | (3-3) | 9% |
| 3-H2HB(F,F)-F | (3-15) | 8% |
| 4-H2HB(F,F)-F | (3-15) | 8% |
| 5-H2HB(F,F)-F | (3-15) | 8% |
| 3-HBB(F,F)-F | (3-24) | 21% |
| 5-HBB(F,F)-F | (3-24) | 20% |
| 3-H2BB(F,F)-F | (3-27) | 7% |
| 5-HHBB(F,F)-F | (4-6) | 3% |
| 5-HHEBB-F | (4-17) | 2% |
| 3-HH2BB(F,F)-F | (4-15) | 3% |
| 1O1-HBBH-4 | (14-1) | 2% |
| 1O1-HBBH-5 | (14-1) | 3% |

NI = 98.0° C.;
Δn = 0.111;
Δε = 8.6;
Vth = 1.80 V.

Use Example 8

| | | |
|---|---|---|
| 4-HHCx-5 | (1-2-1-4) | 4% |
| 3-HCxO1H-5 | (1-3-1-18) | 4% |
| 5-HB-F | (2-1) | 10% |
| 6-HB-F | (2-1) | 9% |
| 7-HB-F | (2-1) | 7% |
| 2-HHB-OCF3 | (3-1) | 7% |
| 3-HHB-OCF3 | (3-1) | 7% |
| 4-HHB-OCF3 | (3-1) | 7% |
| 5-HHB-OCF3 | (3-1) | 5% |
| 3-HH2B-OCF3 | (3-4) | 4% |
| 5-HH2B-OCF3 | (3-4) | 4% |
| 3-HHB(F,F)-OCF2H | (3-3) | 4% |
| 3-HHB(F,F)-OCF3 | (3-3) | 5% |
| 3-HH2B(F)-F | (3-5) | 3% |
| 3-HBB(F)-F | (3-23) | 5% |
| 5-HBB(F)-F | (3-23) | 10% |
| 5-HBBH-3 | (14-1) | 2% |
| 3-HB(F)BH-3 | (14-2) | 3% |

NI = 91.8° C.;
Δn = 0.090;
Δε = 3.9;
Vth = 2.70 V;
η = 15.4 mPa · s.

Use Example 9

| | | |
|---|---|---|
| 2-HHCx-5 | (1-2-1-6) | 3% |
| 3-HHCx-5 | (1-2-1-1) | 3% |
| 5-HB-CL | (2-2) | 11% |
| 3-HH-4 | (12-1) | 8% |
| 3-HHB-1 | (13-1) | 3% |
| 3-HHB(F,F)-F | (3-3) | 8% |
| 3-HBB(F,F)-F | (3-24) | 20% |
| 5-HBB(F,F)-F | (3-24) | 15% |
| 3-HHEB(F,F)-F | (3-12) | 10% |
| 4-HHEB(F,F)-F | (3-12) | 3% |
| 5-HHEB(F,F)-F | (3-12) | 3% |
| 2-HBEB(F,F)-F | (3-39) | 3% |
| 3-HBEB(F,F)-F | (3-39) | 4% |
| 5-HBEB(F,F)-F | (3-39) | 3% |
| 3-HHBB(F,F)-F | (4-6) | 3% |

NI = 79.9° C.;
Δn = 0.099;
Δε = 8.0;
Vth = 1.57 V;
η = 21.2 mPa · s.

Use Example 10

| | | |
|---|---|---|
| 3-HCxVH-5 | (1-3-1-13) | 3% |
| 1-BHCx-3 | (1-2-3-4) | 3% |
| 3-HB-CL | (2-2) | 2% |
| 5-HB-CL | (2-2) | 4% |
| 3-HHB-OCF3 | (3-2) | 5% |
| 3-H2HB-OCF3 | (3-13) | 5% |
| 5-H4HB-OCF3 | (3-19) | 15% |
| V-HHB(F)-F | (3-2) | 5% |
| 3-HHB(F)-F | (3-2) | 5% |
| 5-HHB(F)-F | (3-2) | 5% |
| 3-H4HB(F,F)-CF3 | (3-21) | 8% |
| 5-H4HB(F,F)-CF3 | (3-21) | 10% |
| 5-H2HB(F,F)-F | (3-15) | 5% |
| 5-H4HB(F,F)-F | (3-21) | 7% |
| 2-H2BB(F)-F | (3-26) | 5% |

-continued

| | | |
|---|---|---|
| 3-H2BB(F)-F | (3-26) | 8% |
| 3-HBEB(F,F)-F | (3-39) | 5% |

NI = 80.2° C.;
Δn = 0.098;
Δε = 8.0;
Vth = 2.00 V;
η = 26.9 mPa·s.

Use Example 11

| | | |
|---|---|---|
| 4-HHCx-5 | (1-2-1-4) | 2% |
| 3-CxHVH-5 | (1-2-1-20) | 4% |
| 5-HB-CL | (2-2) | 17% |
| 7-HB(F,F)-F | (2-4) | 3% |
| 3-HH-4 | (12-1) | 10% |
| 3-HH-5 | (12-1) | 5% |
| 3-HB-O2 | (12-5) | 15% |
| 3-HHB-1 | (13-1) | 8% |
| 3-HHB-O1 | (13-1) | 5% |
| 2-HHB(F)-F | (3-2) | 7% |
| 3-HHB(F)-F | (3-2) | 7% |
| 5-HHB(F)-F | (3-2) | 7% |
| 3-HHB(F,F)-F | (3-3) | 6% |
| 3-H2HB(F,F)-F | (3-15) | 2% |
| 4-H2HB(F,F)-F | (3-15) | 2% |

NI = 79.3° C.;
Δn = 0.076;
Δε = 2.3;
Vth = 2.39 V;
η = 14.0 mPa·s.

Use Example 12

| | | |
|---|---|---|
| 3-CxHVH-5 | (1-2-1-20) | 3% |
| 3-HHCx-2V | (1-2-1-9) | 3% |
| 5-HB-CL | (2-2) | 3% |
| 7-HB(F)-F | (2-3) | 7% |
| 3-HH-4 | (12-1) | 9% |
| 3-HH-EMe | (12-2) | 20% |
| 3-HHEB-F | (3-10) | 8% |
| 5-HHEB-F | (3-10) | 8% |
| 3-HHEB(F,F)-F | (3-12) | 10% |
| 4-HHEB(F,F)-F | (3-12) | 5% |
| 4-HGB(F,F)-F | (3-103) | 5% |
| 5-HGB(F,F)-F | (3-103) | 6% |
| 2-H2GB(F,F)-F | (3-106) | 4% |
| 3-H2GB(F,F)-F | (3-106) | 5% |
| 5-GHB(F,F)-F | (3-109) | 4% |

NI = 88.1° C.;
Δn = 0.066;
Δε = 4.8;
Vth = 1.80 V;
η = 19.1 mPa·s.

Use Example 13

| | | |
|---|---|---|
| 5-HHCx-3 | (1-2-1-2) | 3% |
| 3-HCxO1H-5 | (1-3-1-18) | 3% |
| 3-HB-O2 | (12-5) | 10% |
| 5-HB-CL | (2-2) | 13% |
| 3-HBB(F,F)-F | (3-24) | 7% |
| 3-PyB(F)-F | (2-15) | 10% |
| 5-PyB(F)-F | (2-15) | 10% |
| 3-PyBB-F | (3-80) | 10% |
| 4-PyBB-F | (3-80) | 10% |
| 5-PyBB-F | (3-80) | 10% |
| 5-HBB(F)B-2 | (14-5) | 7% |
| 5-HBB(F)B-3 | (14-5) | 7% |

NI = 95.2° C.;
Δn = 0.180;
Δε = 7.7;
Vth = 1.93 V.

Use Example 14

| | | |
|---|---|---|
| 3-HCx-5 | (1-1-1-3) | 4% |
| 5-HHCx-3 | (1-2-1-2) | 3% |
| 3-HH-O1 | (12-1) | 8% |
| 5-HH-O1 | (12-1) | 4% |
| 3-HH-4 | (12-1) | 5% |
| 3-HB(2F,3F)-O2 | (6-1) | 12% |
| 5-HB(2F,3F)-O2 | (6-1) | 21% |
| 2-HHB(2F,3F)-1 | (7-1) | 5% |
| 3-HHB(2F,3F)-1 | (7-1) | 7% |
| 3-HHB(2F,3F)-O2 | (7-1) | 11% |
| 5-HHB(2F,3F)-O2 | (7-1) | 20% |

NI = 62.4° C.;
Δn = 0.074;
η = 21.6 mPa·s;
Δε = −3.9.

Use Example 15

| | | |
|---|---|---|
| 3-HHCx-5 | (1-2-1-1) | 5% |
| 4-HHCx-5 | (1-2-1-4) | 3% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 12% |
| 3-HHB(2F,3F)-O2 | (7-1) | 8% |
| 5-HHB(2F,3F)-O2 | (7-1) | 10% |
| 3-HHB-O1 | (13-1) | 6% |

NI = 86.9° C.;
Δn = 0.087;
Δε = −3.0.

Use Example 16

| | | |
|---|---|---|
| 3-CxHB(2F,3F)-O2 | (1-2-3-25) | 4% |
| 5-CxHB(2F,3F)-O2 | (1-2-3-26) | 4% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 10% |
| 3-HHB(2F,3F)-O2 | (7-1) | 7% |
| 5-HHB(2F,3F)-O2 | (7-1) | 13% |
| 3-HHB-1 | (13-1) | 6% |

NI = 83.6° C.;
Δn = 0.090;
η = 36.1 mPa·s;
Δε = −3.5.

Use Example 17

| | | |
|---|---|---|
| 3-CxHB(2F,3F)-O2 | (1-2-3-25) | 3% |
| 5-CxHB(2F,3F)-O2 | (1-2-3-26) | 3% |
| 3-HH-4 | (12-1) | 8% |
| 3-H2B(2F,3F)-O2 | (6-4) | 22% |
| 5-H2B(2F,3F)-O2 | (6-4) | 22% |
| 3-HHB(2F,3CL)-O2 | (7-12) | 3% |
| 5-HHB(2F,3CL)-O2 | (7-12) | 2% |
| 3-HBB(2F,3F)-O2 | (7-7) | 7% |
| 5-HBB(2F,3F)-O2 | (7-7) | 9% |
| V-HHB-1 | (13-1) | 6% |
| 3-HHB-3 | (13-1) | 6% |
| 3-HHEBH-3 | (14-6) | 3% |
| 3-HHEBH-4 | (14-6) | 3% |
| 3-HHEBH-5 | (14-6) | 3% |

NI = 89.9° C.;
Δn = 0.099;
η = 28.3 mPa · s;
Δε = −4.1.

A pitch when 0.25 part of optically active compound (Op-05) was added to 100 parts of the composition was 60.3 micrometers.

Use Example 18

| | | |
|---|---|---|
| 3-HCx1OB(2F,3F)-O2 | (1-3-2-40) | 3% |
| 5-HCx1OB(2F,3F)-O2 | (1-3-2-39) | 3% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 10% |
| 3-HHB(2F,3F)-1 | (7-1) | 12% |
| 3-HHB(2F,3F)-O2 | (7-1) | 9% |
| 5-HHB(2F,3F)-O2 | (7-1) | 13% |
| 6-HEB(2F,3F)-O2 | (7-1) | 6% |

Use Example 19

| | | |
|---|---|---|
| 3-HCxB(2F,3F)-O2 | (1-3-2-25) | 3% |
| 5-HCxB(2F,3F)-O2 | (1-3-2-26) | 3% |
| 2-HH-5 | (12-1) | 3% |
| 3-HH-4 | (12-1) | 15% |
| 3-HH-5 | (12-1) | 4% |
| 3-HB-O2 | (12-5) | 12% |
| 3-H2B(2F,3F)-O2 | (6-4) | 15% |
| 5-H2B(2F,3F)-O2 | (6-4) | 15% |
| 3-HHB(2F,3CL)-O2 | (7-12) | 3% |
| 2-BB(2F,3F)-O2 | (7-7) | 3% |
| 3-HBB(2F,3F)-O2 | (7-7) | 5% |
| 5-HBB(2F,3F)-O2 | (7-7) | 9% |
| 3-HHB-1 | (13-1) | 3% |
| 3-HHB-3 | (13-1) | 4% |
| 3-HHB-O1 | (13-1) | 3% |

Use Example 20

| | | |
|---|---|---|
| 3-CxH1OB(2F,3F)-O2 | (1-2-3-41) | 3% |
| 5-CxH1OB(2F,3F)-O2 | (1-2-3-42) | 3% |
| 3-HB-O1 | (12-5) | 15% |
| 3-HH-4 | (12-1) | 5% |
| 3-HB(2F,3F)-O2 | (6-1) | 12% |
| 5-HB(2F,3F)-O2 | (6-1) | 12% |
| 2-HHB(2F,3F)-1 | (7-1) | 12% |
| 3-HHB(2F,3F)-1 | (7-1) | 10% |
| 3-HHB(2F,3F)-O2 | (7-1) | 9% |
| 5-HHB(2F,3F)-O2 | (7-1) | 13% |
| 3-HHB-1 | (13-1) | 6% |

Use Example 21

| | | |
|---|---|---|
| 3-CxB(2F,3F)-O2 | (1-1-2-25) | 3% |
| 5-CxB(2F,3F)-O2 | (1-2-2-26) | 3% |
| 2-BEB(F)-C | (5-14) | 3% |
| 3-BEB(F)-C | (5-14) | 4% |
| 4-BEB(F)-C | (5-14) | 8% |
| 1V2-BEB(F,F)-C | (5-15) | 16% |
| 3-HB-O2 | (12-5) | 10% |
| 3-HH-4 | (12-1) | 3% |
| 3-HHB-F | (3-1) | 3% |
| 3-HHB-1 | (13-1) | 8% |
| 3-HHB-O1 | (13-1) | 4% |
| 3-HBEB-F | (3-37) | 4% |
| 3-HHEB-F | (3-10) | 7% |
| 5-HHEB-F | (3-10) | 7% |
| 3-H2BTB-2 | (13-17) | 4% |
| 3-H2BTB-3 | (13-17) | 4% |
| 3-H2BTB-4 | (13-17) | 4% |
| 3-HB(F)TB-2 | (13-18) | 5% |

Use Example 22

| | | |
|---|---|---|
| 3-HCx1OB(2CF3,3F)-O2 | (1-3-2-44) | 3% |
| 5-HCx1OB(2CF2H,3F)-O2 | (1-3-2-46) | 3% |
| 1V2-BEB(F,F)-C | (5-15) | 5% |
| 3-HB-C | (5-1) | 18% |
| 2-BTB-1 | (12-10) | 10% |
| 5-HH-VFF | (12-1) | 30% |
| 3-HHB-1 | (13-1) | 4% |
| VFF-HHB-1 | (13-1) | 8% |
| VFF2-HHB-1 | (13-1) | 6% |
| 3-H2BTB-2 | (13-17) | 5% |
| 3-H2BTB-3 | (13-17) | 4% |
| 3-H2BTB-4 | (13-17) | 4% |

Use Example 23

| | | |
|---|---|---|
| 3-CxHB(2F,3F)-O2 | (1-2-3-25) | 3% |
| 5-CxHB(2F,3F)-O2 | (1-2-3-26) | 3% |
| 2-HB-C | (5-1) | 5% |
| 3-HB-C | (5-1) | 12% |
| 3-HB-O2 | (12-5) | 15% |
| 2-BTB-1 | (12-10) | 3% |
| 3-HHB-F | (3-1) | 4% |
| 3-HHB-1 | (13-1) | 8% |
| 3-HHB-O1 | (13-1) | 5% |
| 3-HHB-3 | (13-1) | 14% |
| 3-HHEB-F | (3-10) | 4% |
| 5-HHEB-F | (3-10) | 4% |
| 2-HHB(F)-F | (3-2) | 4% |
| 3-HHB(F)-F | (3-2) | 4% |

-continued

| | | |
|---|---|---|
| 5-HHB(F)-F | (3-2) | 7% |
| 3-HHB(F,F)-F | (3-3) | 5% |

Use Example 24

| | | |
|---|---|---|
| 3-CxHB(2F,3F)-O2 | (1-2-3-25) | 3% |
| 3-HCx1OB(2F,3F)-O2 | (1-3-2-40) | 3% |
| 5-HB-CL | (2-2) | 16% |
| 3-HH-4 | (12-1) | 12% |
| 3-HH-5 | (12-1) | 4% |
| 3-HHB-F | (3-1) | 4% |
| 3-HHB-CL | (3-1) | 3% |
| 4-HHB-CL | (3-1) | 4% |
| 3-HHB(F)-F | (3-2) | 5% |
| 4-HHB(F)-F | (3-2) | 9% |
| 5-HHB(F)-F | (3-2) | 9% |
| 7-HHB(F)-F | (3-2) | 8% |
| 5-HBB(F)-F | (3-23) | 3% |
| 1O1-HBBH-5 | (14-1) | 3% |
| 3-HHBB(F,F)-F | (4-6) | 2% |
| 4-HHBB(F,F)-F | (4-6) | 3% |
| 5-HHBB(F,F)-F | (4-6) | 3% |
| 3-HH2BB(F,F)-F | (4-15) | 3% |
| 4-HH2BB(F,F)-F | (4-15) | 3% |

Use Example 25

| | | |
|---|---|---|
| 5-HCx1OB(2F,3F)-O2 | (1-3-2-39) | 3% |
| 3-HCxB(2F,3F)-O2 | (1-3-2-25) | 3% |
| 5-HB-CL | (2-2) | 3% |
| 7-HB(F)-F | (2-3) | 7% |
| 3-HH-4 | (12-1) | 9% |
| 3-HH-EMe | (12-2) | 23% |
| 3-HHEB-F | (3-10) | 8% |
| 5-HHEB-F | (3-10) | 8% |
| 3-HHEB(F,F)-F | (3-12) | 6% |
| 4-HHEB(F,F)-F | (3-12) | 3% |
| 4-HGB(F,F)-F | (3-103) | 5% |
| 5-HGB(F,F)-F | (3-103) | 6% |
| 2-H2GB(F,F)-F | (3-106) | 4% |
| 3-H2GB(F,F)-F | (3-106) | 5% |
| 5-GHB(F,F)-F | (3-109) | 7% |

INDUSTRIAL APPLICABILITY

A compound of the invention has both a high clearing point and a low crystallization temperature, and thus has a wide temperature range of a liquid crystal phase, and also an excellent solubility in other liquid crystal compounds. The compound of the invention further has general physical properties necessary for the compound, namely, stability to heat, light and so forth, a suitable optical anisotropy and a suitable dielectric anisotropy furthermore. A liquid crystal composition of the invention contains at least one of the compounds, and has a high maximum temperature of a nematic phase, a low minimum temperature of the nematic phase, a small viscosity, a suitable optical anisotropy and a low threshold voltage. A liquid crystal display device of the invention includes the composition and has a wide temperature range in which the device can be used, a short response time, a large contrast ratio and a low driving voltage, and therefore can be used for a liquid crystal projector, a liquid crystal television and so forth.

What is claimed is:

1. A compound represented by formula (1-1) to formula (1-8):

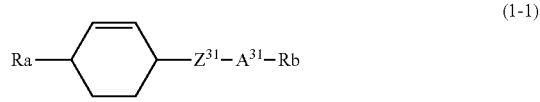

(1-1)

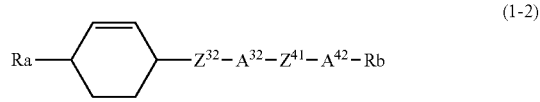

(1-2)

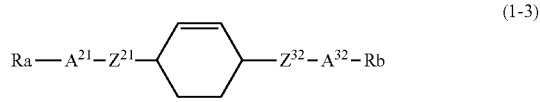

(1-3)

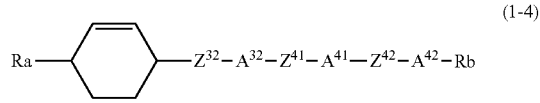

(1-4)

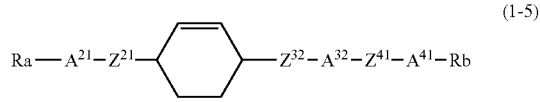

(1-5)

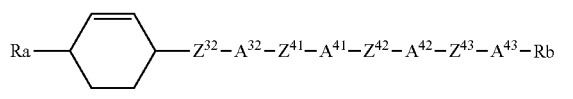

(1-6)

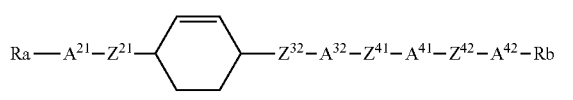

(1-7)

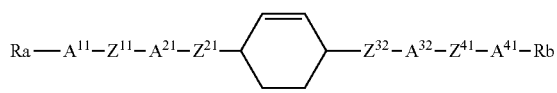

(1-8)

wherein, in formula (1-1) to formula (1-8), Ra and Rb are independently alkyl having 1 to 10 carbons, alkenyl having 2 to 10 carbons, alkoxy having 1 to 9 carbons, alkoxyalkyl having 2 to 9 carbons, alkenyloxy having 3 to 9 carbons, polyfluoroalkyl having 2 to 10 carbons, polyfluoroalkoxy having 1 to 9 carbons or polyfluoroalkenyl having 2 to 10 carbons; $A^{11}, A^{21}, A^{31}, A^{32}, A^{41}, A^{42}$ and $A^{43}$ are independently 1,4-cyclohexylene, 1,4-phenylene, cyclohexene-1,4-diyl, cyclohexene-3,6-diyl, tetrahydropyran-2,5-diyl, 1,3-dioxane-2,5-diyl, 2-fluoro-1,4-phenylene, 3-fluoro-1,4-phenylene, 2,3-difluoro-1,4-phenylene, 2-(trifluoromethyl)-3-fluoro-1,4-phenylene, 2-fluoro-3-(trifluoromethyl)-1,4-phenylene, 2-(difluoromethyl)-3-fluoro-1,4-phenylene, 2-fluoro-3-(difluoromethyl)-1,4-phenylene, 2-trifluoromethyl-1,4-phenylene, 3-trifluoromethyl-1,4-phenylene, 2-difluoromethyl-1,4-phenylene, 3-difluoromethyl-1,4-phenylene, decahydronaphthalene-2,6-diyl or naphthalene-2,6-diyl, but at least one of $A^{11}, A^{21}, A^{31}, A^{32}, A^{41}, A^{42}$ and $A^{43}$ is 2,3-difluoro-1,4-phenylene, 2-(trifluoromethyl)-3-fluoro-1,4-phenylene, 2-fluoro-3-(trifluoromethyl)-1,4-phenylene, 2-(difluoromethyl)-3-fluoro-1,4-phenylene or 2-fluoro-3-(difluoromethyl)-1,4-phenylene; and $Z^{11}, Z^{21}, Z^{31}, Z^{32}, Z^{41}, Z^{42}$ and $Z^{43}$ are independently a single bond, $-(CH_2)_2-$, $-CH=CH-$, $-CH_2O-$, $-OCH_2-$, $-(CH_2)_4-$, —C≡C—, —CH₂SiH₂—, —SiH₂CH₂—, —CH=CH—CH₂O— or —OCH₂—CH=CH—.

2. The compound according to claim 1, wherein, in formula (1-1) to formula (1-5), Ra and Rb are independently fluorine, alkyl having 1 to 8 carbons, alkenyl having 2 to 8 carbons, alkoxy having 1 to 7 carbons, alkoxyalkyl having 2 to 7 carbons or alkenyloxy having 3 to 7 carbons; $A^{21}$, $A^{31}$, $A^{32}$, $A^{41}$ and $A^{42}$ are independently 1,4-cyclohexylene, 1,4-phenylene, cyclohexene-1,4-diyl, tetrahydropyran-2,5-diyl, 2-fluoro-1,4-phenylene, 3-fluoro-1,4-phenylene, 2,3-difluoro-1,4-phenylene, 2-(trifluoromethyl)-3-fluoro-1,4-phenylene, 2-fluoro-3-(trifluoromethyl)-1,4-phenylene, 2-(difluoromethyl)-3-fluoro-1,4-phenylene or 2-fluoro-3-(difluoromethyl)-1,4-phenylene, but at least one of $A^{21}$, $A^{31}$, $A^{32}$, $A^{41}$ and $A^{42}$ is 2,3-difluoro-1,4-phenylene, 2-(trifluoromethyl)-3-fluoro-1,4-phenylene, 2-fluoro-3-(trifluoromethyl)-1,4-phenylene, 2-(difluoromethyl)-3-fluoro-1,4-phenylene or 2-fluoro-3-(difluoromethyl)-1,4-phenylene; and $Z^{21}$, $Z^{31}$, $Z^{32}$, $Z^{41}$ and $Z^{42}$ are independently a single bond, —(CH₂)₂—, —CH=CH—, —CH₂O—, —OCH₂—, —(CH₂)₄— or —C≡C—.

3. The compound according to claim 1, wherein, in formula (1-1) to formula (1-5), Ra and Rb are independently alkyl having 1 to 5 carbons, alkenyl having 2 to 5 carbons or alkoxy having 1 to 4 carbons; $A^{21}$, $A^{31}$, $A^{32}$, $A^{41}$ and $A^{42}$ are independently 1,4-cyclohexylene, 1,4-phenylene, 2-fluoro-1,4-phenylene, 3-fluoro-1,4-phenylene or 2,3-difluoro-1,4-phenylene, but at least one of $A^{21}$, $A^{31}$, $A^{32}$, $A^{41}$ and $A^{42}$ is 2,3-difluoro-1,4-phenylene; and $Z^{21}$, $Z^{31}$, $Z^{32}$, $Z^{41}$ and $Z^{42}$ are independently a single bond, —(CH₂)₂—, —CH₂O—, —OCH₂— or —CH=CH—.

4. The compound according to claim 1, wherein, in formula (1-1) to formula (1-3), $A^{21}$, $A^{31}$, $A^{32}$ and $A^{42}$ are independently 1,4-cyclohexylene, 1,4-phenylene or 2,3-difluoro-1,4-phenylene, but at least one of $A^{21}$, $A^{31}$, $A^{32}$ and $A^{42}$ is 2,3-difluoro-1,4-phenylene, and $Z^{21}$, $Z^{31}$, $Z^{32}$ and $Z^{42}$ are a single bond, —CH₂O— or —OCH₂—.

5. The compound according to claim 1, represented by any one of formula (1-1-2), formula (1-2-2) to formula (1-2-4), formula (1-3-2), formula (1-3-3), formula (1-4-2) to formula (1-4-6) and formula (1-5-2) to formula (1-5-7):

(1-1-2)
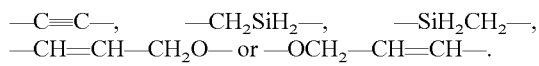

(1-2-2)
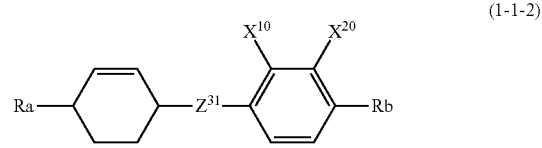

(1-2-3)
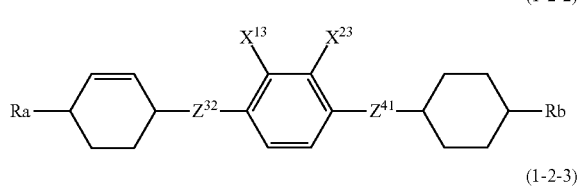

(1-2-4)
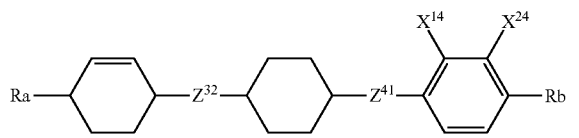

(1-3-2)
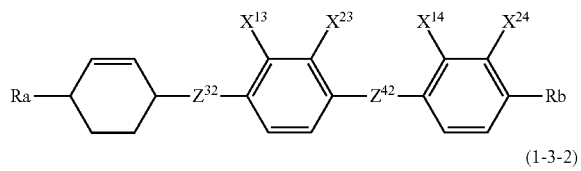

(1-3-3)
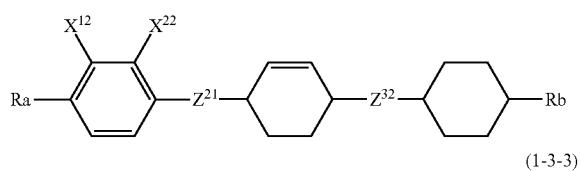

(1-4-2)
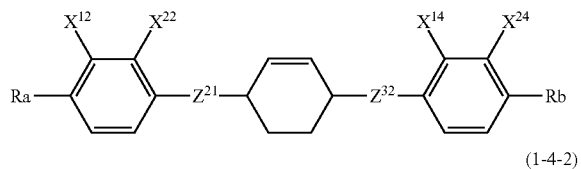

(1-4-3)
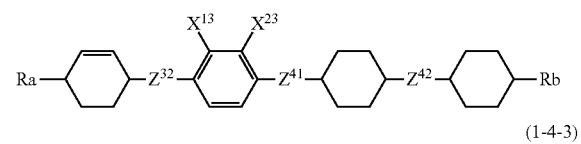

(1-4-4)
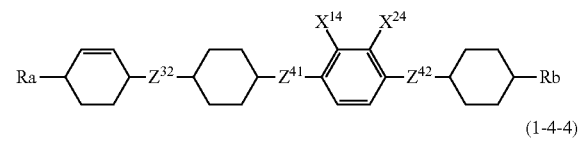

(1-4-5)
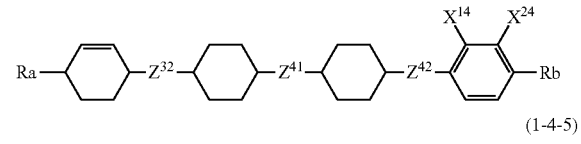

(1-4-6)
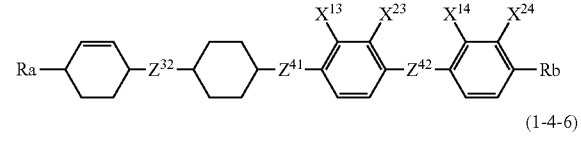

(1-5-2)
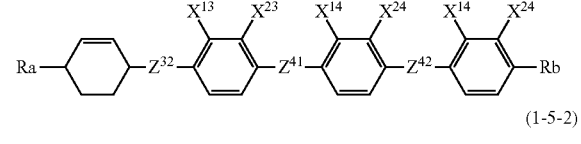

(1-5-3)
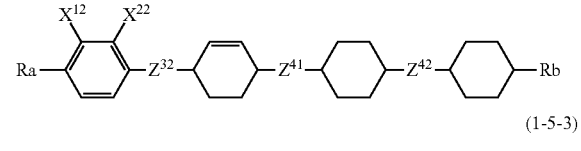

(1-5-4)
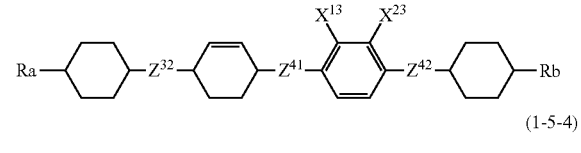

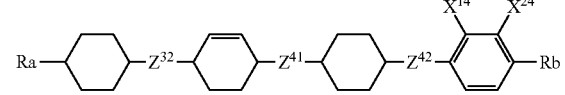

-continued (1-5-5)
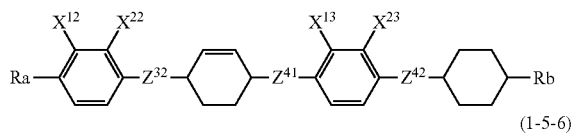

(1-5-6)
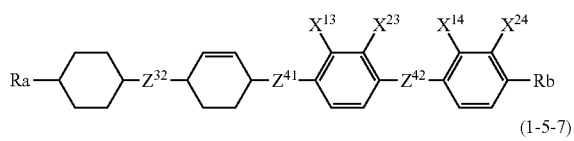

(1-5-7)
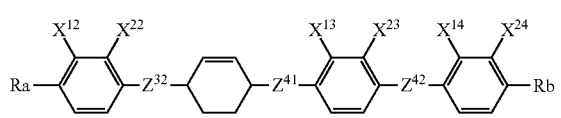

wherein, in formula (1-1-2), formula (1-2-2) to formula (1-2-4), formula (1-3-2) to formula (1-3-3), formula (1-4-2) to formula (1-4-6) and formula (1-5-2) to formula (1-5-7), Ra and Rb are independently alkyl having 2 to 10 carbons, alkoxy having 1 to 9 carbons or alkenyl having 2 to 10 carbons; $X^{10}$, $X^{20}$, $X^{12}$, $X^{22}$, $X^{13}$, $X^{23}$, $X^{14}$ and $X^{24}$ are independently fluorine or hydrogen, but both in at least one set of $X^{10}$ and $X^{20}$, $X^{12}$ and $X^{22}$, $X^{13}$ and $X^{23}$, and $X^{14}$ and $X^{24}$ are fluorine; $Z^{21}$, $Z^{31}$, $Z^{32}$, $Z^{41}$ and $Z^{42}$ are independently a single bond, —(CH$_2$)$_2$—, —CH=CH—, —CH$_2$O— or —OCH$_2$—.

6. The compound according to claim 1, represented by any one of formulas (1-1-2), (1-2-2) to (1-2-4), and (1-3-3):

(1-1-2)
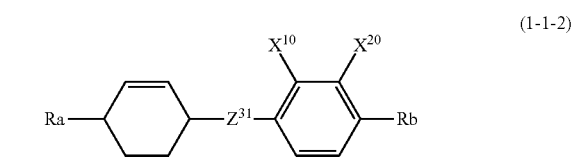

(1-2-2)
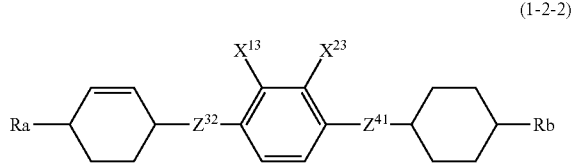

(1-2-3)
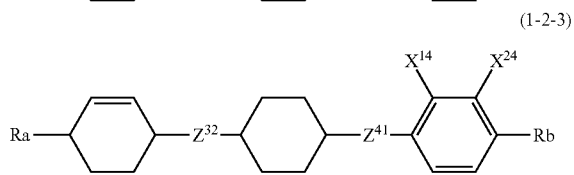

(1-2-4)
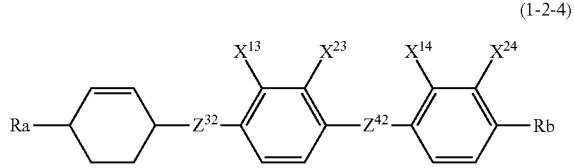

(1-3-3)
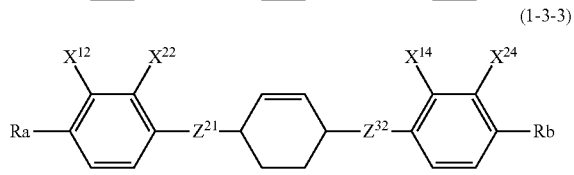

wherein, in formulas (1-1-2), (1-2-2) to (1-2-4), and (1-3-3), Ra and Rb are independently alkyl having 1 to 8 carbons, alkoxy having 1 to 7 carbons or alkenyl having 2 to 8 carbons; $X^{10}$, $X^{20}$, $X^{12}$, $X^{22}$, $X^{13}$, $X^{23}$, $X^{14}$ and $X^{24}$ are independently fluorine or hydrogen, but both in at least one set of $X^{10}$ and $X^{20}$, $X^{12}$ and $X^{22}$, $X^{13}$ and $X^{23}$, and $X^{14}$ and $X^{24}$ are fluorine; $Z^{21}$, $Z^{31}$, $Z^{32}$ and $Z^{41}$ are independently a single bond, —(CH$_2$)$_2$—, —CH=CH—, —CH$_2$O— or —OCH$_2$—.

7. The compound according to claim 6, wherein, in formulas (1-1-2), (1-2-3) and (1-2-4), Ra and Rb are alkyl having 1 to 5 carbons, alkoxy having 1 to 5 carbons or alkenyl having 2 to 5 carbons; $X^{10}$, $X^{20}$, $X^{14}$ and $X^{24}$ are fluorine, $X^{13}$ and $X^{23}$ are independently fluorine or hydrogen; and $Z^{21}$, $Z^{31}$, $Z^{32}$ and $Z^{41}$ are independently a single bond, —CH=CH—, —CH$_2$O— or —OCH$_2$—.

8. The compound according to claim 6, wherein, in formulas (1-1-2), (1-2-3) and (1-2-4), Ra and Rb are alkyl having 1 to 5 carbons, alkoxy having 1 to 5 carbons or alkenyl having 2 to 5 carbons; $X^{10}$, $X^{20}$, $X^{14}$ and $X^{24}$ are fluorine, and $X^{13}$ and $X^{23}$ are independently fluorine or hydrogen; and $Z^{21}$, $X^{31}$, $Z^{32}$ and $Z^{41}$ are independently a single bond, —CH$_2$O— or —OCH$_2$—.

9. The compound according to claim 6, wherein, in formulas (1-1-2), (1-2-3) and (1-2-4), Ra and Rb are alkyl having 1 to 5 carbons, alkoxy having 1 to 5 carbons or alkenyl having 2 to 5 carbons; $X^{10}$, $X^{20}$, $X^{14}$ and $X^{24}$ are fluorine, and $X^{13}$ and $X^{23}$ are hydrogen; and $Z^{21}$, $Z^{31}$, $Z^{32}$ and $Z^{41}$ are independently a single bond or —CH$_2$O—.

10. A liquid crystal composition containing at least one compound according to claim 1.

11. The liquid crystal composition according to claim 10, further containing at least one compound selected from the group of compounds represented by formulas (2), (3) and (4):

(2)
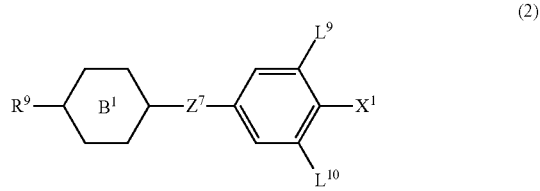

(3)
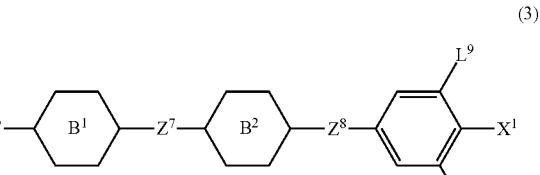

(4)
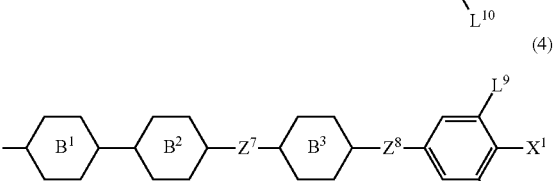

wherein, in formulas (2) to (4), $R^9$ is independently alkyl having 1 to 10 carbons or alkenyl having 2 to 10 carbons, and in the alkyl and the alkenyl, arbitrary hydrogen may be replaced by fluorine and arbitrary —CH$_2$— may be replaced by —O—;

$X^1$ is fluorine, chlorine, —OCF$_3$, —OCHF$_2$, —CF$_3$, —CHF$_2$, —CH$_2$F, —OCF$_2$CHF$_2$ or —OCF$_2$CHFCF$_3$;

ring $B^1$, ring $B^2$ and ring $B^3$ are independently 1,4-cyclohexylene, 1,3-dioxane-2,5-diyl, pyrimidine-2,5-diyl, 1-tetrahydropyran-2,5-diyl, 1,4-phenylene, 2-fluoro-1,4-phenylene, 3-fluoro-1,4-phenylene or 3,5-difluoro-1,4-phenylene;

$Z^7$ and $Z^8$ are independently —$(CH_2)_2$—, —$(CH_2)_4$—, —COO—, —$CF_2O$—, —$OCF_2$—, —CH=CH—, —C≡C—, —$CH_2O$— or a single bond; and $L^9$ and $L^{10}$ are independently hydrogen or fluorine.

12. The liquid crystal composition according to claim 10, further containing at least one compound selected from the group of compounds represented by formula (5):

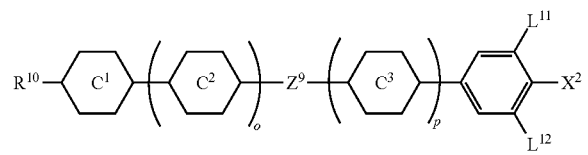
(5)

wherein, in formula (5), $R^{10}$ is alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;

$X^2$ is —C≡N or —C≡C—C≡N;

ring $C^1$, ring $C^2$ and ring $C^3$ are independently 1,4-cyclohexylene, 1,4-phenylene in which arbitrary hydrogen may be replaced by fluorine, 1,3-dioxane-2,5-diyl, 1-tetrahydropyran-2,5-diyl or pyrimidine-2,5-diyl;

$Z^9$ is —$(CH_2)_2$—, —COO—, —$CF_2O$—, —$OCF_2$—, —C≡C—, —$CH_2O$— or a single bond;

$L^{11}$ and $L^{12}$ are independently hydrogen or fluorine; and o is 0, 1 or 2, p is 0 or 1, and a sum of o and p is 0, 1, 2 or 3.

13. The liquid crystal composition according to claim 10, further containing at least one compound selected from the group of compounds represented by formulas (6), (7), (8), (9), (10) and (11):

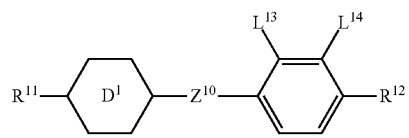
(6)

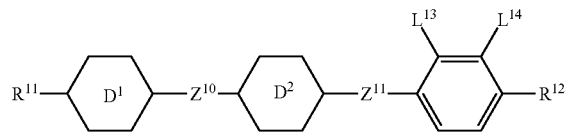
(7)

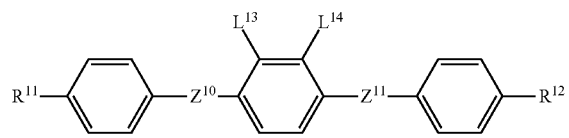
(8)

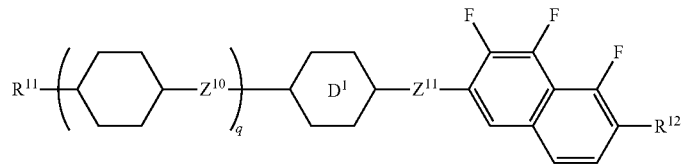
(9)

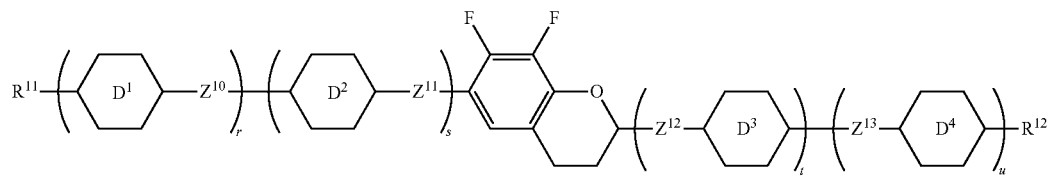
(10)

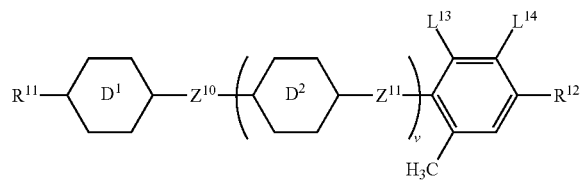
(11)

wherein, in formulas (6) to (11), $R^{11}$ and $R^{12}$ are independently alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;

ring $D^1$, ring $D^2$, ring $D^3$ and ring $D^4$ are independently 1,4-cyclohexylene, 1,4-cyclohexenylene, 1,4-phenylene in which arbitrary hydrogen may be replaced by fluorine, 6-tetrahydropyran-2,5-diyl or decahydro-2,6-naphthalene;

$Z^{10}$, $Z^{11}$, $Z^{12}$ and $Z^{13}$ are independently —$(CH_2)_2$—, —COO—, —$CH_2O$—, —$OCF_2$—, —$OCF_2(CH_2)_2$— or a single bond;

$L^{13}$ and $L^{14}$ are independently fluorine or chlorine; and q, r, s, t, u and v are independently 0 or 1, and a sum of r, s, t and u is 1 or 2.

14. The liquid crystal composition according to claim 10, further containing at least one compound selected from the group of compounds represented by formulas (12), (13) and (14):

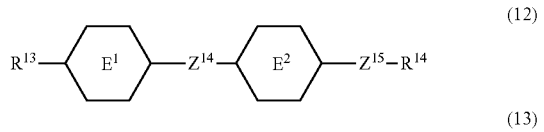
(12)

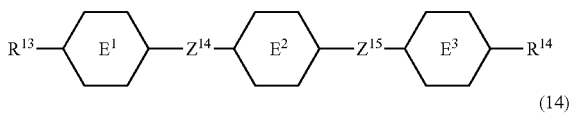
(13)

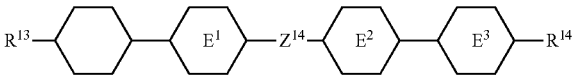
(14)

wherein, in formulas (12) to (14), $R^{13}$ and $R^{14}$ are independently alkyl having 1 to 10 carbons or alkenyl having 2 to 10 carbons, and in the alkyl and the alkenyl, arbitrary —$CH_2$— may be replaced by —O—;

ring $E^1$, ring $E^2$ and ring $E^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are independently —C≡C—, —COO—, —$(CH_2)_2$—, —CH=CH— or a single bond.

15. The liquid crystal composition according to claim 11, further containing at least one compound selected from the group of compounds represented by formula (5):

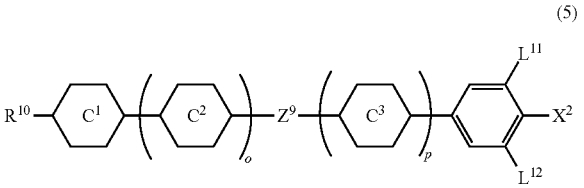
(5)

wherein, in formula (5), $R^{10}$ is alkyl having 1 to 10 carbons or alkenyl having 2 to 10 carbons, and in the alkyl and the alkenyl, arbitrary hydrogen may be replaced by fluorine and arbitrary —$CH_2$— may be replaced by —O—;

$X^2$ is —C≡N or —C≡C—C≡N;

ring $C^1$, ring $C^2$ and ring $C^3$ are independently 1,4-cyclohexylene, 1,4-phenylene in which arbitrary hydrogen may be replaced by fluorine, 1,3-dioxane-2,5-diyl, 1-tetrahydropyran-2,5-diyl or pyrimidine-2,5-diyl;

$Z^9$ is —$(CH_2)_2$—, —COO—, —$CF_2O$—, —$OCF_2$—, —C≡C—, —$CH_2O$— or a single bond;

$L^{11}$ and $L^{12}$ are independently hydrogen or fluorine; and o is 0, 1 or 2, p is 0 or 1, and a sum of o and p is 0, 1, 2 or 3.

16. The liquid crystal composition according to claim 11, further containing at least one compound selected from the group of compounds represented by formulas (12), (13) and (14):

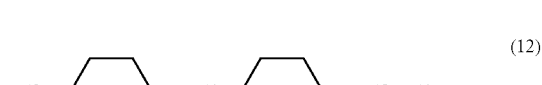
(12)

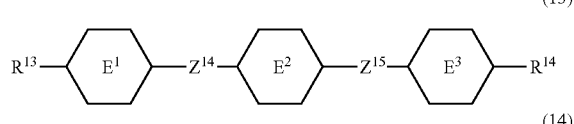
(13)

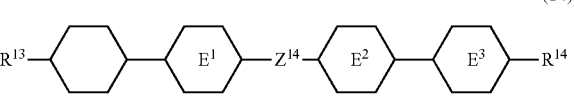
(14)

wherein, in formulas (12) to (14), $R^{13}$ and $R^{14}$ are independently alkyl having 1 to 10 carbons or alkenyl having 2 to 10 carbons, and in the alkyl and the alkenyl, arbitrary —$CH_2$— may be replaced by —O—;

ring $E^1$, ring $E^2$ and ring $E^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are independently —C≡C—, —COO—, —$(CH_2)_2$—, —CH=CH— or a single bond.

17. The liquid crystal composition according to claim 12, further containing at least one compound selected from the group of compounds represented by formulas (12), (13) and (14):

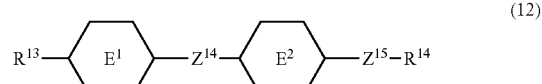
(12)

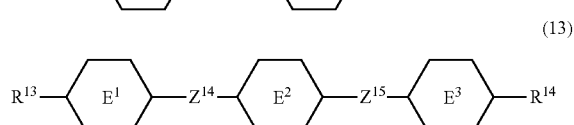
(13)

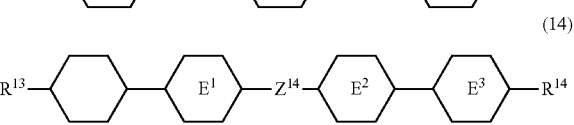
(14)

wherein, in formulas (12) to (14), $R^{13}$ and $R^{14}$ are independently alkyl having 1 to 10 carbons or alkenyl having 2 to 10 carbons, and in the alkyl and the alkenyl, arbitrary —$CH_2$— may be replaced by —O—;

ring $E^1$, ring $E^2$ and ring $E^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are independently —C≡C—, —COO—, —$(CH_2)_2$—, —CH=CH— or a single bond.

18. The liquid crystal composition according to claim 13, further containing at least one compound selected from the group of compounds represented by formulas (12), (13) and (14):

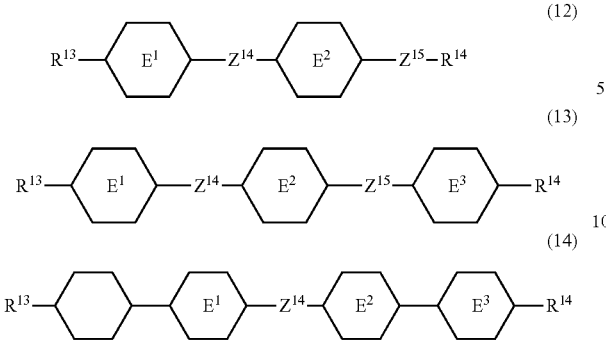

wherein, in formulas (12) to (14), $R^{13}$ and $R^{14}$ are independently alkyl having 1 to 10 carbons or alkenyl having 2 to 10 carbons, and in the alkyl and the alkenyl, arbitrary —$CH_2$— may be replaced by —O—;

ring $E^1$, ring $E^2$ and ring $E^3$ are independently 1,4-cyclohexylene, pyrimidine-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are independently —C≡C—, —COO—, —$(CH_2)_2$—, —CH=CH— or a single bond.

19. The liquid crystal composition according to claim 10, further containing at least one optically active compound and/or at least one polymerizable compound.

20. The liquid crystal composition according to claim 10, further containing at least one antioxidant and/or at least one ultraviolet light absorber.

21. A liquid crystal display device, comprising the liquid crystal composition according to claim 10.

* * * * *